(12) United States Patent
Kubota

(10) Patent No.: US 9,703,081 B2
(45) Date of Patent: Jul. 11, 2017

(54) PROJECTION ZOOM LENS AND PROJECTOR

(71) Applicant: Takashi Kubota, Suginami-ku (JP)

(72) Inventor: Takashi Kubota, Suginami-ku (JP)

(73) Assignee: RICOH COMPANY, LTD., Tokyo (JP)

( * ) Notice: Subject to any disclaimer, the term of this patent is extended or adjusted under 35 U.S.C. 154(b) by 982 days.

(21) Appl. No.: 13/893,586

(22) Filed: May 14, 2013

(65) Prior Publication Data

US 2013/0308105 A1     Nov. 21, 2013

(30) Foreign Application Priority Data

May 15, 2012    (JP) ................................ 2012-111388
May 18, 2012    (JP) ................................ 2012-114782

(51) Int. Cl.
    *G03B 21/14*         (2006.01)
    *G02B 15/14*         (2006.01)
    *G02B 15/177*        (2006.01)

(52) U.S. Cl.
    CPC ........... *G02B 15/14* (2013.01); *G02B 15/177* (2013.01); *G03B 21/14* (2013.01)

(58) Field of Classification Search
    CPC ...... G02B 15/14; G02B 15/177; G02B 15/20; G03B 21/00; G03B 21/14
    See application file for complete search history.

(56) References Cited

U.S. PATENT DOCUMENTS

| | | |
|---|---|---|
| 4,453,178 A | 6/1984 | Miyatake et al. |
| 4,770,513 A | 9/1988 | Fujie et al. |
| 5,659,424 A | 8/1997 | Osawa et al. |

(Continued)

FOREIGN PATENT DOCUMENTS

| | | |
|---|---|---|
| CN | 1102887 A | 5/1995 |
| JP | 07-151971 | 6/1995 |

(Continued)

OTHER PUBLICATIONS

Combined Chinese Office Action and Search Report issued Mar. 2, 2015 in Patent Application No. 201310332685.5 (with English language translation).

(Continued)

*Primary Examiner* — Sultan Chowdhury
*Assistant Examiner* — Danell L Owens
(74) *Attorney, Agent, or Firm* — Oblon, McClelland, Maier & Neustadt, L.L.P.

(57) ABSTRACT

A projection zoom lens constituting a projection optical system of a projector, which projects an image displayed on a surface of an image display element on a projected surface, so as to magnify and display the image includes, in order from the projected surface side to the image display element side, a first lens group having a negative refractive power, a second lens group having a negative refractive power, a third lens group having a positive refractive power, a fourth lens group having a positive refractive power, and a fifth lens group, wherein a refractive power of the fifth lens group is weaker than the refractive power of the first lens group, the refractive power of the second lens group, the refractive power of the third lens group, and the refractive power of the fourth lens group.

16 Claims, 77 Drawing Sheets

(56) References Cited

U.S. PATENT DOCUMENTS

| | | |
|---|---|---|
| 5,933,280 A | 8/1999 | Osawa et al. |
| 6,130,786 A | 10/2000 | Osawa et al. |
| 6,327,100 B1 | 12/2001 | Yamanashi |
| 2010/0208358 A1 | 8/2010 | Minefuji |
| 2010/0309562 A1 | 12/2010 | Amano |
| 2011/0128637 A1 | 6/2011 | Kubota |
| 2011/0249344 A1* | 10/2011 | Nagatoshi ............ G02B 15/177 359/682 |
| 2011/0310496 A1 | 12/2011 | Kubota et al. |
| 2011/0317285 A1 | 12/2011 | Ohashi et al. |
| 2012/0147485 A1 | 6/2012 | Kubota |
| 2013/0194488 A1 | 8/2013 | Kubota et al. |
| 2013/0194681 A1 | 8/2013 | Ohashi et al. |

FOREIGN PATENT DOCUMENTS

| | | |
|---|---|---|
| JP | 2000-275522 | 10/2000 |
| JP | 2003-015038 | 1/2003 |
| JP | 2004-37925 A | 2/2004 |
| JP | 2004-61910 A | 2/2004 |
| JP | 2005-043607 | 2/2005 |
| JP | 2005-055625 | 3/2005 |
| JP | 2005-266174 A | 9/2005 |
| JP | 2005-292260 | 10/2005 |
| JP | 2007-156268 A | 6/2007 |
| JP | 2010134186 A * | 6/2010 |
| JP | 2010-176099 A | 8/2010 |
| JP | 2010-190939 | 9/2010 |
| JP | 2010-282147 | 12/2010 |
| JP | 2011-069957 | 4/2011 |
| JP | 2011-069959 | 4/2011 |
| JP | 2011-107200 A | 6/2011 |
| JP | 2011-227124 A | 11/2011 |
| JP | 2012-88518 A | 5/2012 |
| JP | 2013-88544 A | 5/2013 |

OTHER PUBLICATIONS

Office Action issued Jan. 5, 2016 in Japanese Patent Application No. 2012-111388.

Office Action issued Jan. 5, 2016 in Japanese Patent Application No. 2012-114782.

* cited by examiner

FIG. 1
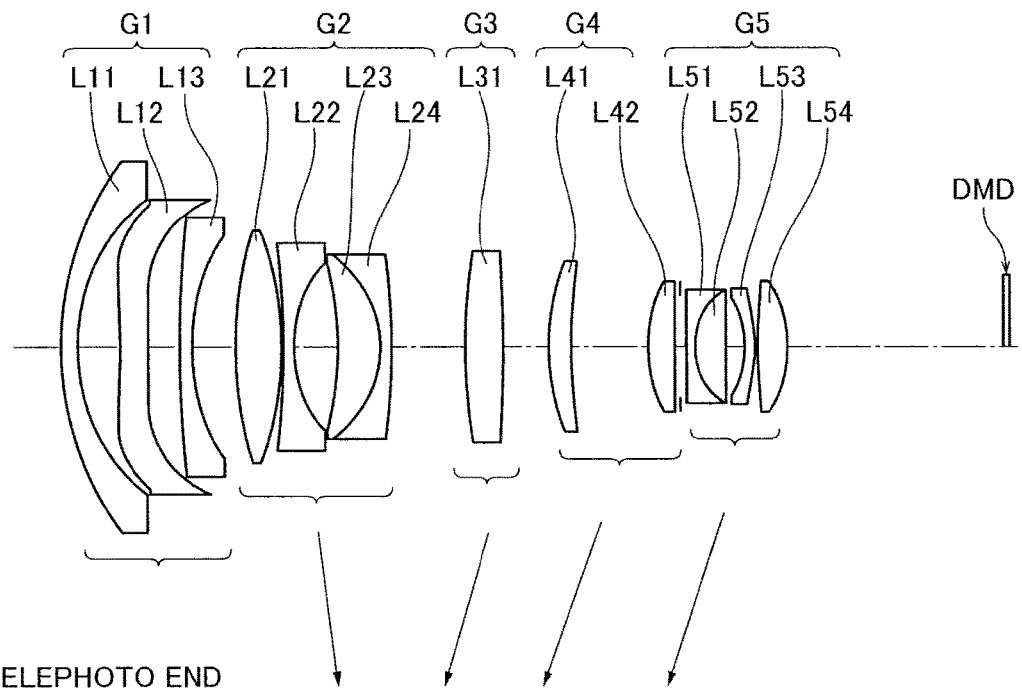
WIDE-ANGLE END
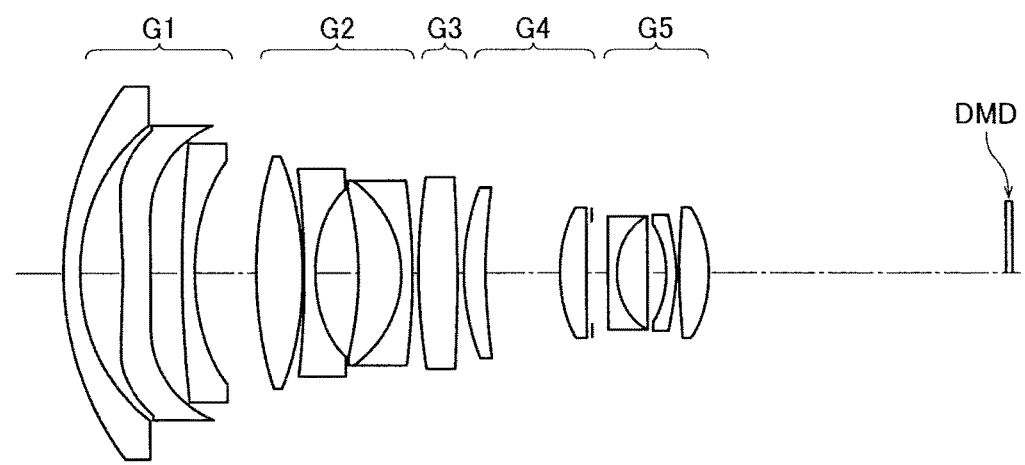
TELEPHOTO END

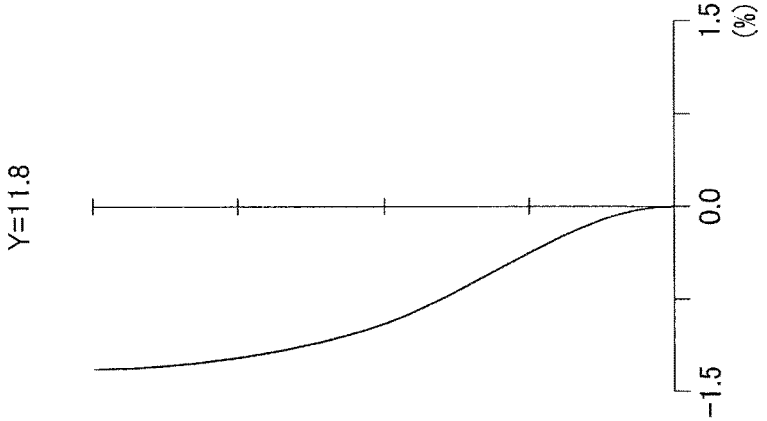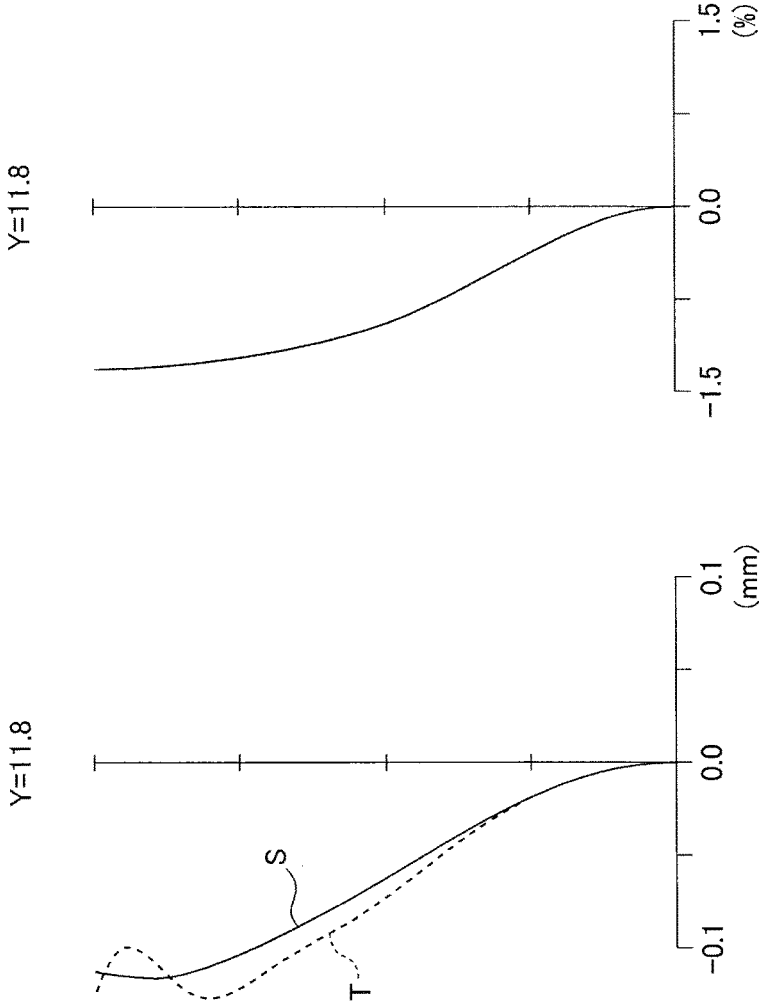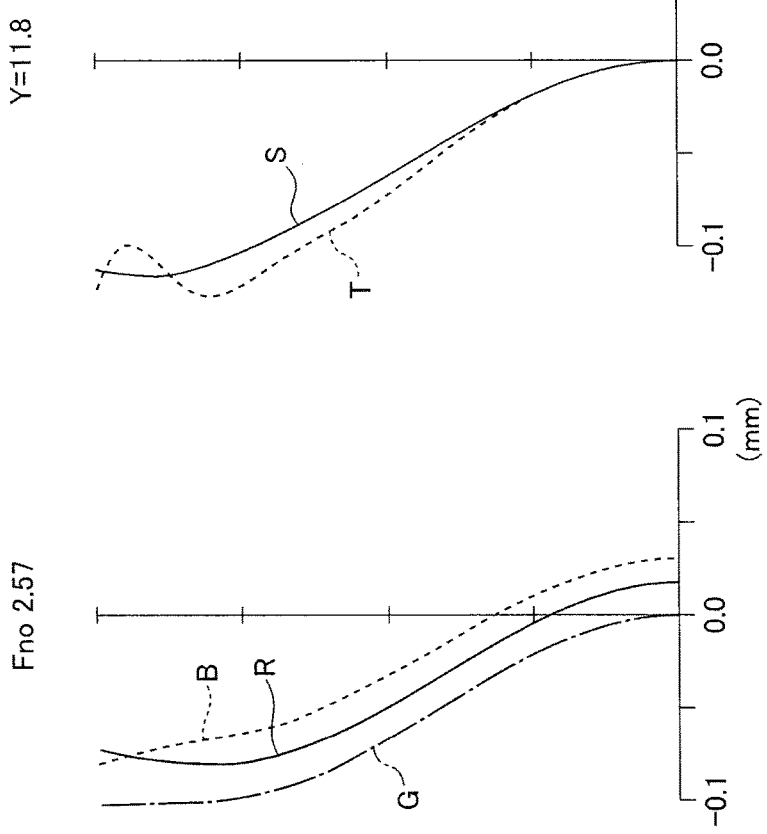

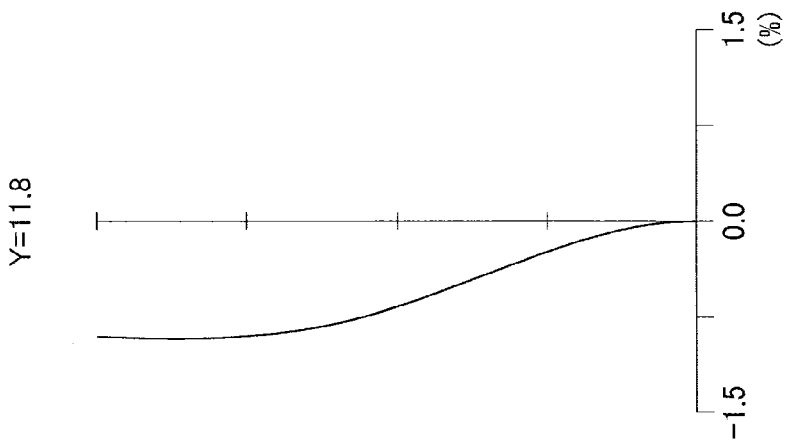
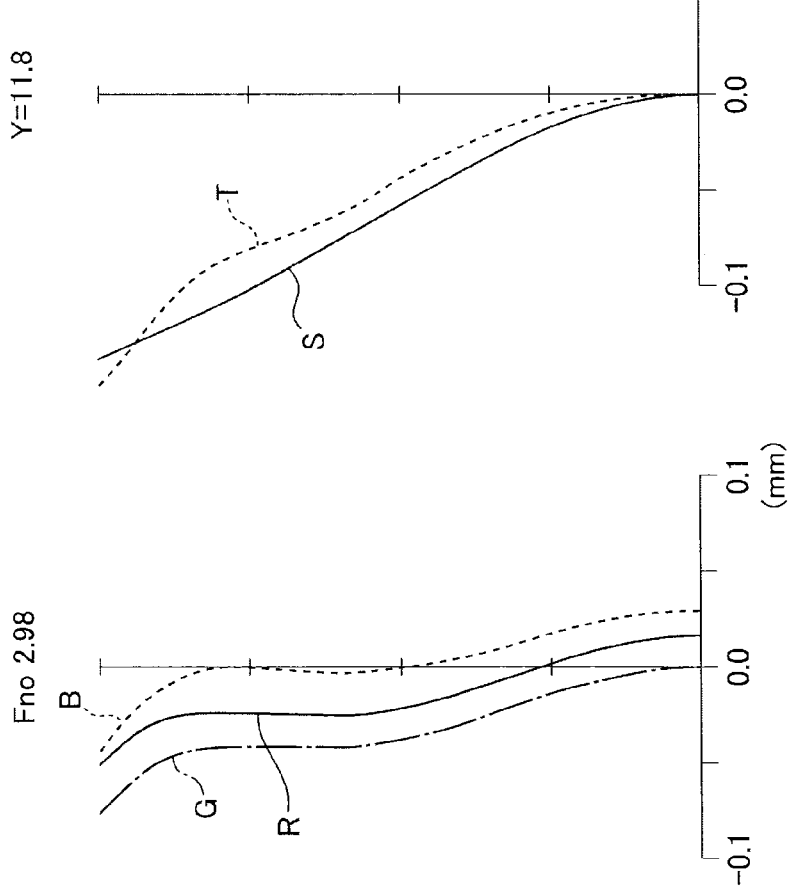

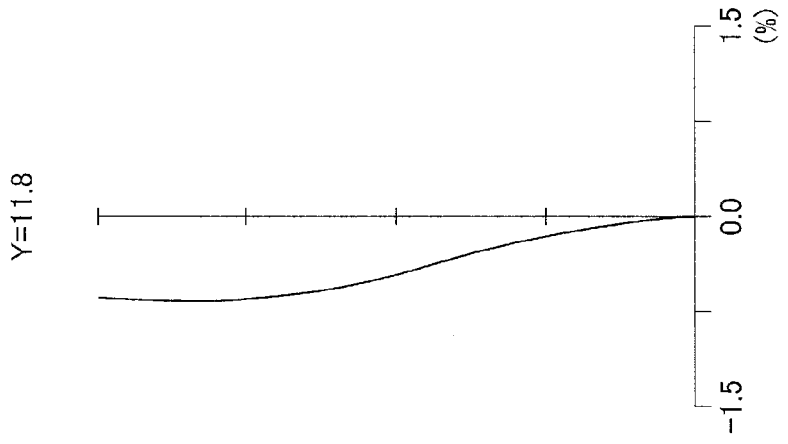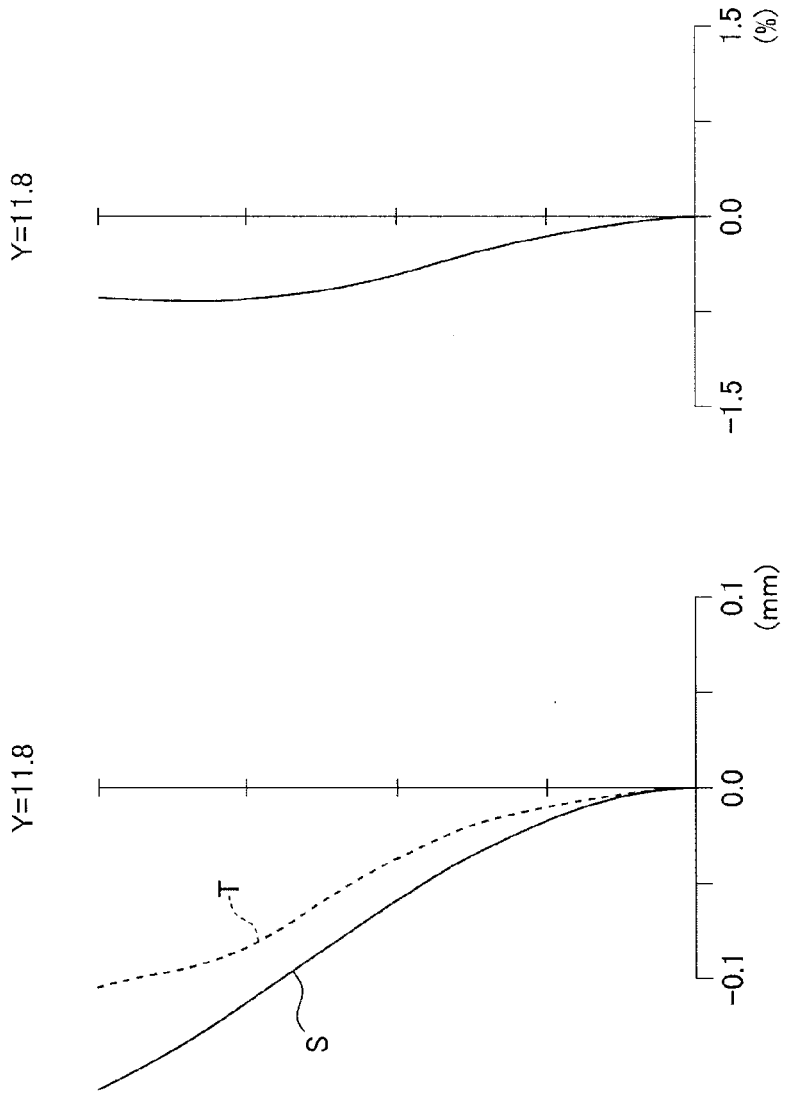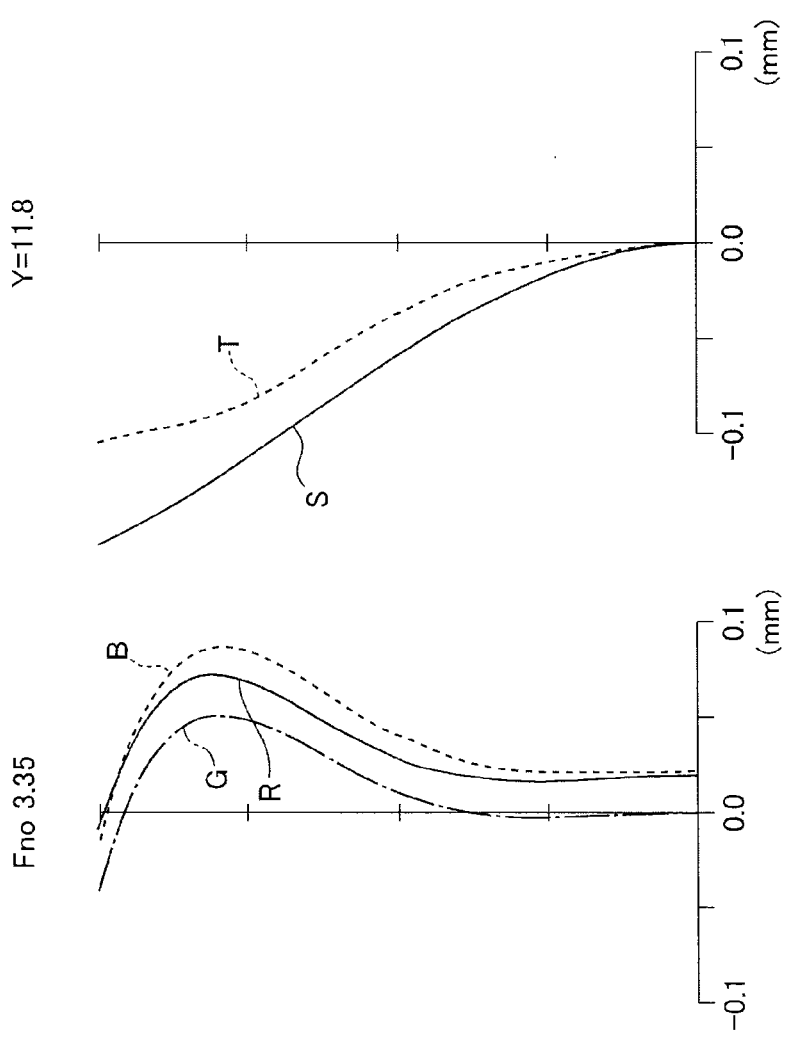

FIG. 5
WIDE-ANGLE END
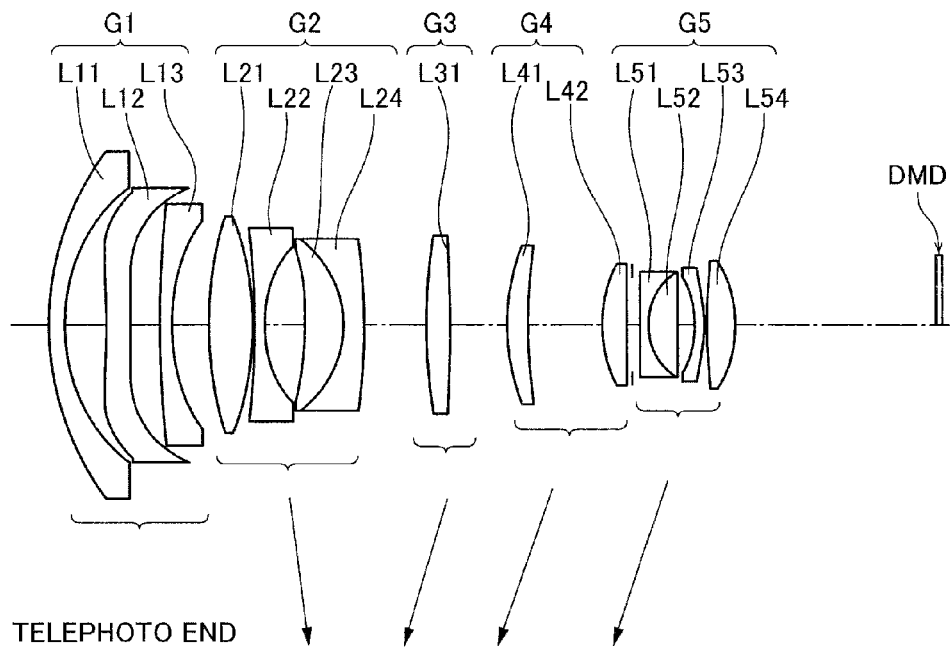
TELEPHOTO END
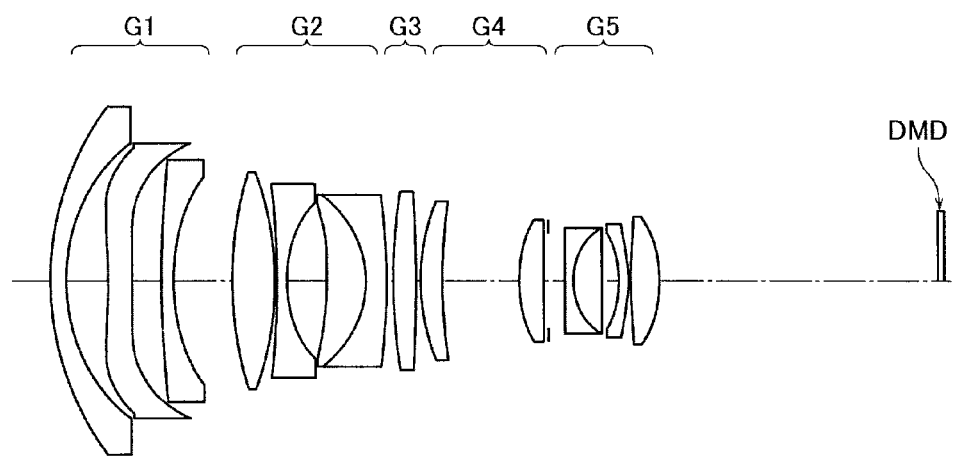

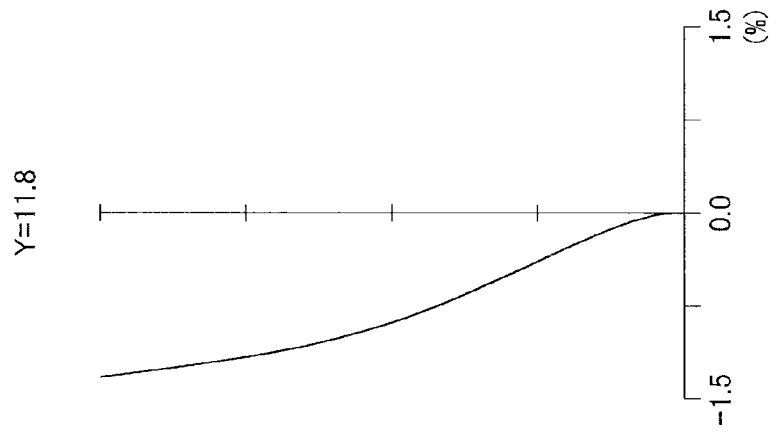
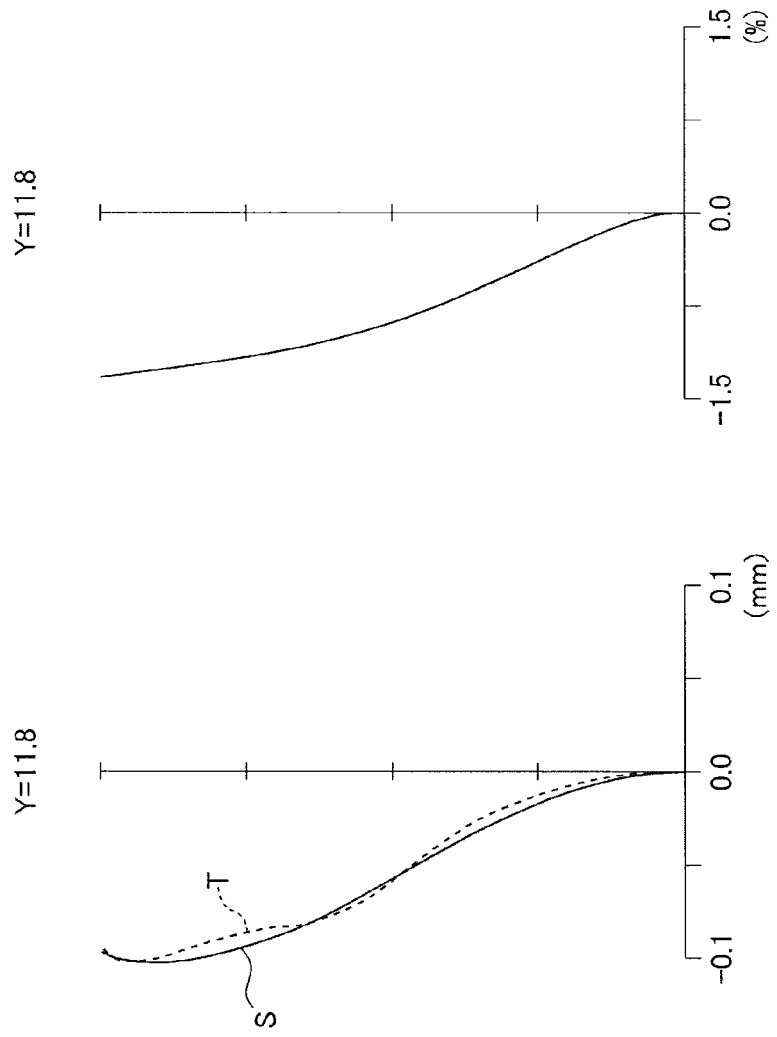
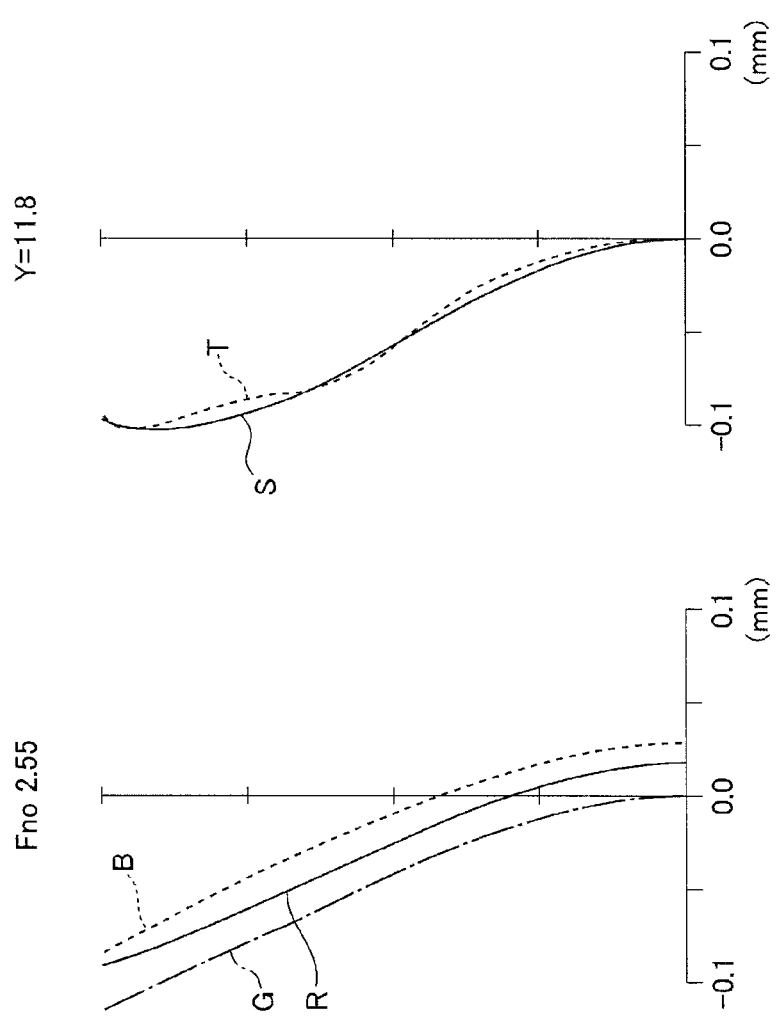

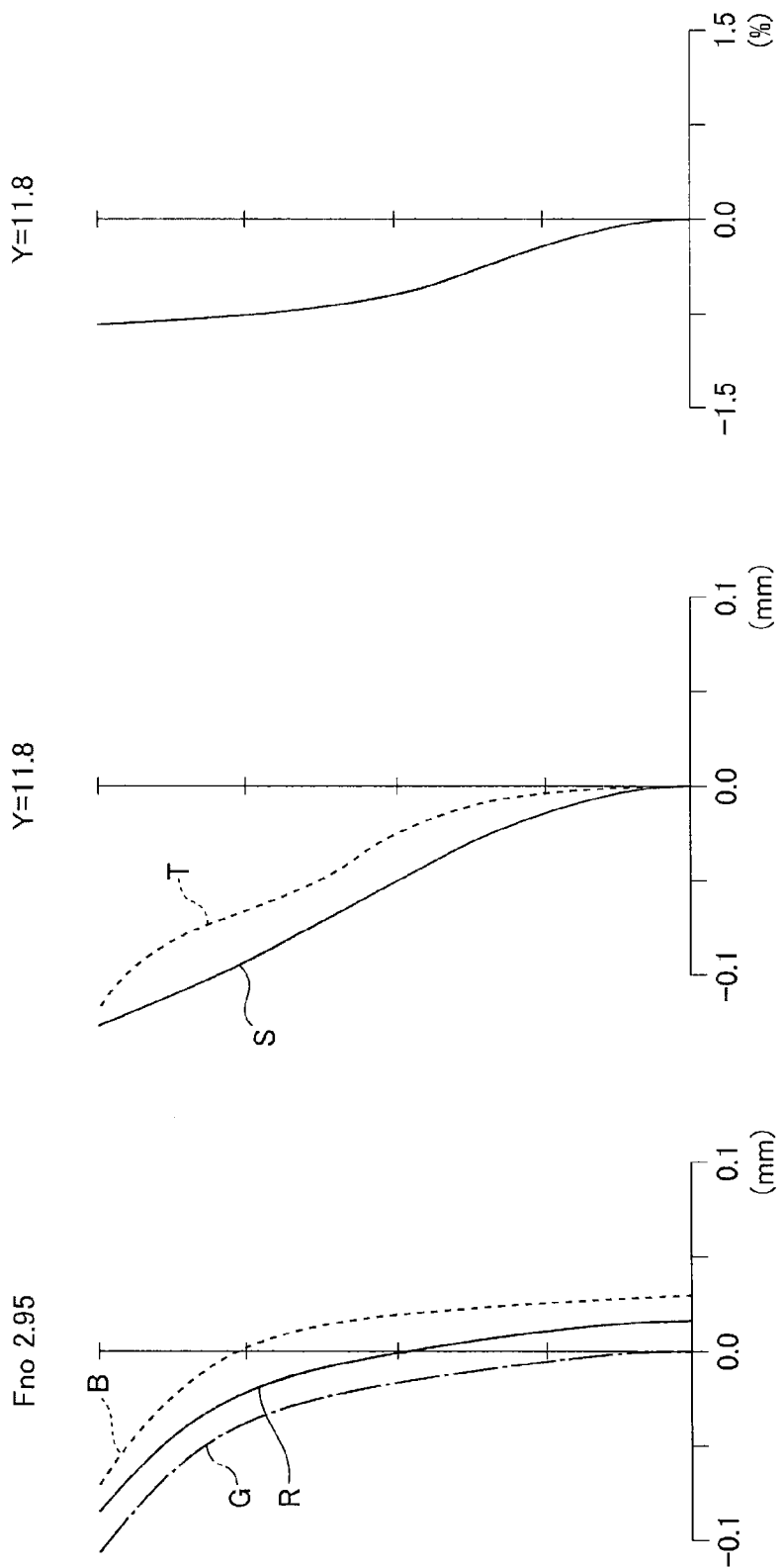

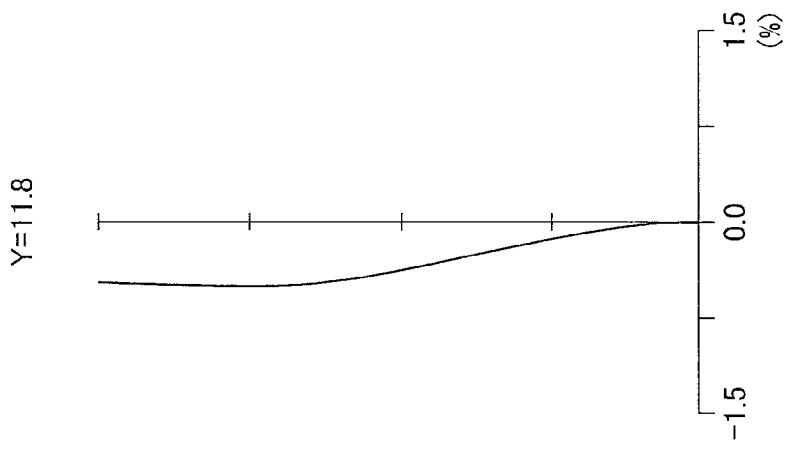
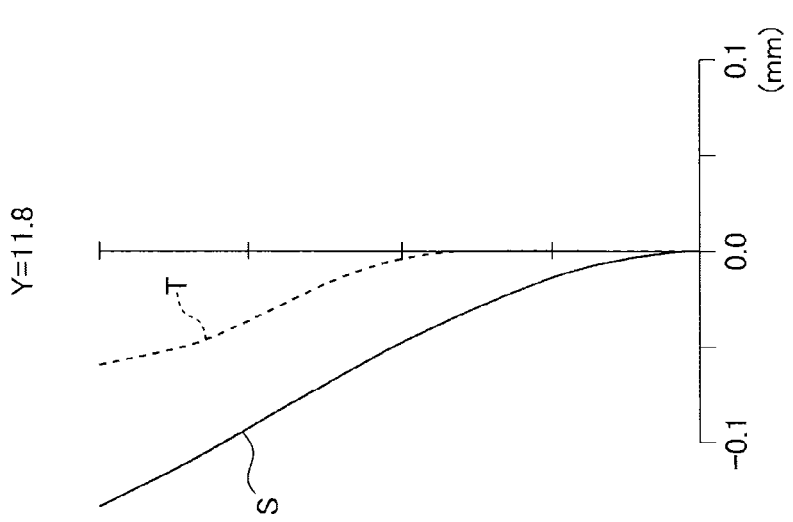
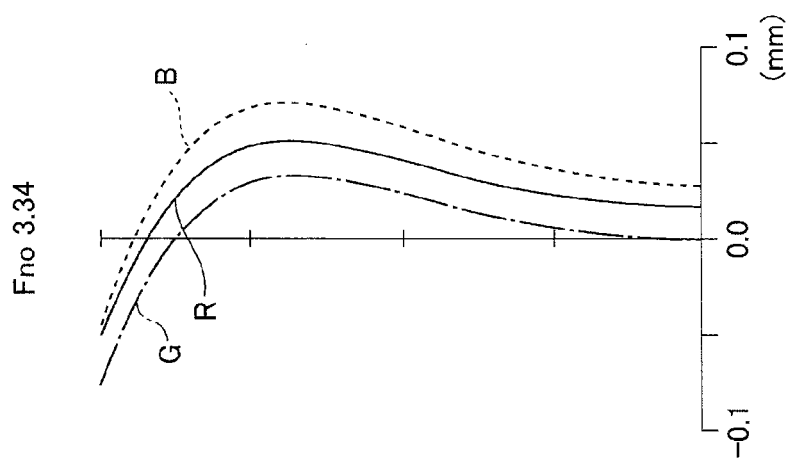

FIG. 9
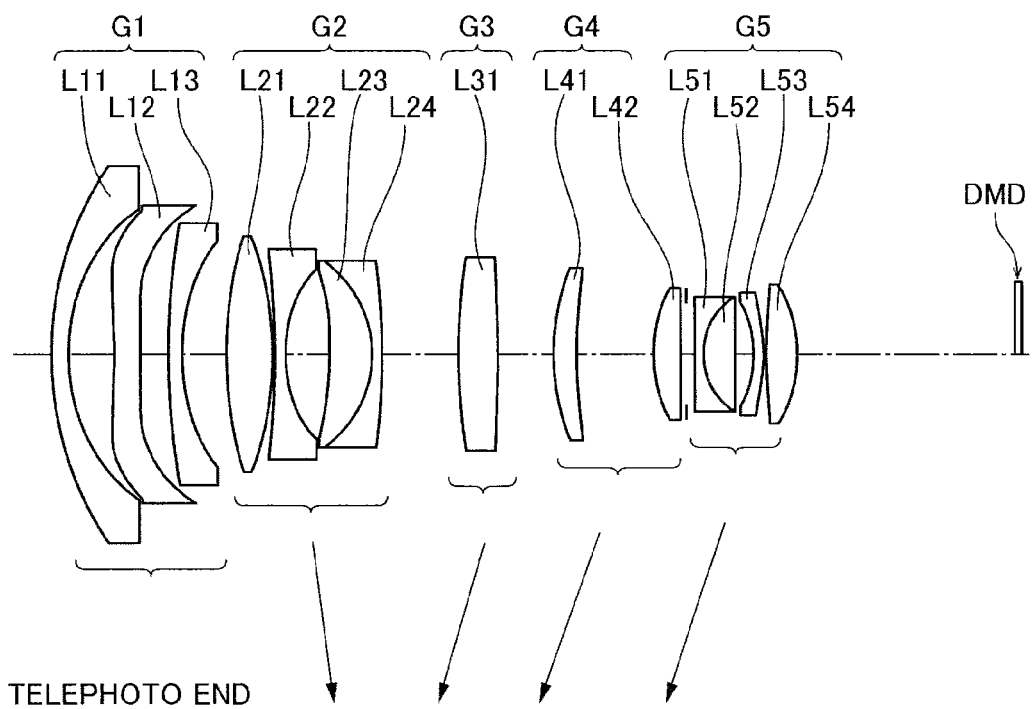
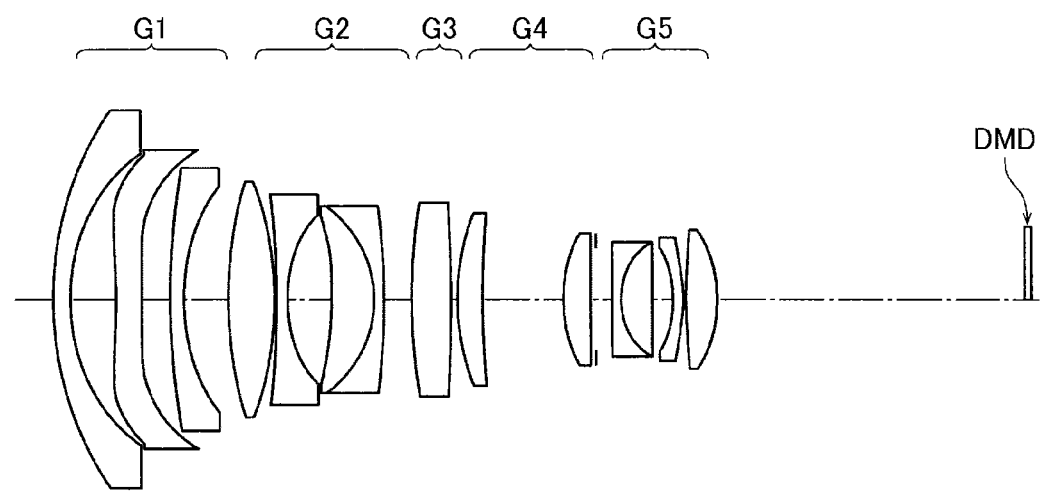

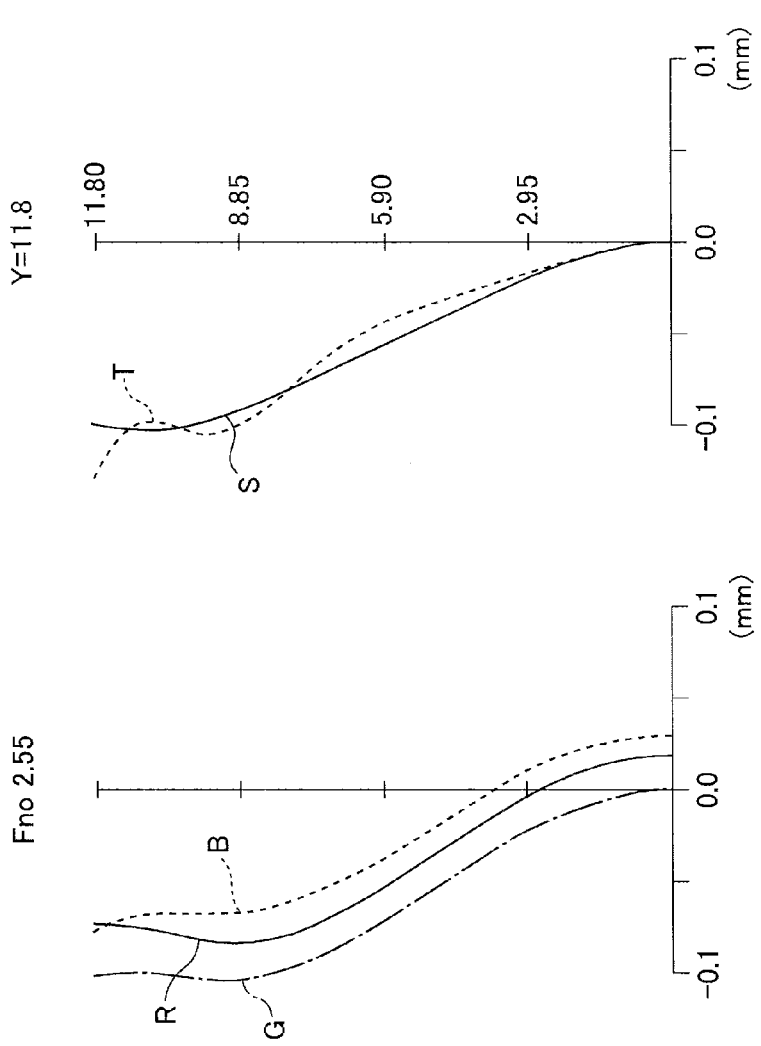
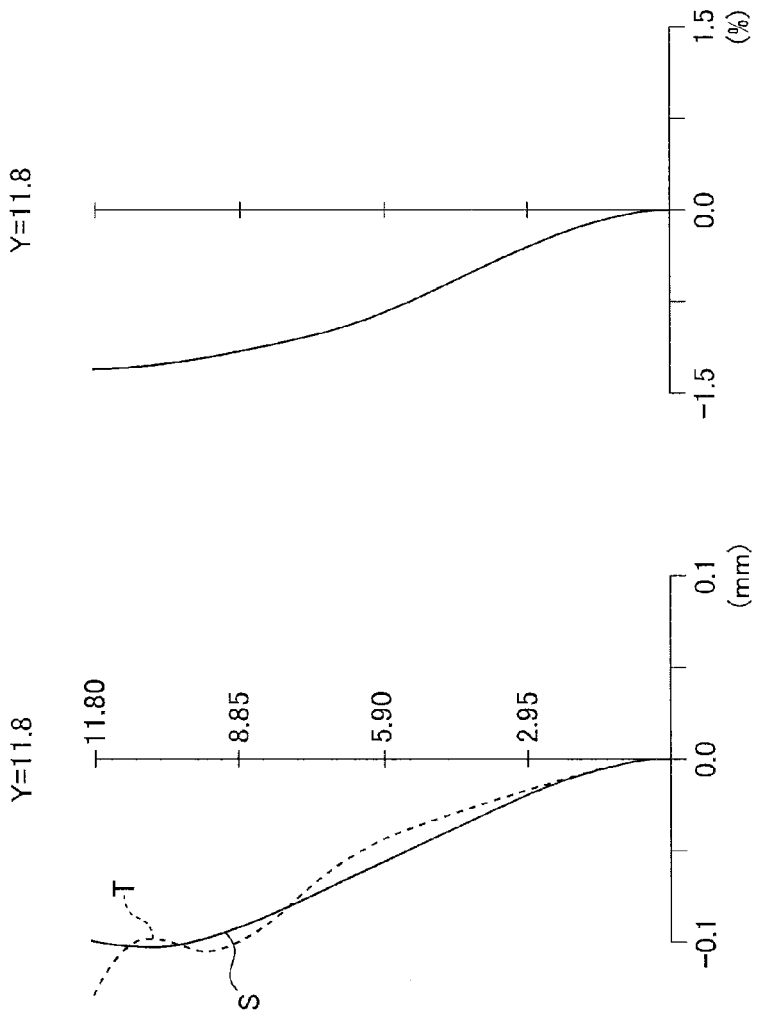
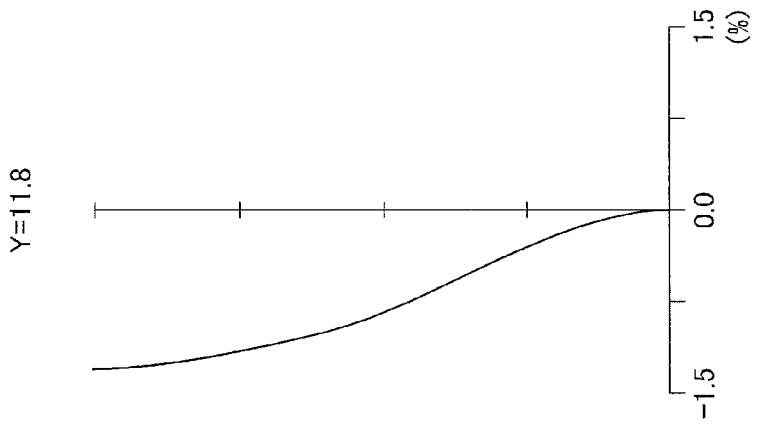

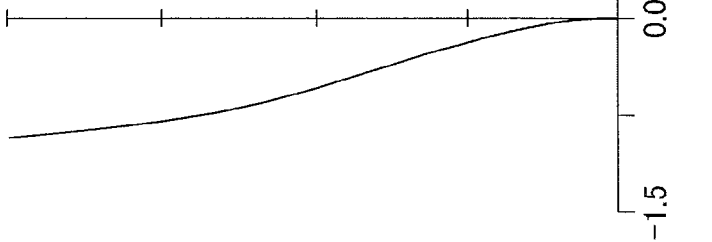
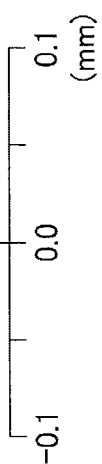
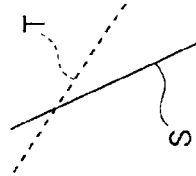
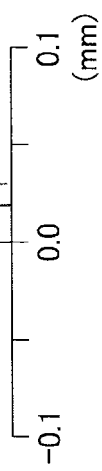
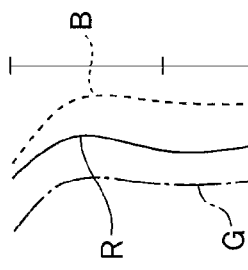

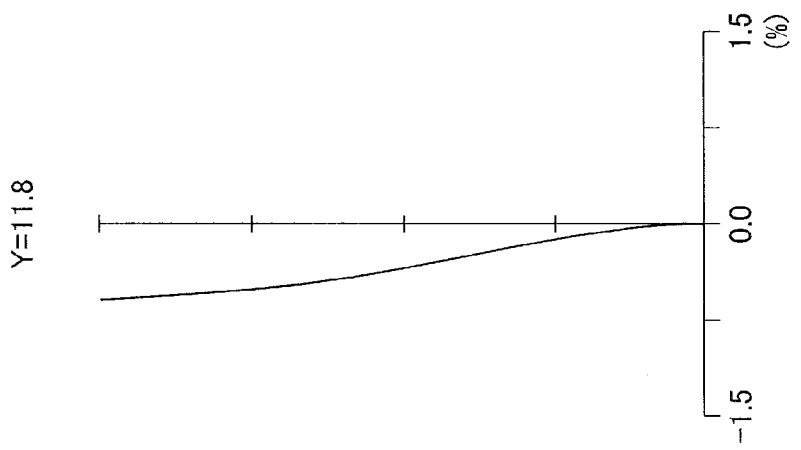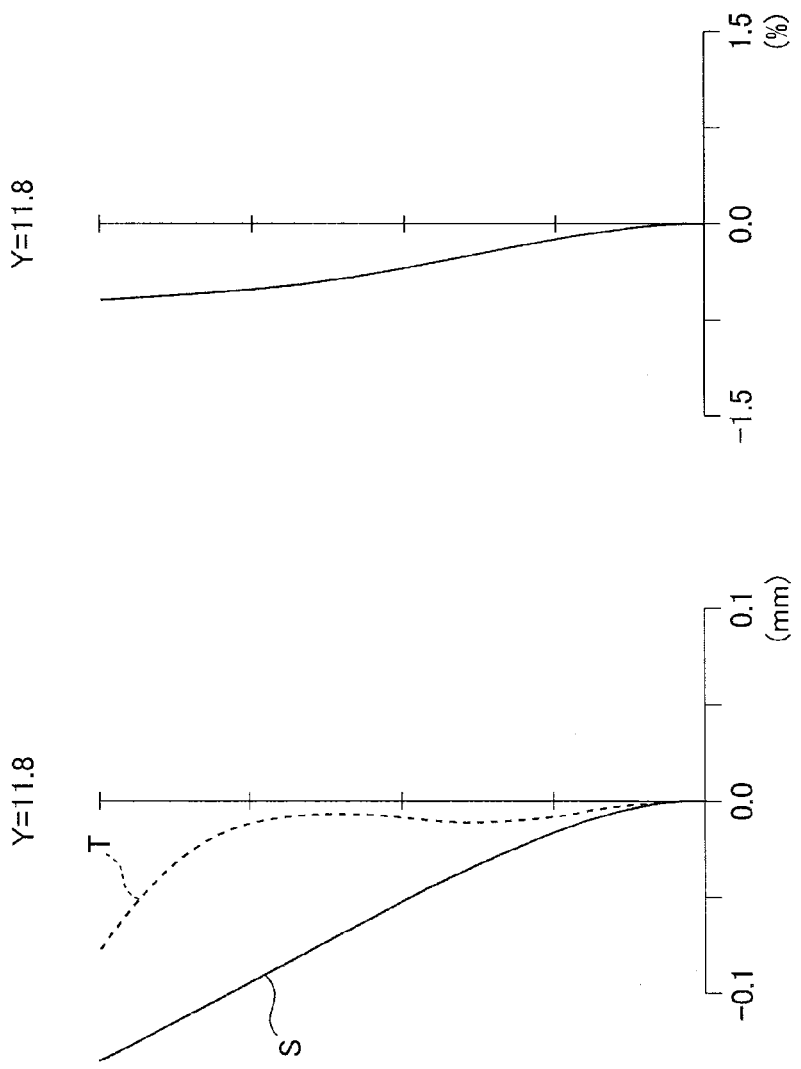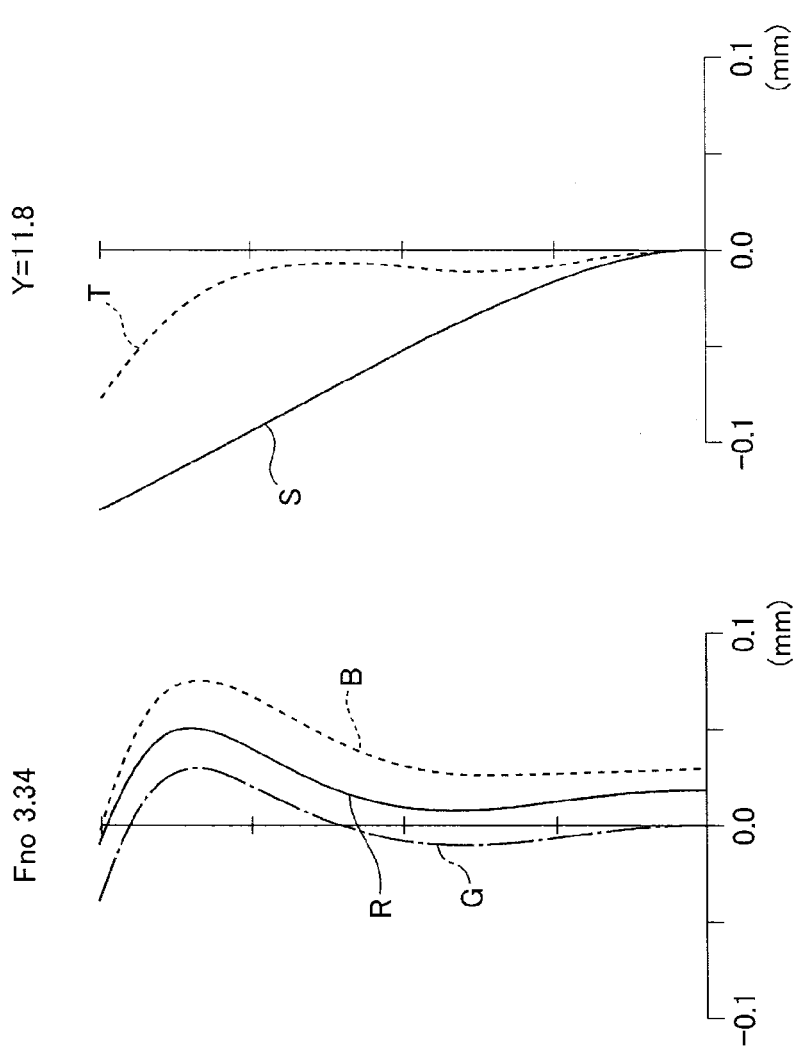

FIG.13
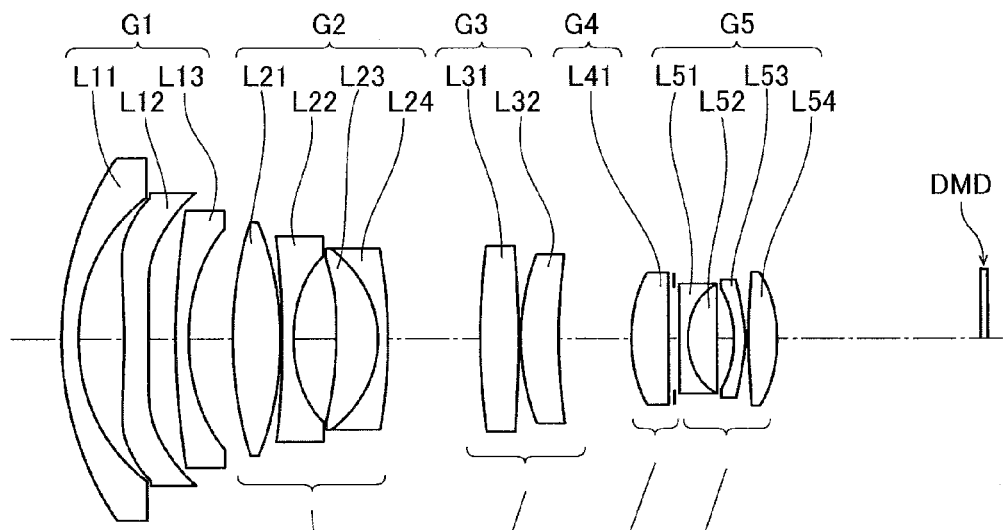
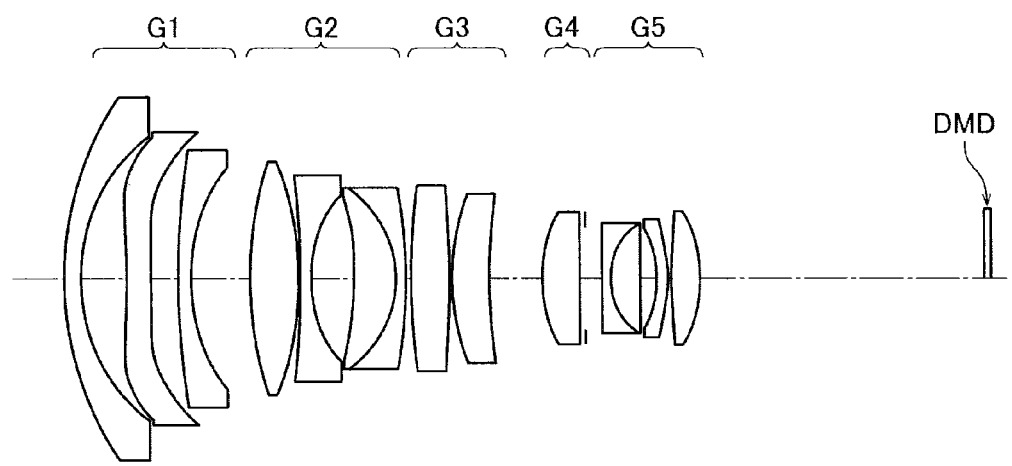

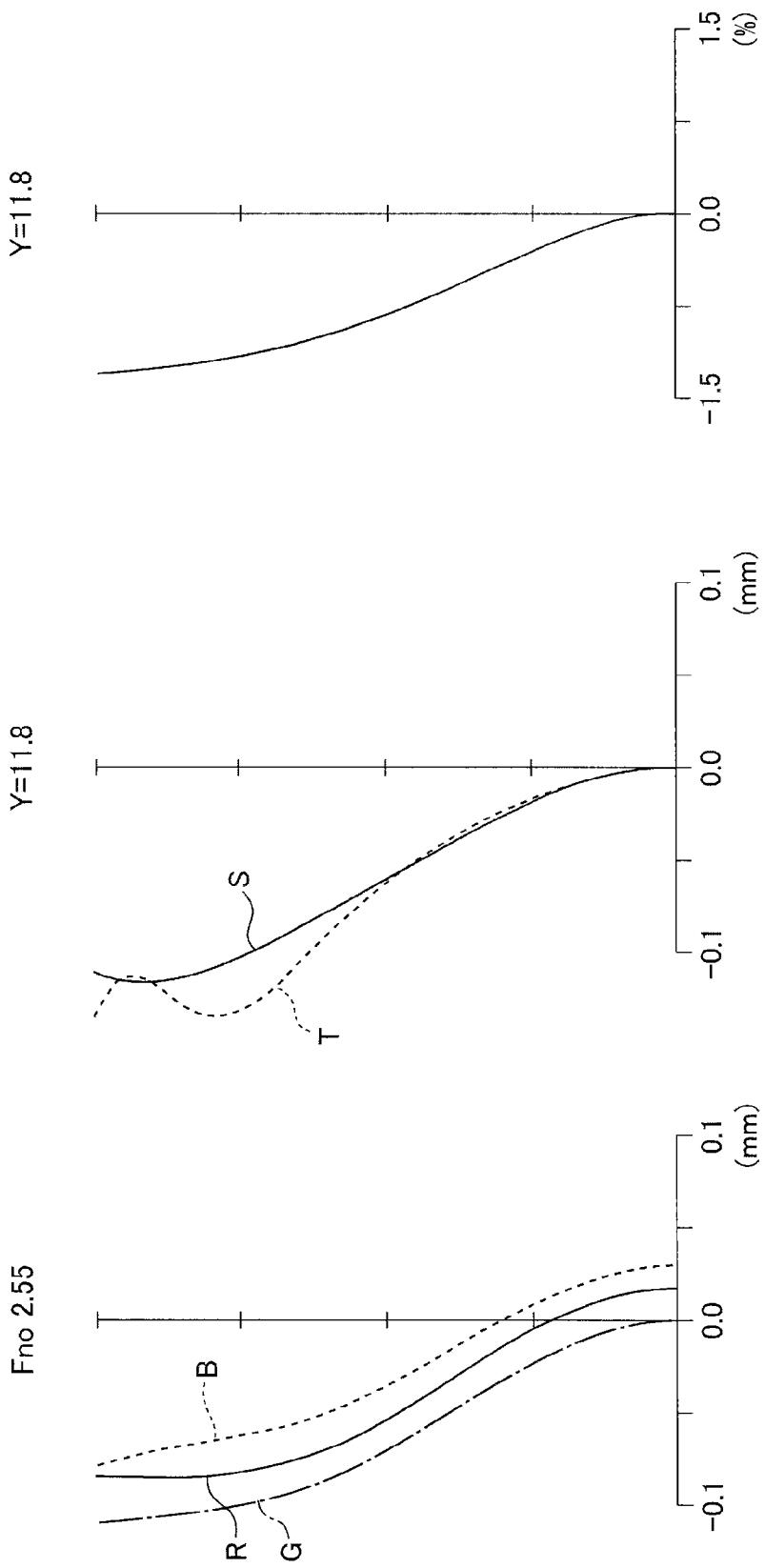

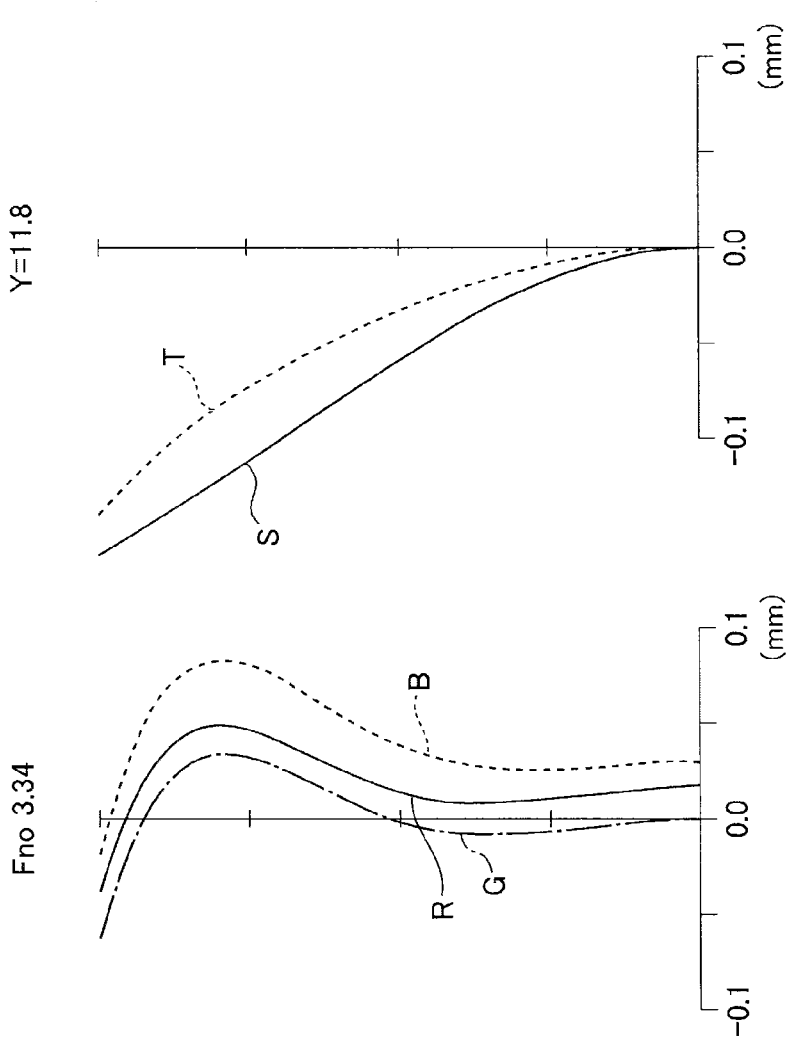
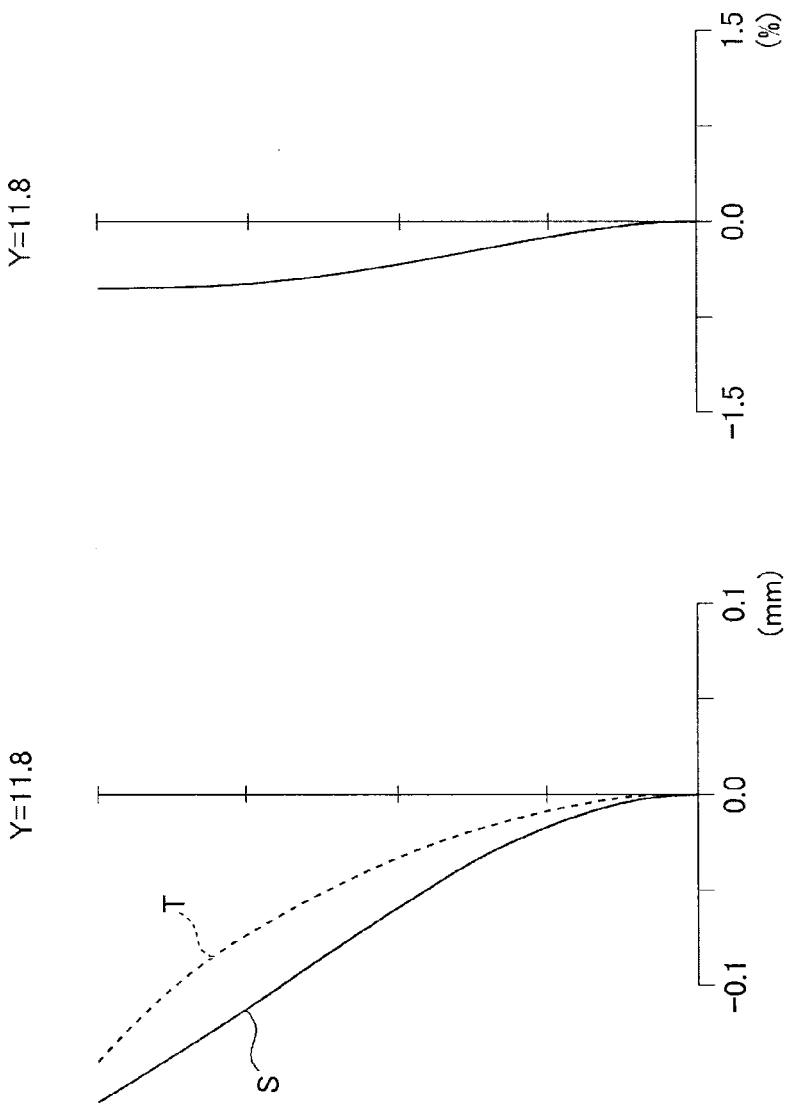
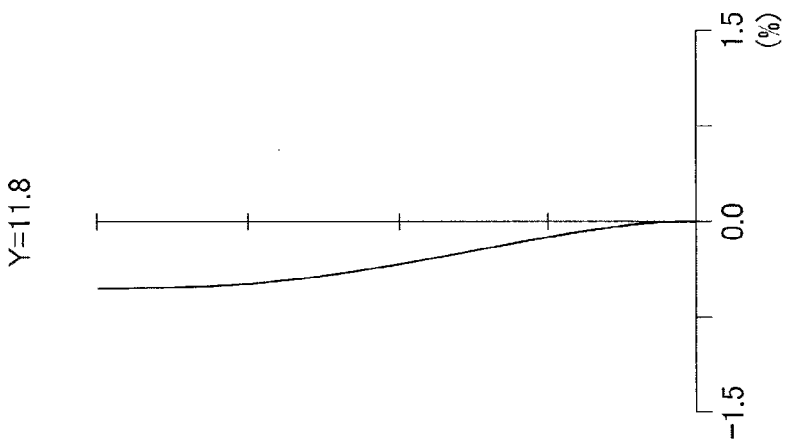

FIG.17
WIDE-ANGLE END
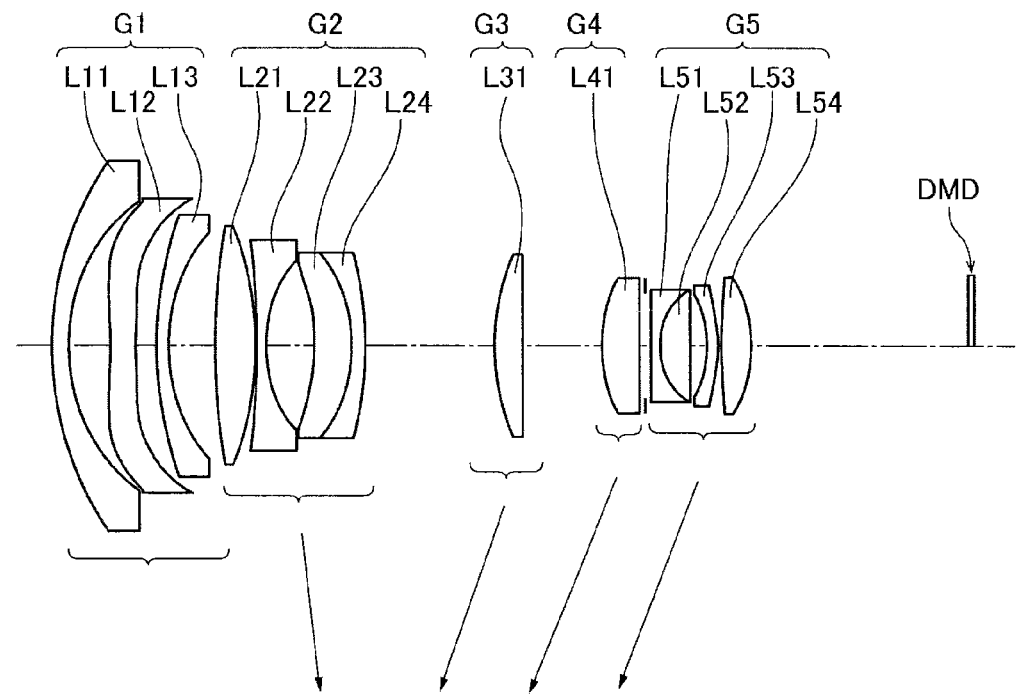
TELEPHOTO END
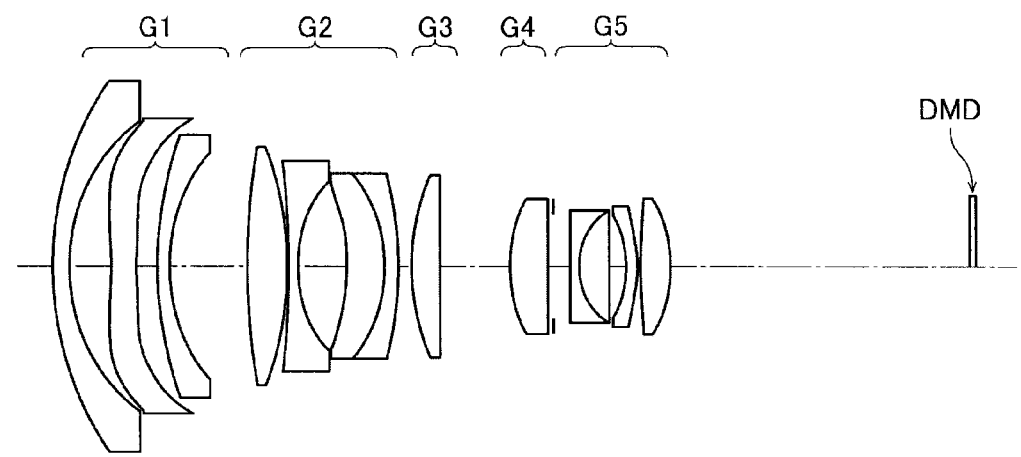

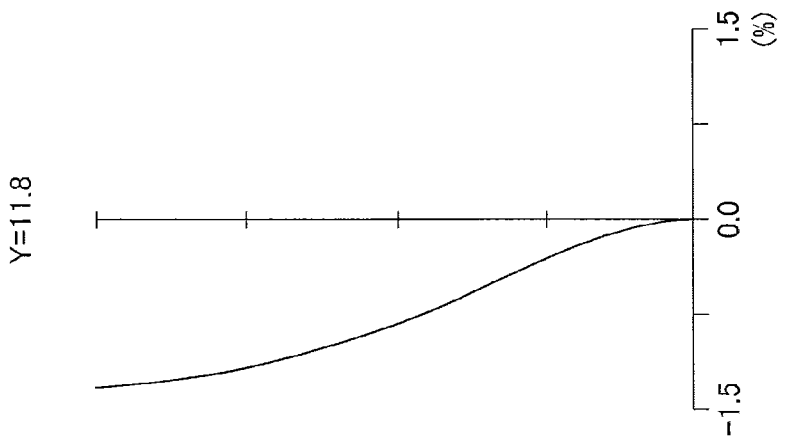
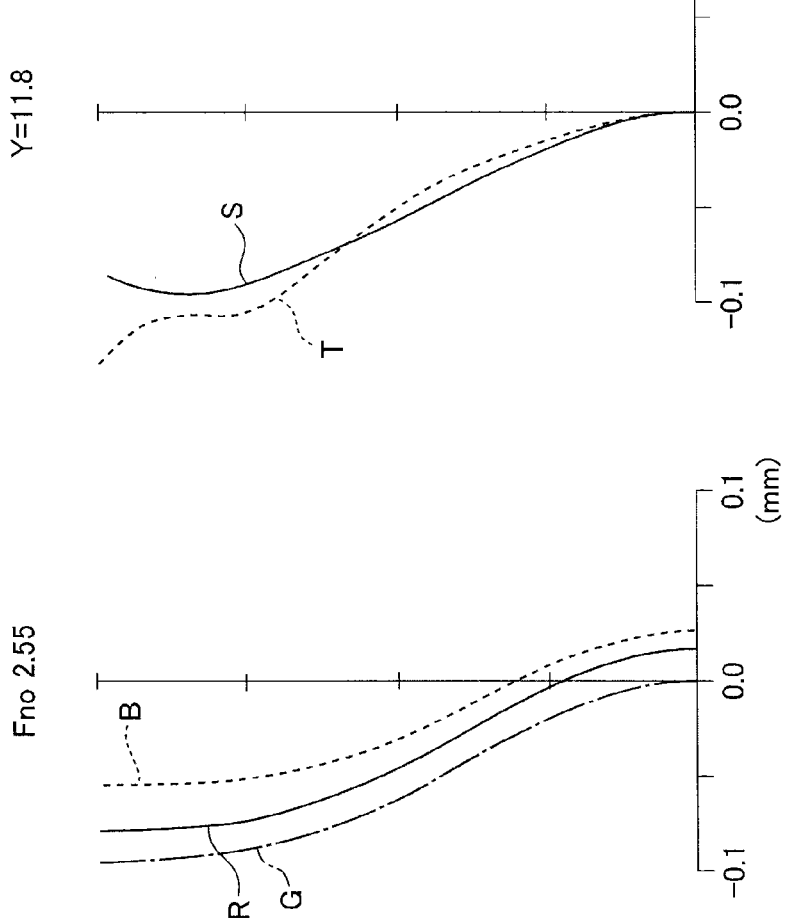

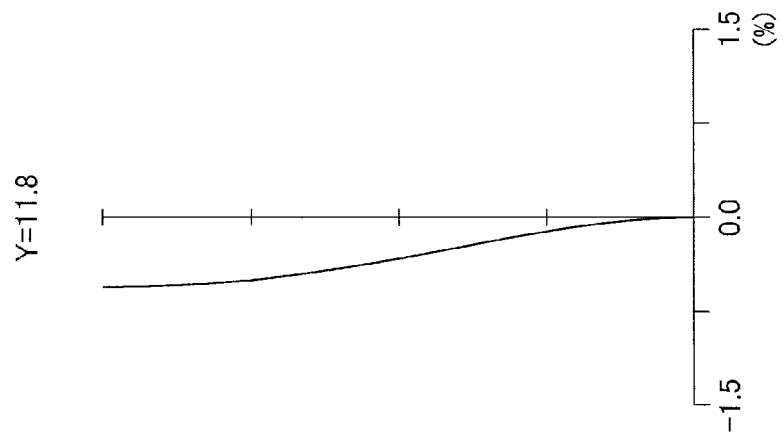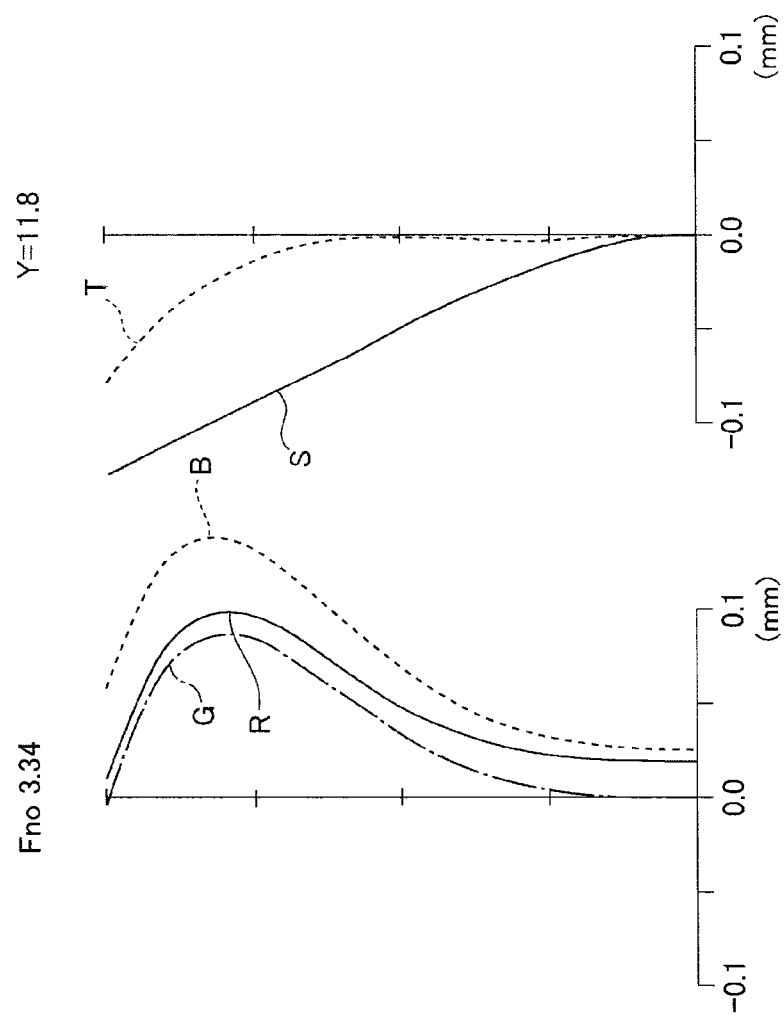

FIG.21
WIDE-ANGLE END
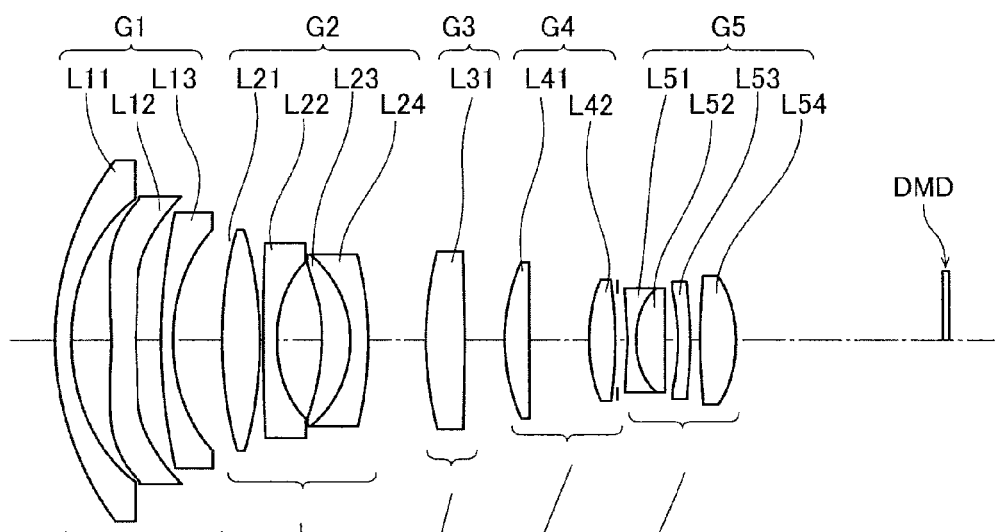
TELEPHOTO END
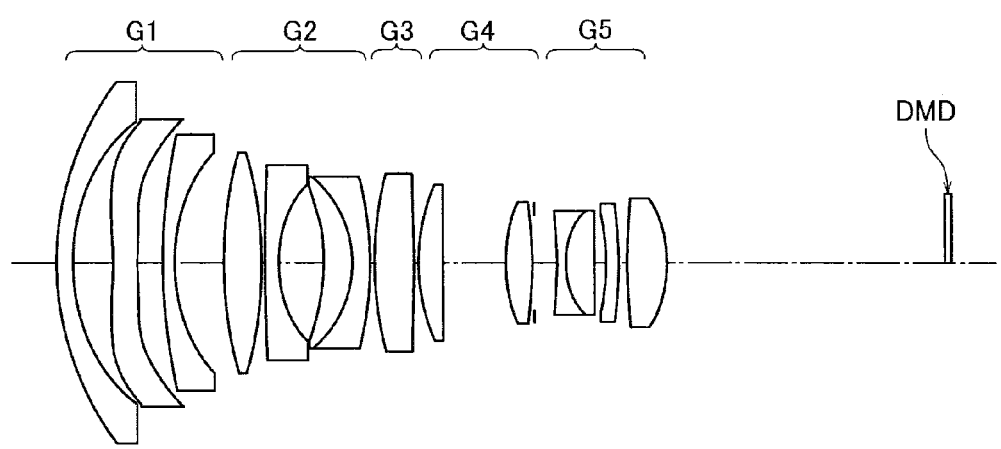

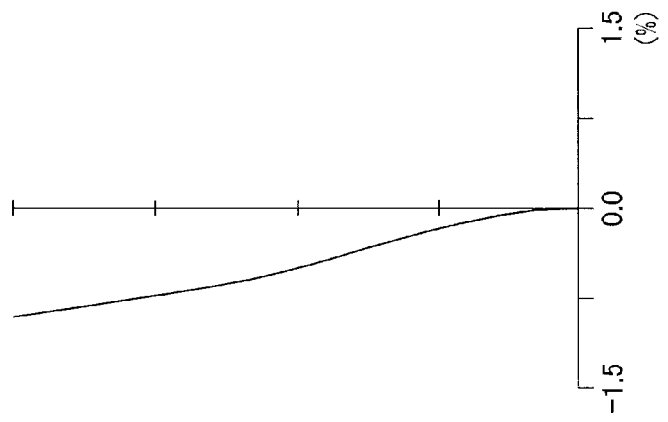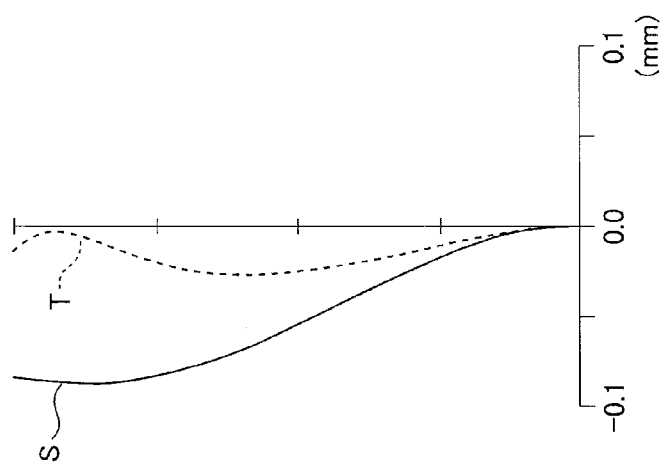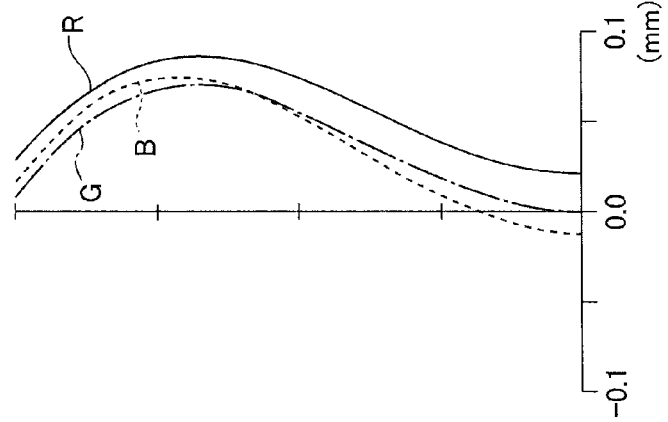

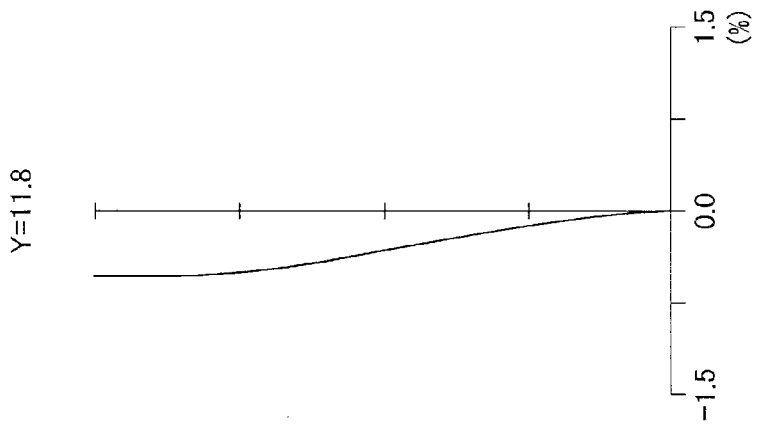
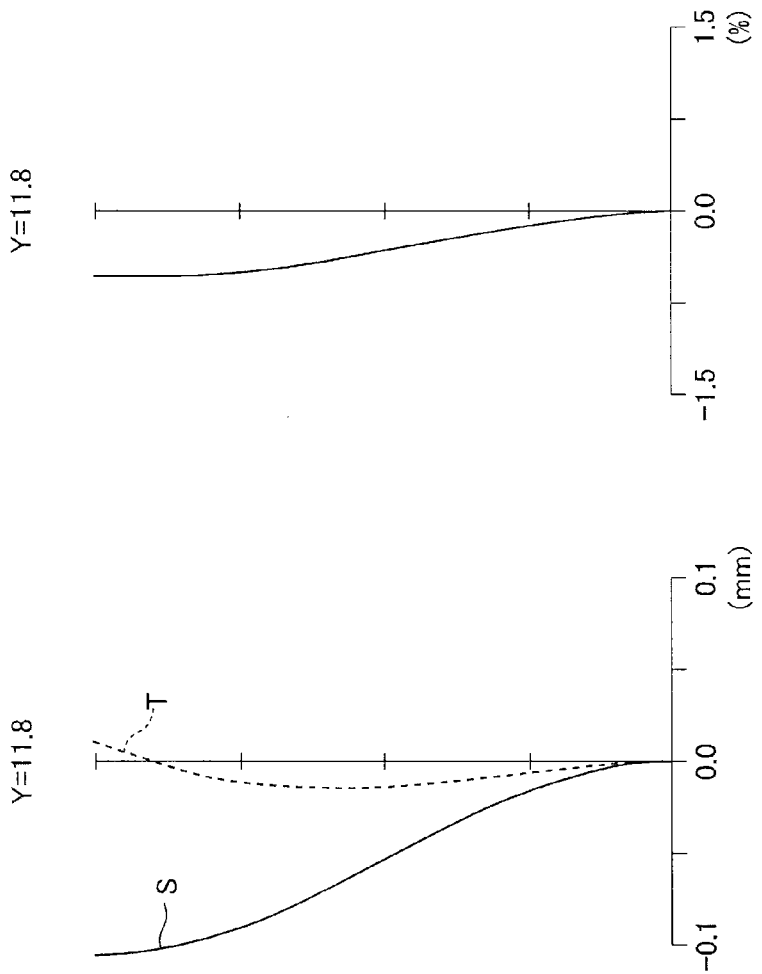
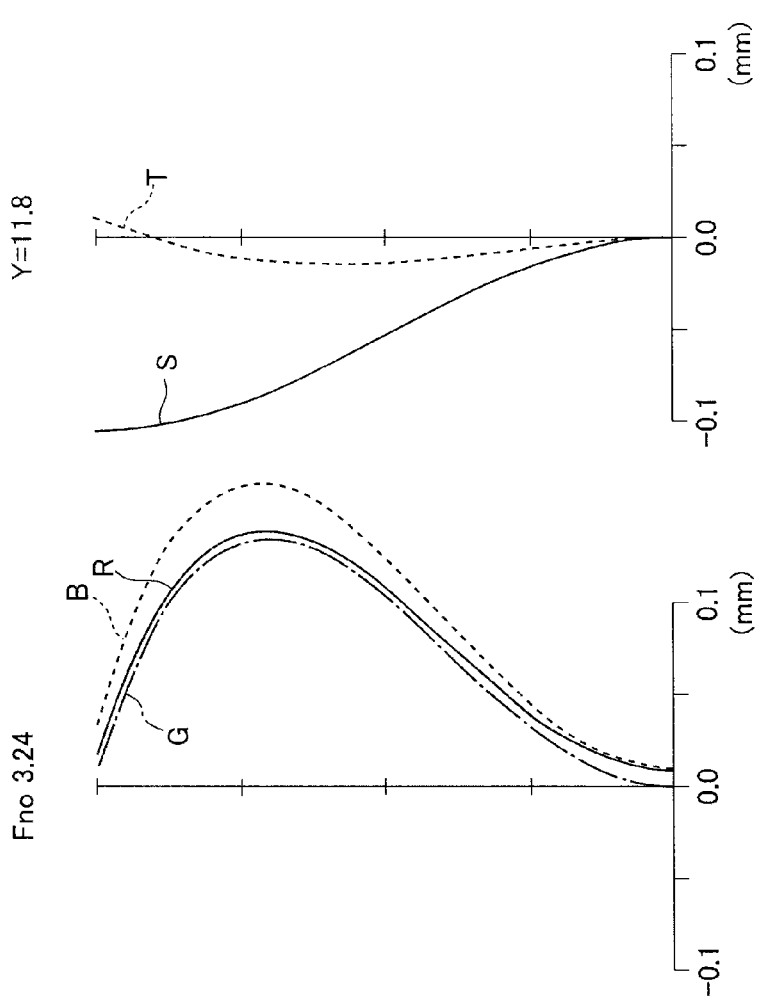

FIG.25
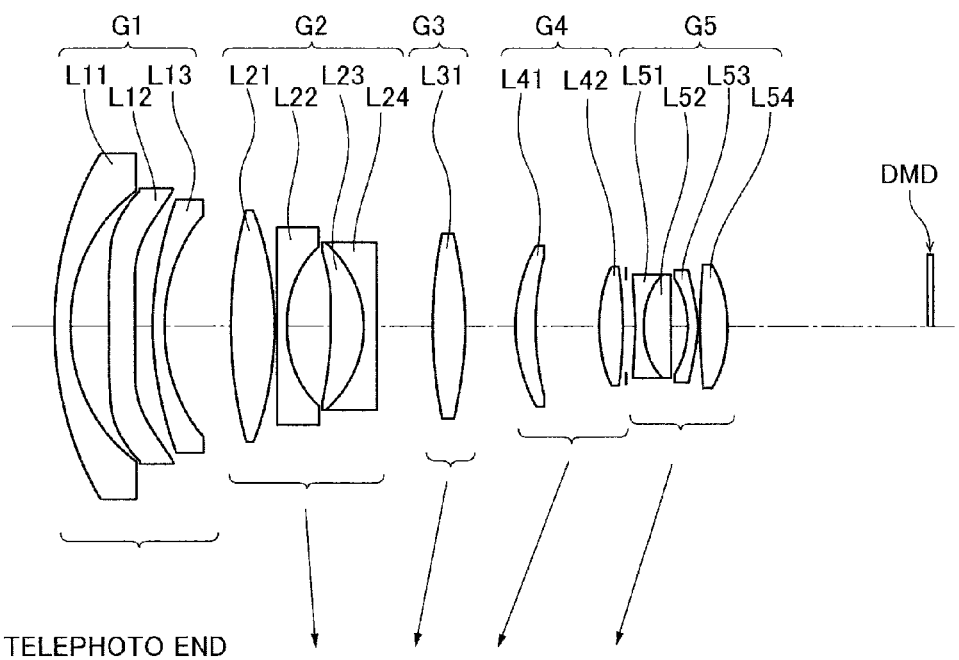
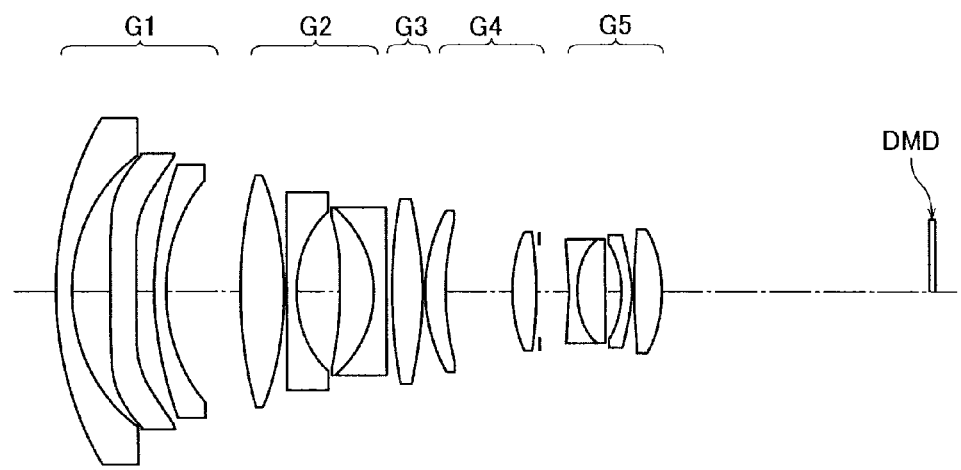

FIG.29
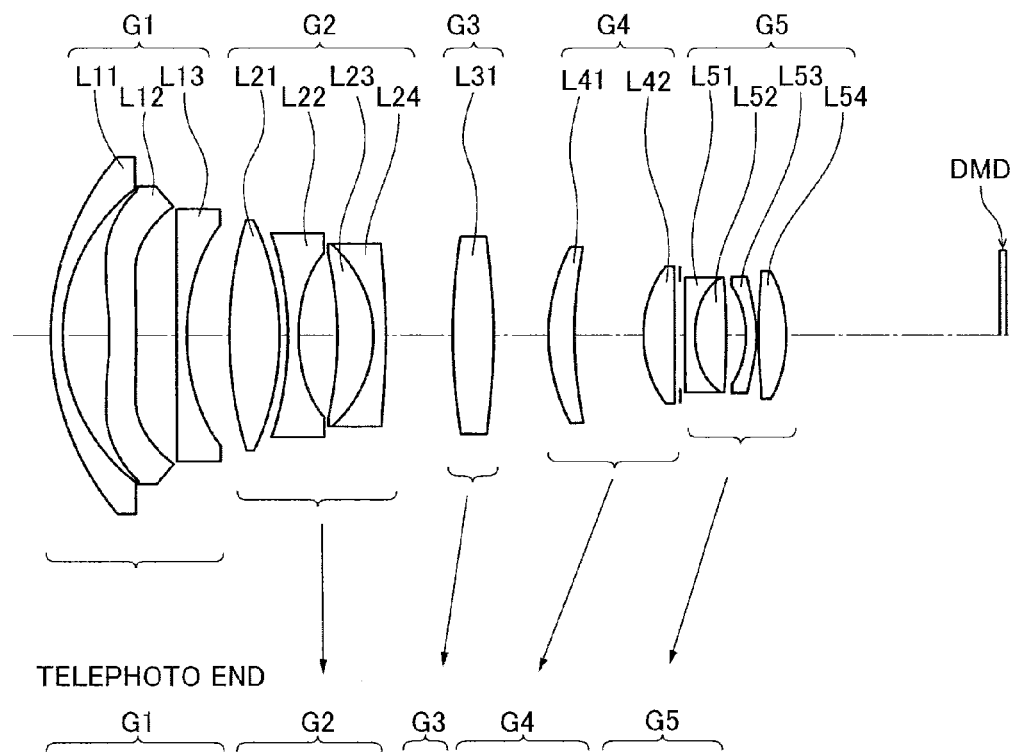
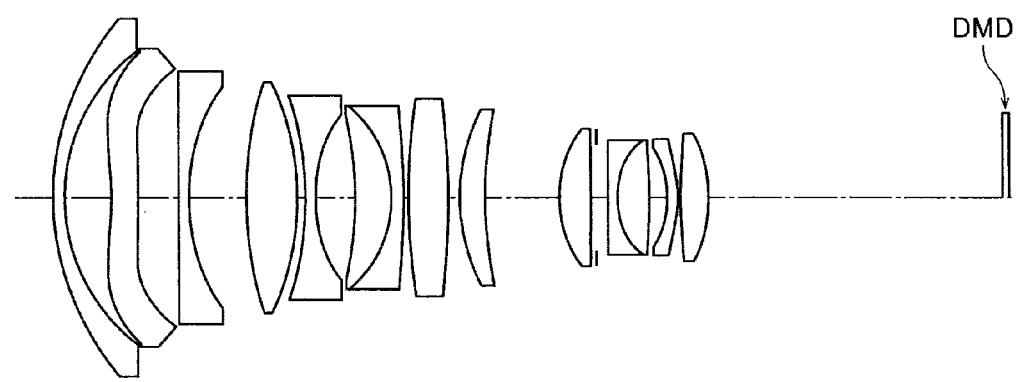

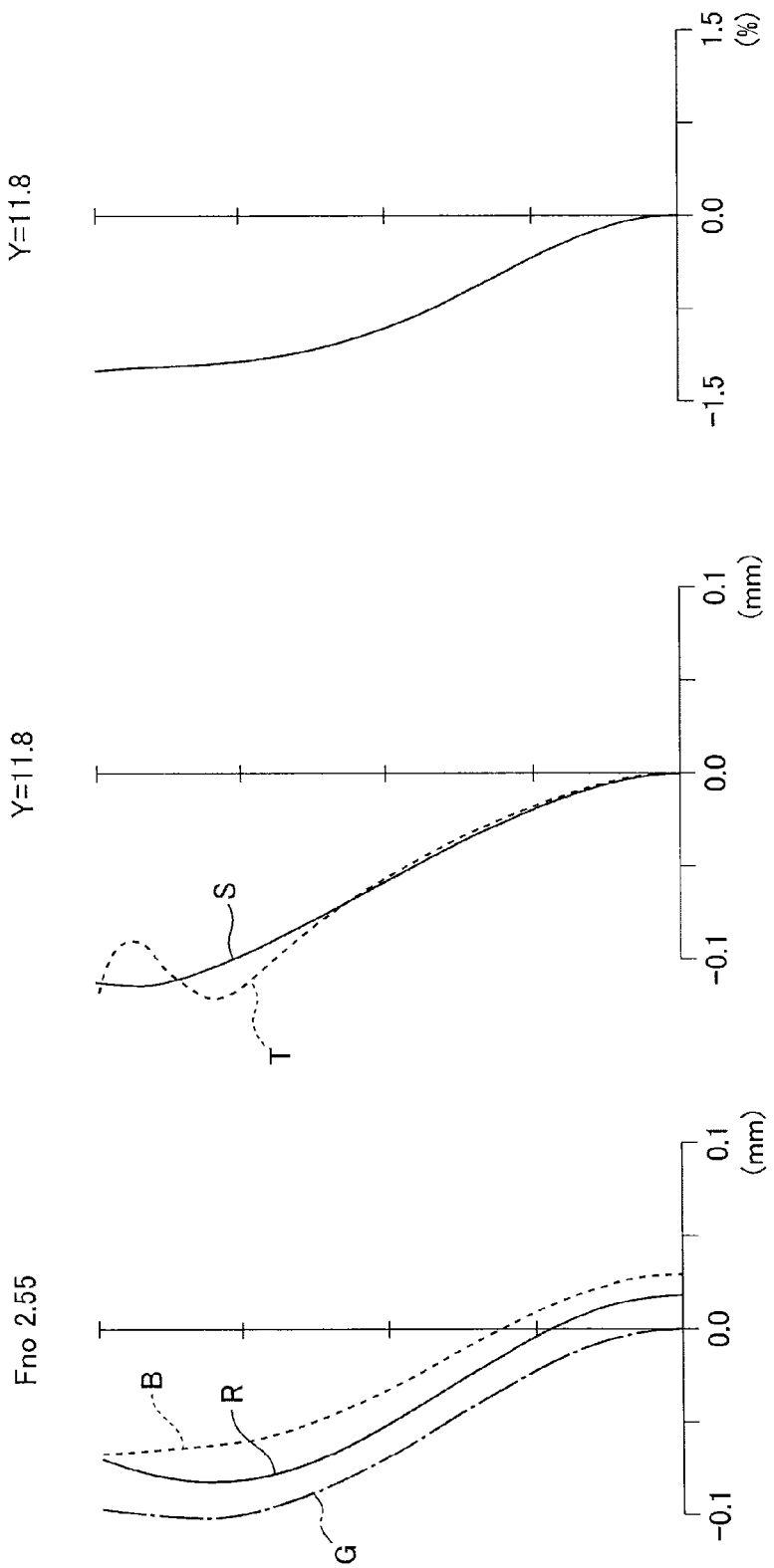

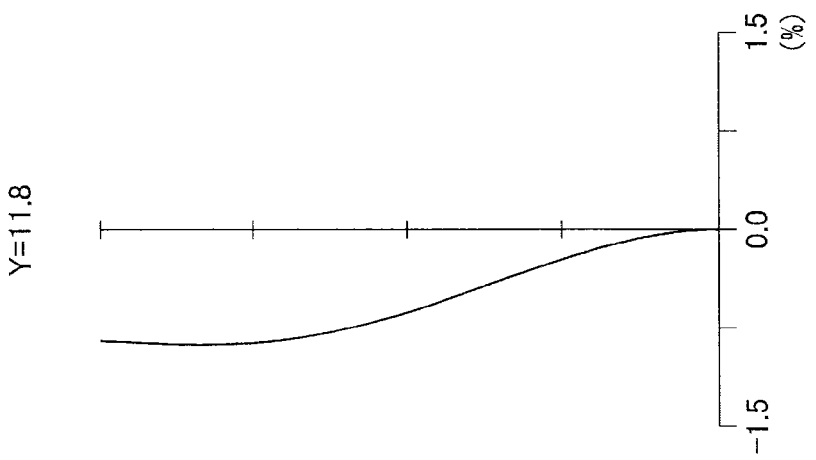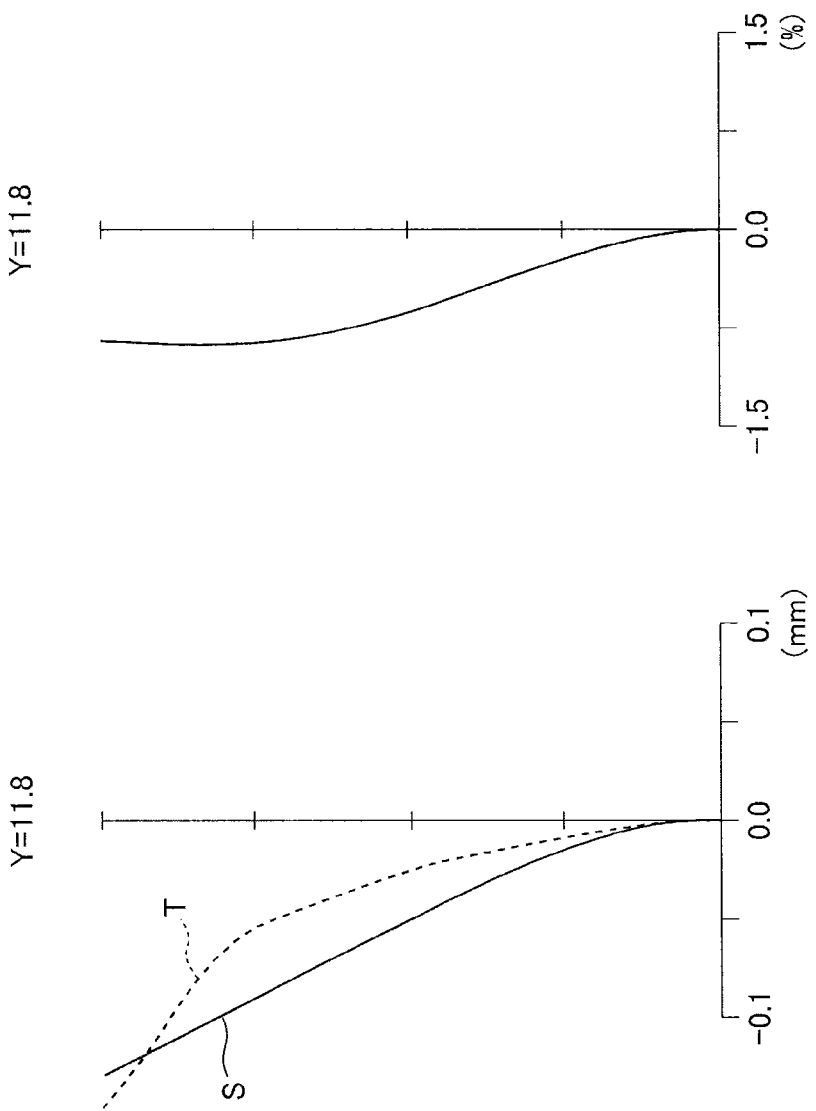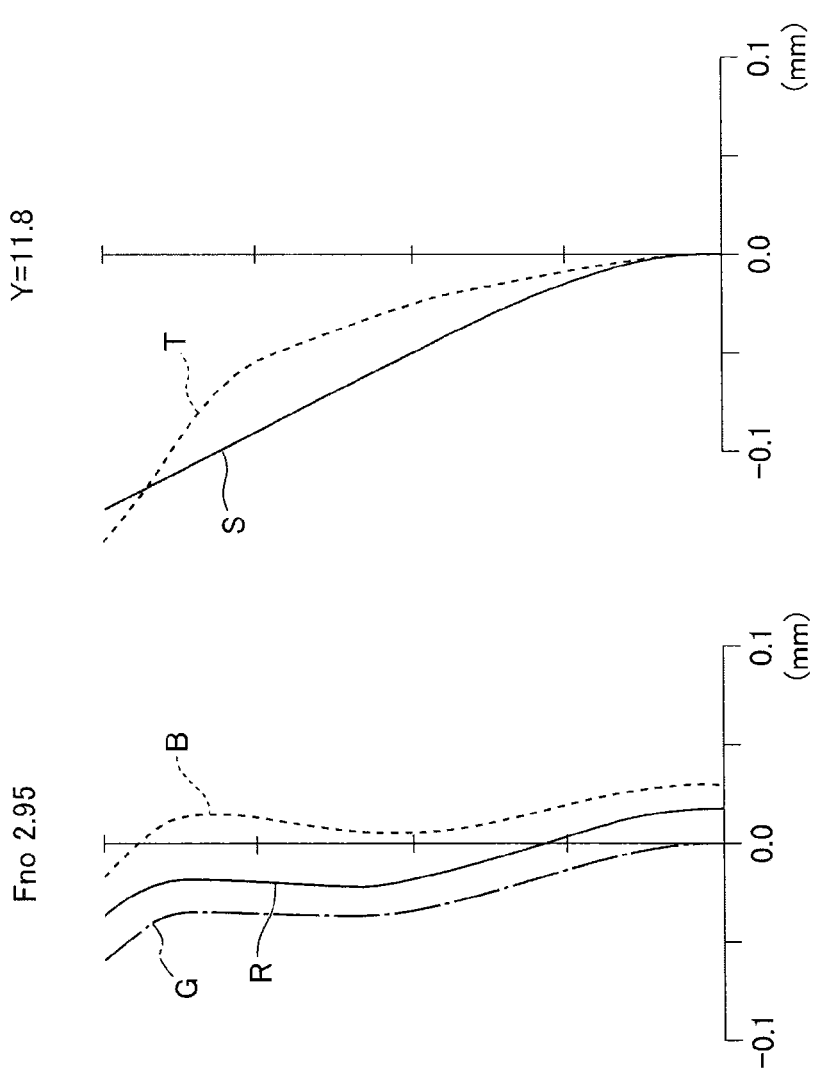

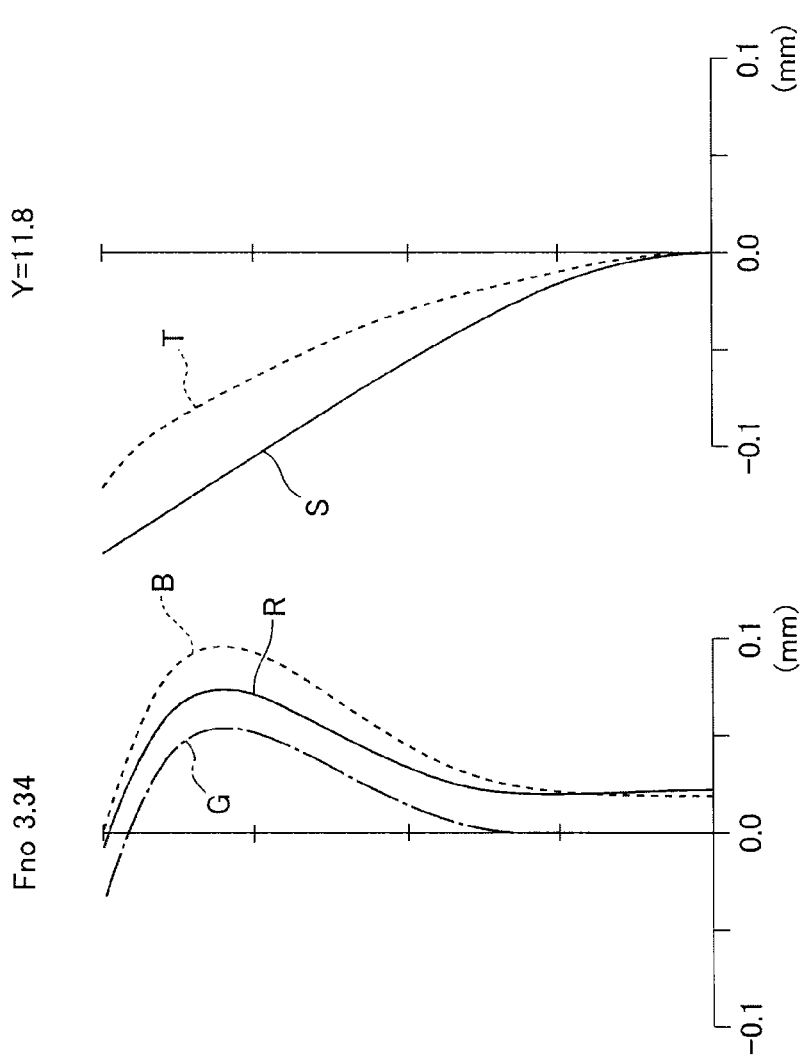

FIG.33
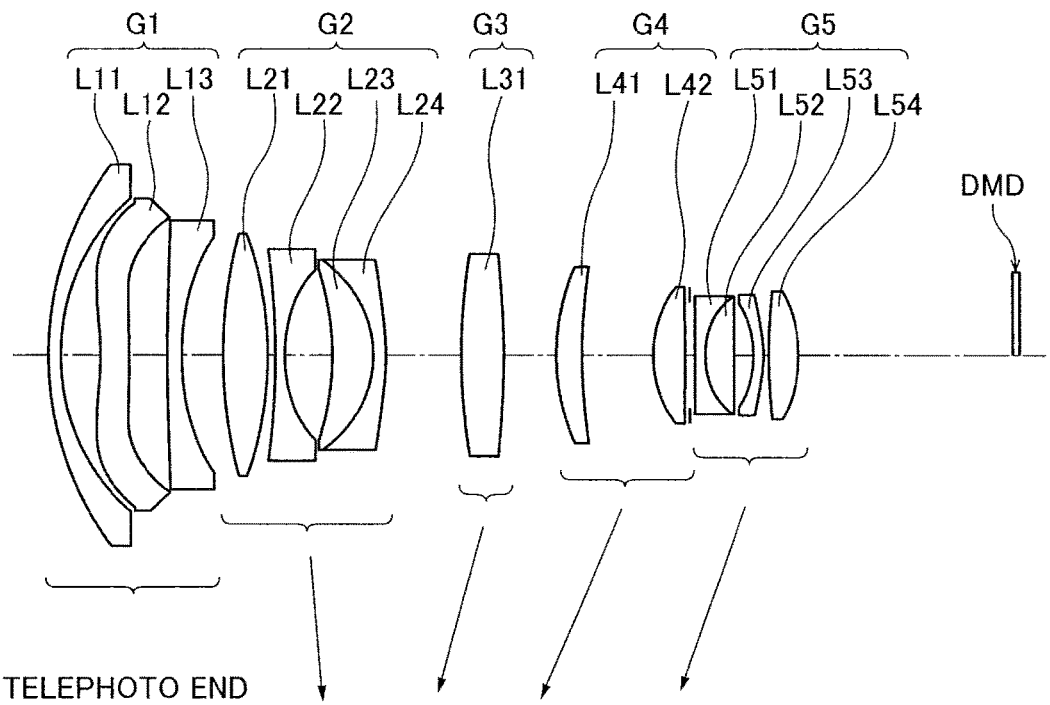
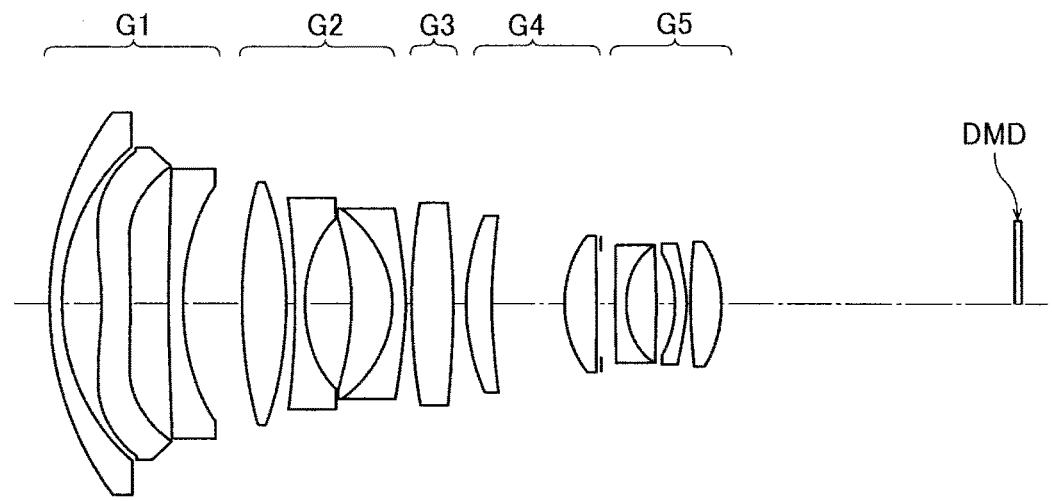

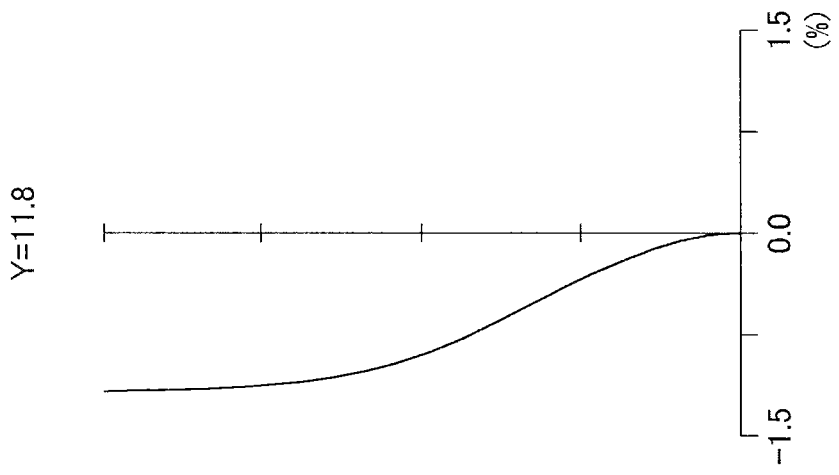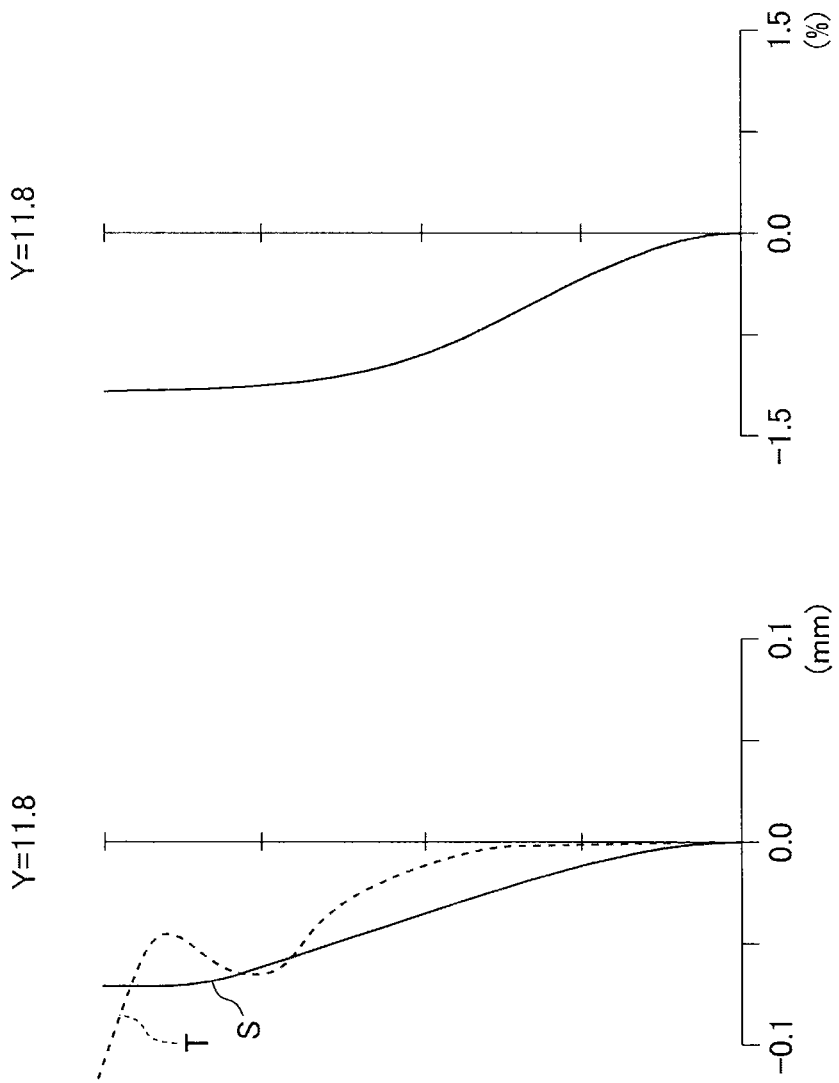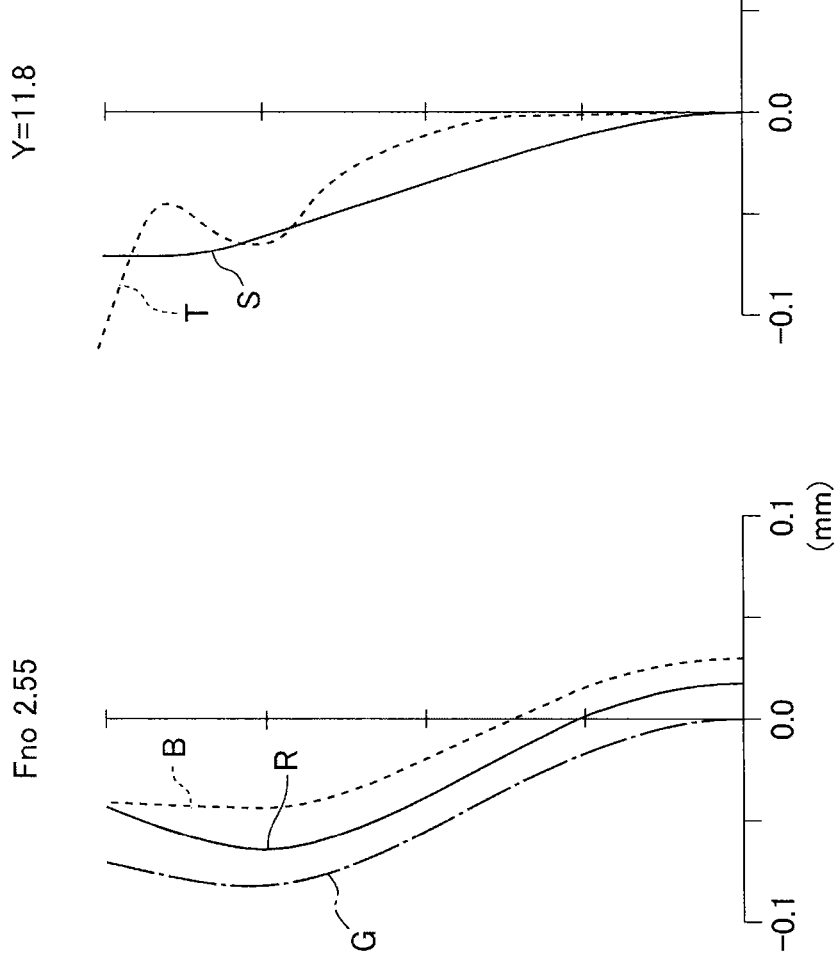

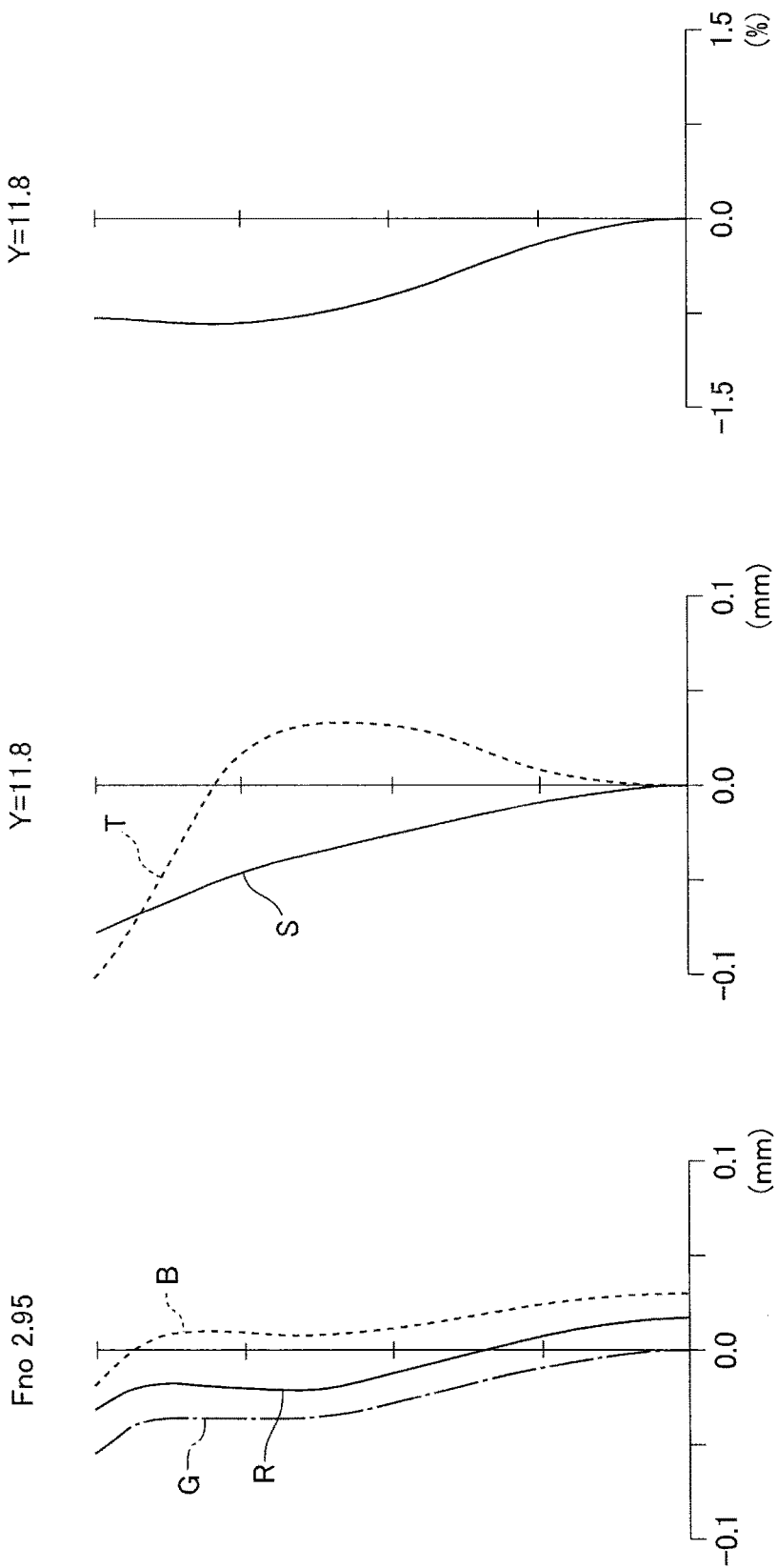

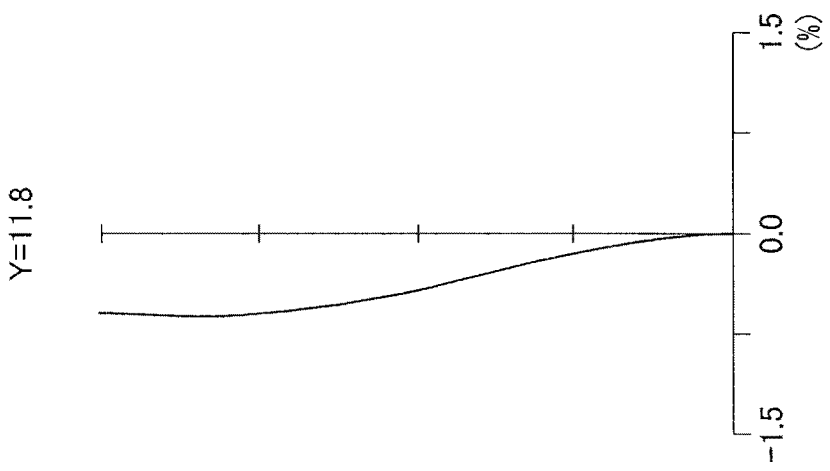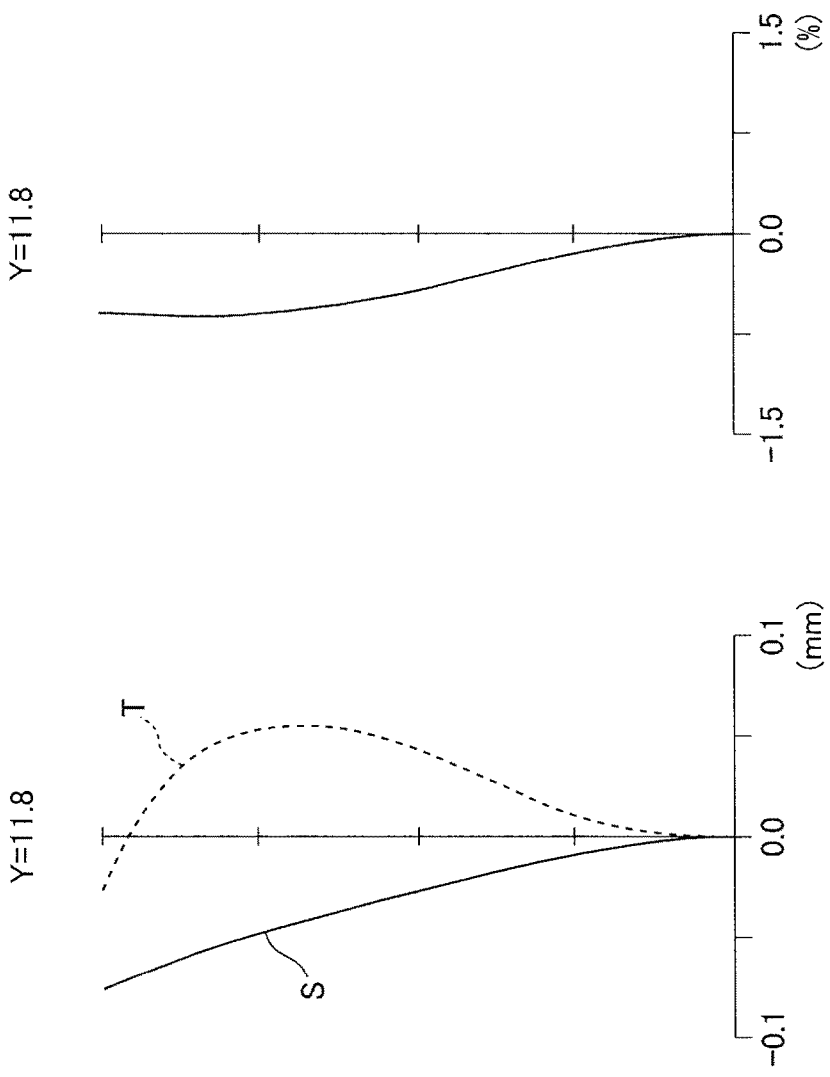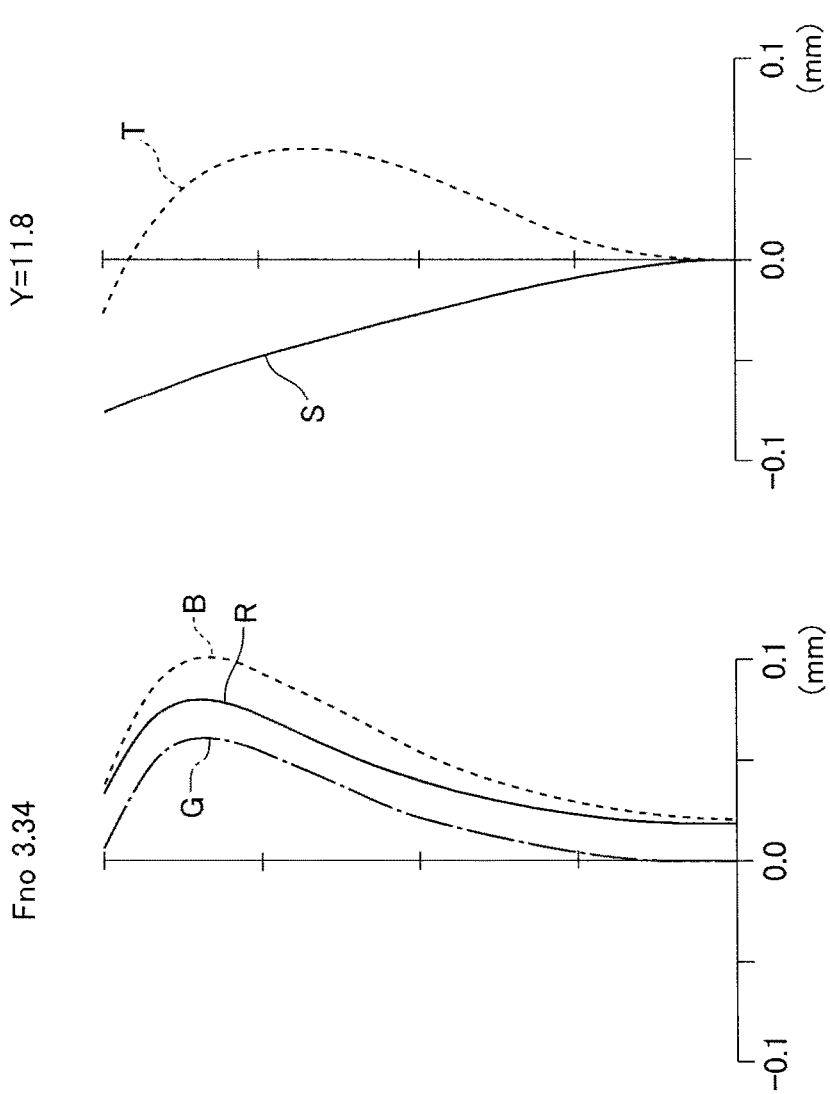

FIG.37
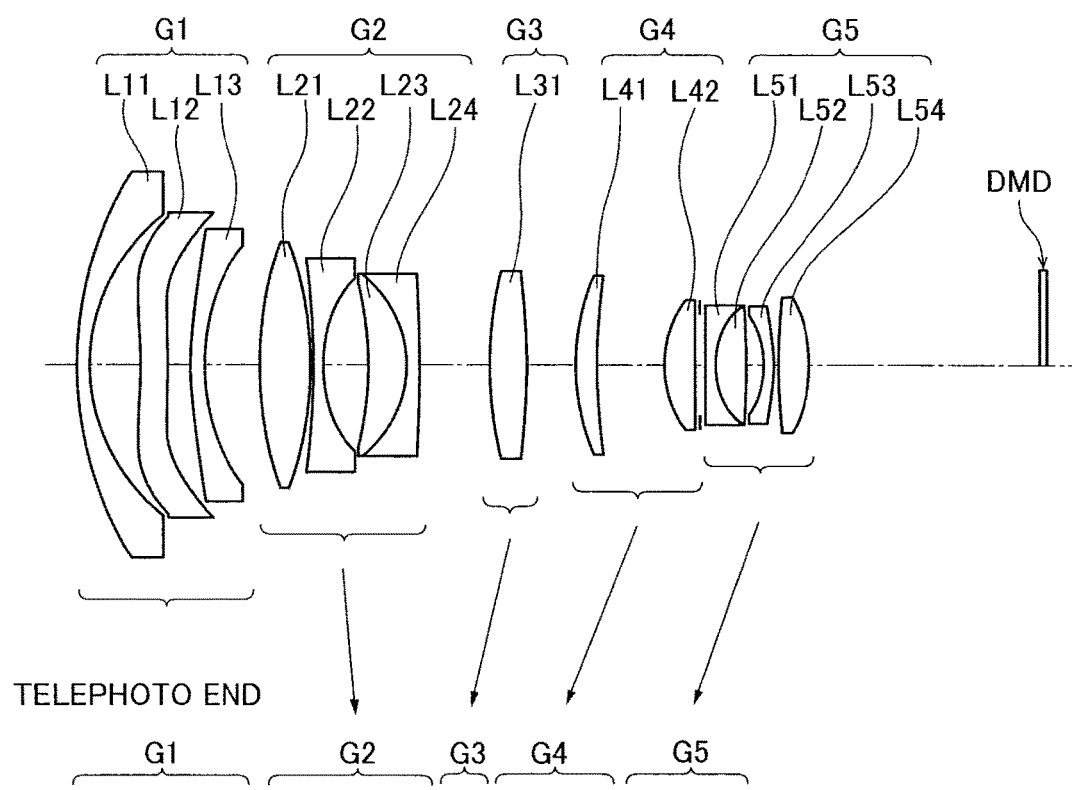
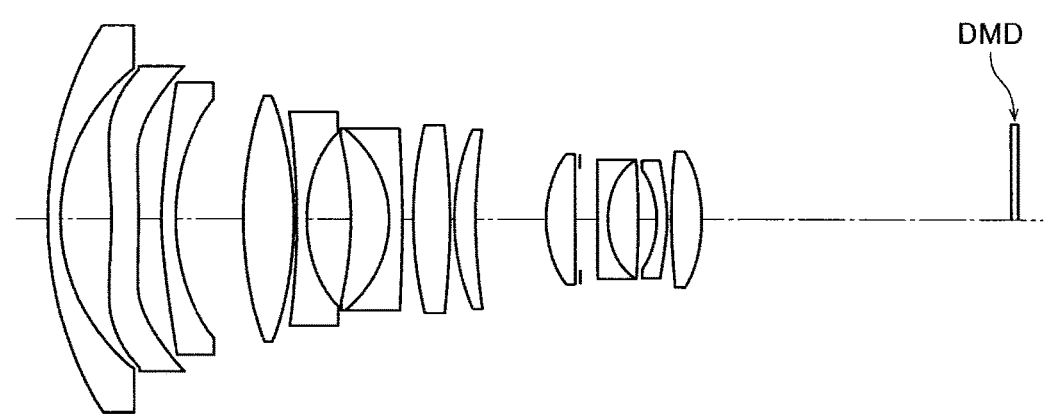

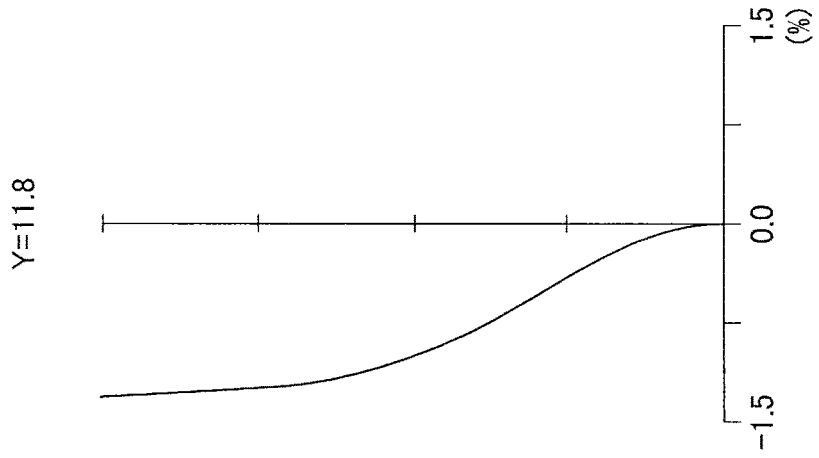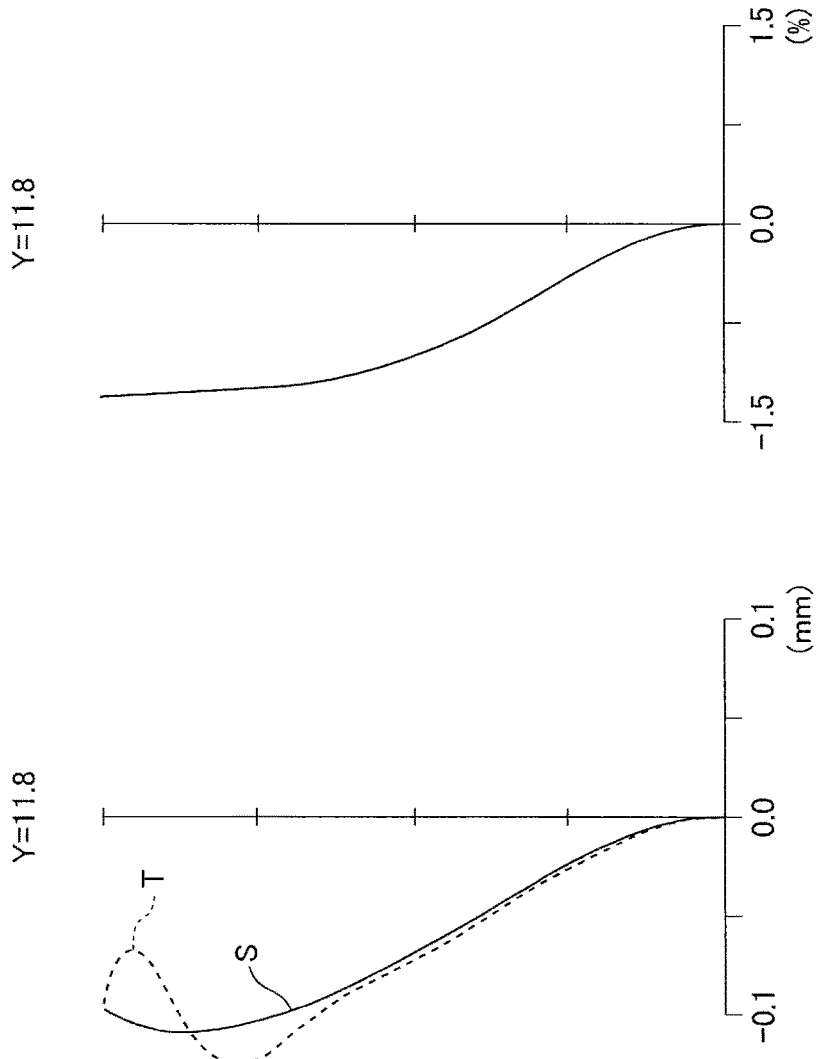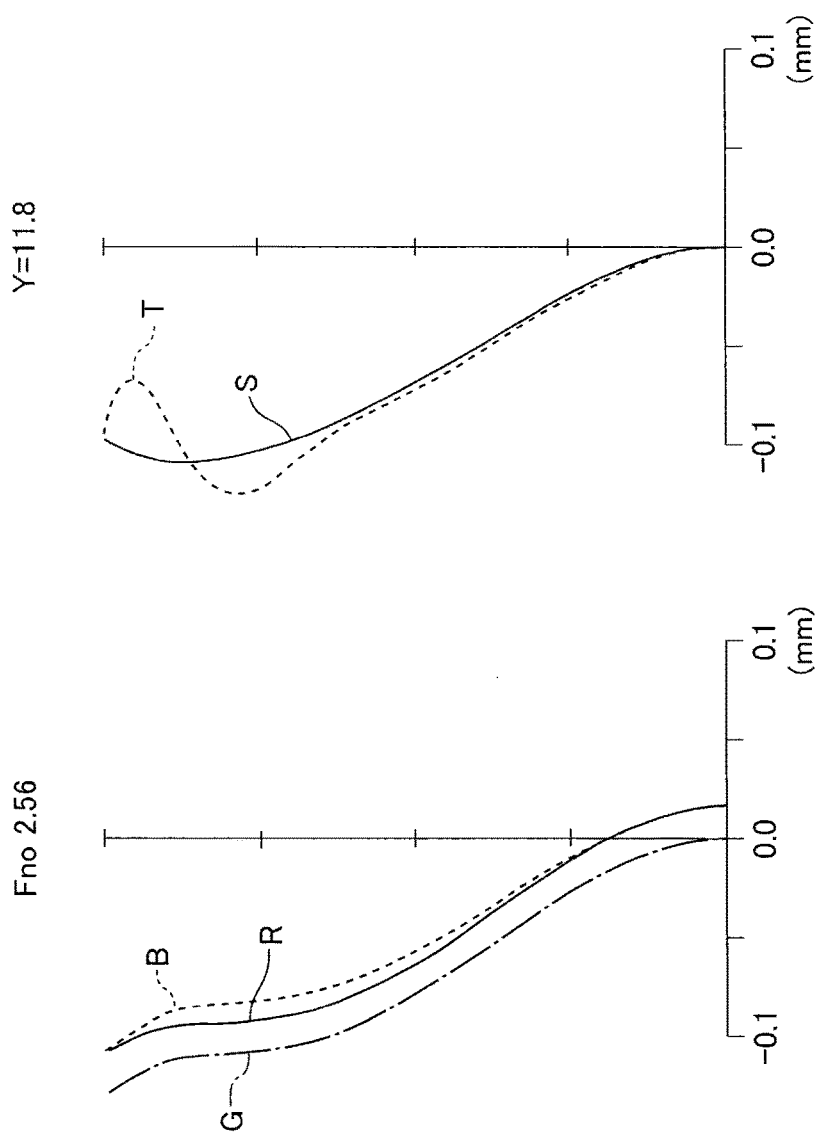

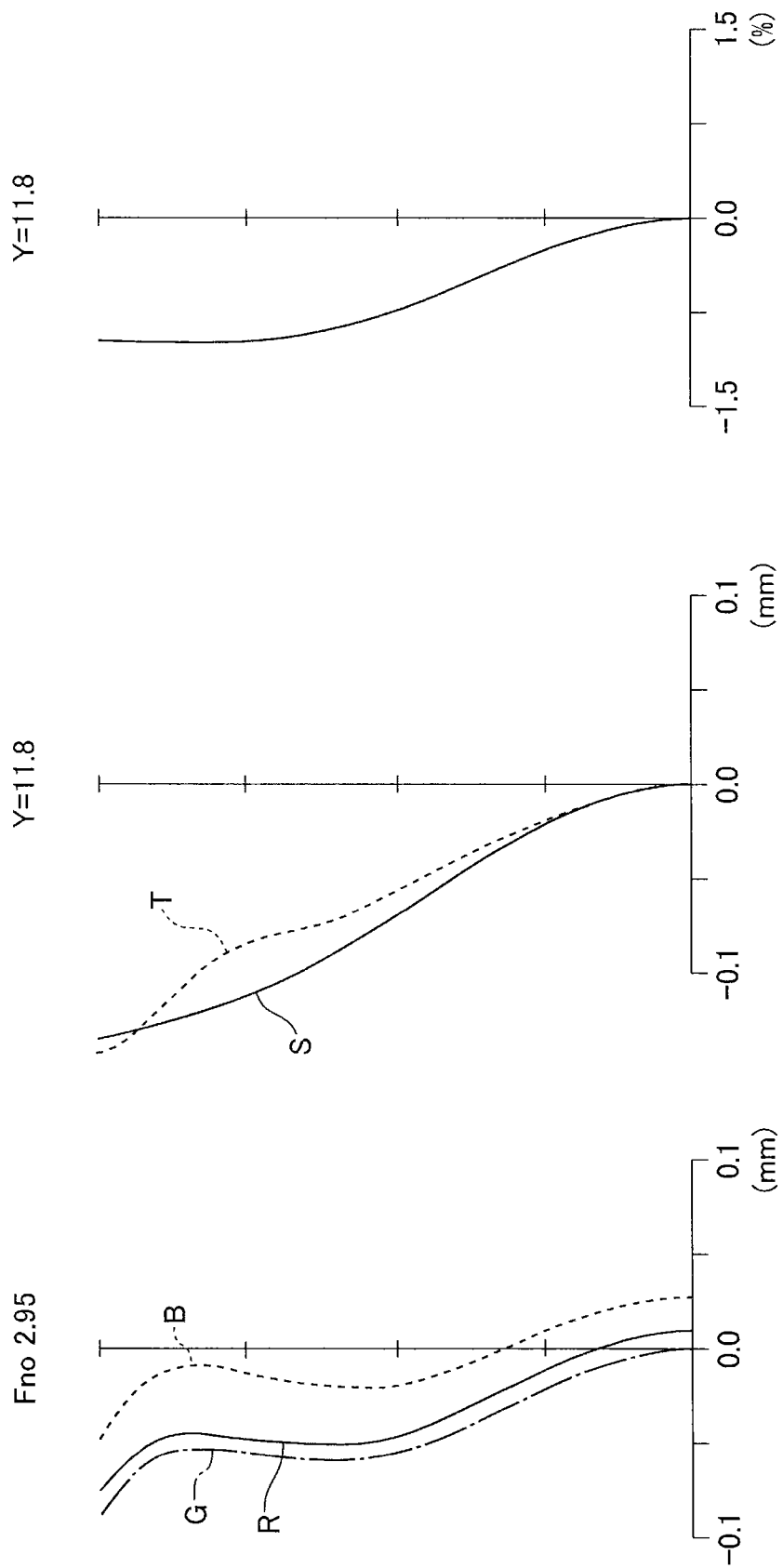

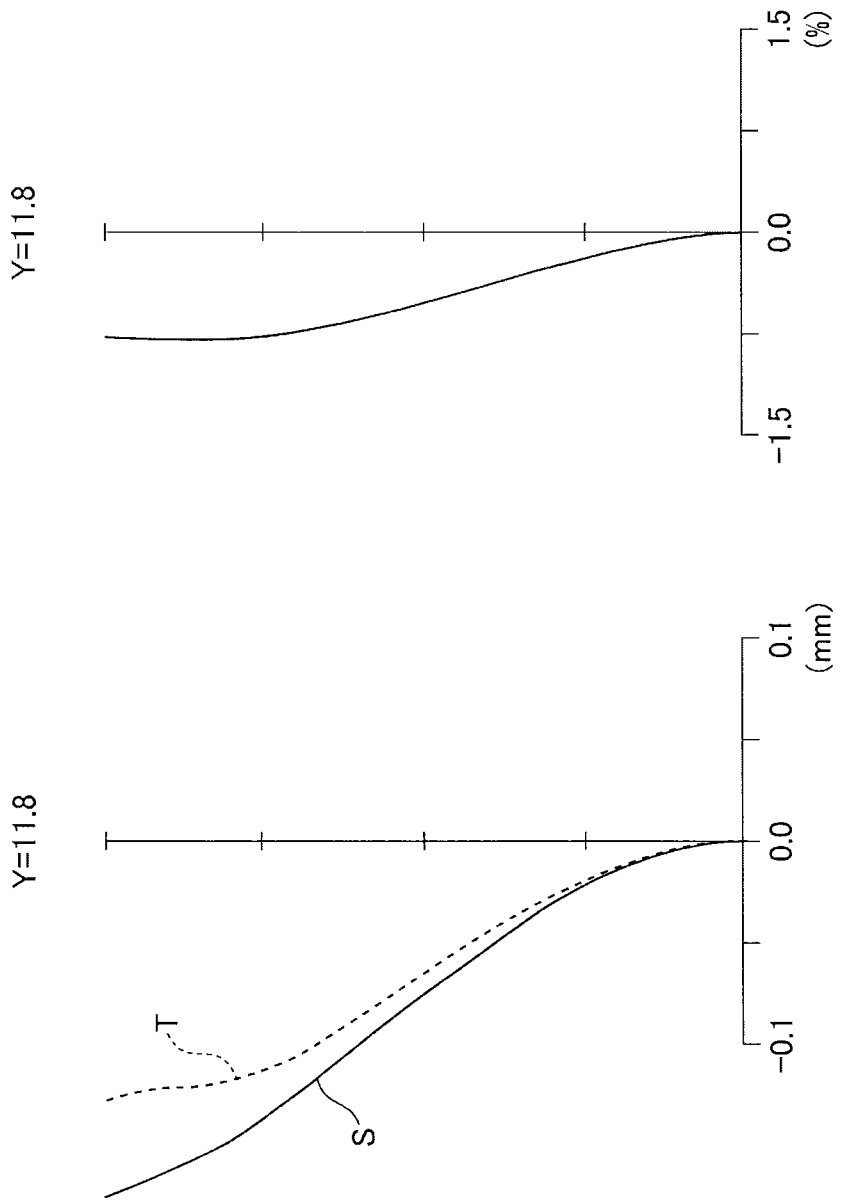

FIG.41
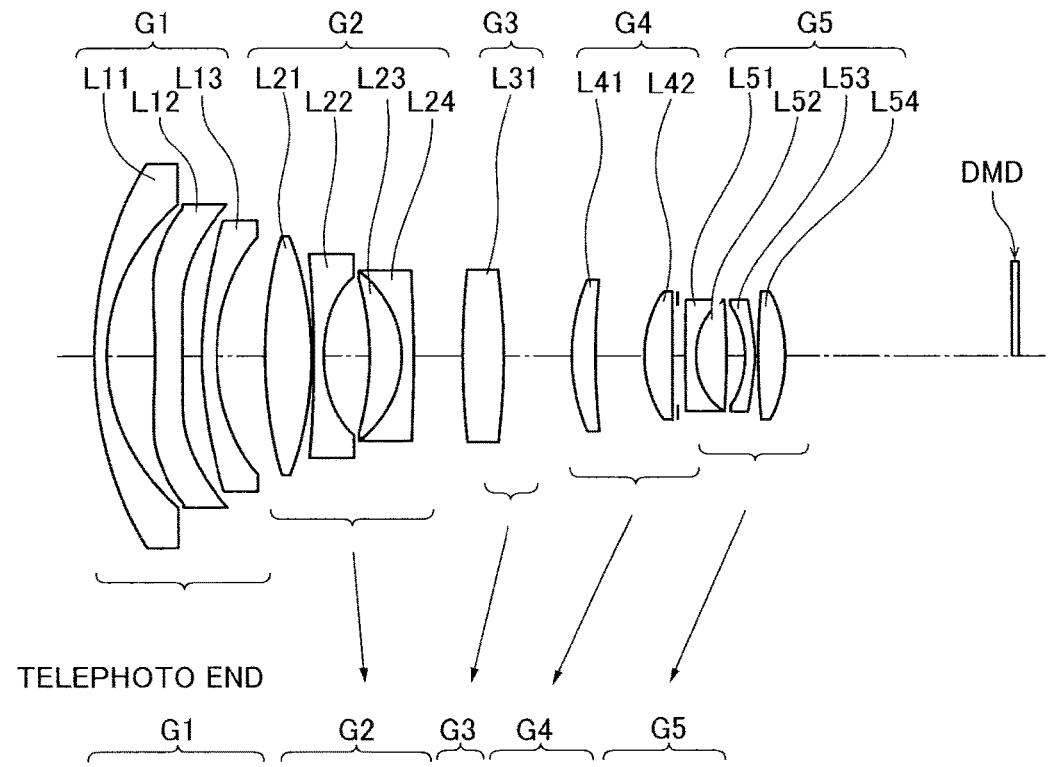
WIDE-ANGLE END
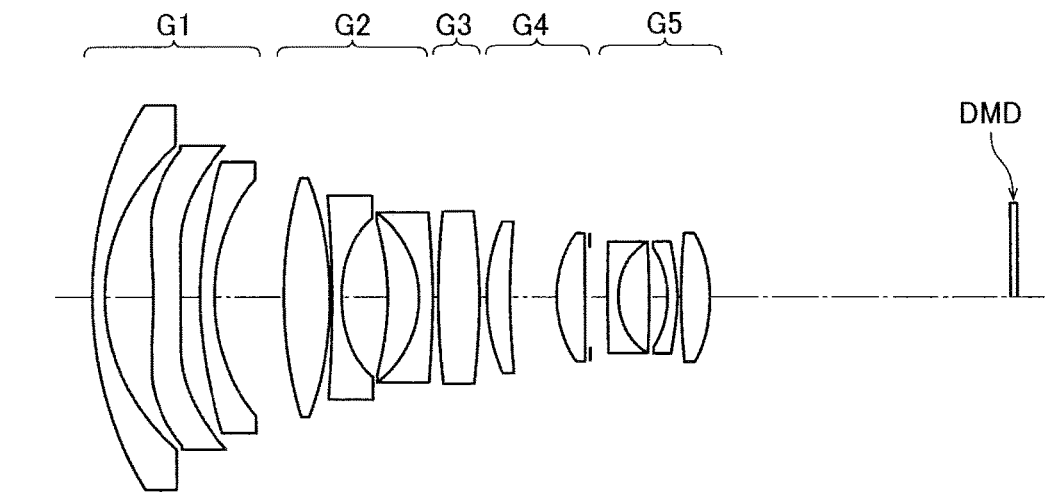
TELEPHOTO END

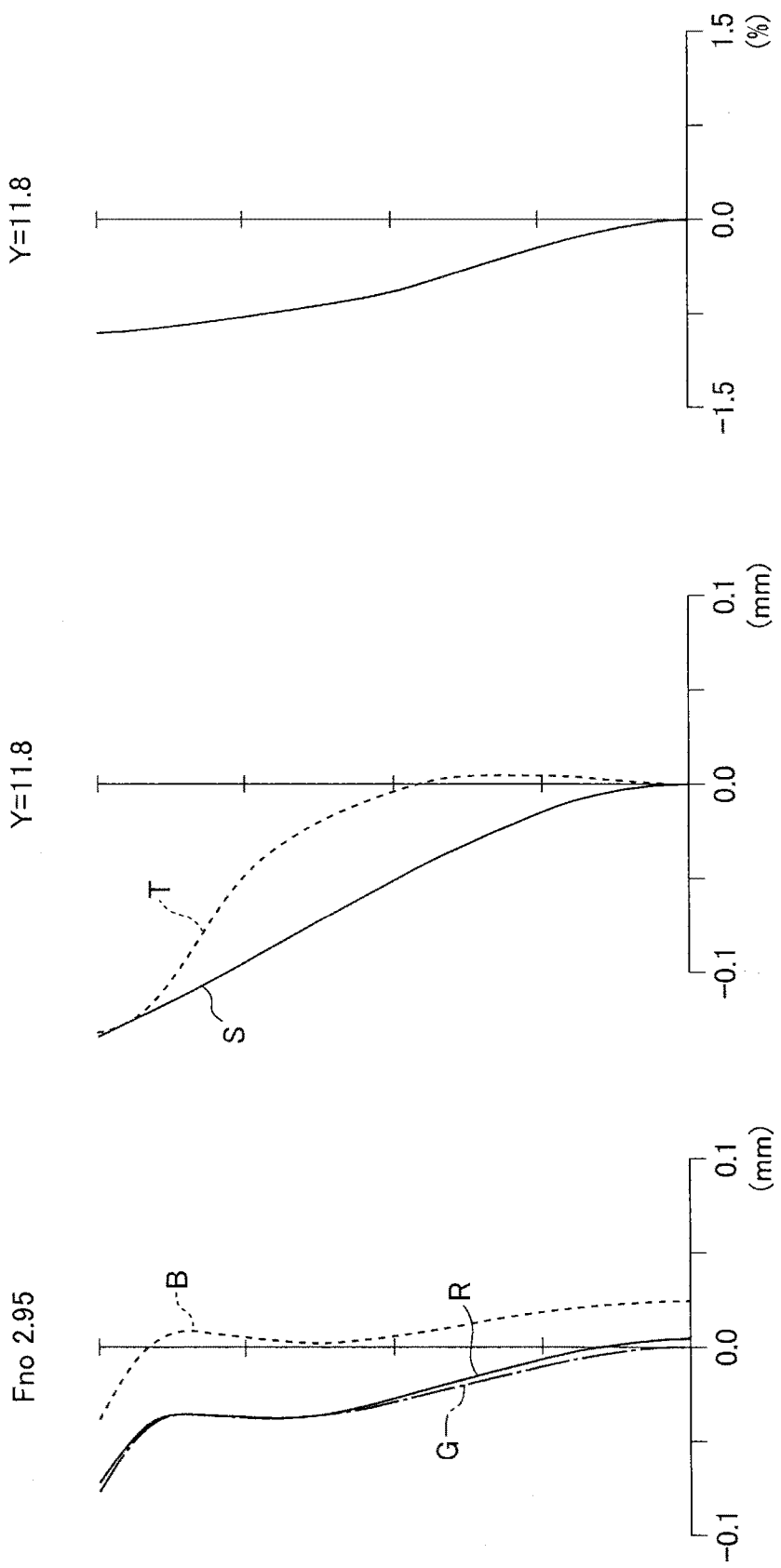

FIG.45
WIDE-ANGLE END
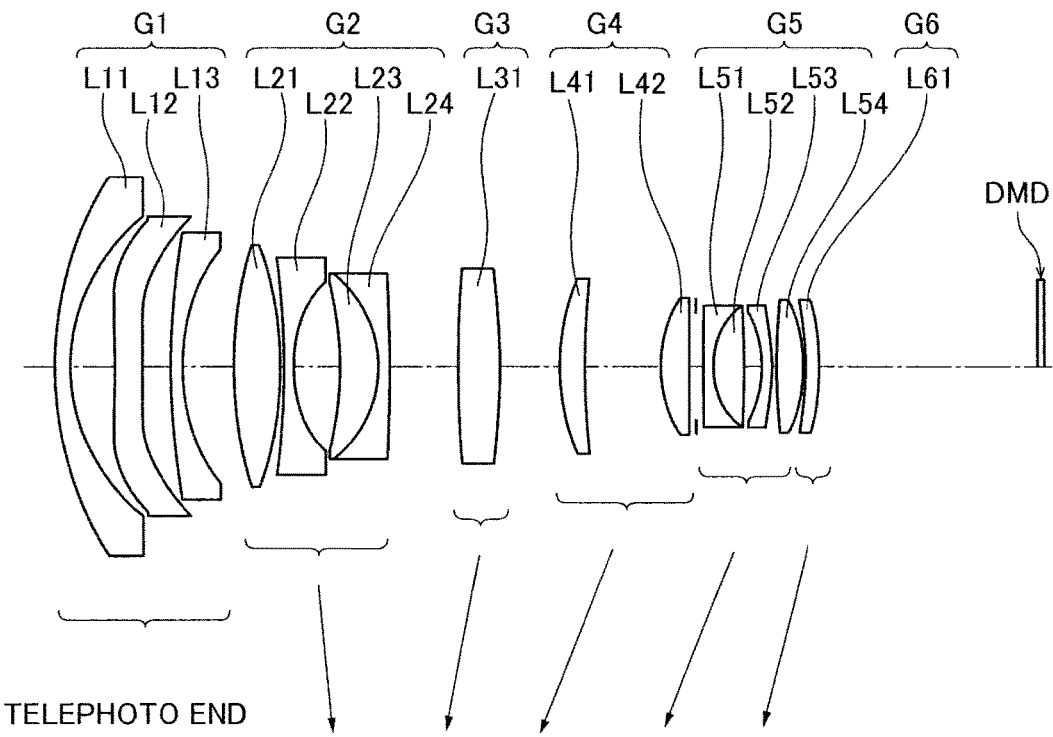
TELEPHOTO END
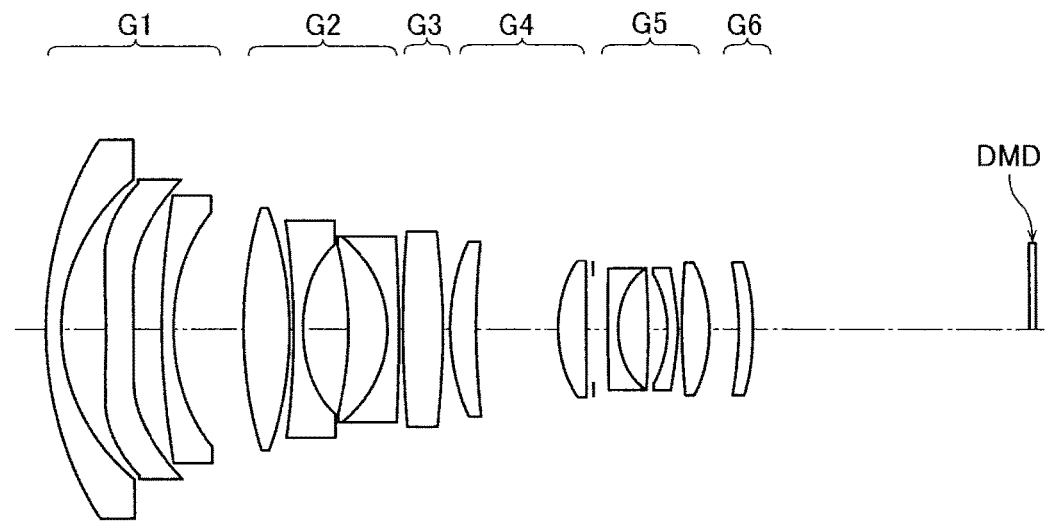

FIG.50
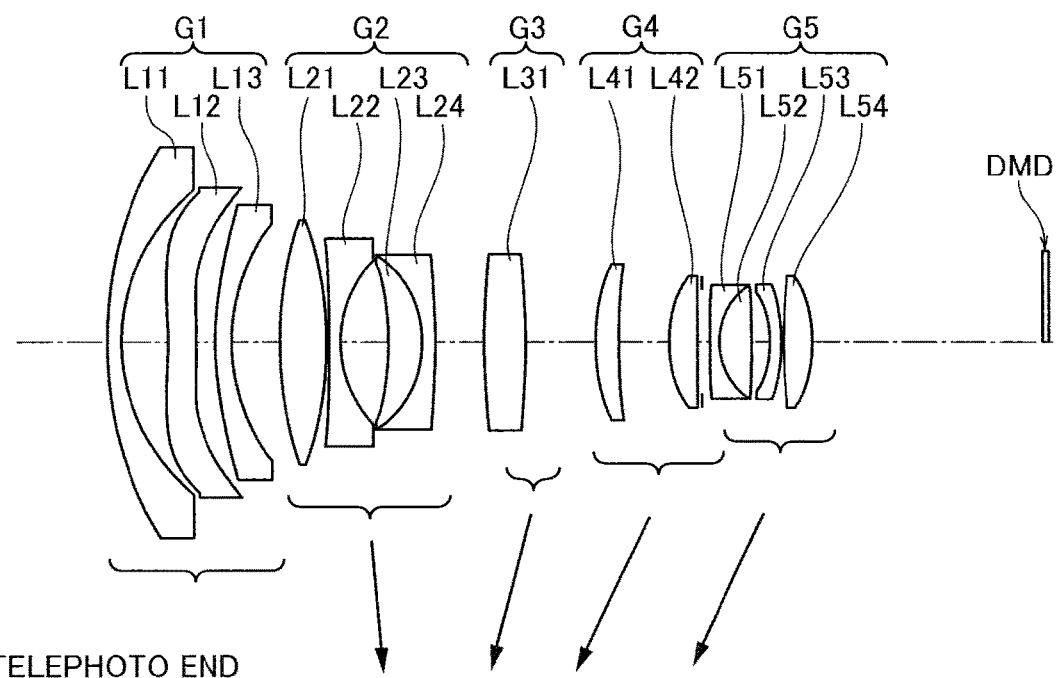
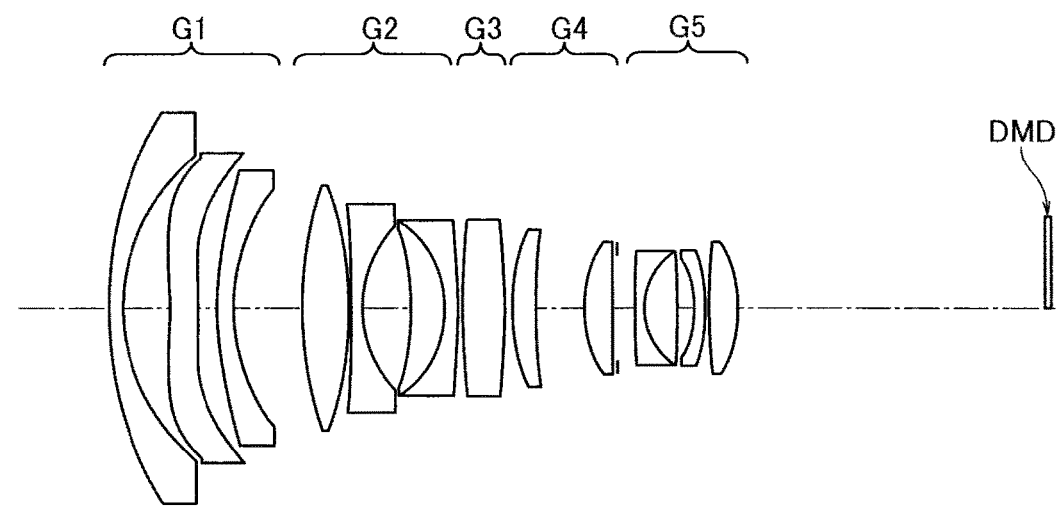

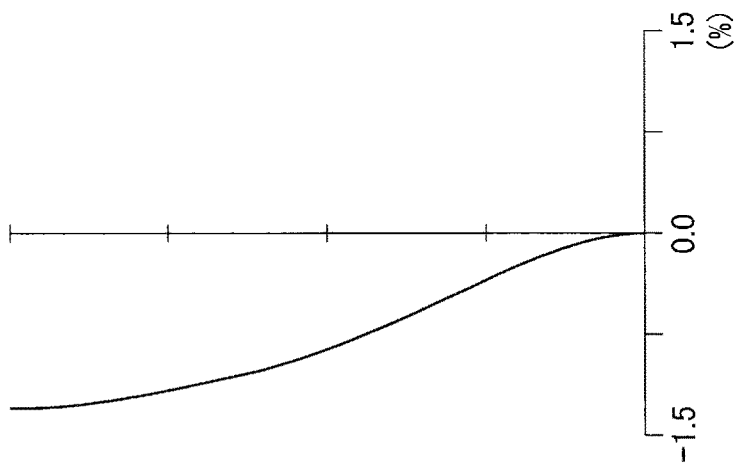
FIG.51C
FIG.51B
FIG.51A
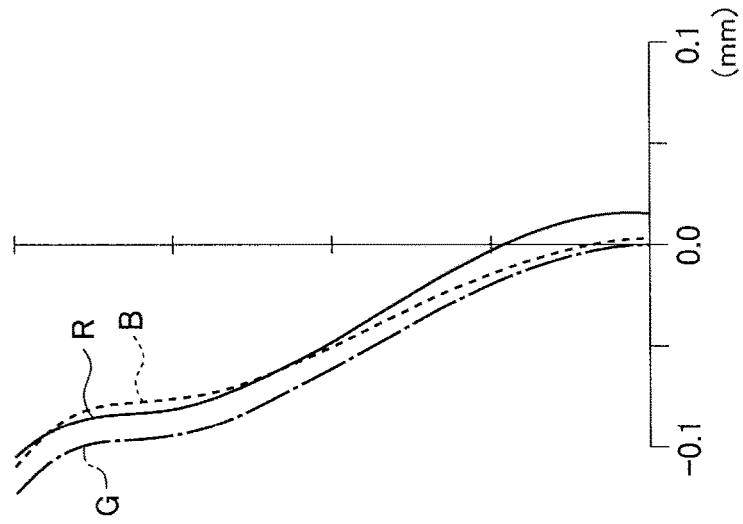

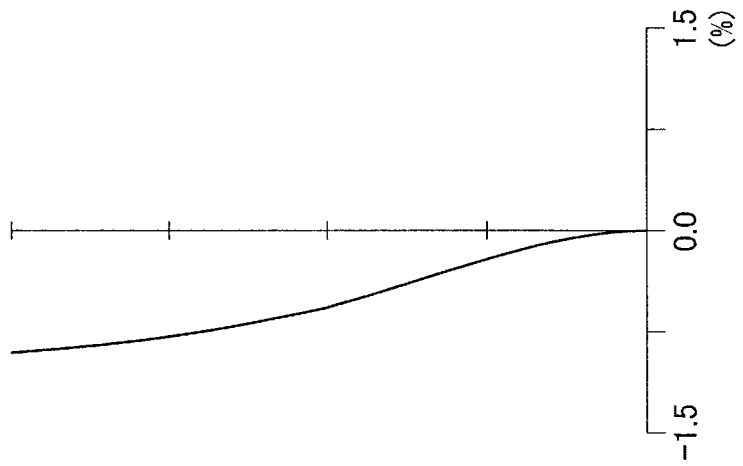
FIG.52C Y=11.8
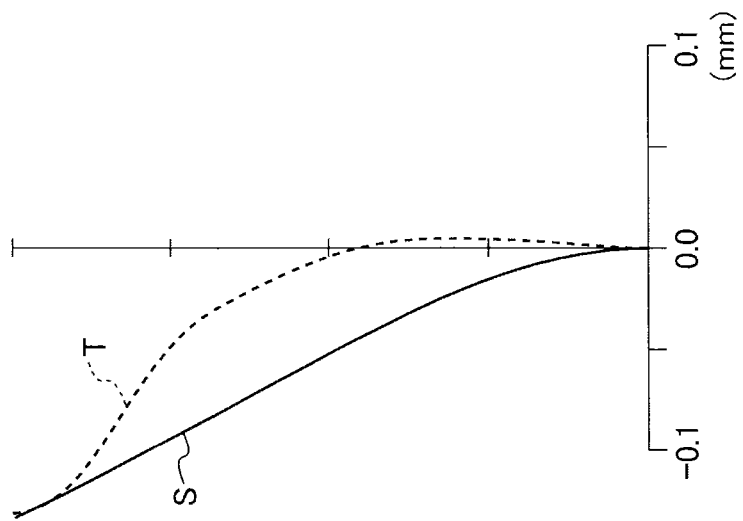
FIG.52B Y=11.8
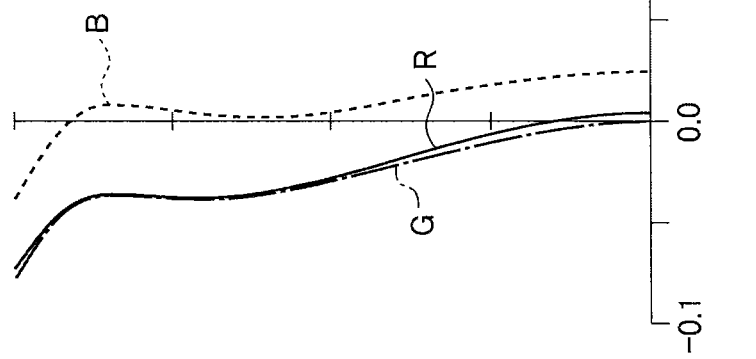
FIG.52A Fno 2.95

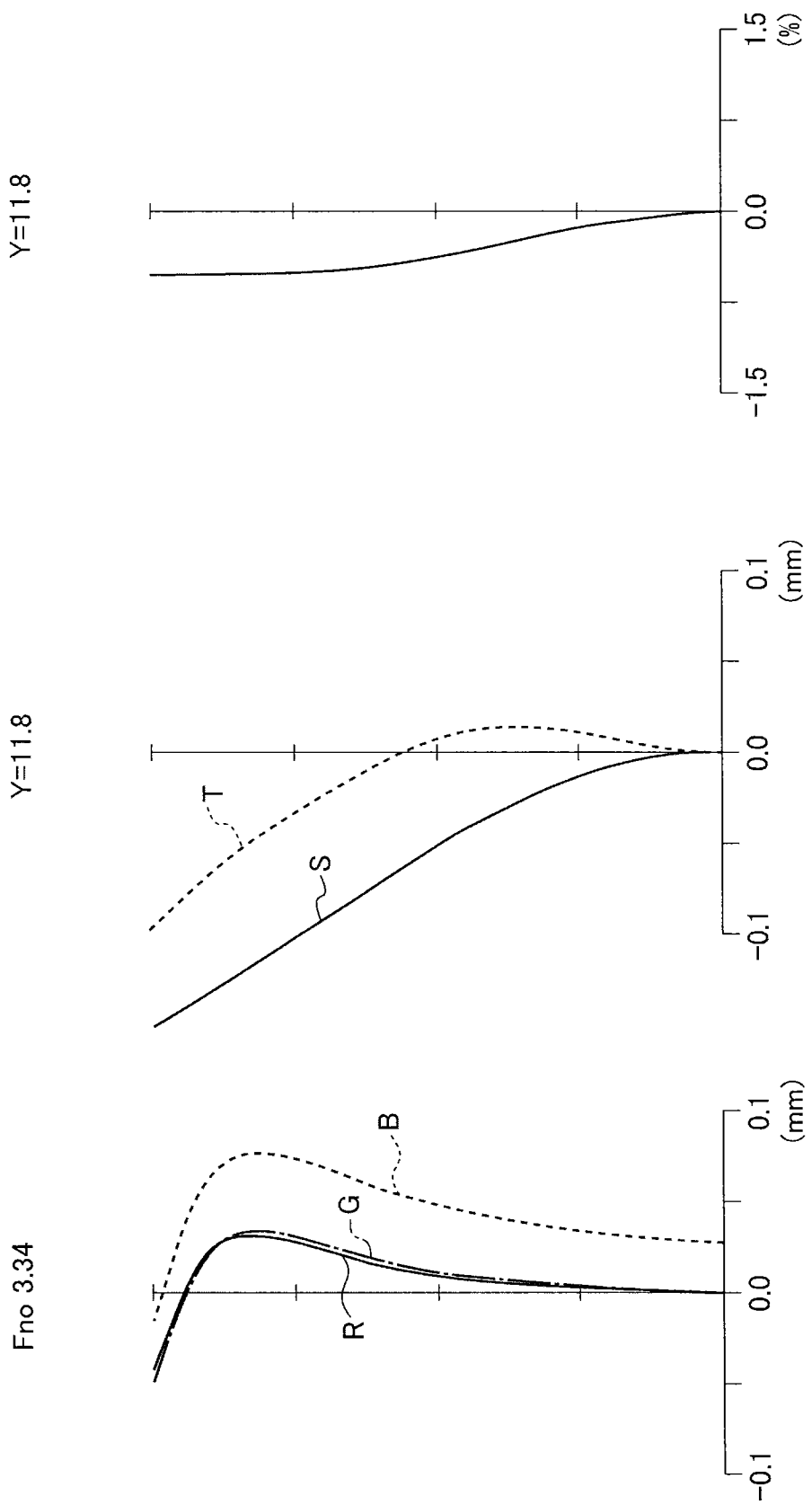

FIG.54
WIDE-ANGLE END
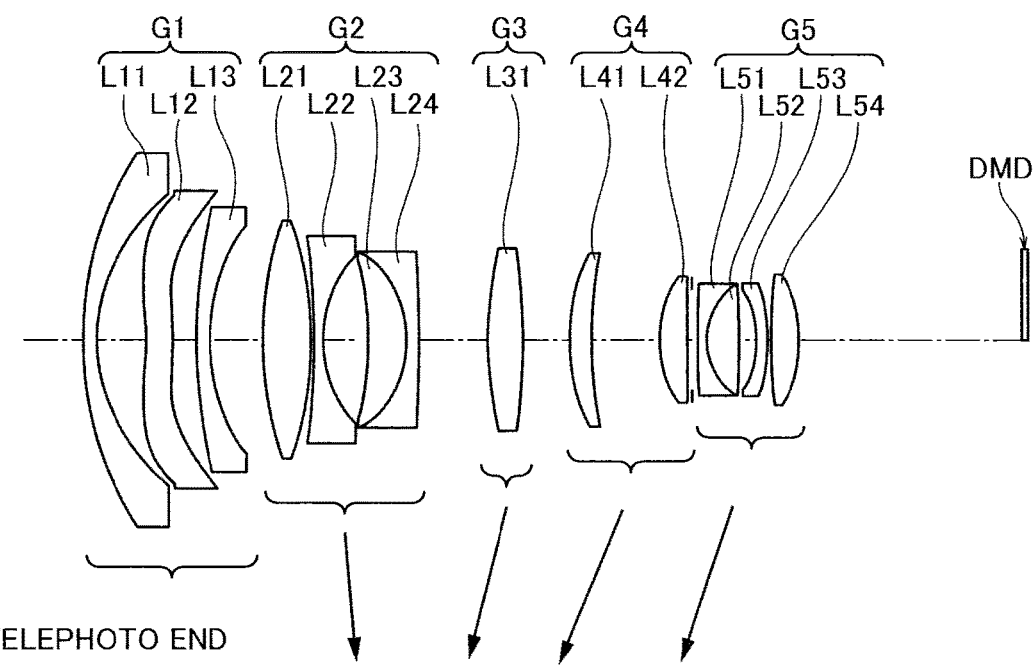
TELEPHOTO END
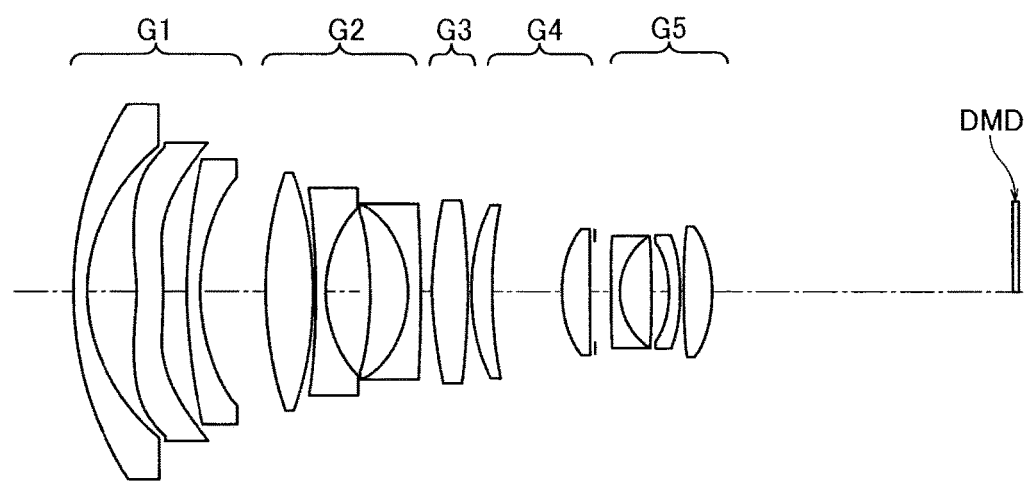

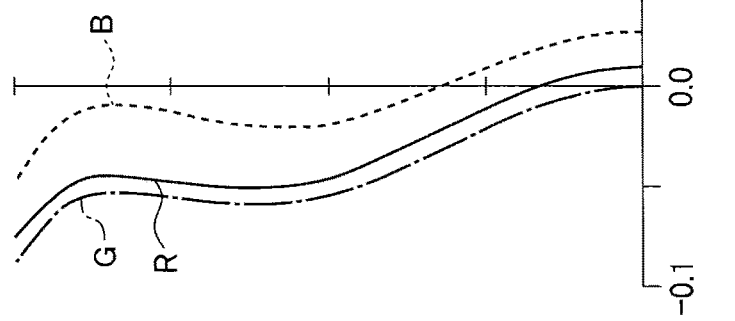
FIG.56A Fno 2.95
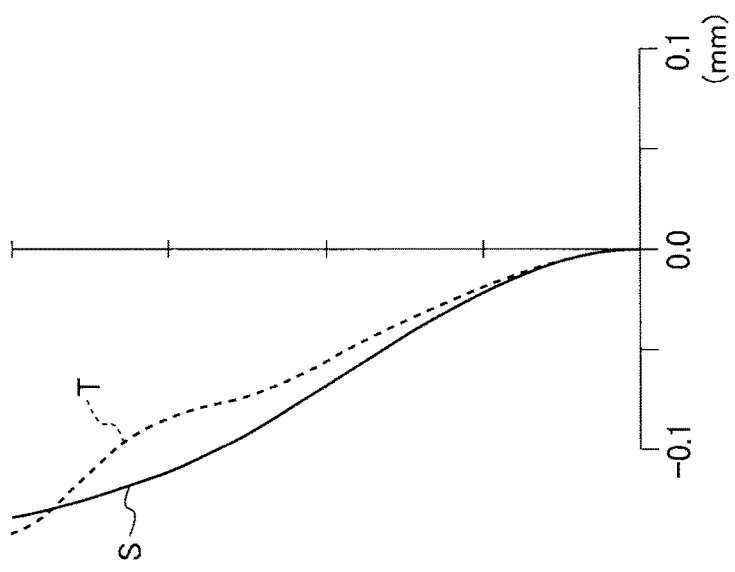
FIG.56B Y=11.8
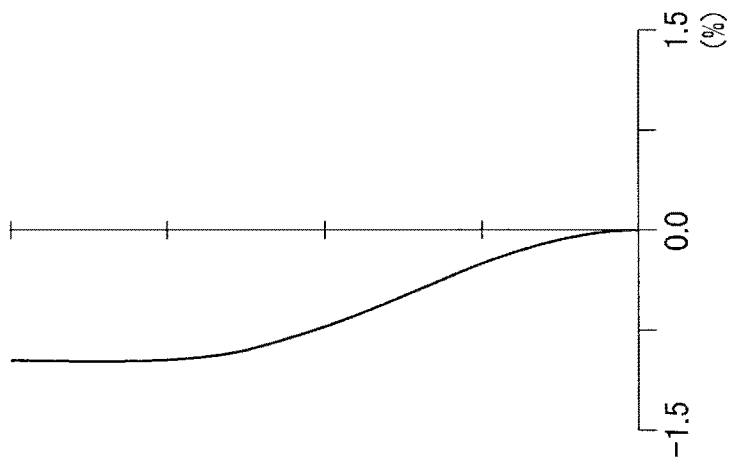
FIG.56C Y=11.8

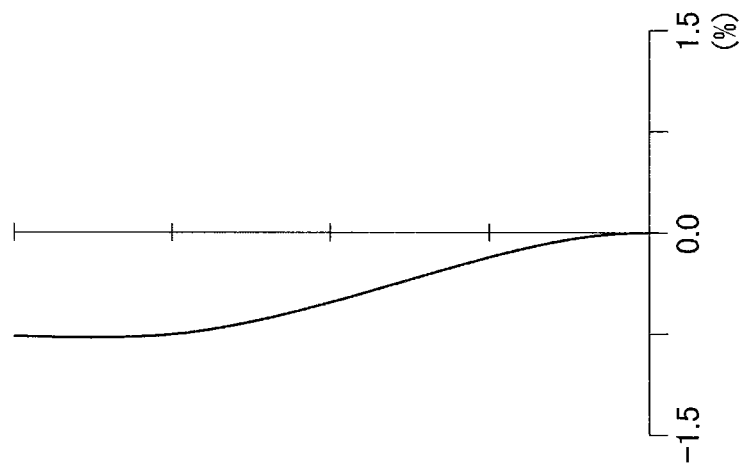
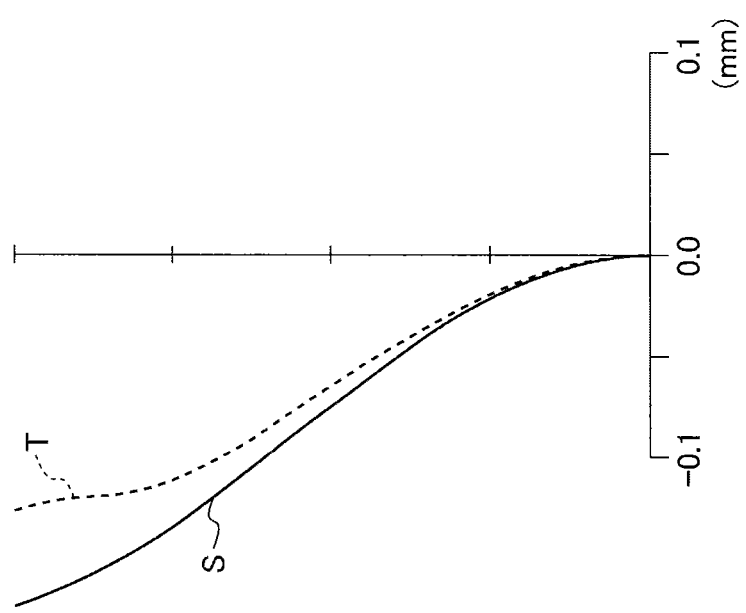
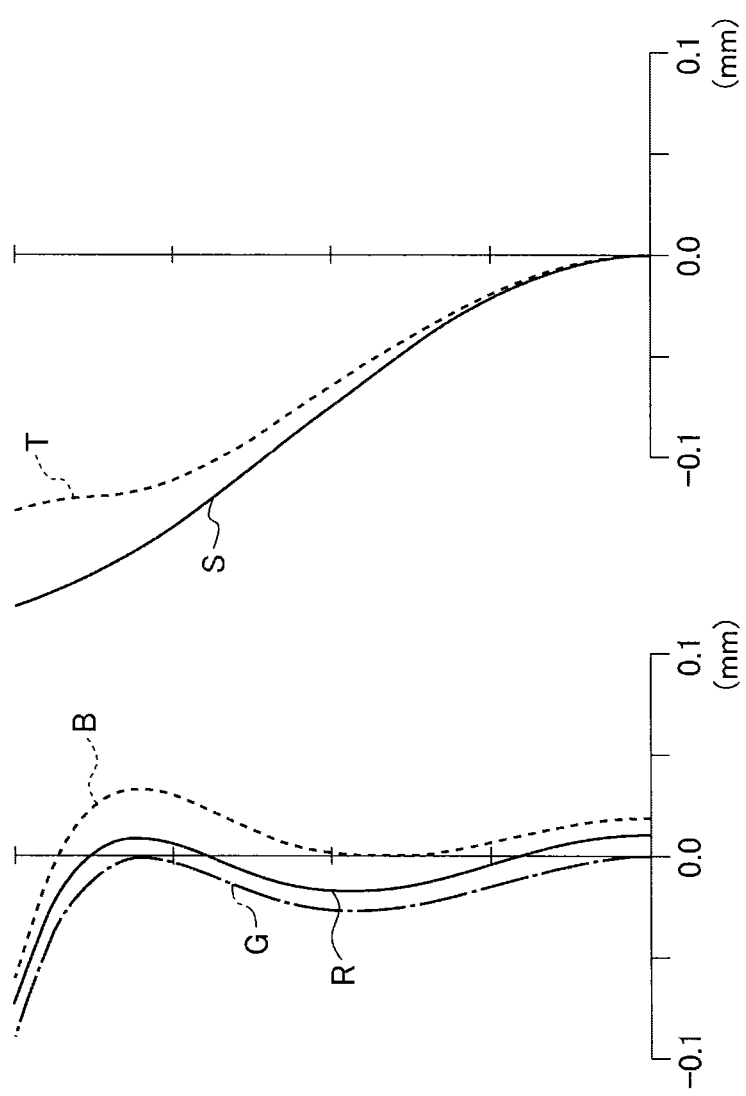

FIG.58
WIDE-ANGLE END
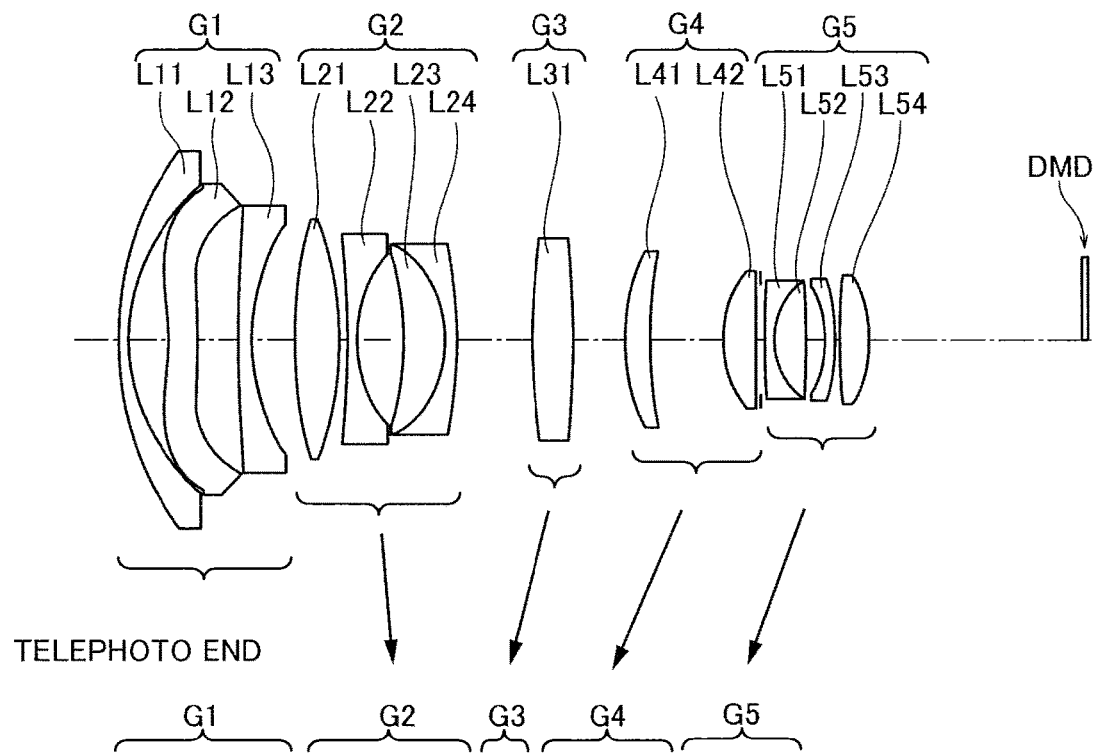
TELEPHOTO END
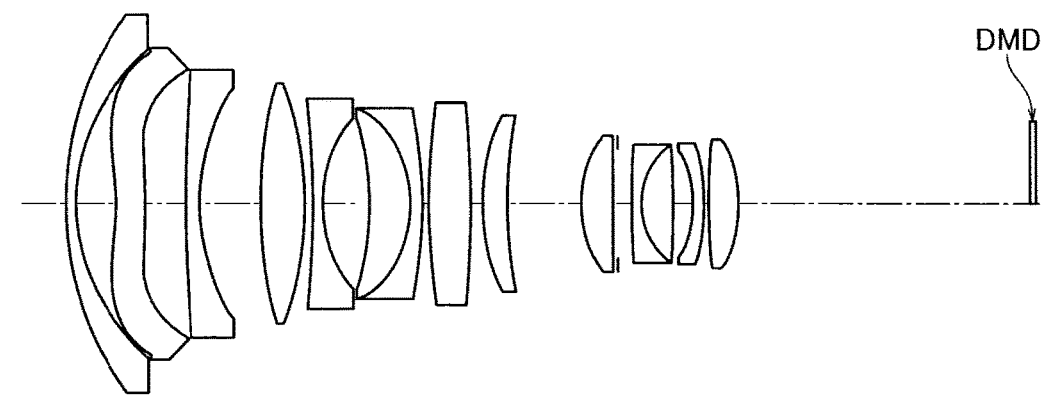

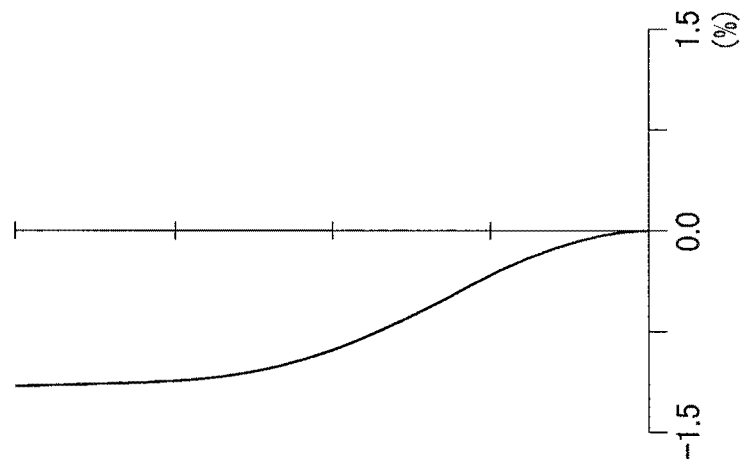
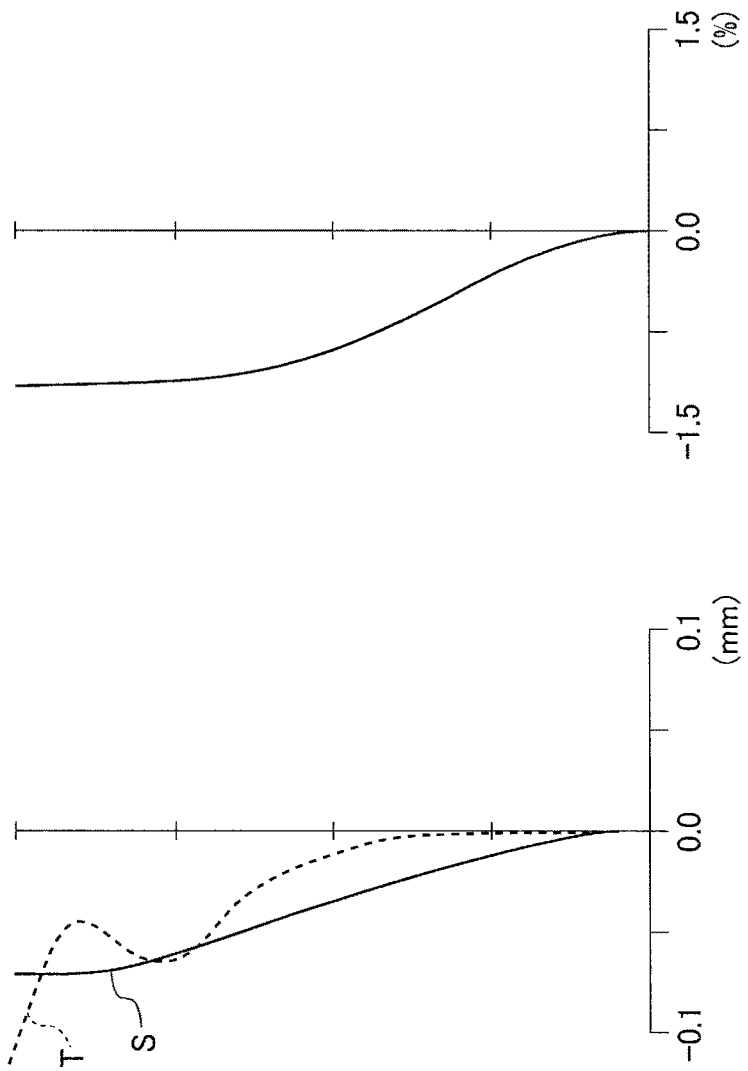
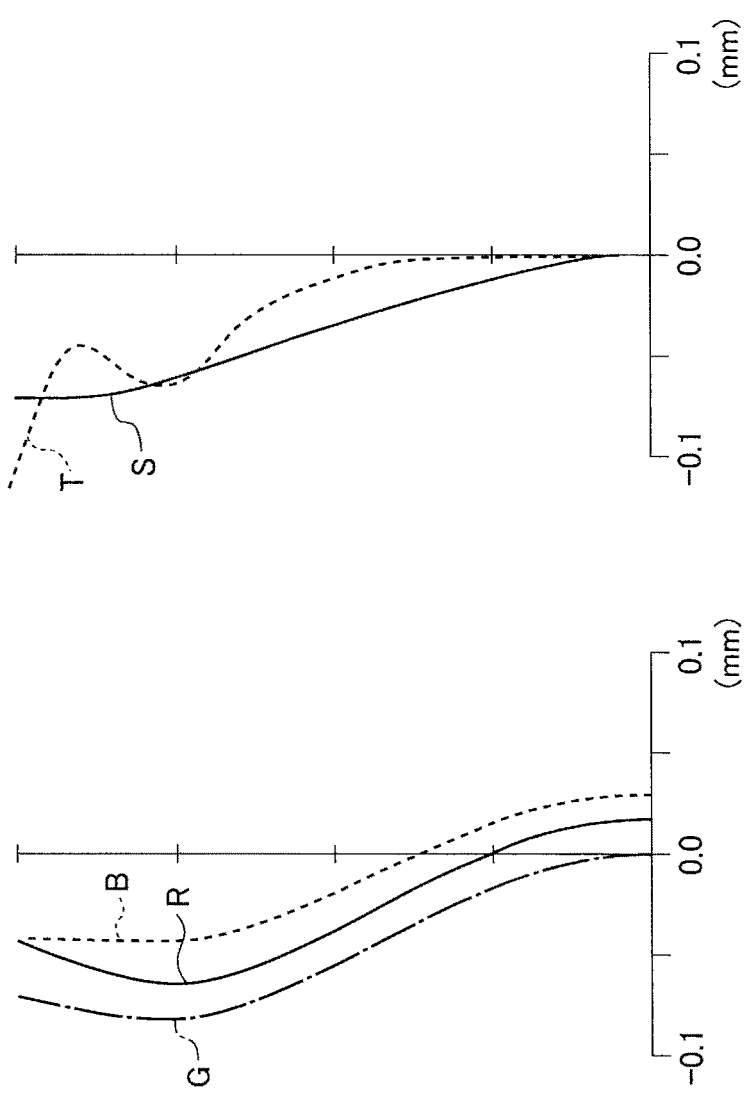

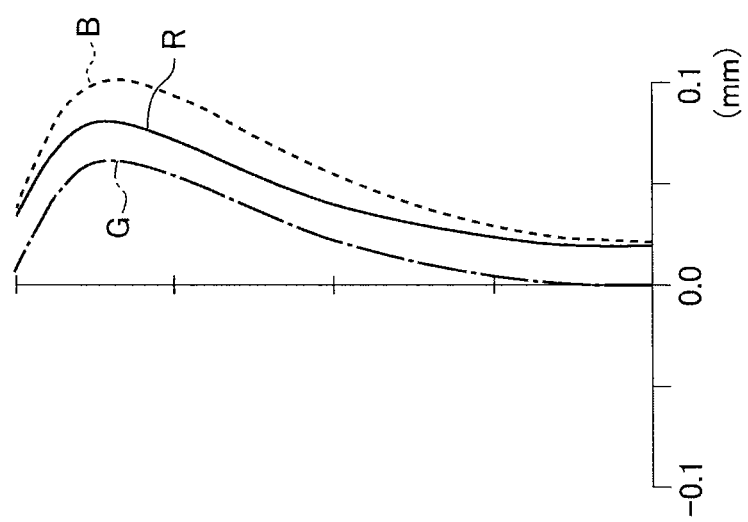
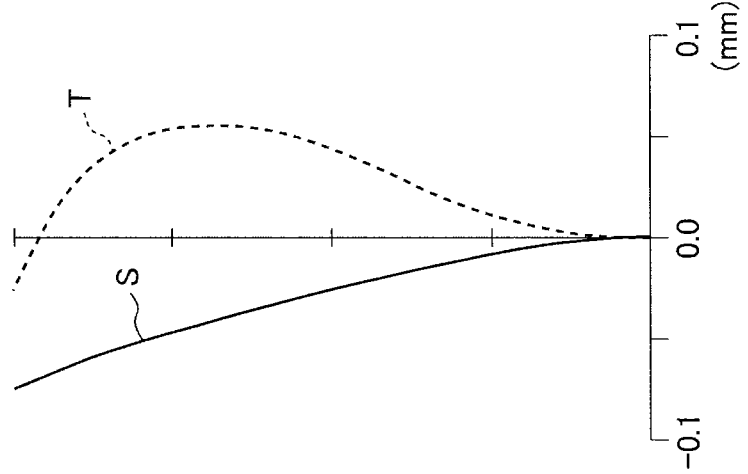
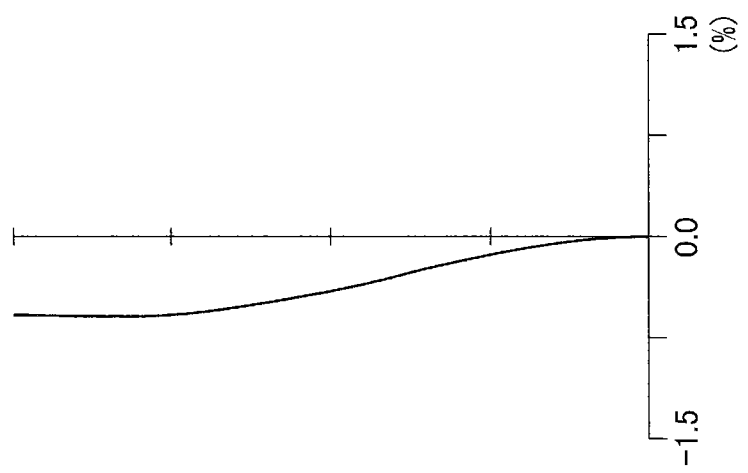

FIG.62
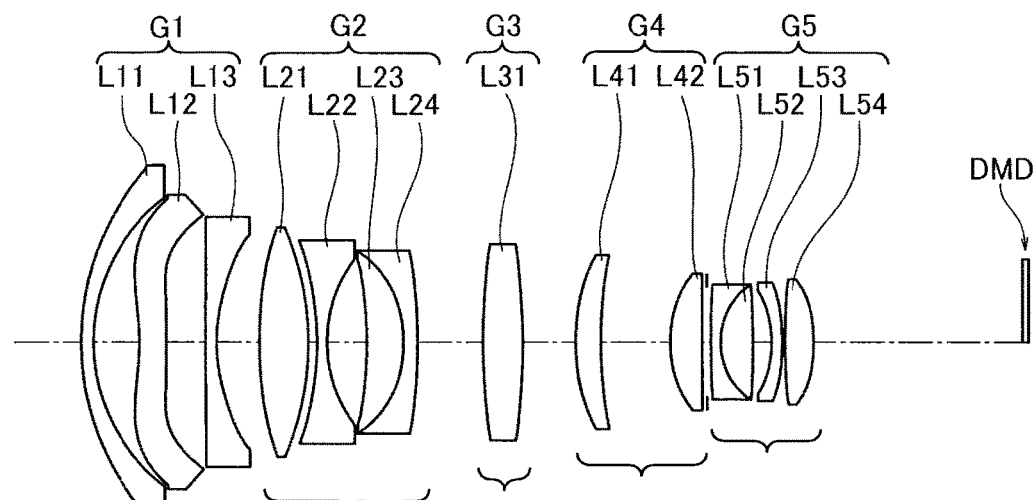
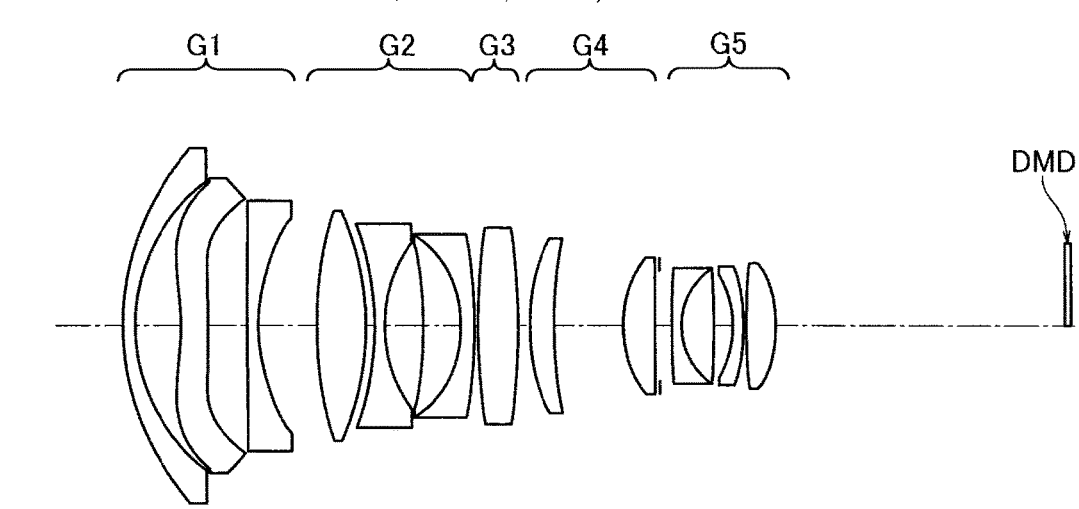

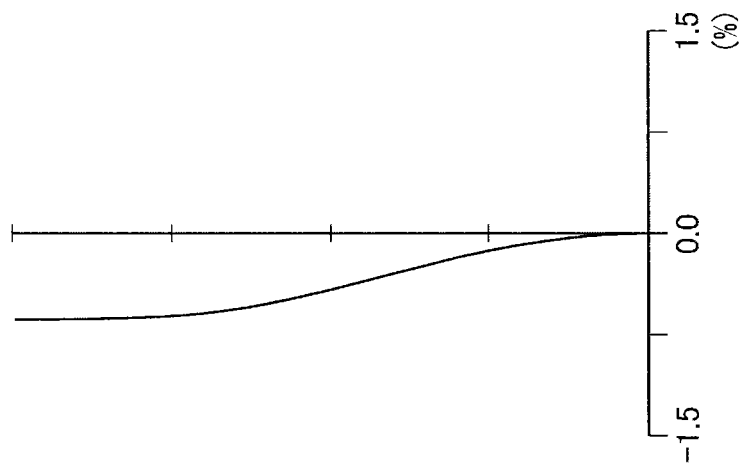
FIG.65C Y=11.8
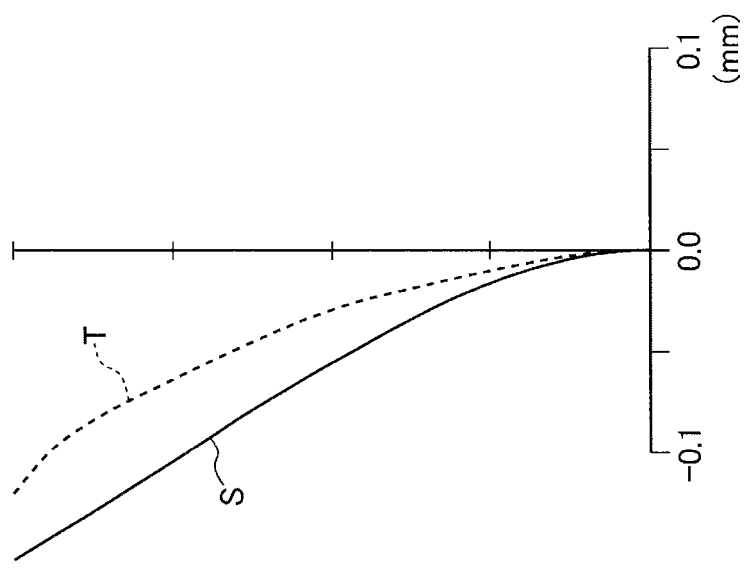
FIG.65B Y=11.8
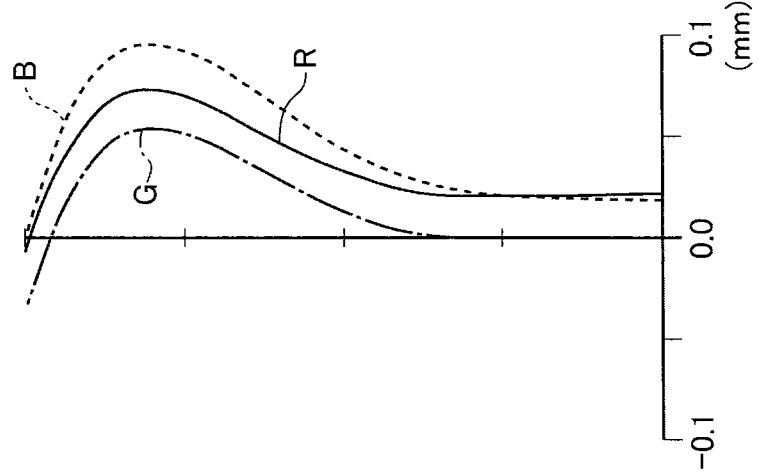
FIG.65A Fno 3.34

FIG.66
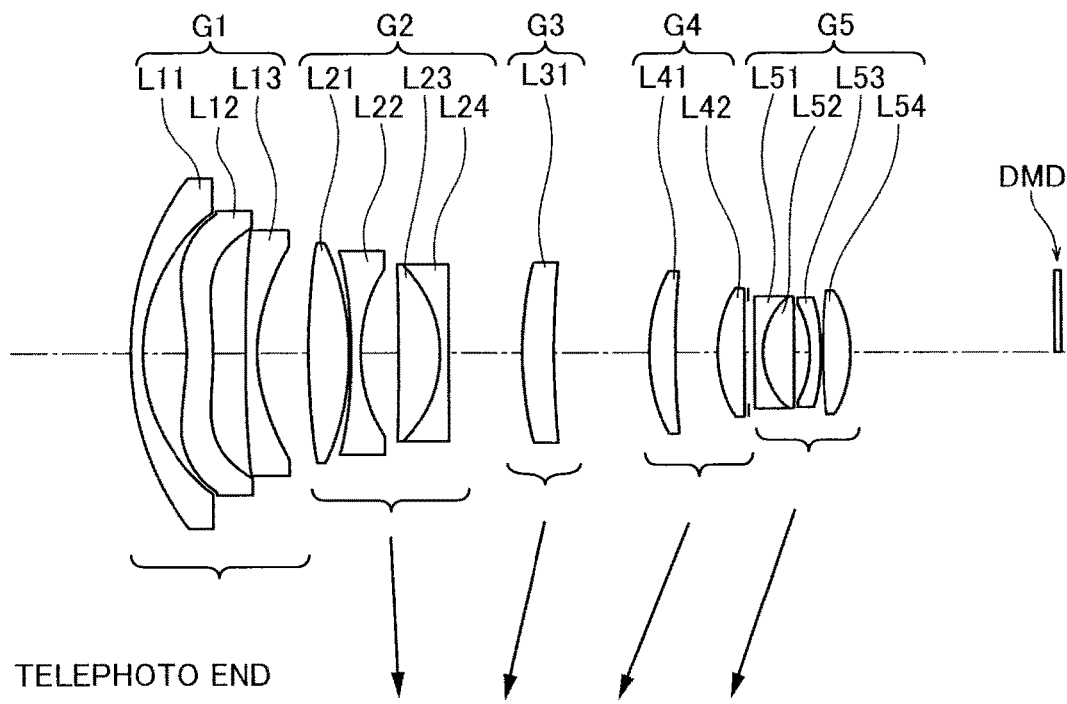
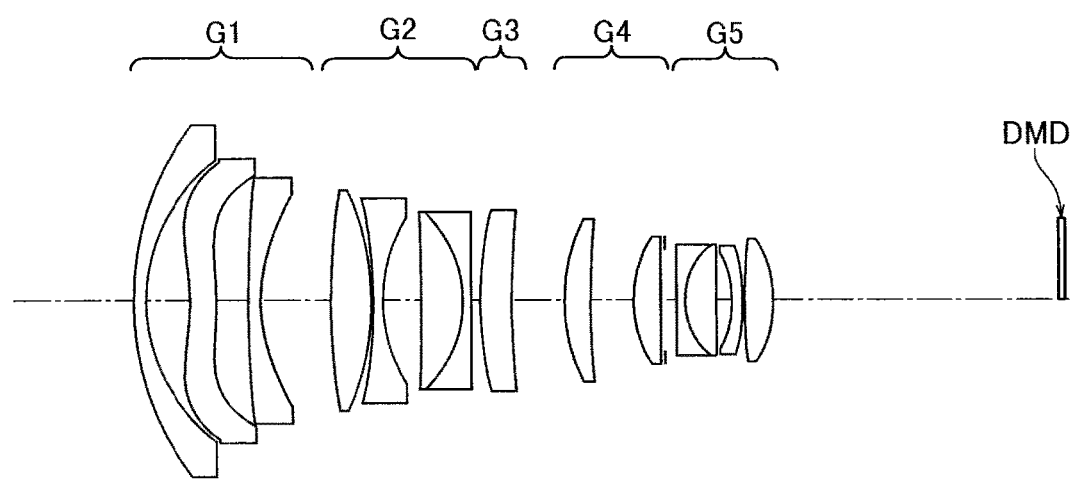

FIG.70
WIDE-ANGLE END
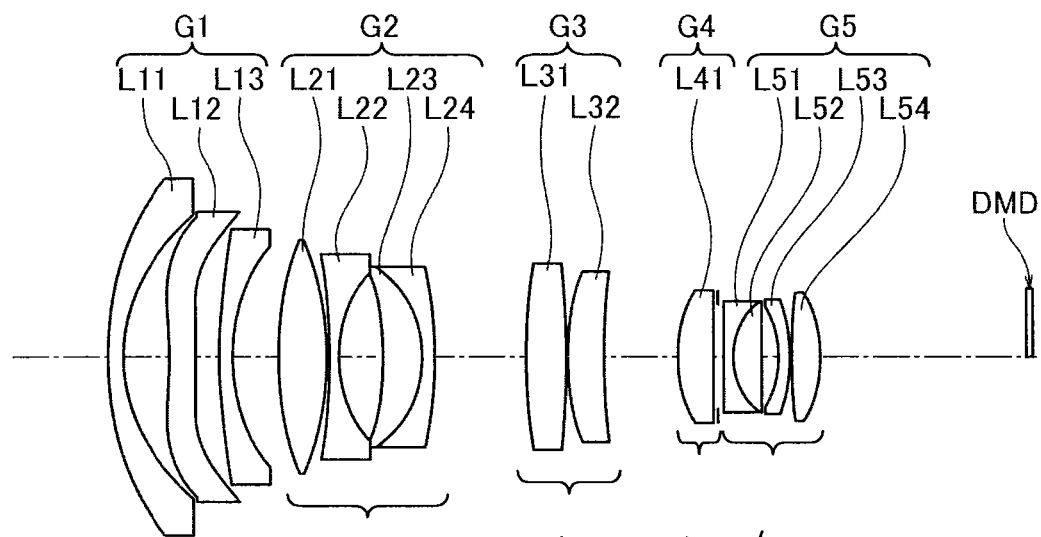
TELEPHOTO END
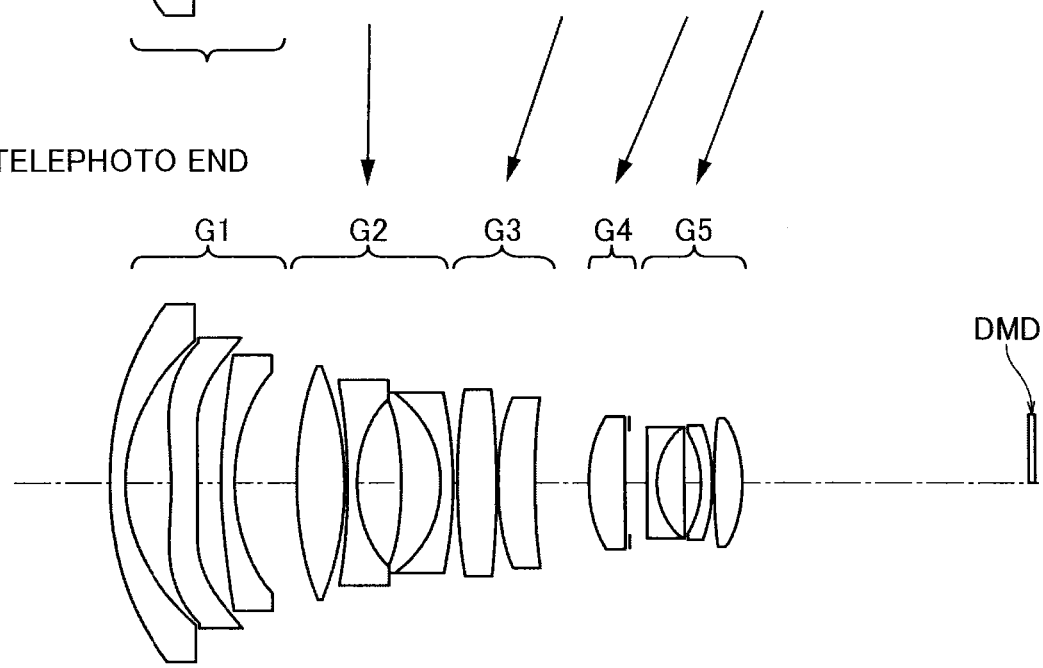

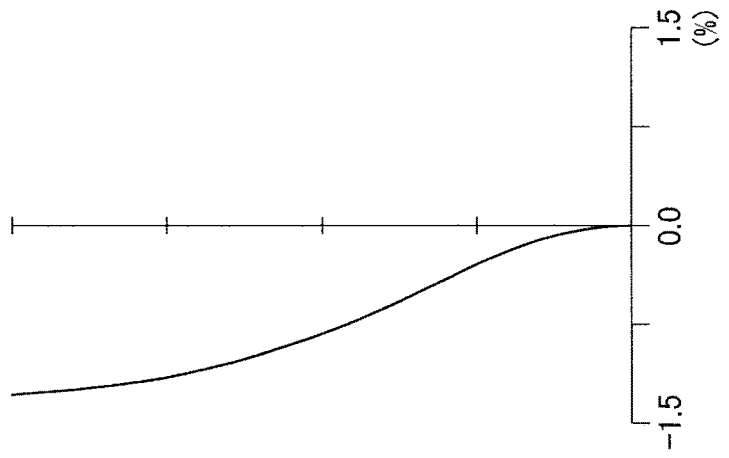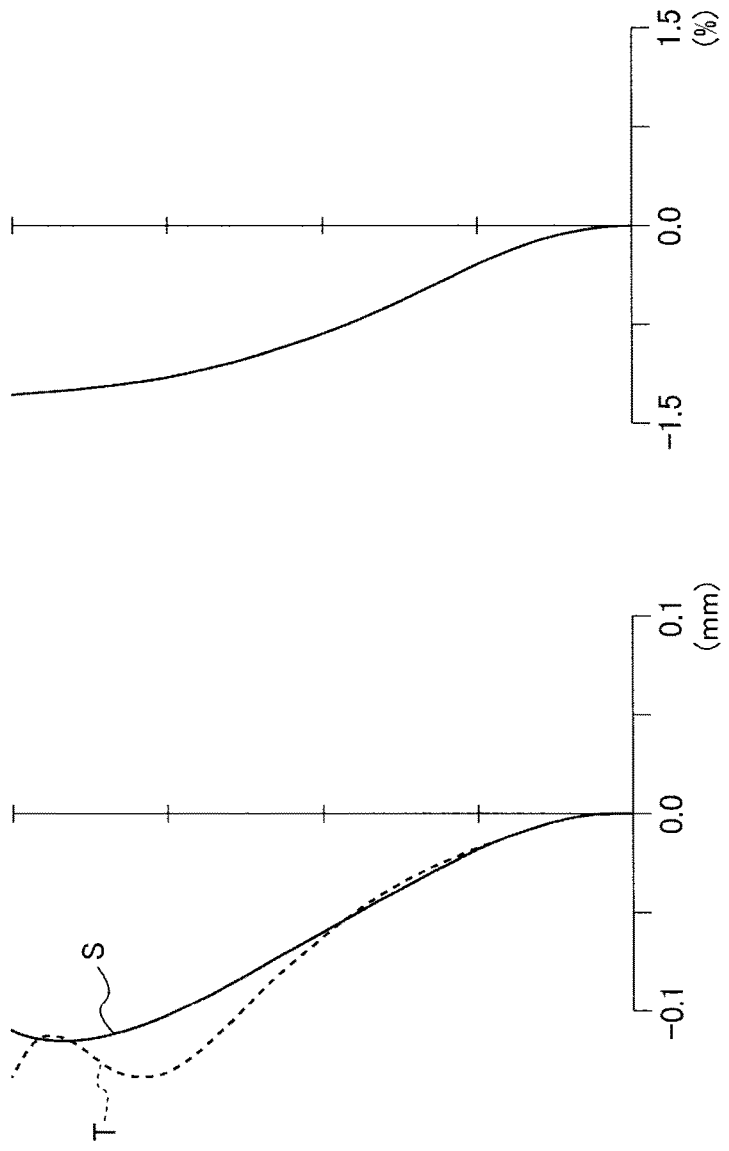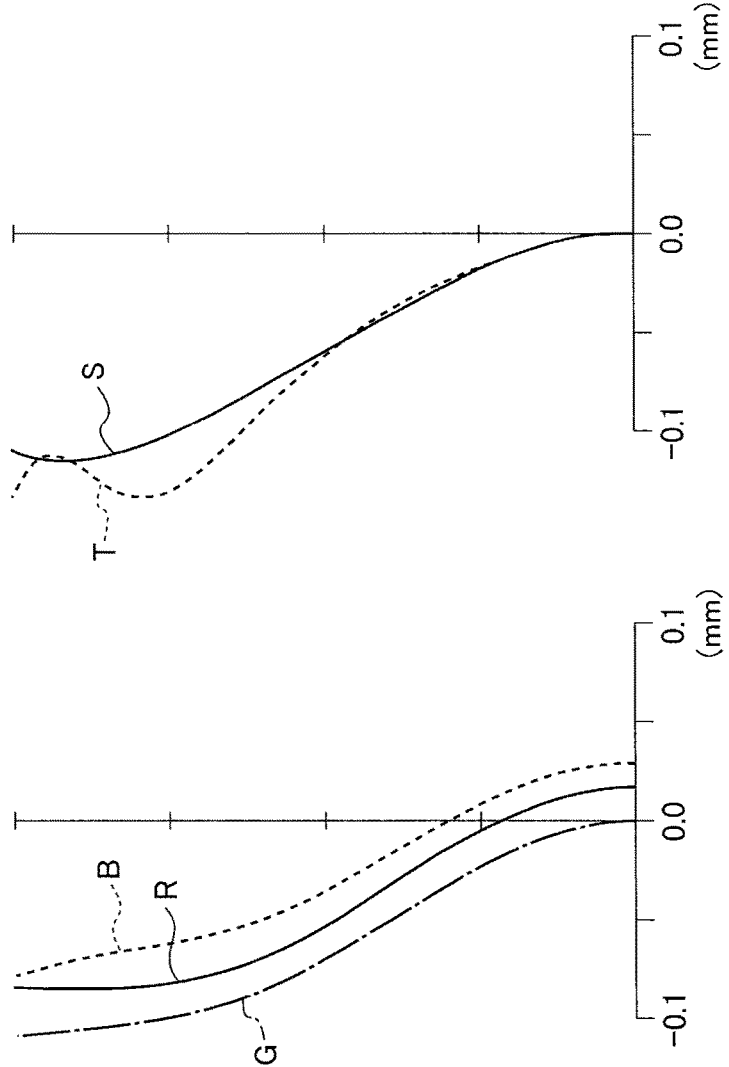

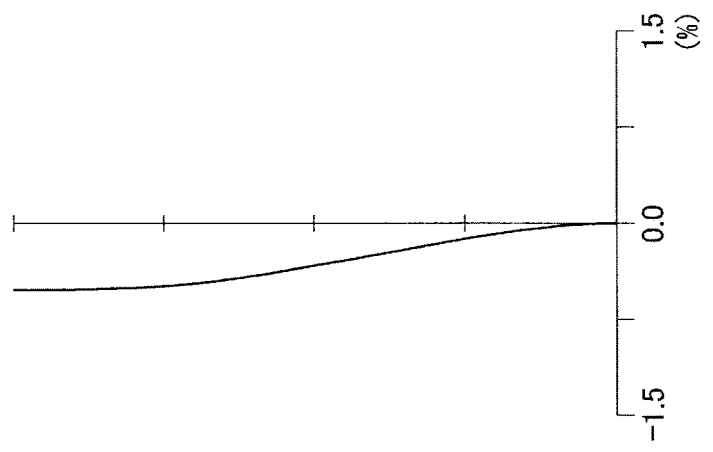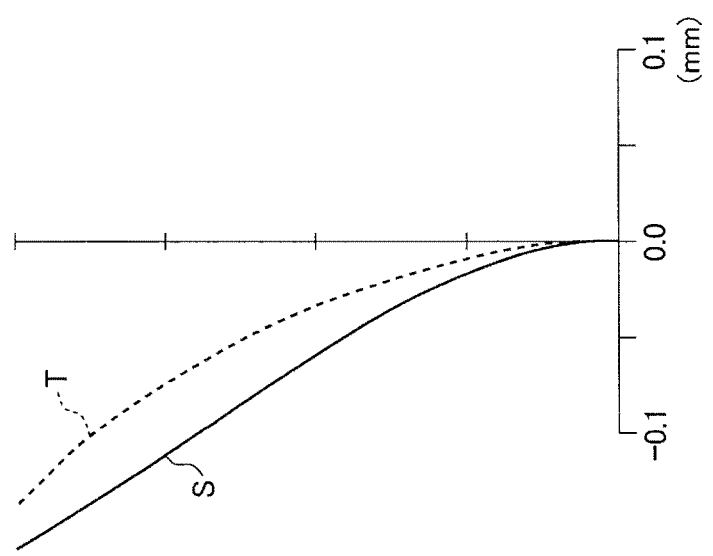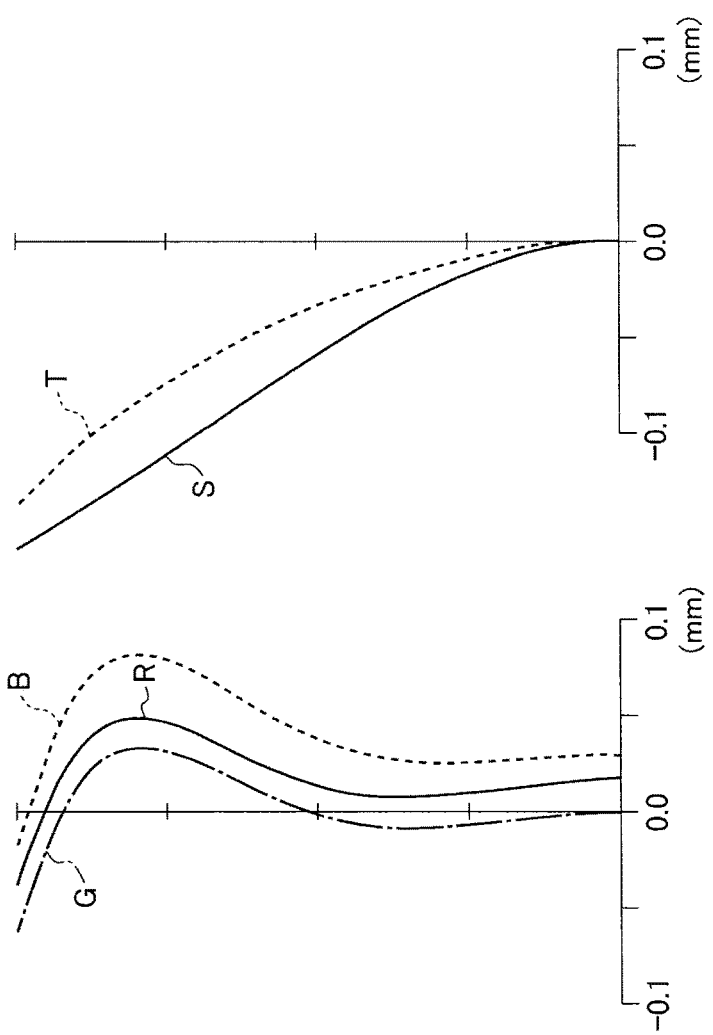

FIG.74
WIDE-ANGLE END
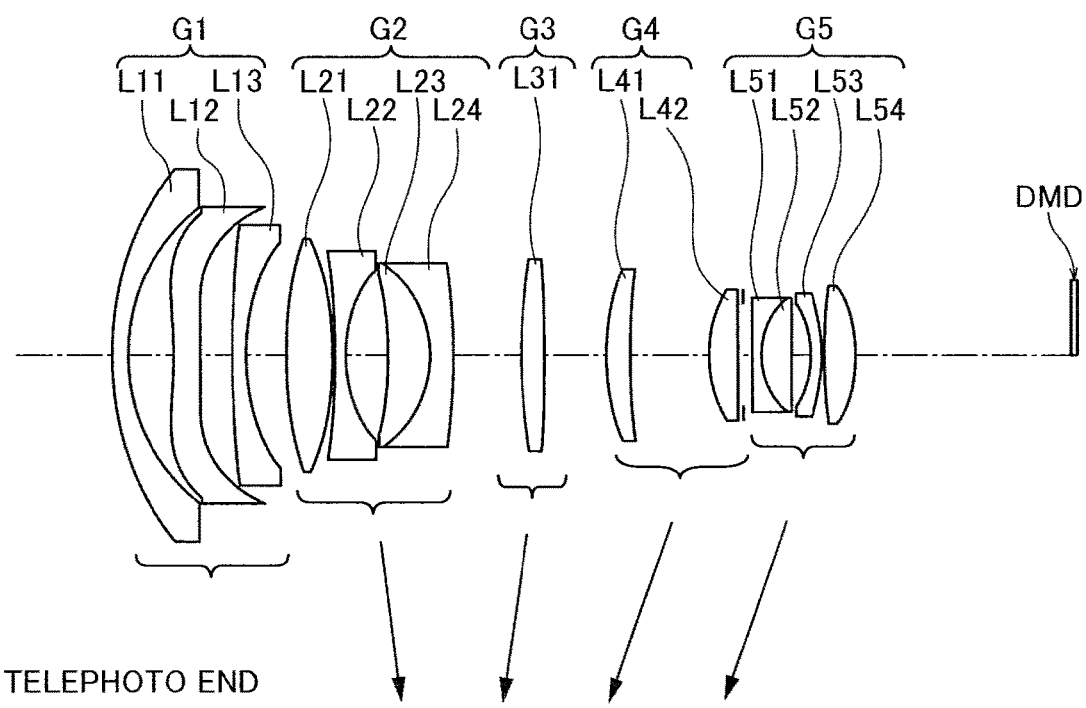
TELEPHOTO END
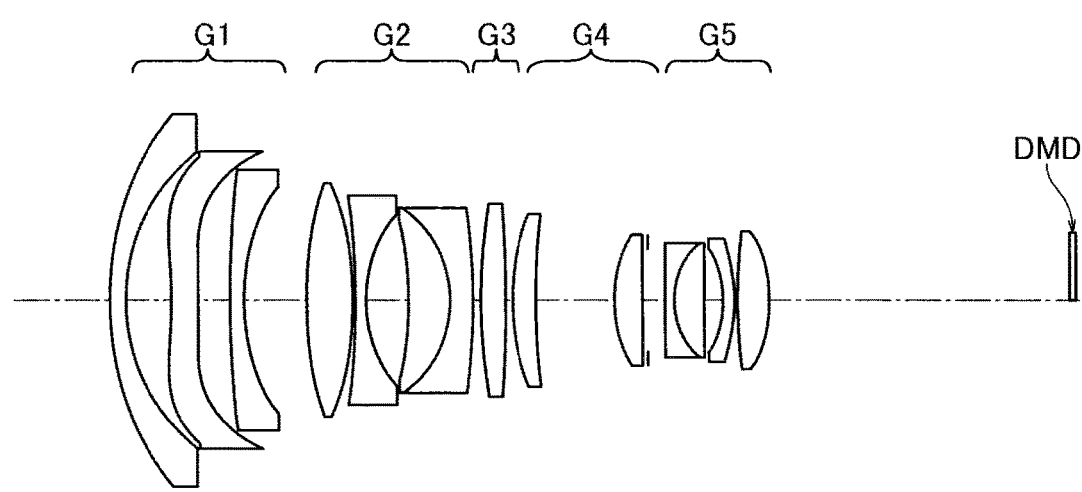

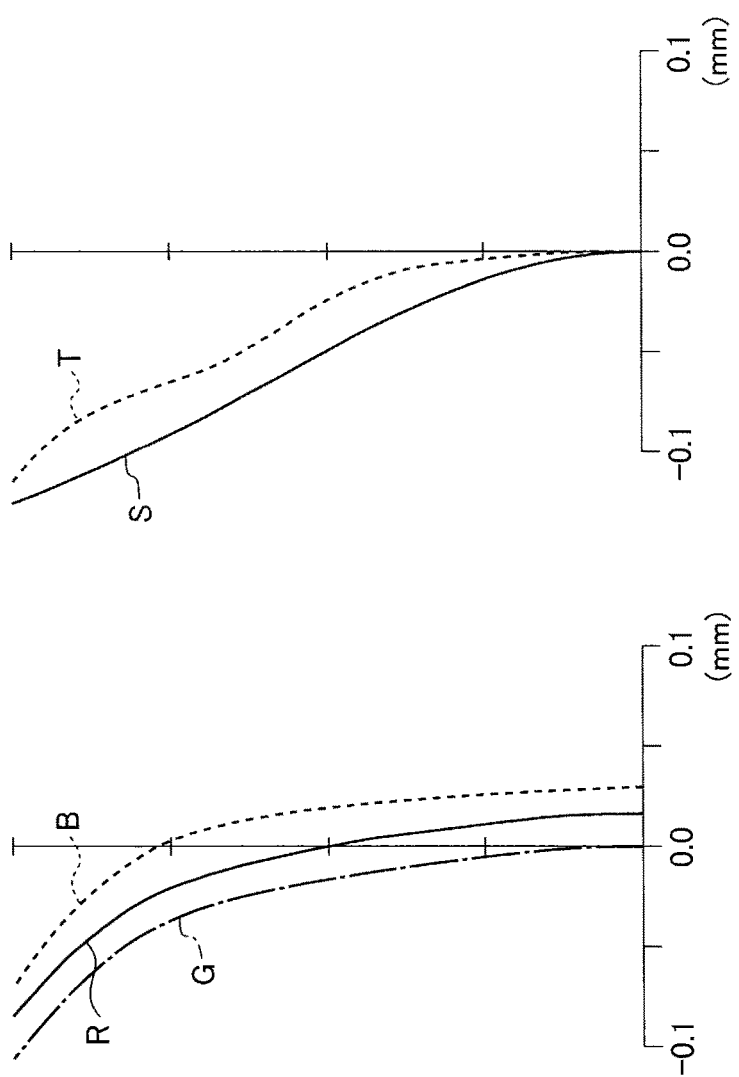

PROJECTION ZOOM LENS AND PROJECTOR

PRIORITY CLAIM

The present application is based on and claims priority from Japanese Patent Application No. 2012-111388, filed on May 15, 2012, and Japanese Patent Application No. 2012-114782, filed on May 18, 2012, the disclosures of which are hereby incorporated by reference in their entirety.

BACKGROUND

Field of the Invention

The present invention relates to a projection zoom lens for use in a projection optical system of a projector, in particular, to a zoom lens suitable for enlarging an original image formed by light beams modulated by a micro device to be projected on a screen, and a projector equipped with the zoom lens.

Description of the Related Art

A front projection type projector which projects an image on a projected surface (screen) placed in front of the projector is widely used in, for example, enterprises for presentation, schools, or homes. Many light modulation elements (light valves) for use in a projector are transmission type or reflection type liquid crystal elements. However, a micro device as typified by a digital micromirror device (DMD), which is advantageous for downsizing and improving brightness, is often used.

The DMD is an element which generates a projection image with light reflected by a micromirror. The turning angle of the micromirror is about ±10°, and effective reflection light and ineffective reflection light can be switched by the angle differences. Effective incident control of the effective reflection light and the ineffective reflection light from the DMD is required for a projection lens of a projector using the DMD. For this reason, it is desirable to arrange a projection lens in the normal direction on the side of the DMD. In order to achieve such an arrangement, an illumination light source and the projection light source are placed in approximately the same position. The arrangement of the projection lens in the normal direction on the side of the DMD is limited as described above.

In view of the above-described limitation, it is necessary for the projection lens of the projector using the DMD to be downsized such that the lens diameter on the side of the light valve does not interfere with the illumination light system, and to have long backfocus. Therefore, a relatively low-power zoom lens and a telephoto zoom lens are suitable for the projection lens of the projector using the DMD.

In recent years, a lens having both high-power zoom and wide-angle zoom is required for such a projection lens, and a projection lens corresponding to such a lens is known (refer to JP 2011-69959A, JP 2011-69957A, JP 2003-015038A, JP2005-292260A).

The lens described in JP 2011-69959A and JP 2011-69957A is a projection zoom lens aimed at high power in the fifth and sixth groups, and having a zoom ratio of about×1.5. Such a zoom lens has a half-field angle ω of 30° although the aberration is well corrected. The lens described in JP 2003-015038A and JP2005-292260A is a wide-angle zoom lens of a projection optical system, but it is an LCD type telecentric optical system, which cannot be adopted for the optical system using the DMD. Accordingly, it is difficult for the known projection lens of the projector using the DMD to achieve both high power and a wide angle of view.

SUMMARY

The present invention has been made in view of the above circumstances, and an object of the present invention is to provide a lens suitable for a projector using an image generation element such as a DMD as a light modulation element, and a high-performance projection zoom lens having a wide half-field angle (ω=39-45)° and a high-power zoom ratio of×1.5.

To attain the above object, one embodiment of the present invention provides a projection zoom lens constituting a projection optical system of a projector, which projects an image displayed on a surface of an image display element on a projected surface, so as to magnify and display the image, the projection zoom lens including in order from the projected surface side to the image display element side: a first lens group having a negative refractive power; a second lens group having a negative refractive power; a third lens group having a positive refractive power; a fourth lens group having a positive refractive power; and a fifth lens group, wherein a refractive power of the fifth lens group is weaker than the refractive power of the first lens group, the refractive power of the second lens group, the refractive power of the third lens group, and the refractive power of the fourth lens group.

One embodiment of the present invention also provides a projection zoom lens constituting a projection optical system of a projector, which projects an image displayed on a surface of an image display element on a projected surface, so as to magnify and display the image, the projection zoom lens including in order from the projected surface side to the image display element side: a first lens group having a negative refractive power; a second lens group having a negative refractive power; a third lens group having a positive refractive power; a fourth lens group having a positive refractive power; and a fifth lens group, wherein a lens group closet to the image display element is moved from a wide-angle side to a telephoto size in zooming.

BRIEF DESCRIPTION OF THE DRAWINGS

The accompanying drawings are included to provide further understanding of the present disclosure, and are incorporated in and constitute a part of this specification. The drawings illustrate embodiments of the present disclosure and, together with the specification, serve to explain the principle of the present disclosure.

FIG. 1 is an optical arrangement view illustrating a projection zoom lens at a wide-angle end and a telephoto end according to Embodiment 1 of the present invention.

FIGS. 2A, 2B, 2C are aberration views of the projection zoom lens at the wide-angle end according to Embodiment 1. FIG. 2A illustrates spherical aberration, FIG. 2B illustrates astigmatism, and FIG. 2C illustrates distortion.

FIGS. 3A, 3B, 3C are aberration views of the projection zoom lens at the intermediate according to Embodiment 1. FIG. 3A illustrates spherical aberration, FIG. 3B illustrates astigmatism, and FIG. 3C illustrates distortion.

FIGS. 4A, 4B, 4C are aberration views of the projection zoom lens at the telephoto end according to Embodiment 1. FIG. 4A illustrates spherical aberration, FIG. 4B illustrates astigmatism, and FIG. 4C illustrates distortion.

FIG. 5 is an optical arrangement view illustrating a projection zoom lens at a wide-angle end and a telephoto end according to Embodiment 2 of the present invention.

FIGS. 6A, 6B, 6C are aberration views of the projection zoom lens at the wide-angle end according to Embodiment 2. FIG. 6A illustrates spherical aberration, FIG. 6B illustrates astigmatism, and FIG. 6C illustrates distortion.

FIGS. 7A, 7B, 7C are aberration views of the projection zoom lens at the intermediate according to Embodiment 2. FIG. 7A illustrates spherical aberration, FIG. 7B illustrates astigmatism, and FIG. 7C illustrates distortion.

FIGS. 8A, 8B, 8C are aberration views of the projection zoom lens at the telephoto end according to Embodiment 2. FIG. 8A illustrates spherical aberration, FIG. 8B illustrates astigmatism, and FIG. 8C illustrates distortion.

FIG. 9 is an optical arrangement view illustrating a projection zoom lens at a wide-angle end and a telephoto end according to Embodiment 3 of the present invention.

FIGS. 10A, 10B, 10C are aberration views of the projection zoom lens at the wide-angle end according to Embodiment 3. FIG. 10A illustrates spherical aberration, FIG. 10B illustrates astigmatism, and FIG. 10C illustrates distortion.

FIGS. 11A, 11B, 11C are aberration views of the projection zoom lens at the intermediate according to Embodiment 3. FIG. 11A illustrates spherical aberration, FIG. 11B illustrates astigmatism, and FIG. 11C illustrates distortion.

FIGS. 12A, 12B, 12C are aberration views of the projection zoom lens at the telephoto end according to Embodiment 3. FIG. 12A illustrates spherical aberration, FIG. 12B illustrates astigmatism, and FIG. 12C illustrates distortion.

FIG. 13 is an optical arrangement view illustrating a projection zoom lens at a wide-angle end and a telephoto end according to Embodiment 4 of the present invention.

FIGS. 14A, 14B, 14C are aberration views of the projection zoom lens at the wide-angle end according to Embodiment 4. FIG. 14A illustrates spherical aberration, FIG. 14B illustrates astigmatism, and FIG. 14C illustrates distortion.

FIG. 15A illustrates spherical aberration, FIG. 15B illustrates astigmatism, and FIG. 15C illustrates distortion.

FIGS. 16A, 16B, 16C are aberration views of the projection zoom lens at the telephoto end according to Embodiment 4. FIG. 16A illustrates spherical aberration, FIG. 16B illustrates astigmatism, and FIG. 16C illustrates distortion.

FIG. 17 is an optical arrangement view illustrating a projection zoom lens at a wide-angle end and a telephoto end according to Embodiment 5 of the present invention.

FIGS. 18A, 18B, 18C are aberration views of the projection zoom lens at the wide-angle end according to Embodiment 5. FIG. 18A illustrates spherical aberration, FIG. 18B illustrates astigmatism, and FIG. 18C illustrates distortion.

FIG. 19A illustrates spherical aberration, FIG. 19B illustrates astigmatism, and FIG. 19C illustrates distortion.

FIGS. 20A, 20B, 20C are aberration views of the projection zoom lens at the telephoto end according to Embodiment 5. FIG. 20A illustrates spherical aberration, FIG. 20B illustrates astigmatism, and FIG. 20C illustrates distortion.

FIG. 21 is an optical arrangement view illustrating a projection zoom lens at a wide-angle end and a telephoto end according to Embodiment 6 of the present invention.

FIG. 22A illustrates spherical aberration, FIG. 22B illustrates astigmatism, and FIG. 22C illustrates distortion.

FIGS. 23A, 23B, 23C are aberration views of the projection zoom lens at the intermediate according to Embodiment 6. FIG. 23A illustrates spherical aberration, FIG. 23B illustrates astigmatism, and FIG. 23C illustrates distortion.

FIGS. 24A, 24B, 24C are aberration views of the projection zoom lens at the telephoto end according to Embodiment 6. FIG. 24A illustrates spherical aberration, FIG. 24B illustrates astigmatism, and FIG. 24C illustrates distortion.

FIG. 25 is an optical arrangement view illustrating a projection zoom lens at a wide-angle end and a telephoto end according to Embodiment 7 of the present invention.

FIG. 26A illustrates spherical aberration, FIG. 26B illustrates astigmatism, and FIG. 26C illustrates distortion.

FIG. 27A illustrates spherical aberration, FIG. 27B illustrates astigmatism, and FIG. 27C illustrates distortion.

FIG. 28A illustrates spherical aberration, FIG. 28B illustrates astigmatism, and FIG. 28C illustrates distortion.

FIG. 29 is an optical arrangement view illustrating a projection zoom lens at a wide-angle end and a telephoto end according to Embodiment 8 of the present invention.

FIGS. 30A, 30B, 30C are aberration views of the projection zoom lens at the wide-angle end according to Embodiment 8. FIG. 30A illustrates spherical aberration, FIG. 30B illustrates astigmatism, and FIG. 30C illustrates distortion.

FIGS. 31A, 31B, 31C are aberration views of the projection zoom lens at the intermediate according to Embodiment 8. FIG. 31A illustrates spherical aberration, FIG. 31B illustrates astigmatism, and FIG. 31C illustrates distortion.

FIGS. 32A, 32B, 32C are aberration views of the projection zoom lens at the telephoto end according to Embodiment 8. FIG. 32A illustrates spherical aberration, FIG. 32B illustrates astigmatism, and FIG. 32C illustrates distortion.

FIG. 33 is an optical arrangement view illustrating a projection zoom lens at a wide-angle end and a telephoto end according to Embodiment 9 of the present invention.

FIGS. 34A, 34B, 34C are aberration views of the projection zoom lens at the wide-angle end according to Embodiment 9. FIG. 34A illustrates spherical aberration, FIG. 34B illustrates astigmatism, and FIG. 34C illustrates distortion.

FIGS. 35A, 35B, 35C are aberration views of the projection zoom lens at the intermediate according to Embodiment 9. FIG. 35A illustrates spherical aberration, FIG. 35B illustrates astigmatism, and FIG. 35C illustrates distortion.

FIGS. 36A, 36B, 36C are aberration views of the projection zoom lens at the telephoto end according to Embodiment 9. FIG. 36A illustrates spherical aberration, FIG. 36B illustrates astigmatism, and FIG. 36C illustrates distortion.

FIG. 37 is an optical arrangement view illustrating of a projection zoom lens at a wide-angle end and a telephoto end according to Embodiment 10 of the present invention.

FIGS. 38A, 38B, 38C are aberration views of the projection zoom lens at the wide-angle end according to Embodiment 10. FIG. 38A illustrates spherical aberration, FIG. 38B illustrates astigmatism, and FIG. 38C illustrates distortion.

FIGS. 39A, 39B, 39C are aberration views of the projection zoom lens at the intermediate according to Embodiment 10, FIG. 39A illustrates spherical aberration, FIG. 39B illustrates astigmatism, and FIG. 39C illustrates distortion.

FIGS. 40A, 40B, 40C are aberration views of the projection zoom lens at the telephoto end according to Embodiment 10, FIG. 40A illustrates spherical aberration, FIG. 40B illustrates astigmatism, and FIG. 40C illustrates distortion.

FIG. 41 is an optical arrangement view illustrating of a projection zoom lens at a wide-angle end and a telephoto end according to Embodiment 11 of the present invention.

FIG. 42A illustrates spherical aberration, FIG. 42B illustrates astigmatism, and FIG. 42C illustrates distortion.

FIGS. 43A, 43B, 43C are aberration views of the projection zoom lens at the intermediate according to Embodiment 11, FIG. 43A illustrates spherical aberration, FIG. 43B illustrates astigmatism, and FIG. 43C illustrates distortion.

FIG. 44A illustrates spherical aberration, FIG. 44B illustrates astigmatism, and FIG. 44C illustrates distortion.

FIG. 45 is an optical arrangement view of a projection zoom lens illustrating a wide-angle end and a telephoto end according to Embodiment 12 of the present invention.

FIG. 46A illustrates spherical aberration, FIG. 46B illustrates astigmatism, and FIG. 46C illustrates distortion.

FIG. 47A illustrates spherical aberration, FIG. 47B illustrates astigmatism, and FIG. 47C illustrates distortion.

FIG. 48A illustrates spherical aberration, FIG. 48B illustrates astigmatism, and FIG. 48C illustrates distortion.

FIG. 50 is an optical arrangement view illustrating a projection zoom lens at a wide-angle end and a telephoto end according to Embodiment 13 of the present invention.

FIGS. 51A, 51B, 51C are aberration views of the projection zoom lens at the wide-angle end according to Embodiment 13. FIG. 51A illustrates spherical aberration, FIG. 51B illustrates astigmatism, and FIG. 51C illustrates distortion.

FIGS. 52A, 52B, 52C are aberration views of the projection zoom lens at the intermediate according to Embodiment 13. FIG. 52A illustrates spherical aberration, FIG. 52B illustrates astigmatism, and FIG. 52C illustrates distortion.

FIGS. 53A, 53B, 53C are aberration views of the projection zoom lens at the telephoto end according to Embodiment 13. FIG. 53A illustrates spherical aberration, FIG. 53B illustrates astigmatism, and FIG. 53C illustrates distortion.

FIG. 54 is an optical arrangement view illustrating a projection zoom lens at a wide-angle end and a telephoto end according to Embodiment 14 of the present invention.

FIG. 55A illustrates spherical aberration, FIG. 55B illustrates astigmatism, and FIG. 55C illustrates distortion.

FIGS. 56A, 56B, 56C are aberration views of the projection zoom lens at the intermediate according to Embodiment 14. FIG. 56A illustrates spherical aberration, FIG. 56B illustrates astigmatism, and FIG. 56C illustrates distortion.

FIGS. 57A, 57B, 57C are aberration views of the projection zoom lens at the telephoto end according to Embodiment 14. FIG. 57A illustrates spherical aberration, FIG. 57B illustrates astigmatism, and FIG. 57C illustrates distortion.

FIG. 58 is an optical arrangement view illustrating a projection zoom lens at a wide-angle end and a telephoto end according to Embodiment 15 of the present invention.

FIGS. 59A, 59B, 59C are aberration views of the projection zoom lens at the wide-angle end according to Embodiment 15. FIG. 59A illustrates spherical aberration, FIG. 59B illustrates astigmatism, and FIG. 59C illustrates distortion.

FIG. 60A illustrates spherical aberration, FIG. 60B illustrates astigmatism, and FIG. 60C illustrates distortion.

FIGS. 61A, 61B, 61C are aberration views of the projection zoom lens at the telephoto end according to Embodiment 15. FIG. 61A illustrates spherical aberration, FIG. 61B illustrates astigmatism, and FIG. 61C illustrates distortion.

FIG. 62 is an optical arrangement view illustrating a projection zoom lens at a wide-angle end and a telephoto end according to Embodiment 16 of the present invention.

FIG. 63A illustrates spherical aberration, FIG. 63B illustrates astigmatism, and FIG. 63C illustrates distortion.

FIG. 64A illustrates spherical aberration, FIG. 64B illustrates astigmatism, and FIG. 64C illustrates distortion.

FIGS. 65A, 65B, 65C are aberration views of the projection zoom lens at the telephoto end according to Embodiment 16. FIG. 65A illustrates spherical aberration, FIG. 65B illustrates astigmatism, and FIG. 65C illustrates distortion.

FIG. 66 is an optical arrangement view illustrating a projection zoom lens at a wide-angle end and a telephoto end according to Embodiment 17 of the present invention.

FIG. 67A illustrates spherical aberration, FIG. 67B illustrates astigmatism, and FIG. 67C illustrates distortion.

FIG. 68A illustrates spherical aberration, FIG. 68B illustrates astigmatism, and FIG. 68C illustrates distortion.

FIG. 69A illustrates spherical aberration, FIG. 69B illustrates astigmatism, and FIG. 69C illustrates distortion.

FIG. 70 is an optical arrangement view illustrating a projection zoom lens at a wide-angle end and a telephoto end according to Embodiment 18 of the present invention.

FIGS. 71A, 71B, 71C are aberration views of the projection zoom lens at the wide-angle end according to Embodiment 18. FIG. 71A illustrates spherical aberration, FIG. 71B illustrates astigmatism, and FIG. 71C illustrates distortion.

FIG. 72A illustrates spherical aberration, FIG. 72B illustrates astigmatism, and FIG. 72C illustrates distortion.

FIGS. 73A, 73B, 73C are aberration views of the projection zoom lens at the telephoto end according to Embodiment 18. FIG. 73A illustrates spherical aberration, FIG. 73B illustrates astigmatism, and FIG. 73C illustrates distortion.

FIG. 74 is an optical arrangement view illustrating a projection zoom lens at a wide-angle end and a telephoto end according to Embodiment 19 of the present invention.

FIG. 75A illustrates spherical aberration, FIG. 75B illustrates astigmatism, and FIG. 75C illustrates distortion.

FIGS. 76A, 76B, 76C are aberration views of the projection zoom lens at the intermediate according to Embodiment 19. FIG. 76A illustrates spherical aberration, FIG. 76B illustrates astigmatism, and FIG. 76C illustrates distortion.

FIG. 77A illustrates spherical aberration, FIG. 77B illustrates astigmatism, and FIG. 77C illustrates distortion.

DESCRIPTION OF THE PREFERRED EMBODIMENTS

Figure 15C:
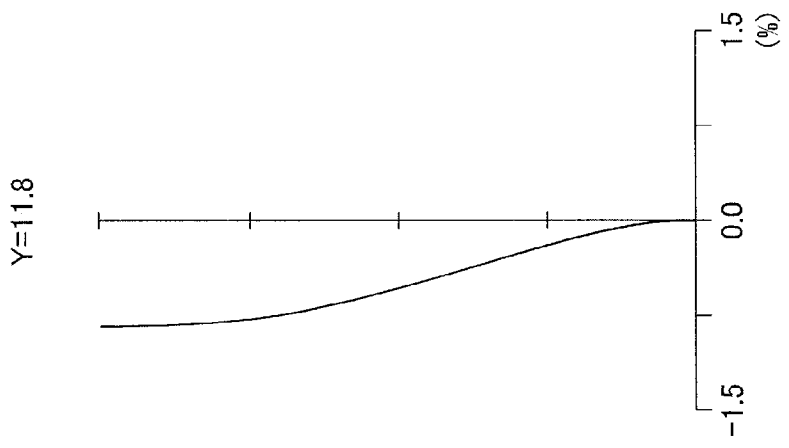
FIGS. 15A, 15B, 15C are aberration views of the projection zoom lens at the intermediate according to Embodiment 4.
Figure 15B:
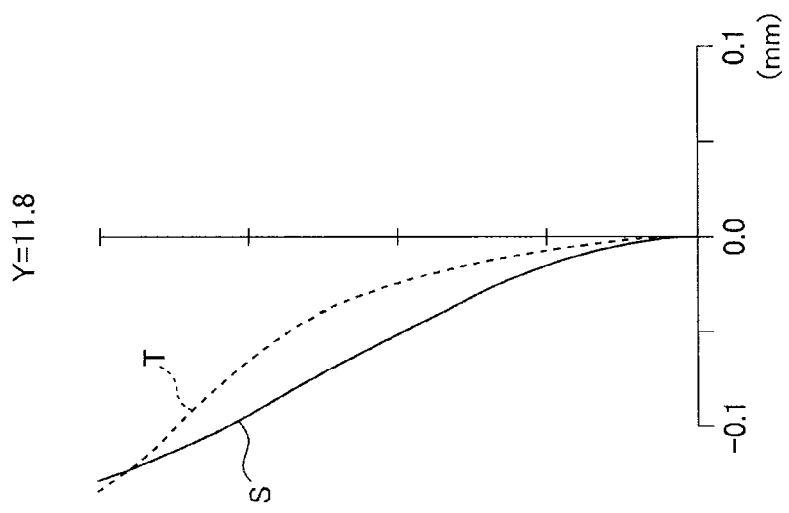
Figure 15A:
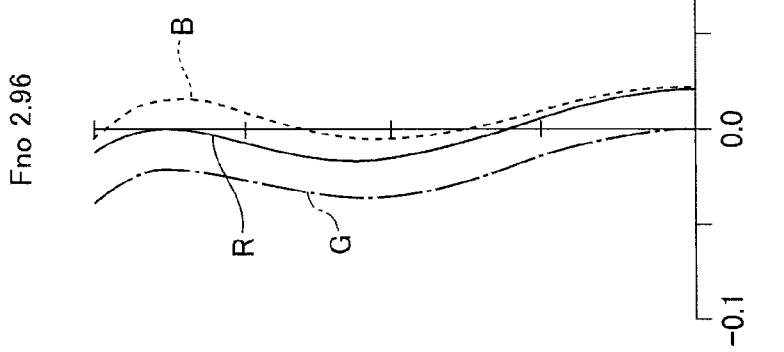
Figure 19C:
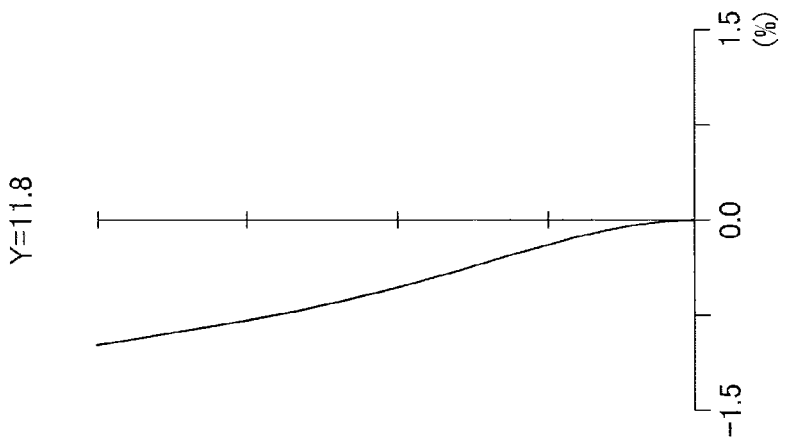
FIGS. 19A, 19B, 19C are aberration views of the projection zoom lens at the intermediate according to Embodiment 5.
Figure 19B:
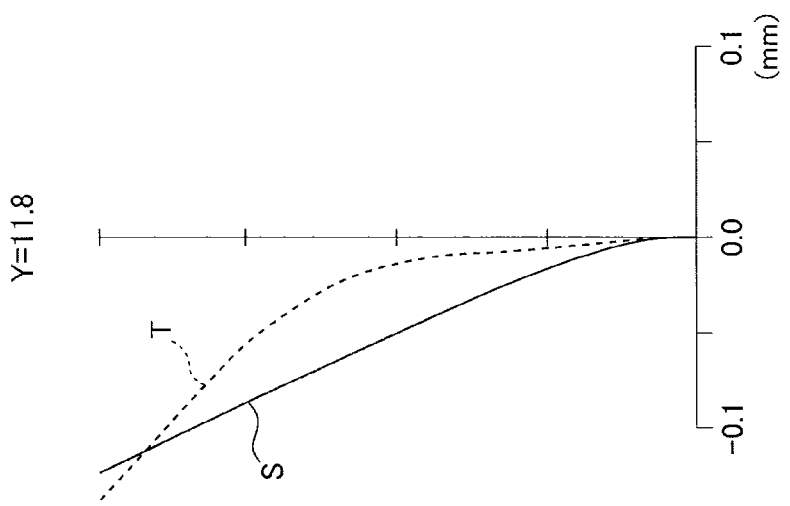
Figure 19A:
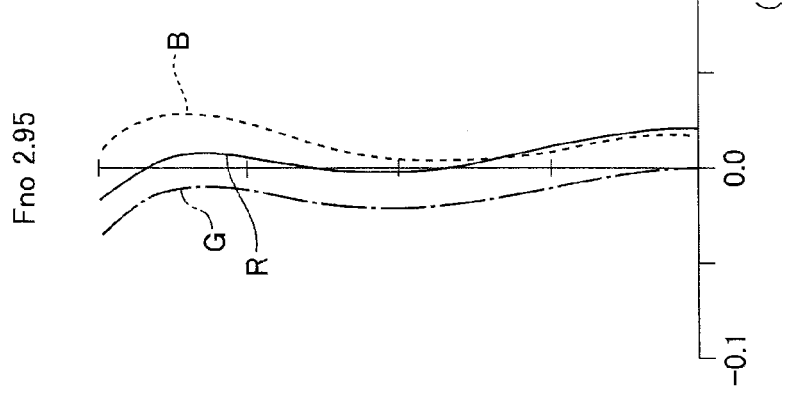

Hereinafter, embodiments of a projection zoom lens and a projector according to the present invention will be described with reference to the drawings.

Projection Zoom Lens

First Embodiment

An embodiment of a projection zoom lens according to the present invention will be described as follows. A projection zoom lens according to First Embodiment is a projection zoom lens suitable for a projector using as a light modulation device a reflective image display element such as a DMD. The projection zoom lens of the present embodiment includes a five-lens group configuration having in order from a magnified side (projected surface side) a negative refractive power, a negative refractive power, a positive refractive power, a positive refractive power, and a weak negative refractive power or a weak positive refractive power, and a zoom ratio of×1.5. In addition, the refractive power of the fifth lens group can be a positive refractive power or a negative refractive power as long as it is weaker than those of the other groups (first to fourth lens groups).

According to the projection zoom lens of First Embodiment, when the light beam emitted from the DMD enters in the fifth lens group, the refraction angle can be lowered, and the aberration variation can be reduced. If the refractive power of the fifth lens group is strong, it is an undesirable condition because the refraction angle of the light beam is increased, and the aberration is also increased.

Second Embodiment

A projection zoom lens according to Second Embodiment provides the optimized solution regarding wide-angle zooming in the projection zoom lens according to First Embodiment. In the known projection zoom lens, the lens group on the most diminished side is fixed, but in the projection zoom lens according to the present embodiment, the lens group on the most diminished side is moved in zooming. With this configuration, the variation in the optical performance from the wide-angle end to the telephoto end can be reduced as much as possible, and the aberration variation in zooming can be also reduced by reducing the refractive power on the most diminished side.

Third Embodiment

A projection zoom lens according to Third Embodiment provides the optimized solution regarding wide-angle zooming in the projection zoom lens according to Second Embodiment. Namely, the lens group closest to the image display element is a lens group having a weak negative refractive power or a weak positive refractive power. When the projection zoom lens includes five groups from the first lens group to the fifth lens group, the lens group closest to the image display element is the fifth lens group.

In addition, if the projection zoom lens includes six groups from the first lens group to the sixth lens group, the lens group closest to the image display element is the sixth lens group. In this case, the refractive power of the sixth lens group is a weak negative refractive power or a weak positive refractive power, which is weaker than those of the other five lens groups.

Fourth Embodiment

A projection zoom lens according to Fourth Embodiment provides the optimized solution regarding a focal length of the fifth lens group in the projection zoom lens according to First to Third Embodiments. Namely, the projection zoom lens of the present embodiment satisfies the following condition 1 in the projection zoom lens according to First to Third Embodiments.

$$-0.01 < 1/F5 < 0.01 \quad \text{(CONDITION 1)}$$

In this regard, F5 is the focal length of the fifth lens group. The condition 1 is a condition for obtaining the optimized solution regarding the refractive power of the fifth lens group, in particular, the optimized solution regarding spherical aberration and coma aberration. When the parameter exceeds the upper limit or the lower limit of the condition 1, it is an undesirable condition because the power of the fifth lens group becomes strong. For this reason, the power arrangement condition is deteriorated, and the spherical aberration and comma aberration are likely to be increased.

Fifth Embodiment

A projection zoom lens according to Fifth Embodiment is a projection zoom lens suitable for a projector. The projection zoom lens of this embodiment includes a five-lens group configuration including from the magnified side (projected surface side) a negative refractive power, a negative refractive power, a positive refractive power, a positive refractive power, and a weak negative refractive power or a weak positive refractive power, and satisfies the following condition 1 regarding the focal length of the fifth lens group.

$$-0.01 < 1/F5 < 0.01 \quad \text{(CONDITION 1)}$$

In this regard, F5 is the focal length of the fifth lens group.

According to the projection zoom lens of Fifth Embodiment, when the light beam emitted through the image display element enters in the fifth lens group, the refraction angle of the light beam can be lowered, and the aberration variation can be reduced. If the refractive power of the fifth lens group is strong, it is an undesirable condition because the refraction angle of the light beam is increased, and the aberration is also increased. The condition 1 is a condition for obtaining the optimized solution regarding the refractive power of the fifth lens group, in particular, the optimized solution regarding spherical aberration and comma aberration. When the parameter exceeds the upper limit or the lower limit, it is an undesirable condition because the power of the fifth lens group becomes strong. For this reason, the power arrangement condition is deteriorated, and the spherical aberration and comma aberration are likely to be increased.

Sixth Embodiment

A projection zoom lens according to Sixth Embodiment provides the optimized solution regarding the focal length of the first lens group and the second lens group in the projection zoom lens according to First to Fifth Embodiments. The zoom lens of the present embodiment satisfies the following condition 2 in the zoom lens according to First to Third Embodiments.

$$0.15 < F1/F2 < 0.50 \quad \text{(CONDITION 2)}$$

In this regard, F1 is the focal length of the first lens group and F2 is the focal length of the second lens group.

The condition 2 is a condition for obtaining the optimized solution regarding astigmatism. When the parameter exceeds the upper limit of the condition 2, it is an undesirable condition because field curvature is increased, and when the parameter exceeds the lower limit, it is also an undesirable condition because astigmatic difference is increased.

Seventh Embodiment

A projection zoom lens according to Seventh Embodiment provides the optimized solution regarding a half-field angle ω when the zoom ratio is×1.5 in the projection zoom lens according to First to Sixth Embodiments. The projection zoom lens according to the present embodiment satisfies the following condition 3 in the projection zoom lens according to First to Sixth Embodiments.

$$39 < \omega < 45 \quad \text{(CONDITION 3)}$$

In this regard, ω is a half-field angle.

Eighth Embodiment

A projection zoom lens according to Eighth Embodiment provides the optimized solution regarding an optical effective diameter when the zoom ratio is×1.5 in the projection zoom lens according to First to Seventh Embodiments. The projection zoom lens according to the present embodiment satisfies the following condition 4 in the projection zoom lens according to First to Seventh Embodiments.

$$2.5 < HS/HE < 3.5 \quad \text{(CONDITION 4)}$$

In this regard, HS is the optical effective diameter of the lens arranged on the most magnified side, and HE is the optical effective diameter of the lens arranged on the most diminished side. Eighth Embodiment provides the optimized solution regarding the lens diameter of the projection zoom lens. When the parameter exceeds the upper limit of the condition 4, it is an undesirable condition because the diameter of the lens closest to the screen is increased. When the parameter exceeds the lower limit of the condition 4, it is also an undesirable condition because the power of the lens on the screen side becomes strong, and the curvature radius also becomes strong although the diameter of the lens closest to the screen is reduced, resulting in difficulty in workability.

Ninth Embodiment

A projection zoom lens according to Ninth Embodiment provides the optimized solution regarding the focal length of the entire optical system and the entire optical length when the wide-angle zoom ratio is×1.5 in the projection zoom lens according to First to Eighth Embodiments. The projection zoom lens according to the present embodiment satisfies the following condition 5 in the projection zoom lens according to First to Eight Embodiments.

$$10.0 < OALw/Fw < 12.0 \quad \text{(CONDITION 5)}$$

In this regard, OALw is the distance from the surface on the magnified side in the lens on the most magnified side to the device surface (DMD surface) when the screen surface is focused at the distance of 1600 mm from the screen as the projected surface to the projection side of the lens on the most magnified side. When the parameter exceeds the upper limit of the condition 5, it is an undesirable condition because the entire length is increased, and when the parameter exceeds the lower limit of the condition 5, it is an undesirable condition for a wide-angle zoom projection system of the present invention because the focal length Fw is increased.

Tenth Embodiment

A projection zoom lens according to Tenth Embodiment provides the optimized solution regarding the entire optical length and the effective diameter when the wide-angle zoom ratio is×1.5 in the projection zoom lens according to Ninth Embodiment. The projection zoom lens according to present embodiment satisfies the following condition 6 in the projection zoom lens according to Ninth Embodiment.

$$15.2 < OALw/HE < 17.4 \quad \text{(CONDITION 6)}$$

The condition 6 is a condition for providing the optimized solution regarding the entire optical length and the diameter of the lens on the most diminished side. When the parameter exceeds the upper limit of the condition 6, it is an undesirable condition because the peripheral light volume ratio is decreased, and the periphery of the screen becomes dark. When the parameter exceeds the lower limit of the condition 6, it is also an undesirable condition because the diameter of the lens on the most diminished side is increased, which interferes with the illumination optical system.

Eleventh Embodiment

Eleventh Embodiment provides a projector having the projection zoom lens according to First to Tenth Embodiments.

Twelfth Embodiment

A projection zoom lens according to Twelfth Embodiment is a projection zoom lens suitable for a projector using as a light modulation device a reflective image display element such as a DMD. The projection zoom lens of the present embodiment includes a five-lens group configuration having in order from the magnified side (projected surface side) a negative refractive power, a negative refractive power, a positive refractive power, a positive refractive power, and a negative refractive power, and satisfies the following condition 7.

$$-1.9 < F5n/F5p < -1.1 \quad \text{(CONDITION 7)}$$

In this regard, F5n is the focal length of the negative lens on the most diminished side (image display element side) in the fifth lens group and F5p is the focal length of the positive lens on the most diminished side (image display element side) in the fifth lens group.

When the parameter exceeds the upper limit of the condition 7, it is an undesirable condition because the astigmatic difference is increased by correcting the spherical aberration, and the distortion is also increased. When the parameter exceeds the lower limit of the condition 7, it is also an undesirable condition because the field curvature and the astigmatic difference on the telephoto side are also increased.

Thirteenth Embodiment

A projection zoom lens according to Thirteenth Embodiment provides the optimized solution for the configuration of the fifth lens group in the projection zoom lens according to Twelfth Embodiment. Namely, the fifth lens group of the projection zoom lens includes, in order from the magnified side (projected surface side), a lens having a negative refractive power, a lens having a positive refractive power, a lens having a negative refractive power, and a lens having a positive refractive power. In particular, the positive lens and the negative lens on the most magnified side in the fifth lens group are formed as a cemented lens, so that the achromatic effect can be obtained at the wide-angle end and the telephoto end, or in zooming.

The effect of the present embodiment can be obtained when the lenses on the most magnified side in the fifth lens group are not formed as a cemented lens of a lens having a negative refractive power and a lens having a positive refractive power. Namely, the achromatic effect can be significantly maintained when a cemented lens is not used. When a lens having a negative refractive power and a lens having a positive refractive are individually arranged, the assembling sensitivity when the eccentricity of the lens in the vertical direction occurs relative to the optical axis direction of the lens is increased. For this reason, it is desirable to use a cemented lens, but it is not always necessary to use a cemented lens as long as an assembling error can be maintained in a constant amount.

The single negative lens which is the third lens from the magnified side in the fifth lens group is effective for increasing positive spherical aberration, and flatting a projection surface. If the fifth lens group includes a lens configuration of negative, positive, and positive, it is an undesirable condition for optical performance because these relationships are deteriorated, and aberration is not sufficiently corrected. The single positive lens on the most diminished side is a necessary lens because it includes an effect which adjusts coma aberration and spherical aberration.

The present embodiment is established if the fifth lens group includes a lens configuration of negative, positive, positive, and negative in order from the magnified side or negative, positive, and positive in order from the magnified side. However, compared to the configuration of negative, positive, negative, and positive, the balance of the coma aberration between the wide-angle end and the telephoto end is deteriorated, resulting in deterioration in performance.

Fourteenth Embodiment

A projection zoom lens according to Fourteenth Embodiment provides the optimized solution regarding the focal length of the fifth lens group in the projection zoom lens according to Twelfth Embodiment and Thirteenth Embodiment. Namely, the projection zoom lens according to the present embodiment satisfies the following condition 8 in the projection zoom lens according to Twelfth Embodiment and Thirteenth Embodiment.

$$-0.01 < 1/F5 \quad \text{(CONDITION 8)}$$

In this regard, F5 is the focal length of the fifth lens group. The condition 8 is a condition for obtaining the optimized solution regarding the refractive power of the fifth lens group, in particular, the optimized solution regarding spherical aberration and coma aberration. When the parameter exceeds the upper limit or the lower limit of the condition 8, it is an undesirable condition because the power of the fifth lens group becomes strong. For this reason, the power arrangement condition is deteriorated, and the spherical aberration and coma aberration are likely to be increased.

Fifteenth Embodiment

A projection zoom lens according to Fifteenth Embodiment provides the optimized solution regarding the focal length of the third lens group and the focal length of the fourth lens group in the projection zoom lens according to Twelfth to Fourteenth Embodiments. Namely, the projection zoom lens according to the present embodiment satisfies the following condition 9 in the projection zoom lens according to Twelfth to Fourteenth Embodiments.

$$1.3 < F3/F4 < 4.6 \quad \text{(CONDITION 9)}$$

In this regard, F3 is the focal length of the third lens group, and F4 is the focal length of the fourth lens group. The condition 9 is a condition for guiding the optimized solution regarding chromatic aberration correction in zooming. When the parameter exceeds the upper limit or the lower limit, it is an undesirable condition because the chromatic aberration is not sufficiently corrected, having a negative effect on the resolution performance.

Sixteenth Embodiment

A projection zoom lens according to Sixteenth Embodiment provides the optimized solution regarding the focal length of the second lens group in the projection zoom lens according to Twelfth to Fifteenth Embodiments. Namely, the projection zoom lens according to the present embodiment satisfies the following condition 10 in the projection zoom lens according to Twelfth to Fifteenth Embodiments.

$$-0.27 < Fw/F2 < -0.11 \quad \text{(CONDITION 10)}$$

In this regard, Fw is the focal length of the entire optical system at the wide-angle end and F2 is the focal length of the second lens group. When the parameter exceeds the upper limit of the condition 10, namely, when the refractive power of the second lens group is reduced, it is an undesirable condition because magnification chromatic aberration is increased. When the parameter exceeds the lower limit of the condition 10, namely, the refractive power of the second lens group is increased, it is an undesirable condition because aberration is excessively corrected, having a negative effect on the solution performance.

Seventeenth Embodiment

A projection zoom lens according to Seventeenth Embodiment provides the optimized solution regarding a pupil position and an image height in the projection zoom lens according to Twelfth to Sixteenth Embodiments. Namely, the projection zoom lens according to the present embodiment satisfies the following condition 11 in the projection zoom lens according to Twelfth to Sixteenth Embodiments.

$$4.0 < |EPw/DMDHT| < 4.5 \quad \text{(CONDITION 11)}$$

In this regard, EPw is the distance from the DMD surface to the entrance pupil at the wide-angle end, and DMDHT is the distance from the rotation central axis of the spherical lens closest to the DMD relative to the diminished side to the most periphery of the DMD. The condition 11 is a condition regarding a configuration. It is preferable for the ratio of EPw and DMDHT to be within the numerical range in the condition 11. When the parameter exceeds the upper limit or the lower limit of the condition 11, it is an undesirable condition because the size of the entire optical system is increased, or the light beam incident angle is increased, for example, resulting in a negative effect on the resolution performance.

Eighteenth Embodiment

A projection zoom lens according to Eighteenth Embodiment provides the optimized solution regarding the focal length of the entire optical system and the backfocus in the projection zoom lens according to Twelfth to Seventeenth Embodiments. Namely, the projection zoom lens according to the present embodiment satisfies the following condition 12 in the projection zoom lens according to Twelfth to Seventeenth Embodiments.

$$0.35 < Fw/BFw < 0.45 \quad \text{(CONDITION 12)}$$

In this regard, BFw is the distance from the surface on the diminished side in the lens on the most diminished side to the surface of the DMD at the wide-angle end and Fw is the focal length of the entire optical system at the wide-angle end. The condition 12 is a condition regarding a configuration, and it is preferable for the ratio of Fw and BFw to be within the numerical range in the condition 12. When the parameter exceeds the upper limit or the lower limit of the condition 12, it is an undesirable condition because the size of the entire optical system is increased, and the light beam incident angle is increased, resulting in a negative effect on an image performance.

Nineteenth Embodiment

A projection zoom lens according to Nineteenth Embodiment provides the optimized solution regarding a half-field angle ω when the zoom ratio is×1.5 in the projection zoom lens according to Twelfth to Eighteenth Embodiments. The projection zoom lens according to the present embodiment satisfies the following condition 13 in Twelfth to Eighteenth Embodiments.

39<ω<45          (CONDITION 13)

In this regard, ω is the half-field angle.

Twentieth Embodiment

Twentieth Embodiment provides a projector including the projection zoom lens according to Twelfth to Nineteenth Embodiments.

Embodiments

Next, the specific embodiments of the projection zoom lens according to the present invention will be described. It is apparent from the numerical values of the following embodiments that aberration of each embodiment is corrected at a high level, and spherical aberration, astigmatism, field curvature, chromatic aberration on axis and distortion are sufficiently corrected, and the preferable optical performance is maintained.

The symbols in each embodiment are as follows.
F: Focal length of entire optical system
Fno: Numerical aperture
ω: Half-field angle
R: Curvature radius
D: Surface interval
Nd: Refractive index
vd: Abbe's number
L: Lens
G: Lens group An aspheric surface is expressed by the following equation.

$$X=(H^2/R)/[1+\{1-k(H/R)^2\}^{1/2}]+C_4H^4+C_6H^6+C_8H^8+C_{10}H^{10}+\ldots$$

In the optical arrangement view of the projection zoom lens of each of the following embodiments, a rotation central axis of a spherical lens closest to a DMD is illustrated by the dashed line. This rotation central axis of the spherical lens closest to the DMD conforms to the rotation central axis of all spherical lenses except a lens L12 and a lens L54, and this rotation central axis is a standard projection axis of a projection optical system. In addition, it is not always necessary that the rotation central axes of all spherical lenses conform.

[Embodiment 1]

FIG. 1 illustrates an optical arrangement view of a projection zoom lens according to Embodiment 1 at the wide-angle end and the telephoto end. The projection zoom lens according to Embodiment 1 includes, in order from the magnified side (left side in the figure), a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L45. A DMD (digital micro mirror device) as a light modulation device is disposed on the diminished side (right side in the figure). In addition, a not-shown cover glass (CG) is disposed on the surface of the DMD facing a lens.

In the projection zoom lens according to Embodiment 1, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, 24 are cemented.

The third lens group G3 is a positive group including a biconvex positive lens L31.

The fourth lens group G4 is a positive group including a positive lens L41 having a convex surface on the magnified side and a positive lens L42 having a convex surface on the magnified side.

The fifth lens group G5 is a weak negative group including a negative lens L51 having a concave surface on the diminished side, a biconvex positive lens L52, a negative lens L53 having a concave surface on the magnified side, and a biconvex positive lens L54. The lenses L51, L52 are cemented.

FIGS. 2A-4C illustrate aberration views of the projection zoom lens according to Embodiment 1. FIGS. 2A-2C are views at the wide-angle end, FIGS. 3A-3C are views at the intermediate and FIGS. 4A-4C are views at the telephoto end. FIGS. 2A, 3A, 4A illustrate spherical aberration, FIGS. 2B, 3B, 4B illustrate astigmatism and FIGS. 2C, 3C, 4C illustrate distortion. In each of FIGS. 2A, 3A, 4A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 2B, 3B, 4B, symbol S denotes a sagittal image surface, and symbol T denotes astigmatism of a tangential image surface. As illustrated in FIGS. 2A-4C, the aberration is effectively corrected in each zoom position.

Each of the numerical values of Embodiment 1 is shown in Table 1. In addition, symbol S denotes a surface number.

TABLE 1

F = 13.0~19.6 mm, Fno = 2.55~3.34, WIDE-ANGLE END ω = 42.1°

| S | R | D | Nd | Vd | L | G |
|---|---|---|---|---|---|---|
| 1 | 44.406 | 2.30 | 1.83400 | 37.35 | L11 | G1 |
| 2 | 26.856 | 6.95 | — | — | | |
| 3* | −42.177 | 4.00 | 1.53159 | 55.70 | L12 | |
| 4* | −72.074 | 4.67 | — | — | | |
| 5 | 172.742 | 2.00 | 1.84666 | 23.78 | L13 | |
| 6 | 29.498 | S6 | — | — | | |
| 7 | 60.448 | 6.79 | 1.74077 | 27.79 | L21 | G2 |
| 8 | −47.004 | 0.40 | — | — | | |
| 9 | −97.889 | 1.50 | 1.49700 | 81.55 | L22 | |
| 10 | 19.566 | 6.48 | — | — | | |
| 11 | −49.086 | 6.00 | 1.64769 | 33.79 | L23 | |
| 12 | −16.570 | 1.80 | 1.77250 | 49.60 | L24 | |
| 13 | −88.107 | S13 | — | — | | |
| 14 | 90.521 | 5.85 | 1.72000 | 46.02 | L31 | G3 |
| 15 | −192.114 | S15 | — | — | | |
| 16 | 31.766 | 3.55 | 1.69350 | 53.21 | L41 | G4 |
| 17 | 92.110 | 11.32 | — | — | | |

TABLE 1-continued

F = 13.0~19.6 mm, Fno = 2.55~3.34, WIDE-ANGLE END ω = 42.1°

| S | R | D | Nd | Vd | L | G |
|---|---|---|---|---|---|---|
| 18 | 18.225 | 4.55 | 1.49700 | 81.55 | L42 | |
| 19 | −182.965 | 0.30 | — | — | | |
| 20 | INF | S20 | — | — | — | |
| 21 | 145.815 | 1.50 | 1.83400 | 37.35 | L51 | G5 |
| 22 | 11.093 | 4.60 | 1.48749 | 70.44 | L52 | |
| 23 | −248.139 | 2.68 | — | — | | |
| 24 | −14.885 | 1.60 | 1.80610 | 40.93 | L53 | |
| 25 | −28.426 | 0.30 | — | — | | |
| 26* | 73.512 | 4.52 | 1.48749 | 70.44 | L54 | |
| 27* | −17.082 | Bf | — | — | | |
| 28 | INF | 1.00 | 1.51680 | 64.10 | CG | — |
| 29 | INF | — | — | — | | |

In addition, INF in Table 1 denotes infinity, and asterisk * in Table 1 denotes an aspheric surface. The numerical values of the aspheric surface coefficients are as shown in Table 2. S6, S13, S15, S20 in Table 1 are changed as shown in the following Table 3 in zooming. A projection distance is a lens interval in 1600 mm. The numerical value regarding each of the above-described conditions is as shown in the following Table 4.

TABLE 2

| — | 3 | 4 | 26 | 27 |
|---|---|---|---|---|
| K | 0 | 0 | 0 | 0 |
| C4 | 8.3242E−05 | 7.7677E−05 | −5.0310E−06 | 2.1371E−05 |
| C6 | −1.6077E−07 | −8.0673E−08 | 6.1340E−08 | 1.2977E−07 |
| C8 | 2.3526E−10 | −1.1834E−10 | 9.6894E−11 | −9.0695E−10 |
| C10 | 3.8179E−15 | 6.8269E−13 | 2.5985E−12 | 8.9458E−12 |
| C12 | −4.4307E−16 | 7.5274E−16 | 0 | 0 |
| C14 | 5.3461E−19 | −5.5343E−18 | 0 | 0 |
| C16 | −1.5575E−22 | 5.8313E−21 | 0 | 0 |

TABLE 3

| — | S6 | S13 | S15 | S20 |
|---|---|---|---|---|
| WIDE-ANGLE END | 6.82 | 10.80 | 7.09 | 1.00 |
| INTERMEDIATE | 9.28 | 3.98 | 4.74 | 1.70 |
| TELEPHOTO END | 9.41 | 0.85 | 0.80 | 2.41 |

TABLE 4

| CONDITION 1 | 1/F5 | −3.8E−03 |
|---|---|---|
| CONDITION 2 | F1/F2 | 0.25 |
| CONDITION 4 | HS/HE | 2.93 |
| CONDITION 5 | OALw/Fw | 11.6 |
| CONDITION 6 | OALw/HE | 17.29 |

[Embodiment 2]

FIG. 5 illustrates an optical arrangement view of a projection zoom lens according to Embodiment 2 at the wide-angle end and the telephoto end. The projection zoom lens according to Embodiment 2 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L45. A DMD (digital micro mirror device) as a light modulation device is disposed on the diminished side. In addition, a not-shown cover glass (CG) is disposed on the surface of the DMD facing a lens.

In the projection zoom lens according to Embodiment 2, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side and a positive lens L42 having a convex surface on the magnified side.

The fifth lens group G5 is a weak negative group including a negative lens L51 having a convex surface on the magnified side, a biconvex positive lens L52, a negative lens L53 having a concave surface on the magnified side, and a biconvex positive lens L54. The lenses L51, L52 are cemented.

FIGS. 6A-8C illustrate aberration views of the projection zoom lens according to Embodiment 2. FIGS. 6A-6C are views at the wide-angle end, FIGS. 7A-7C are views at the intermediate and FIGS. 8A-8C are views at the telephoto end. FIGS. 6A, 7A, 8A illustrate spherical aberration, FIGS. 6B, 7B, 8B illustrate astigmatism and FIGS. 6C, 7C, 8C illustrate distortion. In each of FIGS. 6A, 7A, 8A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 6B, 7B, 8B, symbol S denotes a sagittal image surface, and symbol T denotes astigmatism of a tangential image surface. As illustrated in FIGS. 6A-8C, the aberration is effectively corrected in each zoom position.

Each of numerical values of Embodiment 2 is shown in Table 5.

TABLE 5

F = 13.0~19.6 mm, Fno = 2.55~3.34, WIDE-ANGLE END ω = 42.1°

| S | R | D | Nd | Vd | L | G |
|---|---|---|---|---|---|---|
| 1 | 42.925 | 2.30 | 1.83400 | 37.35 | L11 | G1 |
| 2 | 27.025 | 6.68 | — | — | | |
| 3* | −50.899 | 4.00 | 1.53159 | 55.70 | L12 | |
| 4* | −100.040 | 4.62 | — | — | | |
| 5 | 122.391 | 2.00 | 1.84666 | 23.78 | L13 | |
| 6 | 30.005 | S6 | — | — | | |
| 7 | 77.762 | 5.81 | 1.78470 | 26.29 | L21 | G2 |
| 8 | −54.705 | 0.30 | — | — | | |
| 9 | −155.918 | 1.60 | 1.49700 | 81.55 | L22 | |
| 10 | 18.674 | 6.59 | — | — | | |
| 11 | −48.419 | 5.93 | 1.64769 | 33.79 | L23 | |
| 12 | −17.960 | 3.73 | 1.77250 | 49.60 | L24 | |

TABLE 5-continued

| | F = 13.0~19.6 mm, Fno = 2.55~3.34, WIDE-ANGLE END ω = 42.1° | | | | | |
|---|---|---|---|---|---|---|
| S | R | D | Nd | Vd | L | G |
| 13 | −102.424 | S13 | — | — | | |
| 14 | 81.589 | 3.49 | 1.69700 | 48.52 | L31 | G3 |
| 15 | −486.914 | S15 | — | — | | |
| 16 | 32.258 | 3.78 | 1.69350 | 50.81 | L41 | G4 |
| 17 | 200.172 | 11.56 | — | — | | |
| 18 | 20.135 | 4.13 | 1.49700 | 81.55 | L42 | |
| 19 | −110.425 | 0.30 | — | — | | |
| 20 | INF | S20 | — | — | | |
| 21 | −117.692 | 1.60 | 1.83400 | 37.35 | L51 | G5 |
| 22 | 12.966 | 4.53 | 1.48749 | 70.44 | L52 | |
| 23 | −65.449 | 2.42 | — | — | | |
| 24 | −16.005 | 1.55 | 1.80610 | 40.93 | L53 | |
| 25 | −29.327 | 0.25 | — | — | | |
| 26* | 62.689 | 4.94 | 1.48749 | 70.24 | L54 | |
| 27* | −17.740 | Bf | — | — | | |
| 28 | INF | 1 | 1.51680 | 64.17 | CG | — |
| 29 | INF | — | — | — | | |

In addition, INF in Table 5 denotes infinity, and asterisk * in Table 5 denotes an aspheric surface. The numerical values of the aspheric surface coefficients are as shown in Table 6. S6, S13, S15, S20 in Table 5 are changed as shown in the following Table 7 in zooming. A projection distance is a lens interval in 1600 mm. The numerical value regarding each of the above-described conditions is as shown in the following Table 8.

TABLE 6

| — | 3 | 4 | 26 | 27 |
|---|---|---|---|---|
| K | 0 | 0 | 0 | 0 |
| C4 | 7.5167E−05 | 7.2360E−05 | −1.1005E−05 | 1.9459E−05 |
| C6 | −1.3938E−07 | −7.1757E−08 | 8.1058E−08 | 8.9295E−08 |
| C8 | 1.9731E−10 | −1.0107E−10 | −2.5836E−10 | −7.0144E−10 |
| C10 | −2.1512E−14 | 5.0654E−13 | 5.8440E−12 | 9.6074E−12 |
| C12 | −3.1062E−16 | 6.3442E−16 | 0 | 0 |
| C14 | 5.5741E−19 | −3.0366E−18 | 0 | 0 |
| C16 | −3.7441E−22 | 1.9049E−21 | 0 | 0 |

TABLE 7

| — | S6 | S13 | S15 | S20 |
|---|---|---|---|---|
| WIDE-ANGLE END | 6.15 | 9.79 | 8.90 | 1.43 |
| INTERMEDIATE | 9.34 | 3.34 | 5.38 | 2.22 |
| TELEPHOTO END | 9.63 | 0.80 | 0.80 | 3.02 |

TABLE 8

| CONDITION 1 | 1/F5 | −2.6E−03 |
|---|---|---|
| CONDITION 2 | F1/F2 | 0.38 |
| CONDITION 4 | HS/HE | 2.83 |
| CONDITION 5 | OALw/Fw | 11.7 |
| CONDITION 6 | OALw/HE | 16.86 |

[Embodiment 3]

FIG. 9 illustrates an optical arrangement view of a projection zoom lens according to Embodiment 3 at the wide-angle end and the telephoto end. The projection zoom lens according to Embodiment 3 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

The details of the respective lenses constituting the projection zoom lens according to Embodiment 3 are as described below. In the projection zoom lens according to Embodiment 3, the second lens group G2 is moved on the diminished side, and the third to fifth lens groups G3-G5 are moved on the magnified side in zooming from the wide-angle end to the telephoto end. In the projection zoom lens according to Embodiment 3, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side and a positive lens L42 having a convex surface on the magnified side.

The fifth lens group G5 is a weak negative group including a biconcave negative lens L51, a biconvex positive lens L52, a negative lens L53 having a concave surface on the magnified side, and a positive lens L54 having a convex surface on the diminished side. The lenses L51, L52 are cemented.

FIGS. 10A-12C illustrate aberration views of the projection zoom lens according to Embodiment 3. FIGS. 10A-10C are views at the wide-angle end, FIGS. 11A-11C are views at the intermediate and FIGS. 12A-12C are views at the telephoto end. FIGS. 10A, 11A, 12A illustrate spherical aberration, FIGS. 10B, 11B, 12B illustrate astigmatism and FIGS. 10C, 11C, 12C illustrate distortion. In each of FIGS. 10A, 11A, 12A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 10B, 11B, 12B, symbol S denotes a sagittal image surface, and symbol T denotes astigmatism of a tangential image surface. As illustrated in FIGS. 10A-12C, the aberration is effectively corrected in each zoom position.

Each of the numerical values of Embodiment 3 is shown in Table 9.

TABLE 9

F = 13.0~19.6 mm, Fno = 2.55~3.34, WIDE-ANGLE
END ω = 42.1°

| S | R | D | Nd | Vd | L | G |
|---|---|---|---|---|---|---|
| 1 | 48.317 | 2.30 | 1.83400 | 37.3 | L11 | G1 |
| 2 | 26.507 | 6.70 | — | — | | |
| 3* | −49.145 | 4.00 | 1.53159 | 55.7 | L12 | |
| 4* | −93.737 | 4.20 | — | — | | |
| 5 | 107.867 | 2.00 | 1.84666 | 23.8 | L13 | |
| 6 | 29.680 | S6 | — | — | | |
| 7 | 57.965 | 6.84 | 1.74077 | 27.8 | L21 | G2 |
| 8 | −49.565 | 0.30 | — | — | | |
| 9 | −119.866 | 1.50 | 1.49700 | 81.5 | L22 | |
| 10 | 19.136 | 6.92 | — | — | | |
| 11 | −41.223 | 5.43 | 1.64769 | 33.8 | L23 | |
| 12 | −16.675 | 1.80 | 1.77250 | 49.6 | L24 | |
| 13 | −77.854 | S13 | — | — | | |
| 14 | 93.718 | 6 | 1.72000 | 46.0 | L31 | G3 |
| 15 | −145.518 | S15 | — | — | | |
| 16 | 30.927 | 3.50 | 1.69350 | 53.2 | L41 | G4 |
| 17 | 79.686 | 11.40 | — | — | | |
| 18 | 18.447 | 4.37 | 1.49700 | 81.5 | L42 | |
| 19 | −190.324 | 0.39 | — | — | | |
| 20 | INF | S20 | — | — | | |
| 21 | 195.779 | 1.50 | 1.83400 | 37.3 | L51 | G5 |
| 22 | 10.964 | 4.89 | 1.48749 | 70.4 | L52 | |
| 23 | −97.137 | 2.66 | — | — | | |
| 24 | −14.751 | 1.60 | 1.80610 | 40.9 | L53 | |
| 25 | −29.458 | 0.30 | — | — | | |
| 26 | 101.453 | 4.70 | 1.516330. | 64.1 | L54 | |
| 27* | −16.829 | Bf | — | — | | |
| 28 | INF | 1 | 1.51680 | 64.1 | CG | — |
| 29 | INF | — | — | — | | |

In addition, INF in Table 9 denotes infinity, and asterisk * in Table 9 denotes an aspheric surface. The numerical values of the aspheric surface coefficients are as shown in Table 10. S6, S13, S15, S20 in Table 9 are changed as shown in the following Table 11 in zooming. A projection distance is a lens interval in 1600 mm. The numerical value regarding each of the above-described conditions is as shown in the following Table 12.

TABLE 10

| — | 3 | 4 | 27 |
|---|---|---|---|
| K | 0 | 0 | 6.2282E−02 |
| C4 | 8.0309E−05 | 7.4840E−05 | 2.2166E−05 |
| C6 | −1.6071E−07 | −7.8566E−08 | 5.3239E−08 |
| C8 | 2.4996E−10 | −1.5100E−10 | −1.8252E−10 |
| C10 | −4.0536E−14 | 7.6378E−13 | −3.1594E−13 |
| C12 | −4.3525E−16 | 8.6766E−16 | 0 |
| C14 | 7.4081E−19 | −6.2556E−18 | 0 |
| C16 | −4.8502E−22 | 6.1093E−21 | 0 |

TABLE 11

| — | S6 | S13 | S15 | S20 |
|---|---|---|---|---|
| WIDE-ANGLE END | 6.34 | 11.06 | 7.55 | 1.06 |
| INTERMEDIATE | 9.27 | 4.06 | 4.72 | 1.77 |
| TELEPHOTO END | 9.38 | 0.80 | 0.80 | 2.50 |

TABLE 12

| CONDITION 1 | 1/F5 | −2.7E−03 |
|---|---|---|
| CONDITION 2 | F1/F2 | 0.28 |
| CONDITION 4 | HS/HE | 2.93 |
| CONDITION 5 | OALw/Fw | 10.9 |
| CONDITION 6 | OALw/HE | 16.36 |

[Embodiment 4]

FIG. 13 illustrates an optical arrangement view of a projection zoom lens according to Embodiment 4 at the wide-angle end and the telephoto end. The projection zoom lens according to Embodiment 4 includes, in order from the magnified side, a first lens group G1 having lenses L11-L13, a second lens group G2 having lenses L21-L24, a third lens group G3 having lenses L31-L32, a fourth lens group G4 having a lens L41, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 4, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group having a biconvex positive lens L31 and a positive lens L32 having a convex surface on the magnified side.

The fourth lens group G4 is a positive group including the positive lens L41 having a convex surface on the magnified side.

The fifth lens group G5 is a weak negative group including a negative lens L51 having a concave surface on the diminished side, a biconvex positive lens L52, a negative lens L53 having a concave surface on the magnified side, and a biconvex positive lens L54. The lenses L51, L52 are cemented.

FIGS. 14A-16C illustrate aberration views of the projection zoom lens according to Embodiment 4. FIGS. 14A-14C are views at the wide-angle end, FIGS. 15A-15C are views at the intermediate and FIGS. 16A-16C are views at the telephoto end. FIGS. 14A, 15A, 16A illustrate spherical aberration, FIGS. 14B, 15B, 16B illustrate astigmatism and FIGS. 14C, 15C, 16C illustrate distortion. In each of FIGS. 14A, 15A, 16A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 14B, 15B, 16B, symbol S denotes a sagittal image surface, and reference number T denotes astigmatism of a tangential image surface. As illustrated in FIGS. 14A-16C, the aberration is effectively corrected in each zoom position.

Each of the numerical values of Embodiment 4 is shown in Table 13.

TABLE 13

F = 13.0~19.6 mm, Fno = 2.55~3.34, WIDE-ANGLE
END ω = 42.1°

| S | R | D | Nd | Vd | L | G |
|---|---|---|---|---|---|---|
| 1 | 47.619 | 2.30 | 1.83400 | 37.3 | L11 | G1 |
| 2 | 26.561 | 6.97 | — | — | | |
| 3* | −56.434 | 4.00 | 1.53159 | 55.7 | L12 | |
| 4* | −122.828 | 3.75 | — | — | | |
| 5 | 96.207 | 2.00 | 1.84666 | 23.8 | L13 | |
| 6 | 27.030 | S6 | — | — | | |
| 7 | 47.758 | 7.41 | 1.74077 | 27.8 | L21 | G2 |
| 8 | −48.276 | 0.37 | — | — | | |
| 9 | −80.029 | 1.50 | 1.49700 | 81.5 | L22 | |
| 10 | 19.290 | 6.73 | — | — | | |
| 11 | −43.652 | 6.00 | 1.64769 | 33.8 | L23 | |
| 12 | −16.964 | 1.80 | 1.77250 | 49.6 | L24 | |
| 13 | −74.271 | S13 | — | — | | |
| 14 | 89.328 | 6.00 | 1.69350 | 53.2 | L31 | G3 |
| 15 | −173.557 | 0.30 | — | — | | |
| 16 | 37.478 | 5.70 | 1.69350 | 53.2 | L32 | |
| 17 | 95.951 | S17 | — | — | | |
| 18 | 19.081 | 5.75 | 1.49700 | 81.5 | L41 | G4 |
| 19 | −122.064 | 0.30 | — | — | | |
| 20 | INF | S20 | — | — | — | |
| 21 | 226.979 | 1.50 | 1.83400 | 37.3 | L51 | G5 |
| 22 | 11.328 | 4.52 | 1.48749 | 70.4 | L52 | |
| 23 | −146.917 | 2.69 | — | — | | |
| 24 | −14.356 | 1.60 | 1.80610 | 40.9 | L53 | |
| 25 | −24.687 | 0.30 | — | — | | |
| 26* | 80.889 | 4.60 | 1.48749 | 70.4 | L54 | |
| 27* | −16.897 | Bf | — | — | | |
| 28 | INF | 1 | 1.51680 | 64.1 | CG | — |
| 29 | INF | — | — | — | | |

In addition, INF in Table 13 denotes infinity, and asterisk * in Table 13 denotes an aspheric surface. The numerical values of the aspheric surface coefficients are as shown in Table 14. S6, S13, S15, S20 in Table 13 are changed as shown in the following Table 15 in zooming. A projection distance is a lens interval in 1600 mm. The numerical value regarding each of the above-described conditions is as shown in the following Table 16.

TABLE 14

| — | 3 | 4 | 26 | 27 |
|---|---|---|---|---|
| K | 0 | 0 | 0 | 0 |
| C4 | 7.4160E−05 | 6.9420E−05 | 3.2161E−07 | 2.2340E−05 |
| C6 | −1.5267E−07 | −8.6568E−08 | −2.9004E−08 | 6.3343E−08 |
| C8 | 2.4149E−10 | −1.1318E−10 | 1.3655E−09 | 8.9989E−11 |
| C10 | −4.1560E−14 | 7.3276E−13 | −5.0207E−12 | 3.0536E−12 |
| C12 | −4.4089E−16 | 6.6358E−16 | 0 | 0 |
| C14 | 7.4596E−19 | −6.2146E−18 | 0 | 0 |
| C16 | −5.3286E−22 | 6.4916E−21 | 0 | 0 |

TABLE 15

| — | S6 | S13 | S17 | S20 |
|---|---|---|---|---|
| WIDE-ANGLE END | 7.07 | 14.03 | 11.32 | 1.08 |
| INTERMEDIATE | 9.41 | 5.91 | 10.30 | 1.91 |
| TELEPHOTO END | 9.41 | 0.80 | 8.06 | 2.87 |

TABLE 16

| CONDITION 1 | 1/F5 | −1.1E−03 |
|---|---|---|
| CONDITION 2 | F1/F2 | 0.20 |
| CONDITION 4 | HS/HE | 2.93 |
| CONDITION 5 | OALw/Fw | 11.0 |
| CONDITION 6 | OALw/HE | 16.39 |

[Embodiment 5]

FIG. 17 illustrates an optical arrangement view of a projection zoom lens according to Embodiment 5 at the wide-angle end and the telephoto end. The projection zoom lens according to Embodiment 5 includes, in order from the magnified side, a first lens group G1 having lenses L11-L13, a second lens group G2 having lenses L21-L24, a third lens group G3 having a lens L31, a fourth lens group G4 having a lens L41, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 5, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side.

The fifth lens group G5 is a weak negative group including a negative lens L51 having a concave surface on the diminished side, a biconvex positive lens L52, a negative lens L53 having a concave surface on the magnified side, and a biconvex positive lens L54. The lenses L51, L52 are cemented.

FIGS. 18A-20C illustrate aberration views of the projection zoom lens according to Embodiment 5. FIGS. 18A-18C are views at the wide-angle end, FIGS. 19A-19C are views at the intermediate and FIGS. 20A-20C are views at the telephoto end. FIGS. 18A, 19A, 20A illustrate spherical aberration, FIGS. 18B, 19B, 20B illustrate astigmatism and FIGS. 18C, 19C, 20C illustrate distortion. In each of FIGS. 18A, 19A, 20A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 18B, 19B, 20B, symbol S denotes a sagittal image surface, and symbol T denotes astigmatism of a tangential image surface. As illustrated in FIGS. 18A-20C, the aberration is effectively corrected in each zoom position.

Each of the numerical values of Embodiment 5 is shown in Table 17.

TABLE 17

F = 13.0~19.6 mm, Fno = 2.55~3.35, WIDE-ANGLE
END ω = 42.1°

| S | R | D | Nd | Vd | L | G |
|---|---|---|---|---|---|---|
| 1 | 48.747 | 2.30 | 1.83400 | 37.3 | L11 | G1 |
| 2 | 26.475 | 6.33 | — | — | | |
| 3* | −56.542 | 4.00 | 1.53159 | 55.7 | L12 | |
| 4* | −123.318 | 3.09 | — | — | | |
| 5 | 55.529 | 2.00 | 1.84666 | 23.8 | L13 | |
| 6 | 26.860 | S6 | — | — | | |
| 7 | 86.821 | 5.85 | 1.74077 | 27.8 | L21 | G2 |
| 8 | −51.249 | 0.30 | — | — | | |
| 9 | −118.150 | 1.50 | 1.49700 | 81.5 | L22 | |
| 10 | 19.644 | 7.33 | — | — | | |
| 11 | −31.042 | 6.00 | 1.64769 | 33.8 | L23 | |
| 12 | −18.981 | 1.80 | 1.77250 | 49.6 | L24 | |
| 13 | −43.602 | S13 | — | — | | |
| 14 | 34.287 | 4.26 | 1.72000 | 43.6 | L31 | G3 |
| 15 | −1505.390 | S15 | — | — | | |
| 16 | 17.516 | 6.0 | 1.49700 | 81.5 | L41 | G4 |
| 17 | −177.061 | 0.3 | — | — | | |
| 18 | INF | S18 | — | — | — | — |
| 19 | −123.699 | 1.5 | 1.83400 | 37.3 | L51 | G5 |
| 20 | 11.537 | 4.60 | 1.48749 | 70.4 | L52 | |
| 21 | −66.810 | 2.35 | — | — | | |
| 22 | −15.505 | 1.6 | 1.80610 | 40.9 | L53 | |
| 23 | −29.591 | 0.3 | — | — | | |
| 24* | 48.370 | 4.91 | 1.48749 | 70.4 | L54 | |
| 25* | −16.871 | Bf | — | — | | |
| 26 | INF | 1 | 1.51680 | 64.1 | CG | — |
| 27 | INF | — | — | — | | |

In addition, INF in Table 17 denotes infinity, and asterisk * in Table 17 denotes an aspheric surface. The numerical values of the aspheric surface coefficients are as shown in Table 18. S6, S13, S15, S20 in Table 17 are changed as shown in the following Table 19 in zooming. A projection distance is a lens interval in 1600 mm. The numerical value regarding each of the above-described conditions is as shown in the following Table 20.

TABLE 18

| — | 3 | 4 | 24 | 25 |
|---|---|---|---|---|
| K | 0 | 0 | 0 | 0 |
| C4 | 7.7909E−05 | 7.4653E−05 | −1.2037E−05 | 2.4235E−05 |
| C6 | −1.5781E−07 | −8.4976E−08 | −3.5165E−09 | 5.8840E−08 |
| C8 | 2.5209E−10 | −1.1802E−10 | 7.4397E−10 | −4.3687E−10 |
| C10 | −5.0530E−14 | 7.2180E−13 | −9.7127E−13 | 6.1522E−12 |
| C12 | −4.6002E−16 | 8.1085E−16 | 0 | 0 |
| C14 | 8.8615E−19 | −6.0194E−18 | 0 | 0 |
| C16 | −6.7085E−22 | 5.6661E−21 | 0 | 0 |

TABLE 19

| — | S6 | S13 | S15 | S18 |
|---|---|---|---|---|
| WIDE-ANGLE END | 6.90 | 18.58 | 11.32 | 1.41 |
| INTERMEDIATE | 11.19 | 7.98 | 11.09 | 2.08 |
| TELEPHOTO END | 11.78 | 1.58 | 9.95 | 2.89 |

TABLE 20

| CONDITION 1 | 1/F5 | −2.0E−03 |
|---|---|---|
| CONDITION 2 | F1/F2 | 0.33 |
| CONDITION 4 | HS/HE | 2.93 |
| CONDITION 5 | OALw/Fw | 10.6 |
| CONDITION 6 | OALw/HE | 15.81 |

[Embodiment 6]

FIG. 21 illustrates an optical arrangement view of a projection zoom lens according to Embodiment 6 at the wide-angle end and the telephoto end. The projection zoom lens according to Embodiment 6 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 6, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a negative lens L22 having a concave surface on the diminished side, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side and a biconvex positive lens L42.

The fifth lens group G5 is a weak positive group including a biconcave negative lens L51, a biconvex positive lens L52, a negative lens L53 having a concave surface on the magnified side, and a biconvex positive lens L54. The lenses L51, L52 are cemented.

Figure 22C:
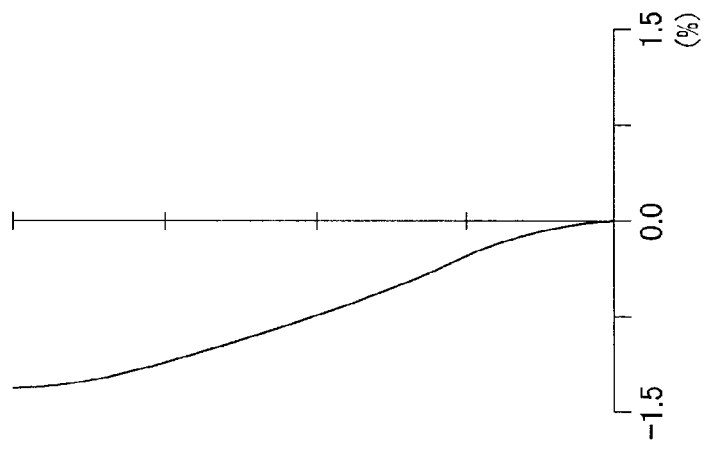
FIGS. 22A, 22B, 22C are aberration views of the projection zoom lens at the wide-angle end according to Embodiment 6.
Figure 22B:
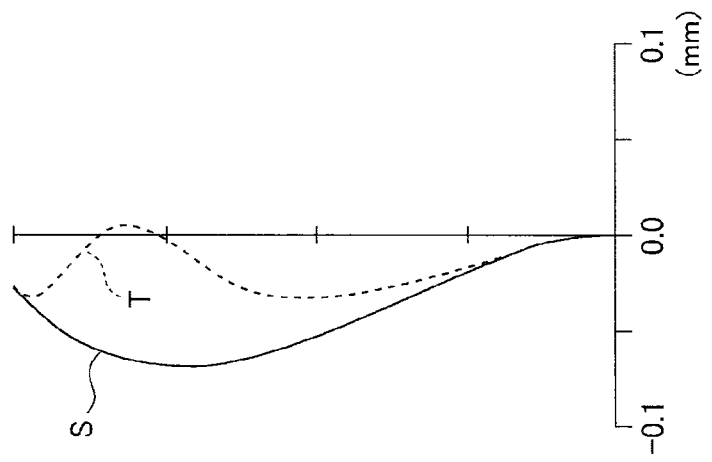
Figure 22A:
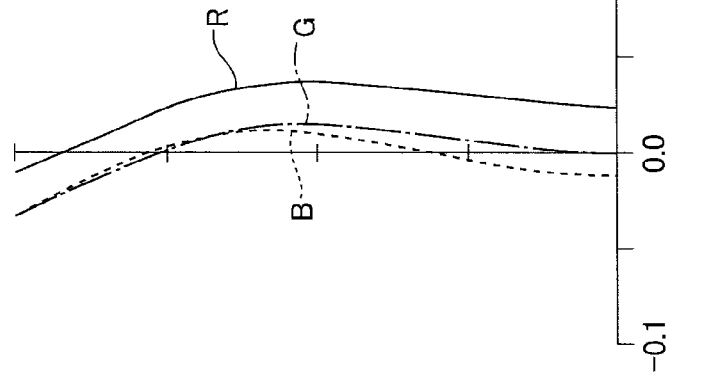

FIGS. 22A-24C illustrate aberration views of the projection zoom lens according to Embodiment 6. FIGS. 22A-22C are views at the wide-angle end, FIGS. 23A-23C are views at the intermediate and FIGS. 24A-24C are views at the telephoto end. FIGS. 22A, 23A, 24A illustrate spherical aberration, FIGS. 22B, 23B, 24B illustrate astigmatism and FIGS. 22C, 23C, 24C illustrate distortion. In each of FIGS. 22A, 23A, 24A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 22B, 23B, 24B, symbol S denotes a sagittal image surface, and symbol T denotes astigmatism of a tangential image surface. As illustrated in FIGS. 22A-24C, the aberration is effectively corrected in each zoom position.

Each of the numerical values of Embodiment 6 is shown in Table 21.

TABLE 21

F = 13.0~19.6 mm, Fno = 2.58~3.24, WIDE-ANGLE END ω = 42.1°

| S | R | D | Nd | Vd | L | G |
|---|---|---|---|---|---|---|
| 1 | 43.101 | 2.30 | 1.84666 | 23.8 | L11 | G1 |
| 2 | 26.644 | 6.57 | — | — | | |
| 3* | -63.360 | 4.00 | 1.53159 | 55.7 | L12 | |
| 4* | -159.546 | 4.07 | — | — | | |
| 5 | 87.280 | 2.00 | 1.80000 | 29.8 | L13 | |
| 6 | 25.379 | S6 | — | — | | |
| 7 | 56.387 | 6.04 | 1.84666 | 23.8 | L21 | G2 |
| 8 | -61.866 | 0.42 | — | — | | |
| 9 | 709.690 | 1.73 | 1.59282 | 68.6 | L22 | |
| 10 | 16.806 | 6.76 | — | — | | |
| 11 | -36.026 | 4.75 | 1.64769 | 33.8 | L23 | |
| 12 | -15.954 | 2.68 | 1.74320 | 49.3 | L24 | |
| 13 | -89.316 | S13 | — | — | | |
| 14 | 50.994 | 6.00 | 1.74400 | 44.8 | L31 | G3 |
| 15 | -568.983 | S15 | — | — | | |
| 16 | 30.458 | 3.72 | 1.59282 | 68.6 | L41 | G4 |
| 17 | 235.776 | 9.57 | — | — | | |
| 18 | 24.379 | 3.92 | 1.49700 | 81.5 | L42 | |
| 19 | -74.932 | 0.30 | — | — | | |
| 20 | INF | S20 | — | — | — | |
| 21 | -56.659 | 1.60 | 1.83400 | 37.3 | L51 | G5 |
| 22 | 12.444 | 4.25 | 1.48749 | 70.4 | L52 | |
| 23 | -86.589 | 1.45 | — | — | | |
| 24* | -78.006 | 2.04 | 1.58913 | 61.2 | L53 | |
| 25* | -201.757 | 1.25 | — | — | | |
| 26 | 91.864 | 6.00 | 1.49700 | 81.5 | L54 | |
| 27 | -19.104 | Bf | — | — | | |
| 28 | INF | 1 | 1.51680 | 64.1 | CG | |
| 29 | INF | — | — | — | | |

In addition, INF in Table 21 denotes infinity, and asterisk * in Table 21 denotes an aspheric surface. The numerical values of the aspheric surface coefficients are as shown in Table 22. S6, S13, S15, S20 in Table 21 are changed as shown in the following Table 23 in zooming. A projection distance is a lens interval in 1600 mm. The numerical value regarding each of the above-described conditions is as shown in the following Table 24.

TABLE 22

| — | 3 | 4 | 24 | 25 |
|---|---|---|---|---|
| K | 0 | 0 | -24.99980522 | 24.99841672 |
| C4 | 7.1278E-05 | 6.8878E-05 | -1.4278E-04 | -1.0001E-04 |
| C6 | -1.3779E-07 | -7.0317E-08 | -8.3692E-08 | 2.5181E-25 |
| C8 | 2.1969E-10 | -1.0845E-10 | -1.9649E-10 | -2.9106E-27 |
| C10 | -8.1224E-14 | 6.0146E-13 | -2.5088E-11 | -9.2147E-12 |
| C12 | -3.5620E-16 | 4.0237E-16 | 0 | 0 |
| C14 | 8.9636E-19 | -3.7571E-18 | 0 | 0 |
| C16 | -8.2594E-22 | 2.8327E-21 | 0 | 0 |

TABLE 23

| — | S6 | S13 | S15 | S20 |
|---|---|---|---|---|
| WIDE-ANGLE END | 6.94 | 8.77 | 5.94 | 1.63 |
| INTERMEDIATE | 7.75 | 3.46 | 3.75 | 2.71 |
| TELEPHOTO END | 6.42 | 0.87 | 0.80 | 3.77 |

TABLE 24

| CONDITION 1 | 1/F5 | 2.5E-03 |
|---|---|---|
| CONDITION 2 | F1/F2 | 0.40 |
| CONDITION 4 | HS/HE | 2.81 |

TABLE 24-continued

| CONDITION 5 | OALw/Fw | 10.6 |
|---|---|---|
| CONDITION 6 | OALw/HE | 15.30 |

[Embodiment 7]

FIG. 25 illustrates an optical arrangement view of a projection zoom lens according to Embodiment 7 at the wide-angle end and the telephoto end. The projection zoom lens according to Embodiment 7 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 7, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a negative lens L22 having a concave surface on the diminished side, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side and a biconvex positive lens L42.

The fifth lens group G5 is a weak positive group including a biconcave negative lens L51, a biconvex positive lens L52, a negative lens L53 having a concave surface on the magnified side, and a biconvex positive lens L54. The lenses L51, L52 are cemented.

Figure 26:
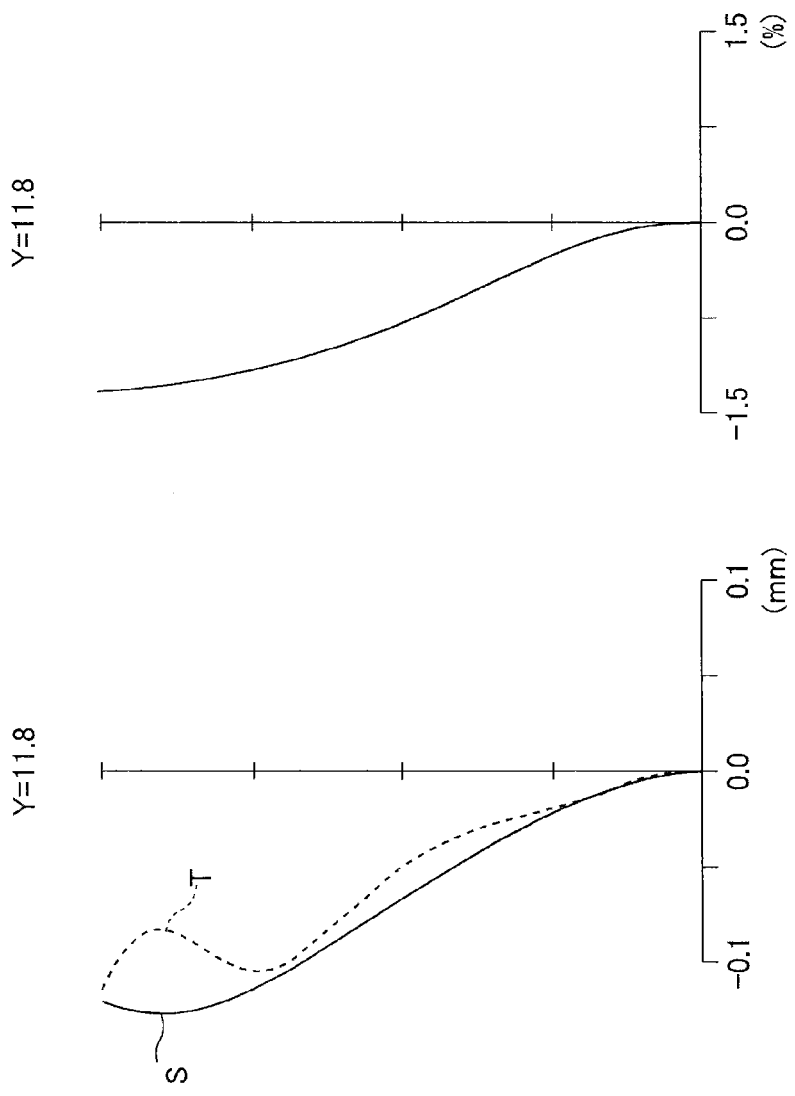
FIGS. 26A, 26B, 26C are aberration views of the projection zoom lens at the wide-angle end according to Embodiment 7.
Figure 27:
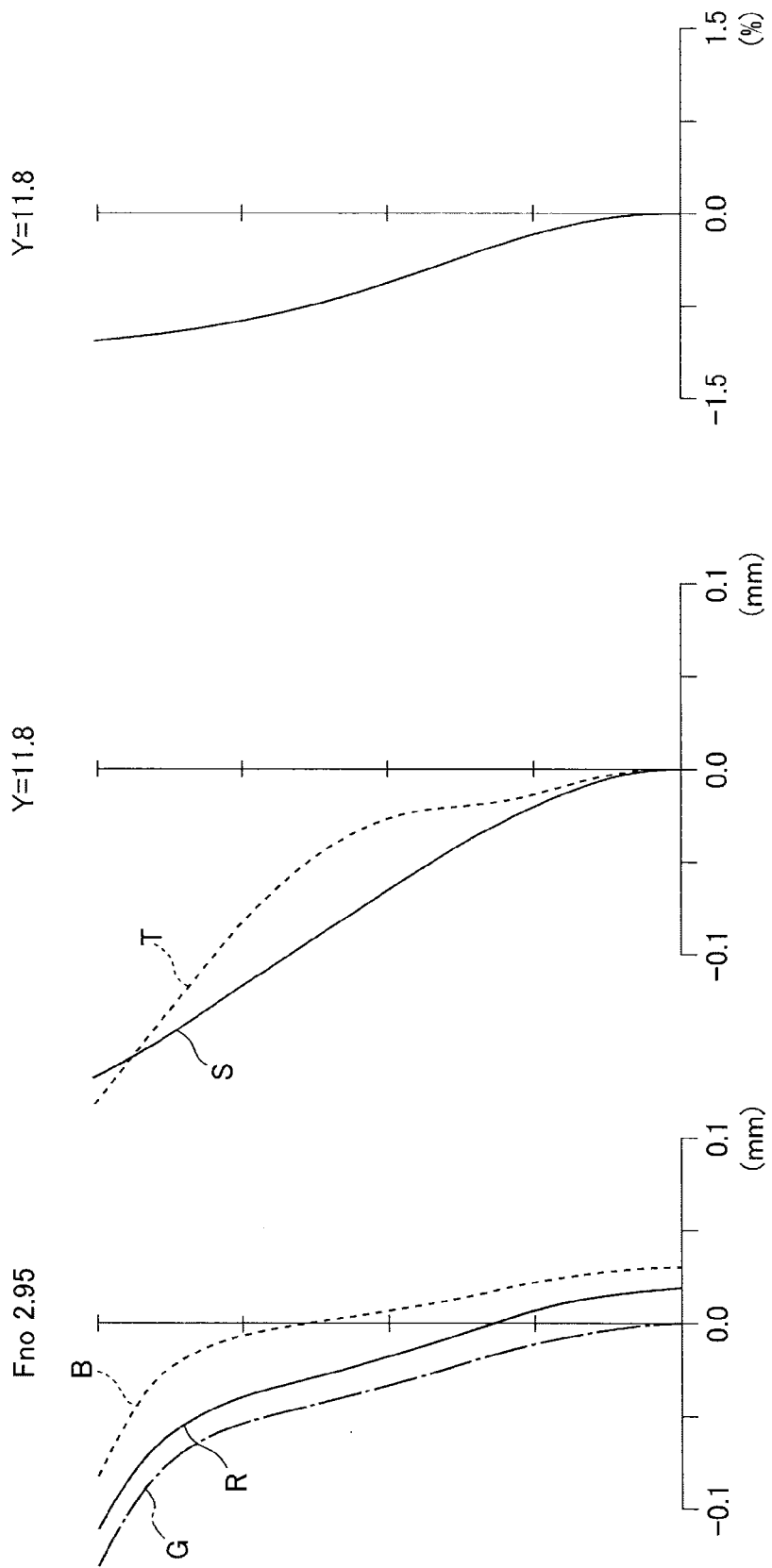
FIGS. 27A, 27B, 27C are aberration views of the projection zoom lens at the intermediate according to Embodiment 7.
Figure 28:
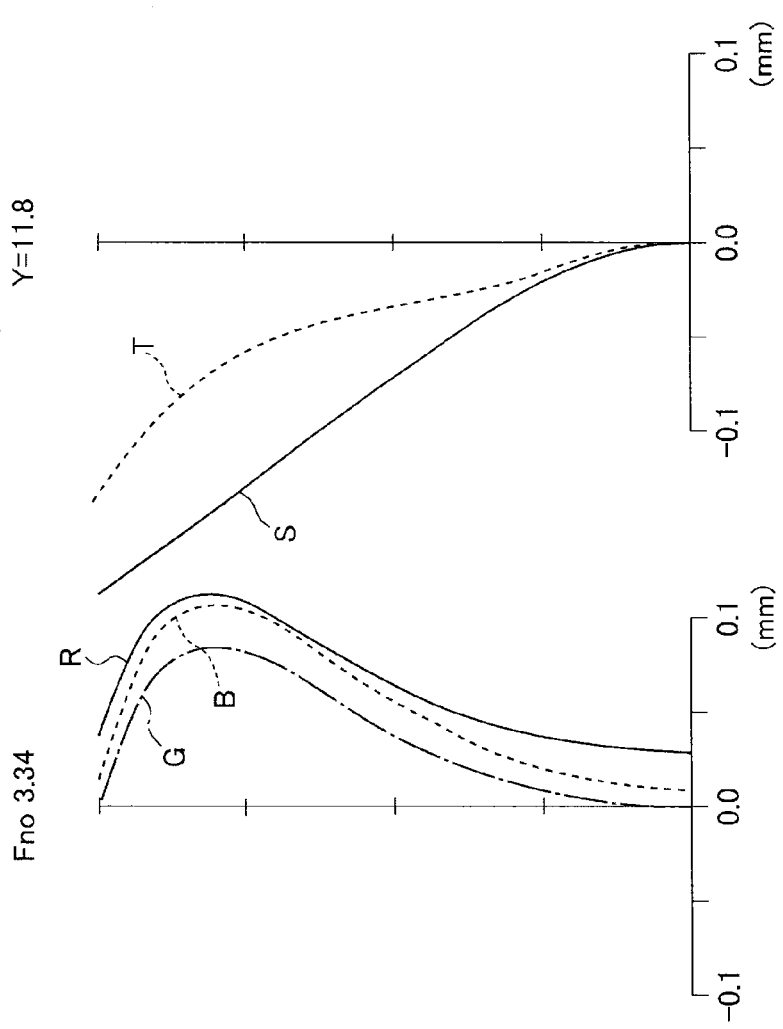
FIGS. 28A, 28B, 28C are aberration views of the projection zoom lens at the telephoto end according to Embodiment 7.

FIGS. 26A-28C illustrate aberration views of the projection zoom lens according to Embodiment 7. FIGS. 26A-26C are views at the wide-angle end, FIGS. 27A-27C are views at the intermediate and FIGS. 28A-28C are views at the telephoto end. FIGS. 26A, 27A, 28A illustrate spherical aberration, FIGS. 26B, 27B, 28B illustrate astigmatism and FIGS. 26C, 27C, 28C illustrate distortion. In each of FIGS. 26A, 27A, 28A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 26B, 27B, 28B, symbol S denotes a sagittal image surface, and symbol T denotes astigmatism of a tangential image surface. As illustrated in FIGS. 26A-28C, the aberration is effectively corrected in each zoom position.

Each of the numerical values of Embodiment 7 is shown in Table 25.

TABLE 25

F = 13.0~19.6 mm, Fno = 2.58~3.24, WIDE-ANGLE END ω = 42.1°

| S | R | D | Nd | Vd | L | G |
|---|---|---|---|---|---|---|
| 1 | 53.492 | 2.30 | 1.90366 | 31.3 | L11 | G1 |
| 2 | 26.233 | 6.50 | — | — | | |
| 3* | −67.458 | 4.00 | 1.53159 | 55.7 | L12 | |
| 4* | −187.393 | 3.00 | — | — | | |
| 5 | 54.685 | 2.00 | 1.92286 | 20.9 | L13 | |
| 6 | 28.402 | S6 | — | — | | |
| 7 | 62.981 | 7.23 | 1.74077 | 27.8 | L21 | G2 |
| 8 | −48.178 | 0.30 | — | — | | |
| 9 | 500.000 | 1.50 | 1.49700 | 81.5 | L22 | |
| 10 | 16.740 | 7.19 | — | — | | |
| 11 | −49.641 | 5.59 | 1.64769 | 33.8 | L23 | |
| 12 | −16.240 | 1.80 | 1.77250 | 49.6 | L24 | |
| 13 | −672.705 | S13 | — | — | | |
| 14 | 72.632 | 4.94 | 1.72000 | 46.0 | L31 | G3 |
| 15 | −62.077 | S15 | — | — | | |
| 16 | 25.305 | 3.22 | 1.69680 | 55.5 | L41 | G4 |
| 17 | 41.551 | 10.16 | — | — | | |
| 18 | 24.980 | 3.89 | 1.49700 | 81.5 | L42 | |
| 19 | −76.791 | 0.30 | — | — | | |
| 20 | INF | S20 | — | — | | |
| 21 | −77.930 | 1.50 | 1.80610 | 33.3 | L51 | G5 |
| 22 | 12.959 | 4.72 | 1.48749 | 70.4 | L52 | |
| 23 | −43.390 | 2.27 | — | — | | |
| 24 | −15.480 | 1.60 | 1.80610 | 40.9 | L53 | |
| 25 | −23.073 | 0.30 | — | — | | |
| 26 | 90.115 | 4.45 | 1.51633 | 64.1 | L54 | |
| 27* | −20.913 | Bf | — | — | | |
| 28 | INF | 1.00 | 1.51680 | 64.1 | CG | — |
| 29 | INF | — | — | — | | |

In addition, INF in Table 25 denotes infinity, and asterisk * in Table 25 denotes an aspheric surface. The numerical values of the aspheric surface coefficients are as shown in Table 26. S6, S13, S15, S20 in Table 25 are changed as shown in the following Table 27 in zooming. A projection distance is a lens interval in 1600 mm. The numerical value regarding each of the above-described conditions is as shown in the following Table 28.

TABLE 26

| — | 3 | 4 | 27 |
|---|---|---|---|
| K | 0 | 0 | 0.393934714 |
| C4 | 7.6234E−05 | 7.4068E−05 | 1.5354E−05 |
| C6 | −1.5415E−07 | −8.5135E−08 | 3.8223E−08 |
| C8 | 2.5366E−10 | −1.0818E−10 | −3.4304E−10 |
| C10 | −8.4776E−14 | 7.2425E−13 | 1.0072E−12 |
| C12 | −4.8871E−16 | 4.4639E−16 | 0 |
| C14 | 8.7600E−19 | −7.1712E−18 | 0 |
| C16 | −7.4076E−22 | 8.5656E−21 | 0 |

TABLE 27

| — | S6 | S13 | S15 | S20 |
|---|---|---|---|---|
| WIDE-ANGLE END | 10.27 | 9.00 | 7.92 | 1.53 |
| INTERMEDIATE | 11.96 | 3.68 | 4.57 | 3.06 |
| TELEPHOTO END | 11.49 | 0.80 | 0.80 | 4.65 |

TABLE 28

| CONDITION 1 | Fw/F5 | 4.1E−04 |
|---|---|---|
| CONDITION 2 | F1/F2 | 0.43 |
| CONDITION 4 | HS/HE | 2.93 |
| CONDITION 5 | OALw/Fw | 10.8 |
| CONDITION 6 | OALw/HE | 16.15 |

[Embodiment 8]

FIG. 29 illustrates an optical arrangement view of a projection zoom lens according to Embodiment 8 at the wide-angle end and the telephoto end. The projection zoom lens according to Embodiment 8 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 8, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group having a biconvex positive lens L31.

The fourth lens group G4 is a positive group including the positive lens L41 having a convex surface on the magnified side and a positive lens L42 having a convex surface on the magnified side.

The fifth lens group G5 is a weak negative group including a negative lens L51 having a convex surface on the magnified side, a biconvex positive lens L52, a negative lens L53 having a concave surface on the magnified side, and a biconvex positive lens L54. The lenses L51, L52 are cemented.

FIGS. 30A-32C illustrate aberration views of the projection zoom lens according to Embodiment 8. FIGS. 30A-30C are views at the wide-angle end, FIGS. 31A-31C are views at the intermediate and FIGS. 32A-32C are views at the telephoto end. FIGS. 30A, 31A, 32A illustrate spherical aberration, FIGS. 30B, 31B, 32B illustrate astigmatism and FIGS. 30C, 31C, 32C illustrate distortion. In each of FIGS. 30A, 31A, 32A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 30B, 31B, 32B, symbol S denotes a sagittal image surface, and symbol T denotes astigmatism of a tangential image surface. As illustrated in FIGS. 30A-32C, the aberration is effectively corrected in each zoom position.

Each of the numerical values of Embodiment 8 is shown in Table 29.

TABLE 29

F = 14.2~21.1 mm, Fno = 2.55~3.34, WIDE-ANGLE END ω = 39.6°

| S | R | D | Nd | Vd | L | G |
|---|---|---|---|---|---|---|
| 1 | 40.390 | 2.00 | 1.75520 | 27.53 | L11 | G1 |
| 2 | 27.971 | 6.92 | — | — | | |
| 3* | −37.277 | 4.10 | 1.53159 | 55.70 | L12 | |
| 4* | −59.504 | 5.64 | — | — | | |
| 5 | 4914.482 | 2.00 | 1.84666 | 23.78 | L13 | |
| 6 | 29.546 | S6 | — | — | | |
| 7 | 56.614 | 7.68 | 1.74077 | 27.79 | L21 | G2 |
| 8 | −40.382 | 1.27 | — | — | | |
| 9 | −46.097 | 1.50 | 1.49700 | 81.55 | L22 | |
| 10 | 22.058 | 5.99 | — | — | | |
| 11 | −57.021 | 6.00 | 1.64769 | 33.79 | L23 | |
| 12 | −17.121 | 1.80 | 1.77250 | 49.60 | L24 | |
| 13 | −94.921 | S13 | — | — | | |
| 14 | 90.549 | 6.00 | 1.72000 | 46.02 | L31 | G3 |
| 15 | −155.491 | S15 | — | — | | |
| 16 | 31.526 | 3.71 | 1.71300 | 53.94 | L41 | G4 |
| 17 | 78.606 | 10.50 | — | — | | |
| 18 | 17.642 | 4.96 | 1.49700 | 81.55 | L42 | |
| 19 | −303.512 | 0.30 | — | — | | |
| 20 | INF | S20 | — | — | — | |
| 21 | 96.837 | 1.50 | 1.83400 | 37.35 | L51 | G5 |
| 22 | 10.749 | 5.04 | 1.48749 | 70.44 | L52 | |
| 23 | −226.938 | 2.79 | — | — | | |
| 24 | −15.477 | 1.60 | 1.80610 | 40.93 | L53 | |
| 25 | −34.192 | 0.30 | — | — | | |
| 26* | 70.532 | 4.72 | 1.48749 | 70.44 | L54 | |
| 27* | −17.501 | Bf | — | — | | |
| 28 | INF | 1.00 | 1.51680 | 64.10 | CG | — |
| 29 | INF | — | — | — | | |

In addition, INF in Table 29 denotes infinity, and asterisk * in Table 29 denotes an aspheric surface. The numerical values of the aspheric surface coefficients are as shown in Table 30. S6, S13, S15, S20 in Table 29 are changed as shown in the following Table 31 in zooming. A projection distance is a lens interval in 1600 mm. The numerical value regarding each of the above-described conditions is as shown in the following Table 32.

TABLE 30

| — | 3 | 4 | 26 | 27 |
|---|---|---|---|---|
| K | 0 | 0 | 0 | 0 |
| C4 | 8.4159E−05 | 7.7770E−05 | −2.7356E−06 | 2.2269E−05 |
| C6 | −1.6258E−07 | −7.6149E−08 | 6.8176E−08 | 1.2531E−07 |
| C8 | 2.3960E−10 | −1.2751E−10 | 1.1402E−10 | −7.9451E−10 |
| C10 | 1.0252E−15 | 6.9122E−13 | 4.3531E−12 | 1.0073E−11 |
| C12 | −4.4487E−16 | 8.7161E−16 | 0 | 0 |
| C14 | 5.6651E−19 | −5.2808E−18 | 0 | 0 |
| C16 | −1.4016E−22 | 5.9419E−21 | 0 | 0 |

TABLE 31

| — | S6 | S13 | S15 | S20 |
|---|---|---|---|---|
| WIDE-ANGLE END | 6.49 | 9.97 | 8.35 | 0.86 |
| INTERMEDIATE | 8.61 | 3.78 | 5.82 | 1.39 |
| TELEPHOTO END | 8.85 | 0.80 | 1.68 | 1.93 |

TABLE 32

| CONDITION 1 | Fw/F5 | −5.7E−03 |
|---|---|---|
| CONDITION 2 | F1/F2 | 0.17 |
| CONDITION 4 | HS/HE | 2.91 |
| CONDITION 5 | OALw/Fw | 10.21 |
| CONDITION 6 | OALw/HE | 16.67 |

[Embodiment 9]

FIG. 33 illustrates an optical arrangement view of a projection zoom lens according to Embodiment 9 at the wide-angle end and the telephoto end. The projection zoom lens according to Embodiment 9 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing the lenses.

In the projection zoom lens according to Embodiment 9, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side and a positive lens L42 having a convex surface on the magnified side.

The fifth lens group G5 is a weak negative group including a negative lens L51 having a convex surface on the magnified side, a biconvex positive lens L52, a negative lens L53 having a concave surface on the magnified side, and a biconvex positive lens L54. The lenses L51, L52 are cemented.

FIGS. 34A-36C illustrate aberration views of the projection zoom lens according to Embodiment 9. FIGS. 34A-34C are views at the wide-angle end, FIGS. 35A-35C are views at the intermediate and FIGS. 36A-36C are views at the telephoto end. FIGS. 34A, 35A, 36A illustrate spherical aberration, FIGS. 34B, 35B, 36B illustrate astigmatism and FIGS. 34C, 35C, 36C illustrate distortion. In each of FIGS. 34A, 35A, 36A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 34B, 35B, 36B, symbol S denotes a sagittal image surface, and symbol T denotes astigmatism of a tangential image surface. As illustrated in FIGS. 34A-36C, the aberration is effectively corrected in each zoom position.

Each of the numerical values of Embodiment 9 is shown in Table 33.

TABLE 33

F = 13.8~20.5 mm, Fno = 2.55~3.34, WIDE-ANGLE END ω = 40.4°

| S | R | D | Nd | Vd | L | G |
|---|---|---|---|---|---|---|
| 1 | 46.867 | 2.00 | 1.75520 | 27.53 | L11 | G1 |
| 2 | 30.251 | 5.52 | — | — | | |
| 3* | −36.475 | 4.27 | 1.53159 | 55.70 | L12 | |
| 4* | −57.690 | 6.22 | — | — | | |
| 5 | 344.426 | 2.00 | 1.84666 | 23.78 | L13 | |
| 6 | 31.478 | S6 | — | — | | |
| 7 | 67.766 | 6.71 | 1.78472 | 25.72 | L21 | G2 |
| 8 | −51.452 | 1.16 | — | — | | |
| 9 | −141.511 | 1.50 | 1.49700 | 81.61 | L22 | |
| 10 | 19.824 | 7.19 | — | — | | |
| 11 | −36.834 | 6.00 | 1.67270 | 32.17 | L23 | |
| 12 | −17.103 | 1.80 | 1.77250 | 49.62 | L24 | |
| 13 | −69.964 | S13 | — | — | | |
| 14 | 124.592 | 6.00 | 1.72000 | 46.02 | L31 | G3 |
| 15 | −124.592 | S15 | — | — | | |
| 16 | 30.372 | 3.78 | 1.69350 | 53.21 | L41 | G4 |
| 17 | 79.326 | 10.94 | — | — | | |
| 18 | 18.479 | 4.64 | 1.49700 | 81.55 | L42 | |
| 19 | −221.173 | 0.30 | — | — | | |
| 20 | INF | S20 | — | — | — | |
| 21 | 132.941 | 1.50 | 1.83400 | 37.35 | L51 | G5 |
| 22 | 11.072 | 4.89 | 1.48749 | 70.44 | L52 | |
| 23 | −112.557 | 2.54 | — | — | | |
| 24 | −15.967 | 1.75 | 1.80610 | 40.93 | L53 | |
| 25 | −34.153 | 0.61 | — | — | | |
| 26 | 80.480 | 4.54 | 1.48749 | 70.44 | L54 | |
| 27* | −18.048 | Bf | — | — | | |
| 28 | INF | 1.00 | 1.51680 | 64.17 | CG | — |
| 29 | INF | — | — | — | | |

In addition, INF in Table 33 denotes infinity, and asterisk * in Table 33 denotes an aspheric surface. The numerical values of the aspheric surface coefficients are as shown in Table 34. S6, S13, S15, S20 in Table 33 are changed as shown in the following Table 35 in zooming. A projection distance is a lens interval in 1600 mm. The numerical value regarding each of the above-described conditions is as shown in the following Table 36.

TABLE 34

| — | 3 | 4 | 27 |
|---|---|---|---|
| K | 0 | 0 | 0 |
| C4 | 8.5185E−05 | 7.9789E−05 | 2.1623E−05 |
| C6 | −1.6323E−07 | −7.4696E−08 | 8.7304E−09 |
| C8 | 2.3812E−10 | −1.2153E−10 | 2.1191E−10 |
| C10 | 7.1995E−16 | 6.6970E−13 | −2.5309E−12 |
| C12 | −4.4456E−16 | 8.6234E−16 | 0 |
| C14 | 5.6391E−19 | −5.1440E−18 | 0 |
| C16 | −1.3912E−22 | 6.1909E−21 | 0 |

TABLE 35

| — | S6 | S13 | S15 | S20 |
|---|---|---|---|---|
| WIDE-ANGLE END | 6.24 | 11.23 | 7.68 | 0.97 |
| INTERMEDIATE | 8.79 | 4.26 | 5.53 | 1.58 |
| TELEPHOTO END | 9.13 | 0.80 | 1.80 | 2.21 |

TABLE 36

| CONDITION 1 | Fw/F5 | −4.8E−03 |
|---|---|---|
| CONDITION 2 | F1/F2 | 0.25 |
| CONDITION 4 | HS/HE | 3.02 |
| CONDITION 5 | OALw/Fw | 10.51 |
| CONDITION 6 | OALw/HE | 16.67 |

[Embodiment 10]

FIG. 37 illustrates an optical arrangement view of a projection zoom lens according to Embodiment 10 at the wide-angle end and the telephoto end. The projection zoom lens according to Embodiment 10 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 10, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side and a positive lens L42 having a convex surface on the magnified side.

The fifth lens group G5 is a weak negative group including a negative lens L51 having a convex surface on the magnified side, a biconvex positive lens L52, a negative lens L53 having a concave surface on the magnified side, and a biconvex positive lens L54. The lenses L51, L52 are cemented.

FIGS. 38A-40C illustrate aberration views of the projection zoom lens according to Embodiment 10. FIGS. 38A-38C are views at the wide-angle end, FIGS. 39A-39C are views at the intermediate and FIGS. 40A-40C are views at the telephoto end. FIGS. 38A, 39A, 40A illustrate spherical aberration, FIGS. 38B, 39B, 40B illustrate astigmatism and FIGS. 38C, 39C, 40C illustrate distortion. In each of FIGS. 38A, 39A, 40A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 38B, 39B, 40B, symbol S denotes a sagittal image surface, and symbol T denotes astigmatism of a tangential image surface. As illustrated in FIGS. 38A-40C, the aberration is effectively corrected in each zoom position.

Each of the numerical values of Embodiment 10 is shown in Table 37.

TABLE 37

F = 12.4~18.5 mm, Fno = 2.56~3.34, WIDE-ANGLE END ω = 43.3°

| S | R | D | Nd | Vd | L | G |
|---|---|---|---|---|---|---|
| 1 | 50.661 | 2.00 | 1.80420 | 46.50 | L11 | G1 |
| 2 | 26.441 | 7.11 | — | — | | |
| 3* | −42.815 | 4.00 | 1.53159 | 55.70 | L12 | |
| 4* | −73.861 | 3.28 | — | — | | |
| 5 | 82.087 | 2.00 | 1.92286 | 20.88 | L13 | |
| 6 | 27.439 | S6 | — | — | | |
| 7 | 50.904 | 7.05 | 1.74077 | 27.79 | L21 | G2 |
| 8 | −49.701 | 0.30 | — | — | | |
| 9 | −170.144 | 1.50 | 1.49700 | 81.55 | L22 | |
| 10 | 17.939 | 6.31 | — | — | | |
| 11 | −55.923 | 5.66 | 1.64769 | 33.79 | L23 | |
| 12 | −15.786 | 1.80 | 1.77250 | 49.60 | L24 | |
| 13 | −207.884 | S13 | — | — | | |
| 14 | 64.599 | 4.88 | 1.72000 | 46.02 | L31 | G3 |
| 15 | −147.036 | S15 | — | — | | |
| 16 | 30.230 | 3.19 | 1.69350 | 53.21 | L41 | G4 |
| 17 | 69.717 | 9.82 | — | — | | |
| 18 | 18.812 | 4.09 | 1.49700 | 81.55 | L42 | |
| 19 | −156.901 | 0.30 | — | — | | |
| 20 | 1E+18 | S20 | — | — | — | |
| 21 | 335.907 | 1.50 | 1.83400 | 37.35 | L51 | G5 |
| 22 | 10.976 | 4.44 | 1.48749 | 70.44 | L52 | |
| 23 | −269.004 | 2.71 | — | — | | |
| 24 | −13.961 | 1.60 | 1.80610 | 40.93 | L53 | |
| 25 | −21.675 | 0.30 | — | — | | |
| 26* | 78.896 | 4.41 | 1.49700 | 81.61 | L54 | |
| 27* | −17.491 | Bf | — | — | | |
| 28 | INF | 1.00 | 1.51680 | 64.17 | CG | — |
| 29 | INF | — | — | — | | |

In addition, INF in Table 37 denotes infinity, and asterisk * in Table 37 denotes an aspheric surface. The numerical values of the aspheric surface coefficients are as shown in Table 38. S6, S13, S15, S20 in Table 37 are changed as shown in the following Table 39 in zooming. A projection distance is a lens interval in 1600 mm. The numerical value regarding each of the above-described conditions is as shown in the following Table 40.

TABLE 38

| — | 3 | 4 | 26 | 27 |
|---|---|---|---|---|
| K | 0 | 0 | 0 | 0 |
| C4 | 8.5374E−05 | 7.8094E−05 | −2.5032E−06 | 1.7694E−05 |
| C6 | −1.6340E−07 | −7.5457E−08 | −2.7651E−08 | 6.0681E−08 |
| C8 | 2.4362E−10 | −1.4355E−10 | 1.2366E−09 | −3.1234E−10 |
| C10 | −2.3225E−14 | 6.7055E−13 | −4.6825E−12 | 3.4879E−12 |
| C12 | −4.7486E−16 | 6.1644E−16 | 0 | 0 |
| C14 | 6.2305E−19 | −5.9963E−18 | 0 | 0 |
| C16 | −2.8932E−22 | 6.7931E−21 | 0 | 0 |

TABLE 39

| — | S6 | S13 | S15 | S20 |
|---|---|---|---|---|
| WIDE-ANGLE END | 7.90 | 10.19 | 6.98 | 1.12 |
| INTERMEDIATE | 9.53 | 4.66 | 4.49 | 1.91 |
| TELEPHOTO END | 9.55 | 1.76 | 0.80 | 2.74 |

TABLE 40

| CONDITION 1 | Fw/F5 | −1.0E−03 |
|---|---|---|
| CONDITION 2 | F1/F2 | 0.29 |
| CONDITION 4 | HS/HE | 2.93 |
| CONDITION 5 | OALw/Fw | 11.03 |
| CONDITION 6 | OALw/HE | 15.80 |

[Embodiment 11]

FIG. 41 illustrates an optical arrangement view of a projection zoom lens according to Embodiment 11 at the wide-angle end and the telephoto end. The projection zoom lens according to Embodiment 11 includes, in order from the magnified side, a first lens group G1 having lenses L1'-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 11, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side, and a positive lens L42 having a convex surface on the magnified side.

The fifth lens group G5 is a weak negative group including a negative lens L51 having a convex surface on the magnified side, a biconvex positive lens L52, a negative lens L53 having a concave surface on the magnified side, and a biconvex positive lens L54. The lenses L51, L52 are cemented.

Figure 42C:
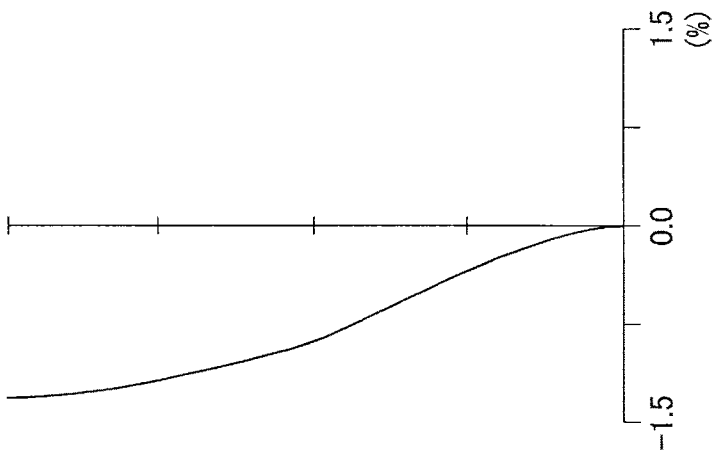
FIGS. 42A, 42B, 42C are aberration views of the projection zoom lens at the wide-angle end according to Embodiment 11.
Figure 42B:
Figure 42A:
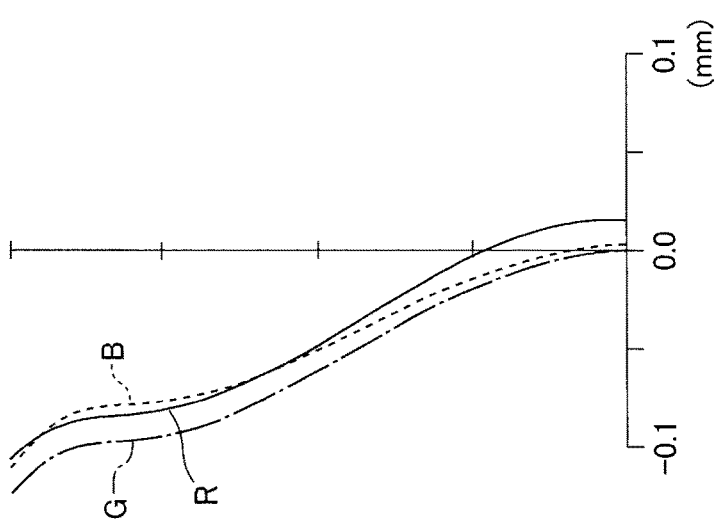
Figures 44A, 44B, 44C:
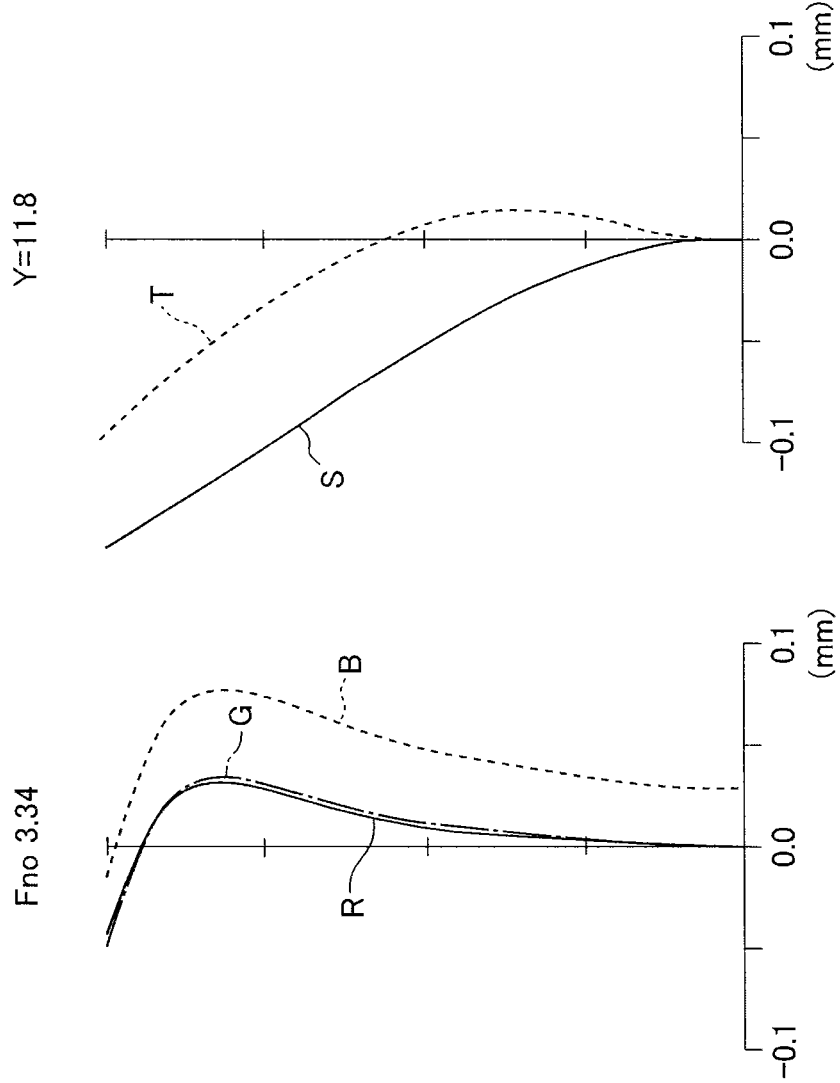
FIGS. 44A, 44B, 44C are aberration views of the projection zoom lens at the telephoto end according to Embodiment 11.

FIGS. 42A-44C illustrate aberration views of the projection zoom lens according to Embodiment 11. FIGS. 42A-42C are views at the wide-angle end, FIGS. 43A-43C are views at the intermediate and FIGS. 44A-44C are views at the telephoto end. FIGS. 42A, 43A, 44A illustrate spherical aberration, FIGS. 42B, 43B, 44B illustrate astigmatism and FIGS. 42C, 43C, 44C illustrate distortion. In each of FIGS. 42A, 43A, 44A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 42B, 43B, 44B, symbol S denotes a sagittal image surface, and symbol T denotes astigmatism of a tangential image surface. As illustrated in FIGS. 42A-44C, the aberration is effectively corrected in each zoom position.

Each of the numerical values of Embodiment 11 is shown in Table 41.

TABLE 41

F = 11.8~17.6 mm, Fno = 2.56~3.34, WIDE-ANGLE END ω = 44.8°

| S | R | D | Nd | Vd | L | G |
|---|---|---|---|---|---|---|
| 1 | 50.155 | 2.00 | 1.83481 | 42.72 | L11 | G1 |
| 2 | 26.381 | 6.70 | — | — | | |
| 3* | −53.270 | 4.00 | 1.53159 | 55.70 | L12 | |
| 4* | −109.223 | 3.00 | — | — | | |
| 5 | 61.681 | 2.00 | 1.92286 | 20.88 | L13 | |
| 6 | 26.721 | S6 | — | — | | |
| 7 | 58.967 | 6.59 | 1.72825 | 28.32 | L21 | G2 |
| 8 | −48.599 | 0.30 | — | — | | |
| 9 | −563.077 | 1.50 | 1.49700 | 81.55 | L22 | |
| 10 | 15.632 | 6.83 | — | — | | |
| 11 | −32.599 | 4.73 | 1.64769 | 33.79 | L23 | |
| 12 | −14.531 | 1.80 | 1.77250 | 49.60 | L24 | |
| 13 | −83.596 | S13 | — | — | | |
| 14 | 118.991 | 6.00 | 1.72000 | 46.02 | L31 | G3 |
| 15 | −85.370 | S15 | — | — | | |
| 16 | 29.686 | 3.30 | 1.67270 | 32.17 | L41 | G4 |
| 17 | 121.713 | 6.89 | — | — | | |
| 18 | 17.445 | 4.19 | 1.49700 | 81.55 | L42 | |
| 19 | −167.813 | 0.30 | — | — | | |
| 20 | 1E+18 | S20 | — | — | — | |
| 21 | 246.707 | 1.50 | 1.91082 | 35.25 | L51 | G5 |
| 22 | 10.804 | 4.64 | 1.48749 | 70.44 | L52 | |
| 23 | −61.219 | 2.48 | — | — | | |
| 24 | −13.053 | 1.60 | 1.83400 | 37.35 | L53 | |
| 25 | −20.527 | 0.30 | — | — | | |
| 26* | 281.847 | 4.35 | 1.49700 | 81.61 | L54 | |
| 27* | −15.195 | Bf | — | — | | |
| 28 | INF | 1.00 | 1.51680 | 64.17 | CG | — |
| 29 | INF | — | — | — | | |

In addition, INF in Table 41 denotes infinity, and asterisk * in Table 41 denotes an aspheric surface. The numerical values of the aspheric surface coefficients are as shown in Table 42. S6, S13, S15, S20 in Table 41 are changed as shown in the following Table 43 in zooming. A projection distance is a lens interval in 1600 mm. The numerical value regarding each of the above-described conditions is as shown in the following Table 44.

TABLE 42

| — | 3 | 4 | 26 | 27 |
|---|---|---|---|---|
| K | 0 | 0 | 0 | 0 |
| C4 | 8.4493E−05 | 7.9696E−05 | −5.4775E−07 | 2.3441E−05 |
| C6 | −1.8695E−07 | −1.0554E−07 | −2.0203E−07 | −1.5887E−07 |
| C8 | 3.3301E−10 | −1.0395E−10 | 4.6270E−09 | 4.3860E−09 |
| C10 | −1.4165E−13 | 8.6022E−13 | −4.5308E−11 | −4.1747E−11 |
| C12 | −6.0562E−16 | 4.9655E−16 | 0 | 0 |
| C14 | 1.2688E−18 | −7.8628E−18 | 0 | 0 |
| C16 | −1.0593E−21 | 9.0619E−21 | 0 | 0 |

TABLE 43

| — | S6 | S13 | S15 | S20 |
|---|---|---|---|---|
| WIDE-ANGLE END | 7.90 | 10.19 | 6.98 | 1.12 |
| INTERMEDIATE | 9.53 | 4.66 | 4.49 | 1.91 |
| TELEPHOTO END | 9.55 | 1.76 | 0.80 | 2.74 |

TABLE 44

| CONDITION 1 | Fw/F5 | −1.9E−03 |
|---|---|---|
| CONDITION 2 | F1/F2 | 0.48 |
| CONDITION 4 | HS/HE | 3.14 |
| CONDITION 5 | OALw/Fw | 11.33 |
| CONDITION 6 | OALw/HE | 16.53 |

The projection zoom lens of each of Embodiments 1-11 includes a five-group configuration. The configuration of the projection zoom lens according to the present invention is not limited to these in Embodiments 1-11. A six-group configuration can be used. When a sixth lens group G6 is provided in the projection zoom lens of each of Embodiments 1-11, the sixth lens group G6 is made of a lens which corrects aberration. In this case, the refractive power of the sixth lens group is weaker than that of the fifth lens group. In zooming, the sixth lens group G6 is moved on the magnified side in timing different from the third, fourth and fifth lens groups G3, G4, G5.

[Embodiment 12]

FIG. 45 illustrates an optical arrangement view of a projection zoom lens according to Embodiment 12 at the wide-angle end and the telephoto end. The projection zoom lens according to Embodiment 12 includes, in order from the magnified side, a first lens group G1 having lenses L11-L13, a second lens group G2 having lenses L21-L24, a third lens group G3 having a lens L31, a fourth lens group G4 having lenses L41, L42, a fifth lens group G5 having lenses L51-L54, and a sixth lens group G6 having a lens L61. A DMD (digital micro mirror device) as a light modulation device is disposed on the diminished side. In addition, a not-shown cover glass (CG) is disposed on the surface of the DMD facing a lens.

In the projection zoom lens according to Embodiment 12, the first lens group G1 is fixed, the second lens group G2 is moved on the diminished side, the third lens group G3 is moved on the magnified side, the fourth lens group G4 is moved on the magnified side, the fifth lens group G5 is moved on the magnified side, and the sixth lens group G6 is moved on the magnified side in zooming from the wide-angle end to the telephoto end. Zooming (changing magnification) can be thereby performed from the wide-angle end to the telephoto end. In addition, the third, fourth, fifth, and sixth lens groups G3, G4, G5, G6 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group having a biconvex positive lens L31.

The fourth lens group G4 is a positive group including the positive lens L41 having a convex surface on the magnified side and a positive lens L42 having a convex surface on the magnified side.

The fifth lens group G5 is a weak negative group including a negative lens L51 having a convex surface on the magnified side, a biconvex positive lens L52, a negative lens L53 having a concave surface on the magnified side, and a biconvex positive lens L54. The lenses L51, L52 are cemented.

The sixth lens group G6 is a weak positive group including a positive lens L61 having a convex surface on the diminished side.

Figure 46:
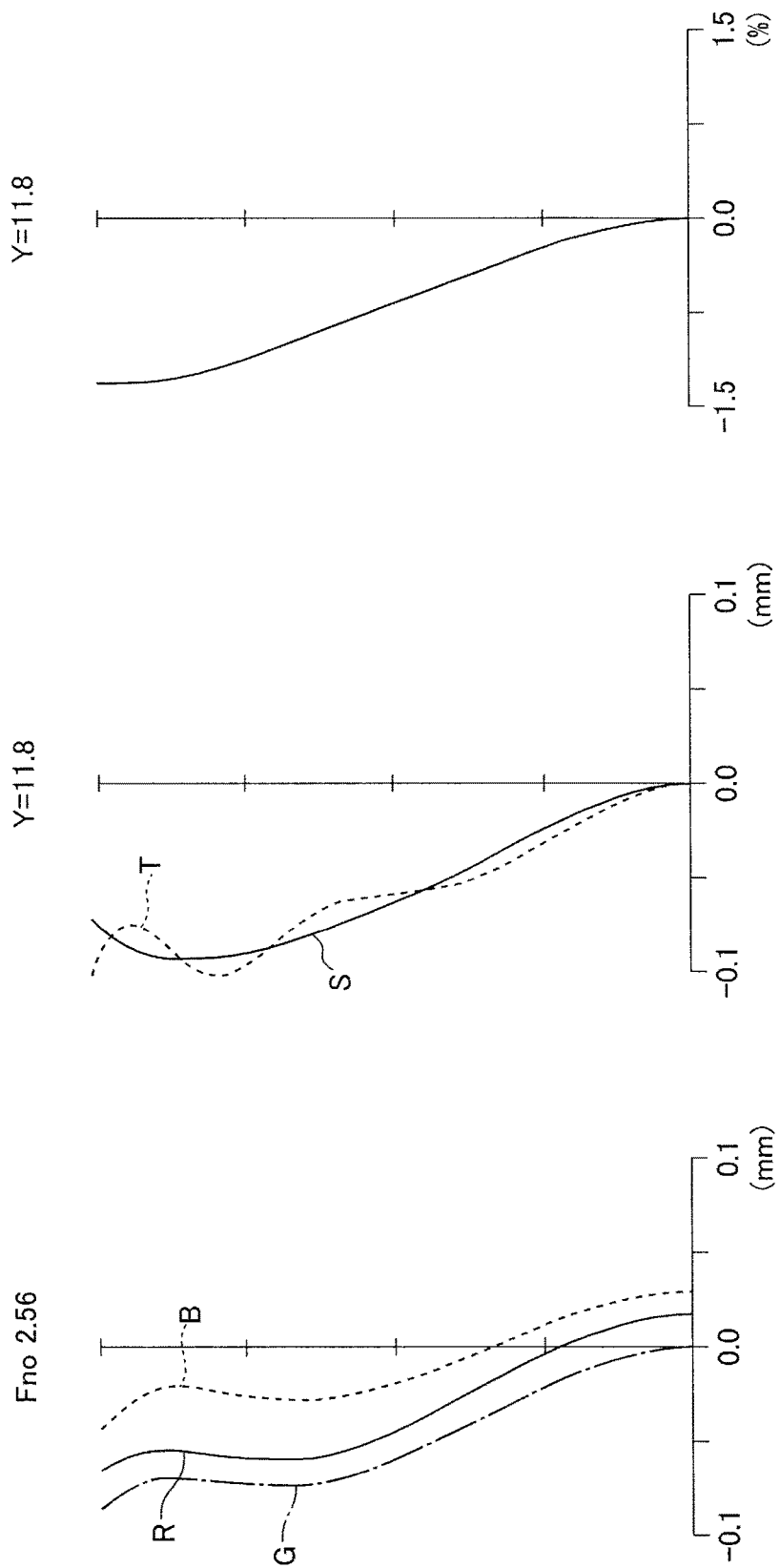
FIGS. 46A, 46B, 46C are aberration views of the projection zoom lens at the wide-angle end according to Embodiment 12.
Figure 47:
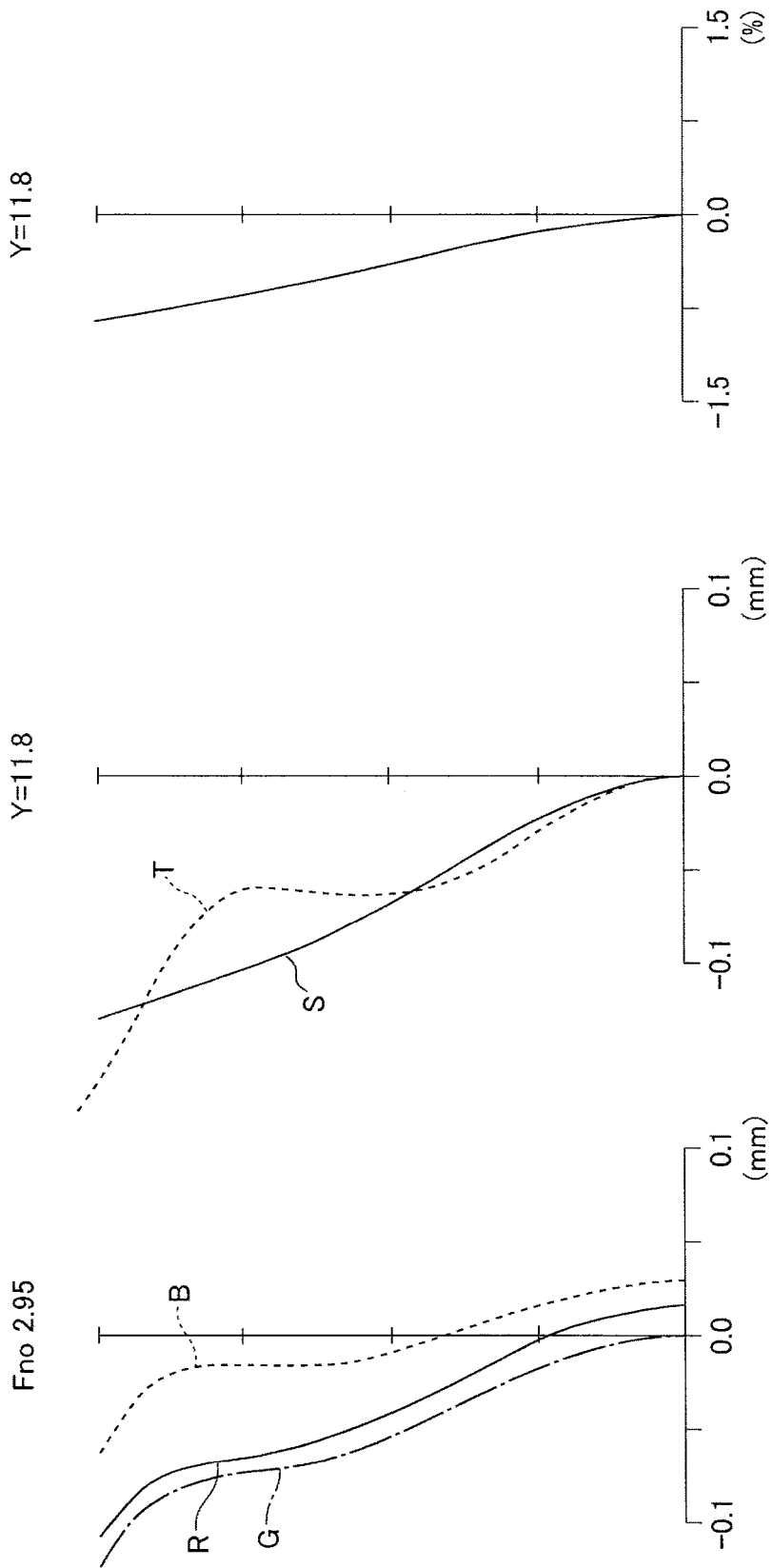
FIGS. 47A, 47B, 47C are aberration views of the projection zoom lens at the intermediate according to Embodiment 12.
Figure 48:
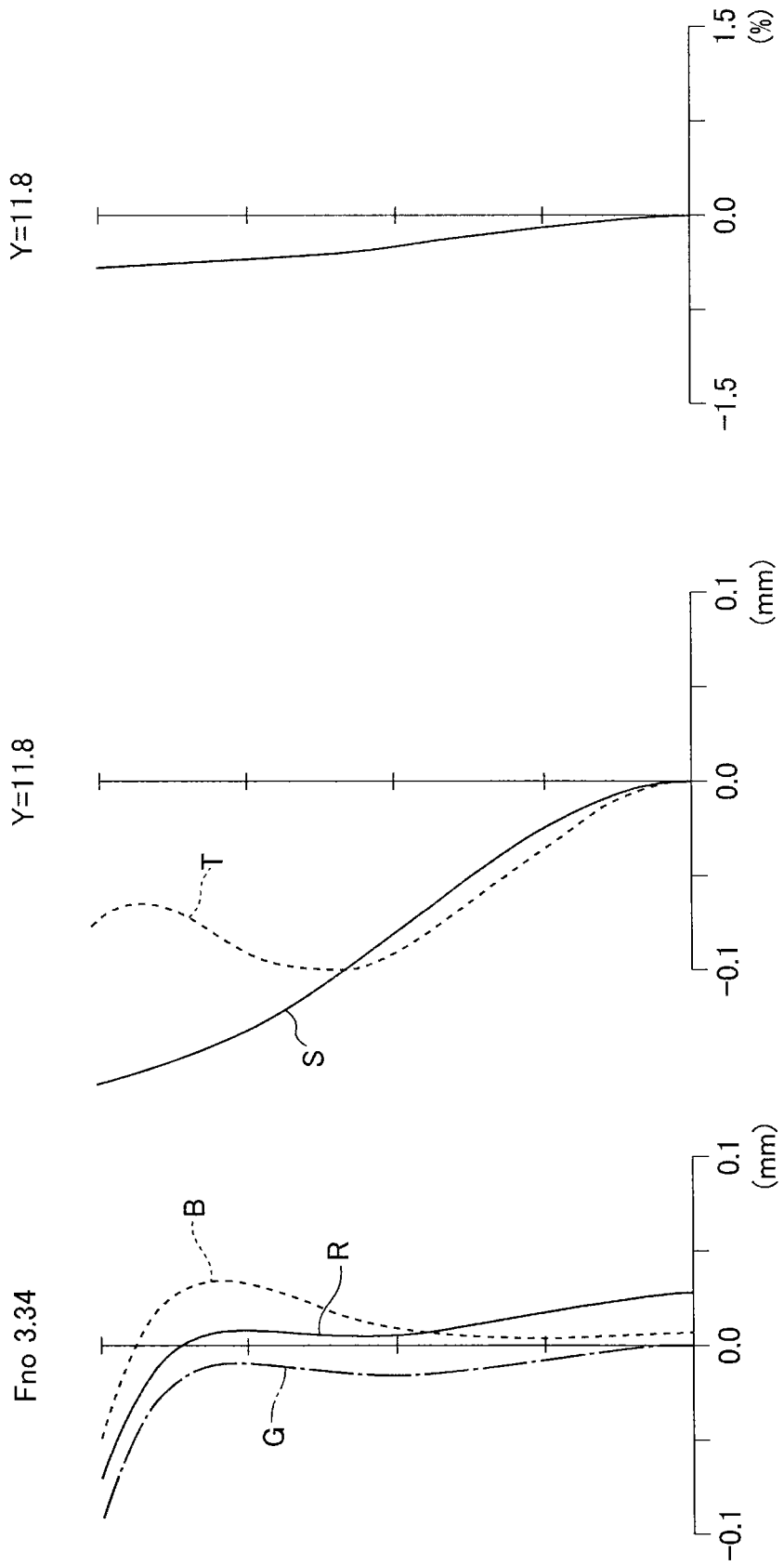
FIGS. 48A, 48B, 48C are aberration views of the projection zoom lens at the telephoto end according to Embodiment 12.

FIGS. 46A-48C illustrate aberration views of the projection zoom lens according to Embodiment 12. FIGS. 46A-46C are views at the wide-angle end, FIGS. 47A-47C are views at the intermediate and FIGS. 48A-48C are views at the telephoto end. FIGS. 46A, 47A, 48A illustrate spherical aberration, FIGS. 46B, 47B, 48B illustrate astigmatism and FIGS. 46C, 47C, 48C illustrate distortion. In each of FIGS. 46A, 47A, 48A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 46B, 47B, 48B, symbol S denotes a sagittal image surface, and symbol T denotes astigmatism of a tangential image surface. As illustrated in FIGS. 46A-48C, the aberration is effectively corrected in each zoom position.

Each of the numerical values of Embodiment 12 is shown in Table 45.

TABLE 45

F = 13.0~19.6 mm, Fno = 2.56~3.34, WIDE-ANGLE END ω = 42.1°

| S | R | D | Nd | Vd | L | G |
|---|---|---|---|---|---|---|
| 1 | 49.449 | 2.30 | 1.83400 | 37.35 | L11 | G1 |
| 2 | 26.427 | 6.56 | — | — | — | |
| 3* | −53.376 | 4.00 | 1.53159 | 55.7 | L12 | |
| 4* | −109.653 | 4.05 | — | — | — | |
| 5 | 92.643 | 2.00 | 1.84066 | 23.78 | L13 | |
| 6 | 28.233 | S6 | — | — | — | |
| 7 | 52.587 | 7.13 | 1.74077 | 27.79 | L21 | G2 |
| 8 | −49.285 | 0.30 | — | — | — | |
| 9 | −115.143 | 1.50 | 1.49700 | 81.55 | L22 | |
| 10 | 18.863 | 6.63 | — | — | — | |
| 11 | −51.003 | 5.78 | 1.64769 | 33.79 | L23 | |
| 12 | −17.507 | 1.80 | 1.77250 | 49.60 | L24 | |
| 13 | −115.408 | S13 | — | — | — | |
| 14 | 163.737 | 5.96 | 1.72000 | 45.02 | L31 | G3 |
| 15 | −100.840 | S15 | — | — | — | |
| 16 | 30.237 | 3.55 | 1.69350 | 53.21 | L41 | G4 |
| 17 | 79.627 | 11.09 | — | — | — | |
| 18 | 19.188 | 4.45 | 1.49700 | 81.55 | L42 | |
| 19 | −115.974 | 0.36 | — | — | — | |
| 20 | 1E+18 | S20 | — | — | — | |
| 21 | 939.962 | 1.50 | 1.83400 | 37.35 | L51 | G5 |
| 22 | 11.330 | 4.78 | 1.48749 | 70.44 | L52 | |
| 23 | −102.568 | 2.71 | — | — | — | |
| 24 | −14.396 | 1.60 | 1.80610 | 40.93 | L53 | |
| 25 | −21.083 | 0.30 | — | — | — | |
| 26 | 150.443 | 4.13 | 1.48749 | 70.44 | L54 | |
| 27 | −20.138 | S27 | — | — | — | |
| 28* | −42.06487 | 2.10 | 1.51680 | 64.17 | L61 | G6 |
| 29 | −38.38528 | Bf | — | — | — | |
| 30 | 1E+18 | 1.00 | 1.51680 | 64.17 | CG | — |
| 31 | 1E+18 | — | — | — | — | |

In addition, INF in Table 45 denotes infinity, and asterisk * in Table 45 denotes an aspheric surface. The numerical values of the aspheric surface coefficients are as illustrated in Table 46. S6, S13, S15, S20 in Table 45 are changed as illustrated in the following Table 47 in zooming. A projection distance is a lens interval in 1600 mm. The numerical value regarding each of the above-described conditions is as shown in the following Table 48.

TABLE 46

| — | 3 | 4 | 28 |
|---|---|---|---|
| K | 0 | 0 | 0 |
| C4 | 8.2637E−05 | 7.7646E−05 | −8.2792E−06 |
| C6 | −1.7443E−07 | −8.9716E−08 | −3.5642E−08 |
| C8 | 2.6784E−10 | −1.6957E−10 | 5.8201E−10 |
| C10 | −4.4343E−14 | 7.8428E−13 | −7.3678E−13 |
| C12 | −4.7993E−16 | 9.5429E−16 | 0 |
| C14 | 8.2672E−19 | −6.3341E−18 | 0 |
| C16 | −5.3601E−22 | 6.0698E−21 | 0 |

TABLE 47

| — | S6 | S13 | S15 | S20 | S27 |
|---|---|---|---|---|---|
| WIDE-ANGLE END | 7.40 | 10.36 | 8.16 | 1.17 | 0.30 |
| INTERMEDIATE | 9.78 | 3.94 | 5.34 | 1.76 | 2.97 |
| TELEPHOTO END | 9.85 | 0.88 | 1.30 | 2.51 | 4.11 |

TABLE 48

| CONDITION 1 | Fw/F5 | −0.07 |
|---|---|---|
| CONDITION 2 | F1/F2 | 0.25 |
| CONDITION 4 | HS/HE | 2.93 |
| CONDITION 5 | OALw/Fw | 11.1 |
| CONDITION 6 | OALw/HE | 16.55 |

As described above, in the projection zoom lens according to the present invention described in each of Embodiments 1-12, the aberration is corrected at a high level, and the spherical aberration, astigmatism, field curvature, chromatic aberration of magnification, and distortion are significantly corrected. A preferable optical performance is apparent from each of the Embodiments.

[Embodiment 13]

FIG. 50 illustrates an optical arrangement view of a projection zoom lens according to Embodiment 13 at the wide-angle end and the telephoto end. The projection zoom lens according to Embodiment 13 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 13, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side, and a positive lens L42 having a convex surface on the magnified side.

The fifth lens group G5 is a negative group including a negative lens L51 having a convex surface on the magnified side, a biconvex positive lens L52, a negative lens L53 having a concave surface on the magnified side, and a biconvex positive lens L54. The lenses L51, L52 are cemented.

FIGS. 51A-53C illustrate aberration views of the projection zoom lens according to Embodiment 13. FIGS. 51A-51C are views at the wide-angle end, FIGS. 52A-52C are views at the intermediate and FIGS. 53A-53C are views at the telephoto end. FIGS. 51A, 52A, 53A illustrate spherical aberration, FIGS. 51B, 52B, 53B illustrate astigmatism and FIGS. 51C, 52C, 53C illustrate distortion. In each of FIGS. 51A, 52A, 53A, symbol R denotes a red (625 nm in wavelength) spherical aberration, symbol G denotes green (550 nm in wavelength) spherical aberration, and symbol B denotes blue (460 nm in wavelength) spherical aberration. In each of FIGS. 51B, 52B, 53B, symbol S denotes a sagittal image surface, and symbol T denotes astigmatism of a tangential image surface. As illustrated in FIGS. 51A-53C, the aberration is effectively corrected in each zoom position.

Each of the numerical values of Embodiment 13 is shown in Table 49.

TABLE 49

F = 11.8~17.6 mm, Fno = 2.56~3.34, WIDE-ANGLE END ω = 44.8°

| S | R | D | Nd | Vd | L | G |
|---|---|---|---|---|---|---|
| 1 | 50.155 | 2.00 | 1.83481 | 42.72 | L11 | G1 |
| 2 | 26.381 | 6.70 | — | — | | |
| 3* | −53.270 | 4.00 | 1.53159 | 55.70 | L12 | |
| 4* | −109.223 | 3.00 | — | — | | |
| 5 | 61.681 | 2.00 | 1.92286 | 20.88 | L13 | |
| 6 | 26.721 | S6 | — | — | | |
| 7 | 58.967 | 6.59 | 1.72825 | 28.32 | L21 | G2 |
| 8 | −48.599 | 0.30 | — | — | | |
| 9 | −563.077 | 1.50 | 1.49700 | 81.55 | L22 | |
| 10 | 15.632 | 6.83 | — | — | | |
| 11 | −32.599 | 4.73 | 1.64769 | 33.79 | L23 | |
| 12 | −14.531 | 1.80 | 1.77250 | 49.60 | L24 | |
| 13 | −83.596 | S13 | — | — | | |
| 14 | 118.991 | 6.00 | 1.72000 | 46.02 | L31 | G3 |
| 15 | −85.370 | S15 | — | — | | |
| 16 | 29.686 | 3.30 | 1.67270 | 32.17 | L41 | G4 |
| 17 | 121.713 | 6.89 | — | — | | |
| 18 | 17.445 | 4.19 | 1.49700 | 81.55 | L42 | |
| 19 | −167.813 | 0.30 | — | — | | |
| 20 | 1E+18 | S20 | — | — | | |
| 21 | 246.707 | 1.50 | 1.91082 | 35.25 | L51 | G5 |
| 22 | 10.804 | 4.64 | 1.48749 | 70.44 | L52 | |
| 23 | −61.219 | 2.48 | — | — | | |
| 24 | −13.053 | 1.60 | 1.83400 | 37.35 | L53 | |
| 25 | −20.527 | 0.30 | — | — | | |
| 26* | 281.847 | 4.35 | 1.49700 | 81.61 | L54 | |
| 27* | −15.195 | Bf | — | — | | |
| 28 | INF | 1.00 | 1.51680 | 64.17 | CG | |
| 29 | INF | — | — | — | | |

In addition, INF in Table 49 denotes infinity, and asterisk * in Table 49 denotes an aspheric surface. The numerical values of the aspheric surface coefficients are as shown in Table 50. S6, S13, S15, S20 in Table 49 are changed as shown in the following Table 51 in zooming. A projection distance is a lens interval in 1600 mm. The numerical value regarding each of the above-described conditions is as shown in the following Table 52.

TABLE 50

| — | 3 | 4 | 26 | 27 |
|---|---|---|---|---|
| K | 0 | 0 | 0 | 0 |
| C4 | 8.4493E−05 | 7.9696E−05 | −5.4775E−07 | 2.3441E−05 |
| C6 | −1.8695E−07 | −1.0554E−07 | −2.0203E−07 | −1.5887E−07 |
| C8 | 3.3301E−10 | −1.0395E−10 | 4.6270E−09 | 4.3860E−09 |
| C10 | −1.4165E−13 | 8.6022E−13 | −4.5308E−11 | −4.1747E−11 |
| C12 | −6.0562E−16 | 4.9655E−16 | 0 | 0 |
| C14 | 1.2688E−18 | −7.8628E−18 | 0 | 0 |
| C16 | −1.0593E−21 | 9.0619E−21 | 0 | 0 |

TABLE 51

| — | S6 | S13 | S15 | S20 |
|---|---|---|---|---|
| WIDE-ANGLE END | 7.90 | 10.19 | 6.98 | 1.12 |
| INTERMEDIATE | 9.53 | 4.66 | 4.49 | 1.91 |
| TELEPHOTO END | 9.55 | 1.76 | 0.80 | 2.74 |

TABLE 52

| CONDITION 7 | F5n/F5p | −1.6 |
|---|---|---|
| CONDITION 8 | 1/F5 | −0.002 |
| CONDITION 9 | F3/F4 | 3.02 |
| CONDITION 10 | Fw/F2 | −0.25 |
| CONDITION 11 | \| EPw/DMDHT \| | 4.35 |
| CONDITION 12 | Fw/BFw | 0.37 |

[Embodiment 14]

FIG. 54 illustrates an optical arrangement view of a projection zoom lens according to Embodiment 14 at the wide-angle end and the telephoto end. The projection zoom lens according to Embodiment 14 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 14, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side, and a positive lens L42 having a convex surface on the magnified side.

The fifth lens group G5 is a negative group including a negative lens L51 having a convex surface on the magnified side, a biconvex positive lens L52, a negative lens L53 having a concave surface on the magnified side, and a biconvex positive lens L54. The lenses L51, L52 are cemented.

Figure 55C:
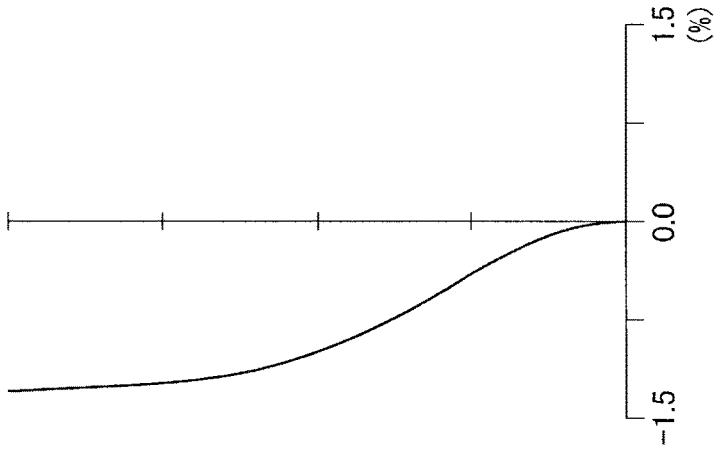
FIGS. 55A, 55B, 55C are aberration views of the projection zoom lens at the wide-angle end according to Embodiment 14.
Figure 55B:
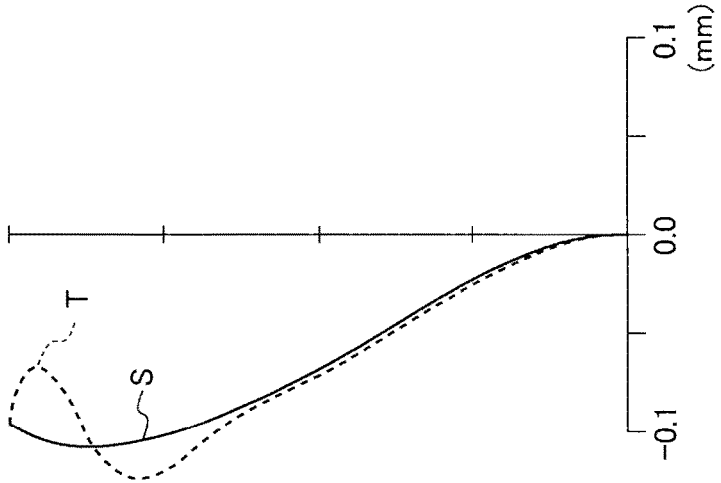
Figure 55A:
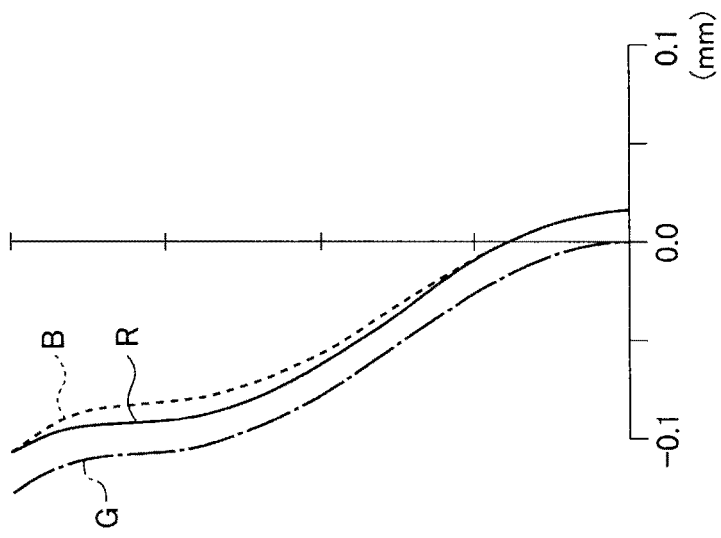
Figure 60C:
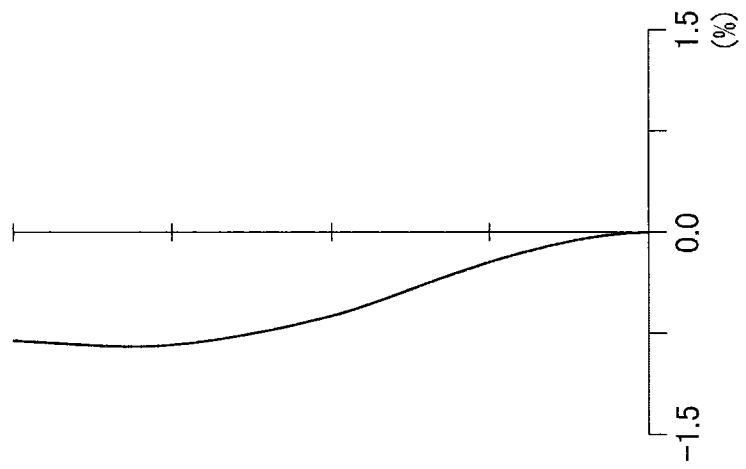
FIGS. 60A, 60B, 60C are aberration views of the projection zoom lens at the intermediate according to Embodiment 15.
Figure 60B:
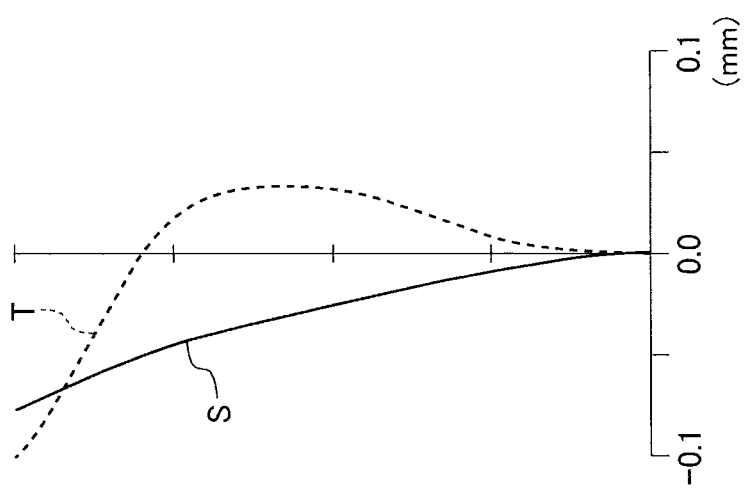
Figure 60A:
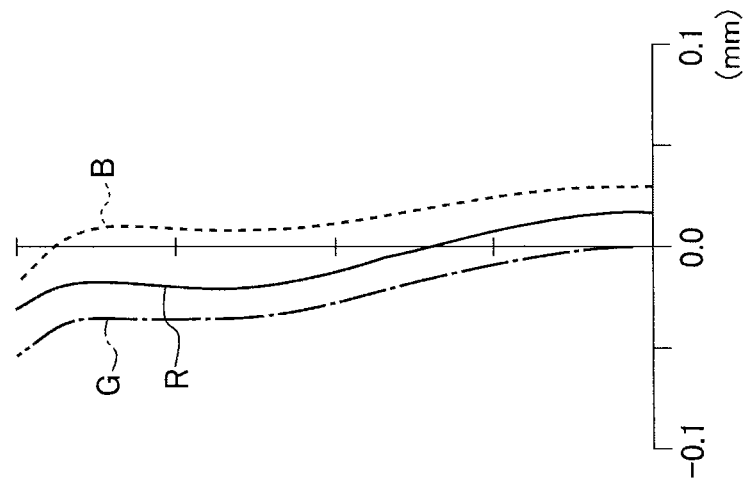

FIGS. 55A-57C illustrate aberration views of the projection zoom lens according to Embodiment 14. FIGS. 55A-55C are views at the wide-angle end, FIGS. 56A-56C are views at the intermediate and FIGS. 57A-57C are views at the telephoto end. FIGS. 55A, 56A, 57A illustrate spherical aberration, FIGS. 55B, 56B, 57B illustrate astigmatism and FIGS. 55C, 56C, 57C illustrate distortion. In each of FIGS. 55A, 56A, 57A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 55B, 56B, 57B, symbol S denotes a sagittal image surface, and symbol T denotes astigmatism of a tangential image surface. As illustrated in FIGS. 55A-57C, the aberration is effectively corrected in each zoom position.

Each of the numerical values of Embodiment 14 is shown in Table 53.

TABLE 53

F = 12.4~18.5 mm, Fno = 2.56~3.34, WIDE-ANGLE END ω = 43.3°

| S | R | D | Nd | Vd | L | G |
|---|---|---|---|---|---|---|
| 1 | 50.661 | 2.00 | 1.80420 | 46.50 | L11 | G1 |
| 2 | 26.441 | 7.11 | — | — | | |
| 3* | −42.815 | 4.00 | 1.53159 | 55.70 | L12 | |
| 4* | −73.861 | 3.28 | — | — | | |
| 5 | 82.087 | 2.00 | 1.92286 | 20.88 | L13 | |
| 6 | 27.439 | S6 | — | — | | |
| 7 | 50.904 | 7.05 | 1.74077 | 27.79 | L21 | G2 |
| 8 | −49.701 | 0.30 | — | — | | |
| 9 | −170.144 | 1.50 | 1.49700 | 81.55 | L22 | |
| 10 | 17.939 | 6.31 | — | — | | |
| 11 | −55.923 | 5.66 | 1.64769 | 33.79 | L23 | |
| 12 | −15.786 | 1.80 | 1.77250 | 49.60 | L24 | |
| 13 | −207.884 | S13 | — | — | | |
| 14 | 64.599 | 4.88 | 1.72000 | 46.02 | L31 | G3 |
| 15 | −147.036 | S15 | — | — | | |
| 16 | 30.230 | 3.19 | 1.69350 | 53.21 | L41 | G4 |
| 17 | 69.717 | 9.82 | — | — | | |
| 18 | 18.812 | 4.09 | 1.49700 | 81.55 | L42 | |
| 19 | −156.901 | 0.30 | — | — | | |
| 20 | 1E+18 | S20 | — | — | | |
| 21 | 335.907 | 1.50 | 1.83400 | 37.35 | L51 | G5 |
| 22 | 10.976 | 4.44 | 1.48749 | 70.44 | L52 | |
| 23 | −269.004 | 2.71 | — | — | | |
| 24 | −13.961 | 1.60 | 1.80610 | 40.93 | L53 | |
| 25 | −21.675 | 0.30 | — | — | | |
| 26* | 78.896 | 4.41 | 1.49700 | 81.61 | L54 | |
| 27* | −17.491 | Bf | — | — | | |
| 28 | INF | 1.00 | 1.51680 | 64.17 | CG | — |
| 29 | INF | — | — | — | | |

In addition, INF in Table 53 denotes infinity, and asterisk * in Table 53 denotes an aspheric surface. The numerical values of the aspheric surface coefficients are as shown in Table 54. S6, S13, S15, S20 in Table 53 are changed as shown in the following Table 55 in zooming. A projection distance is a lens interval in 1600 mm. The numerical value regarding each of the above-described conditions is as shown in the following Table 56.

TABLE 54

| — | 3 | 4 | 26 | 27 |
|---|---|---|---|---|
| K | 0 | 0 | 0 | 0 |
| C4 | 8.5374E−05 | 7.8094E−05 | −2.5032E−06 | 1.7694E−05 |
| C6 | −1.6340E−07 | −7.5457E−08 | −2.7651E−08 | 6.0681E−08 |
| C8 | 2.4362E−10 | −1.4355E−10 | 1.2366E−09 | −3.1234E−10 |
| C10 | −2.3225E−14 | 6.7055E−13 | −4.6825E−12 | 3.4879E−12 |
| C12 | −4.7486E−16 | 6.1644E−16 | 0 | 0 |
| C14 | 6.2305E−19 | −5.9963E−18 | 0 | 0 |
| C16 | −2.8932E−22 | 6.7931E−21 | 0 | 0 |

TABLE 55

| — | S6 | S13 | S15 | S20 |
|---|---|---|---|---|
| WIDE-ANGLE END | 7.90 | 10.19 | 6.98 | 1.12 |
| INTERMEDIATE | 9.53 | 4.66 | 4.49 | 1.91 |
| TELEPHOTO END | 9.55 | 1.76 | 0.80 | 2.74 |

TABLE 56

| CONDITION 7 | F5n/F5p | −1.8 |
|---|---|---|
| CONDITION 8 | 1/F5 | −0.001 |
| CONDITION 9 | F3/F4 | 2.36 |
| CONDITION 10 | Fw/F2 | −0.17 |
| CONDITION 11 | | EPw/DMDHT | | 4.33 |
| CONDITION 12 | Fw/BFw | 0.39 |

[Embodiment 15]

FIG. 58 illustrates an optical arrangement view of a projection zoom lens according to Embodiment 15 at the wide-angle end and the telephoto end. The projection zoom lens according to Embodiment 15 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 15, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side, and a positive lens L42 having a convex surface on the magnified side.

The fifth lens group G5 is a weak negative group including a negative lens L51 having a convex surface on the magnified side, a biconvex positive lens L52, a negative lens L53 having a concave surface on the magnified side, and a biconvex positive lens L54. The lenses L51, L52 are cemented.

FIGS. 59A-61C illustrate aberration views of the projection zoom lens according to Embodiment 15. FIGS. 59A-59C are views at the wide-angle end, FIGS. 60A-60C are views at the intermediate and FIGS. 61A-61C are views at the telephoto end. FIGS. 59A, 60A, 61A illustrate spherical aberration, FIGS. 59B, 60B, 61B illustrate astigmatism and FIGS. 59C, 60C, 61C illustrate distortion. In each of FIGS. 59A, 60A, 61A, symbol R denotes a red (625 nm in wavelength) spherical aberration, symbol G denotes green (550 nm in wavelength) spherical aberration, and symbol B denotes blue (460 nm in wavelength) spherical aberration. In each of FIGS. 59B, 60B, 61B, symbol S denotes a sagittal image surface, and symbol T denotes astigmatism of a tangential image surface. As illustrated in FIGS. 59A-61C, the aberration is effectively corrected in each zoom position.

Each of the numerical values of Embodiment 15 is shown in Table 57.

TABLE 57

| F = 13.8~20.5 mm, Fno = 2.55~3.34, WIDE-ANGLE END ω = 40.4° | | | | | | |
|---|---|---|---|---|---|---|
| S | R | D | Nd | Vd | L | G |
| 1 | 46.867 | 2.00 | 1.75520 | 27.53 | L11 | G1 |
| 2 | 30.251 | 5.52 | — | — | | |
| 3* | −36.475 | 4.27 | 1.53159 | 55.70 | L12 | |
| 4* | −57.690 | 6.22 | — | — | | |
| 5 | 344.426 | 2.00 | 1.84666 | 23.78 | L13 | |
| 6 | 31.478 | S6 | — | — | | |
| 7 | 67.766 | 6.71 | 1.78472 | 25.72 | L21 | G2 |
| 8 | −51.452 | 1.16 | — | — | | |
| 9 | −141.511 | 1.50 | 1.49700 | 81.61 | L22 | |
| 10 | 19.824 | 7.19 | — | — | | |
| 11 | −36.834 | 6.00 | 1.67270 | 32.17 | L23 | |
| 12 | −17.103 | 1.80 | 1.77250 | 49.62 | L24 | |
| 13 | −69.964 | S13 | — | — | | |
| 14 | 124.592 | 6.00 | 1.72000 | 46.02 | L31 | G3 |
| 15 | −124.592 | S15 | — | — | | |
| 16 | 30.372 | 3.78 | 1.69350 | 53.21 | L41 | G4 |
| 17 | 79.326 | 10.94 | — | — | | |
| 18 | 18.479 | 4.64 | 1.49700 | 81.55 | L42 | |
| 19 | −221.173 | 0.30 | — | — | | |
| 20 | INF | S20 | — | — | | |
| 21 | 132.941 | 1.50 | 1.83400 | 37.35 | L51 | G5 |
| 22 | 11.072 | 4.89 | 1.48749 | 70.44 | L52 | |
| 23 | −112.557 | 2.54 | — | — | | |
| 24 | −15.967 | 1.75 | 1.80610 | 40.93 | L53 | |
| 25 | −34.153 | 0.61 | — | — | | |
| 26 | 80.480 | 4.54 | 1.48749 | 70.44 | L54 | |
| 27* | −18.048 | Bf | — | — | | |
| 28 | INF | 1.00 | 1.51680 | 64.17 | CG | — |
| 29 | INF | — | — | — | | |

In addition, INF in Table 57 denotes infinity, and asterisk * in Table 57 denotes an aspheric surface. The numerical values of the aspheric surface coefficient are as shown in Table 58. S6, S13, S15, S20 in Table 57 are changed as shown in the following Table 59 in zooming. A projection distance is a lens interval in 1600 mm. The numerical value regarding each of the above-described conditions is as shown in the following Table 60.

TABLE 58

| — | S3 | S4 | S27 |
|---|---|---|---|
| K | 0 | 0 | 0 |
| C4 | 8.5185E−05 | 7.9789E−05 | 2.1623E−05 |
| C6 | −1.6323E−07 | −7.4696E−08 | 8.7304E−09 |
| C8 | 2.3812E−10 | −1.2153E−10 | 2.1191E−10 |
| C10 | 7.1995E−16 | 6.6970E−13 | −2.5309E−12 |
| C12 | −4.4456E−16 | 8.6234E−16 | 0 |
| C14 | 5.6391E−19 | −5.1440E−18 | 0 |
| C16 | −1.3912E−22 | 6.1909E−21 | 0 |

TABLE 59

| — | S6 | S13 | S15 | S20 |
|---|---|---|---|---|
| WIDE-ANGLE END | 6.24 | 11.23 | 7.68 | 0.97 |
| INTERMEDIATE | 8.79 | 4.26 | 5.53 | 1.58 |
| TELEPHOTO END | 9.13 | 0.80 | 1.80 | 2.21 |

TABLE 60

| CONDITION 7 | F5n/F5p | −1.3 |
|---|---|---|
| CONDITION 8 | 1/F5 | −0.005 |
| CONDITION 9 | F3/F4 | 3.25 |
| CONDITION 10 | Fw/F2 | −0.15 |
| CONDITION 11 | \| EPw/DMDHT \| | 4.31 |
| CONDITION 12 | Fw/BFw | 0.43 |

[Embodiment 16]

FIG. 62 illustrates an optical arrangement view of a projection zoom lens according to Embodiment 16 at the wide-angle end and the telephoto end. The projection zoom lens according to Embodiment 16 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 16, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including the positive lens L41 having a convex surface on the magnified side, and a positive lens L42 having a convex surface on the magnified side.

The fifth lens group G5 is a negative group including a negative lens L51 having a convex surface on the magnified side, a biconvex positive lens L52, a negative lens L53 having a concave surface on the magnified side, and a biconvex positive lens L54. The lenses L51, L52 are cemented.

Figure 63C:
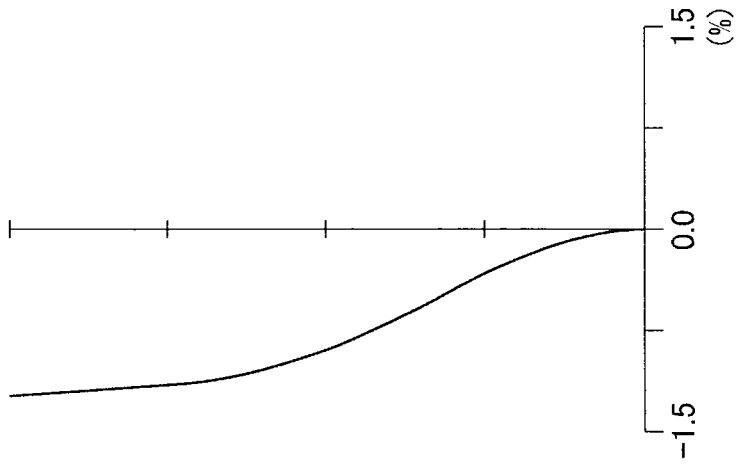
FIGS. 63A, 63B, 63C are aberration views of the projection zoom lens at the wide-angle end according to Embodiment 16.
Figure 63B:
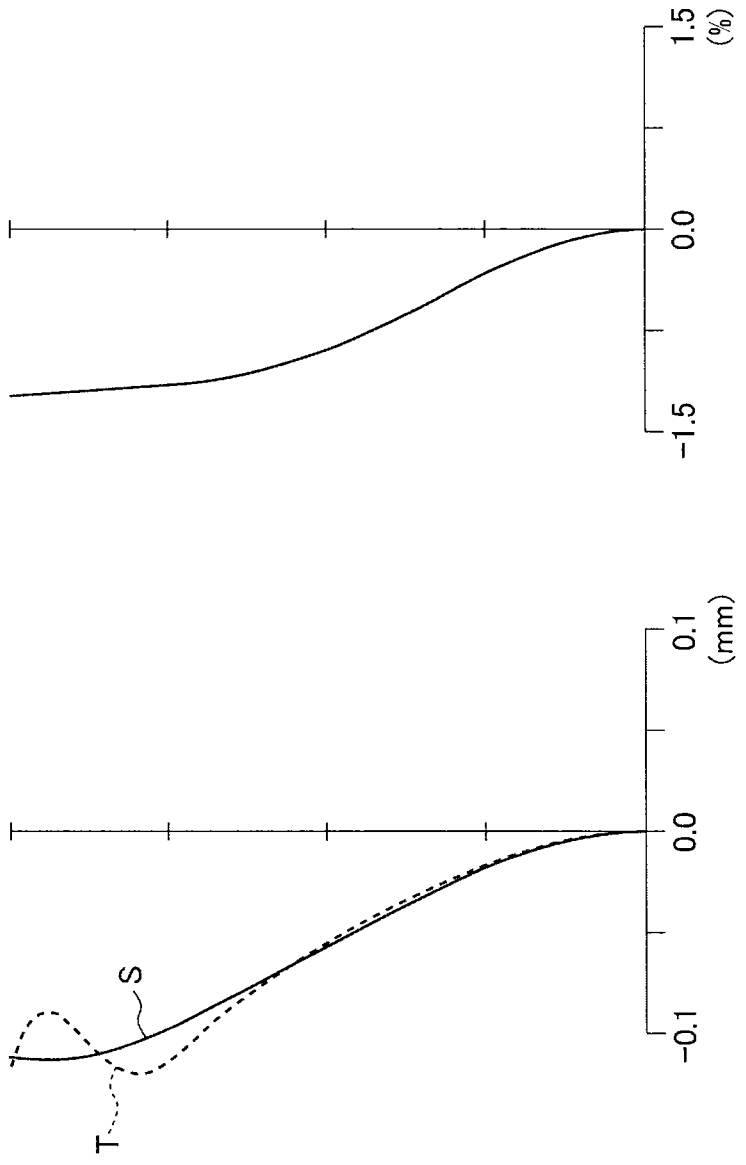
Figure 63A:
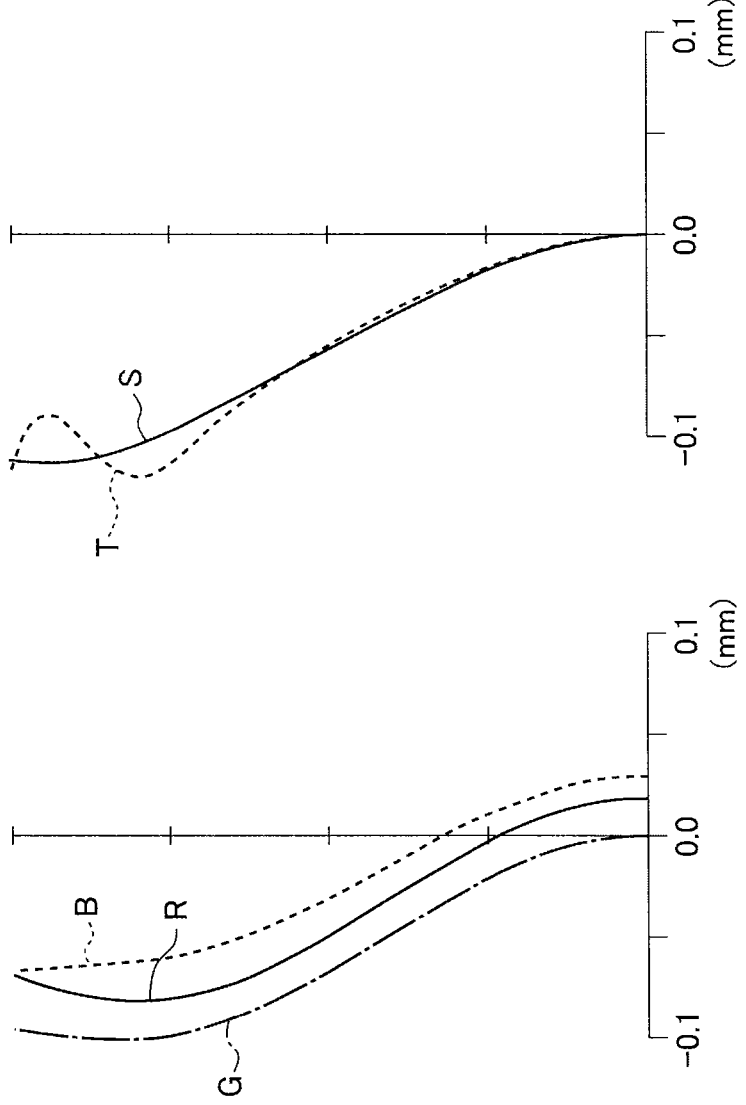
Figure 64C:
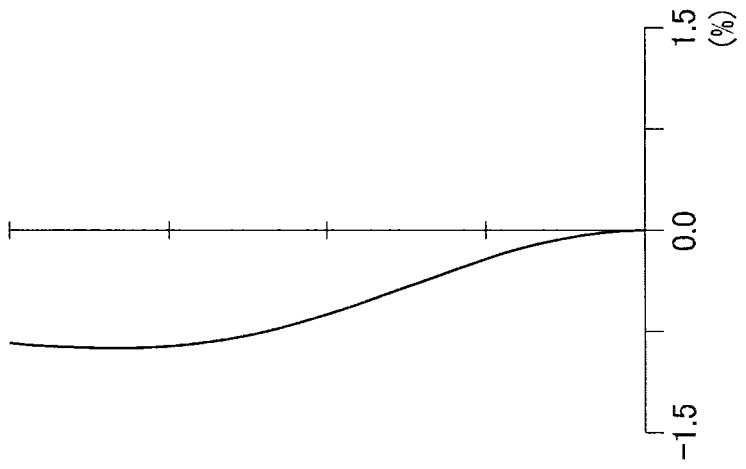
FIGS. 64A, 64B, 64C are aberration views of the projection zoom lens at the intermediate according to Embodiment 16.
Figure 64B:
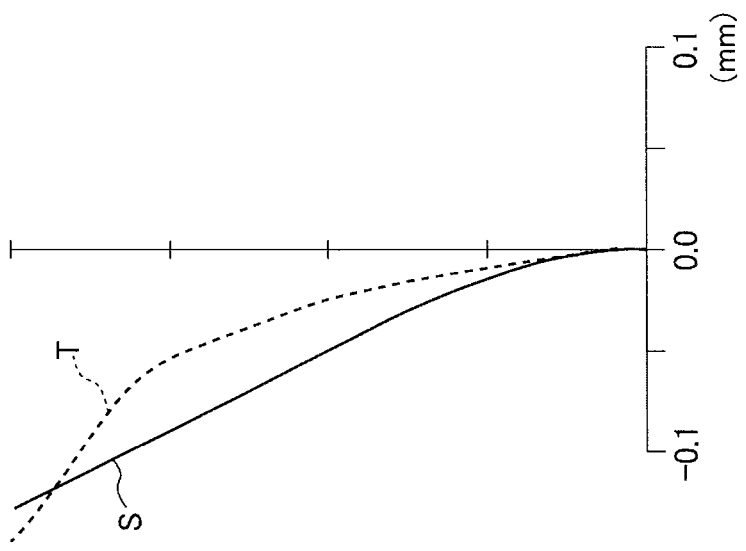
Figure 64A:
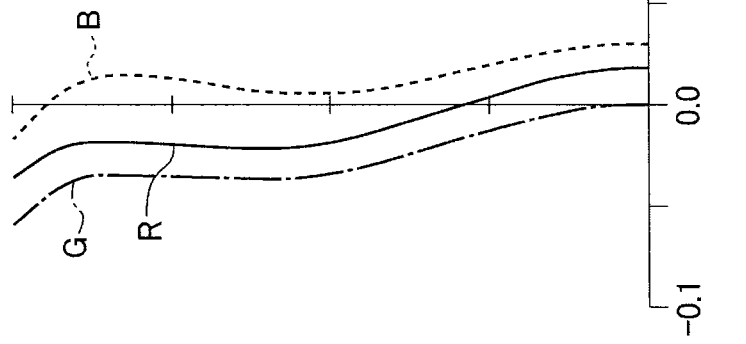

FIGS. 63A-65C illustrate aberration views of the projection zoom lens according to Embodiment 16. FIGS. 63A-63C are views at the wide-angle end, FIGS. 64A-64C are views at the intermediate and FIGS. 65A-65C are views at the telephoto end. FIGS. 63A, 64A, 65A illustrate spherical aberration, FIGS. 63B, 64B, 65B illustrate astigmatism and FIGS. 63C, 64C, 65C illustrate distortion. In each of FIGS. 63A, 64A, 65A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 63B, 64B, 65B, symbol S denotes a sagittal image surface, and symbol T denotes astigmatism of a tangential image surface. As illustrated in FIGS. 63A-65C, the aberration is effectively corrected in each zoom position.

Each of the numerical values of Embodiment 16 is shown in Table 61.

TABLE 61

F = 14.2~21.1 mm, Fno = 2.55~3.34, WIDE-ANGLE END ω = 39.6°

| S | R | D | Nd | Vd | L | G |
|---|---|---|---|---|---|---|
| 1 | 40.390 | 2.00 | 1.75520 | 27.53 | L11 | G1 |
| 2 | 27.971 | 6.92 | — | — | | |
| 3* | −37.277 | 4.10 | 1.53159 | 55.70 | L12 | |
| 4* | −59.504 | 5.64 | — | — | | |
| 5 | 4914.482 | 2.00 | 1.84666 | 23.78 | L13 | |
| 6 | 29.546 | S6 | — | — | | |
| 7 | 56.614 | 7.68 | 1.74077 | 27.79 | L21 | G2 |
| 8 | −40.382 | 1.27 | — | — | | |
| 9 | −46.097 | 1.50 | 1.49700 | 81.55 | L22 | |
| 10 | 22.058 | 5.99 | — | — | | |
| 11 | −57.021 | 6.00 | 1.64769 | 33.79 | L23 | |
| 12 | −17.121 | 1.80 | 1.77250 | 49.60 | L24 | |
| 13 | −94.921 | S13 | — | — | | |
| 14 | 90.549 | 6.00 | 1.72000 | 46.02 | L31 | G3 |
| 15 | −155.491 | S15 | — | — | | |
| 16 | 31.526 | 3.71 | 1.71300 | 53.94 | L41 | G4 |
| 17 | 78.606 | 10.50 | — | — | | |
| 18 | 17.642 | 4.96 | 1.49700 | 81.55 | L42 | |
| 19 | −303.512 | 0.30 | — | — | | |
| 20 | INF | S20 | — | — | — | |
| 21 | 96.837 | 1.50 | 1.83400 | 37.35 | L51 | G5 |
| 22 | 10.749 | 5.04 | 1.48749 | 70.44 | L52 | |
| 23 | −226.938 | 2.79 | — | — | | |
| 24 | −15.477 | 1.60 | 1.80610 | 40.93 | L53 | |
| 25 | −34.192 | 0.30 | — | — | | |
| 26* | 70.532 | 4.72 | 1.48749 | 70.44 | L54 | |
| 27* | −17.501 | Bf | — | — | | |
| 28 | INF | 1.00 | 1.51680 | 64.10 | CG | — |
| 29 | INF | — | — | — | | |

In addition, INF in Table 61 denotes infinity, and asterisk * in Table 61 denotes an aspheric surface. The numerical values of the aspheric surface coefficients are as shown in Table 62. S6, S13, S15, S20 in Table 61 are changed as shown in the following Table 63 in zooming. A projection distance is a lens interval in 1600 mm. The numerical value regarding each of the above-described conditions is as shown in the following Table 64.

TABLE 62

| | 3 | 4 | 26 | 27 |
|---|---|---|---|---|
| K | 0 | 0 | 0 | 0 |
| C4 | 8.4159E−05 | 7.7770E−05 | −2.7356E−06 | 2.2269E−05 |
| C6 | −1.6258E−07 | −7.6149E−08 | 6.8176E−08 | 1.2531E−07 |
| C8 | 2.3960E−10 | −1.2751E−10 | 1.1402E−10 | −7.9451E−10 |
| C10 | 1.0252E−15 | 6.9122E−13 | 4.3531E−12 | 1.0073E−11 |
| C12 | −4.4487E−16 | 8.7161E−16 | 0 | 0 |
| C14 | 5.6651E−19 | −5.2808E−18 | 0 | 0 |
| C16 | −1.4016E−22 | 5.9419E−21 | 0 | 0 |

TABLE 63

| | S6 | S13 | S15 | S20 |
|---|---|---|---|---|
| WIDE-ANGLE END | 6.49 | 9.97 | 8.35 | 0.86 |
| INTERMEDIATE | 8.61 | 3.78 | 5.82 | 1.39 |
| TELEPHOTO END | 8.85 | 0.80 | 1.68 | 1.93 |

TABLE 64

| CONDITION 7 | F5n/F5p | −1.2 |
|---|---|---|
| CONDITION 8 | 1/F5 | −0.006 |
| CONDITION 9 | F3/F4 | 3.03 |
| CONDITION 10 | Fw/F2 | −0.12 |
| CONDITION 11 | |EPw/DMDHT| | 4.29 |
| CONDITION 12 | Fw/BFw | 0.44 |

[Embodiment 17]

FIG. 66 illustrates an optical arrangement view of a projection zoom lens according to Embodiment 17 at the wide-angle end and the telephoto end. The projection zoom lens according to Embodiment 17 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 17, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side, and a positive lens L42 having a convex surface on the magnified side.

The fifth lens group G5 is a negative group including a negative lens L51 having a convex surface on the magnified side, a biconvex positive lens L52, a negative lens L53 having a concave surface on the magnified side, and a biconvex positive lens L54. The lenses L51, L52 are cemented.

Figure 67C:
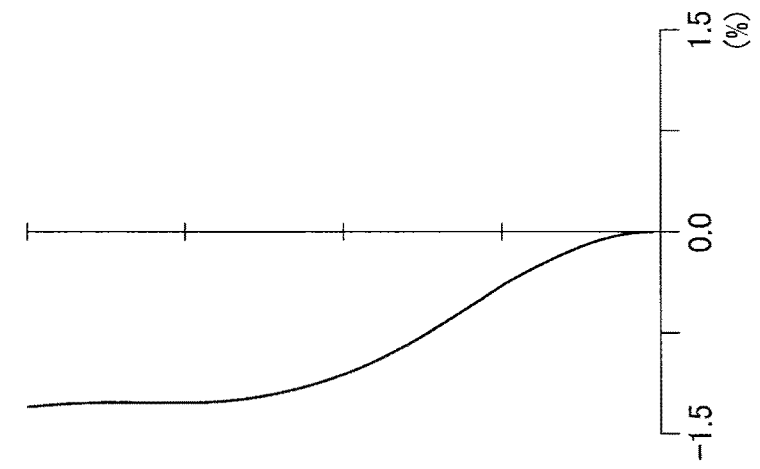
FIGS. 67A, 67B, 67C are aberration views of the projection zoom lens at the wide-angle end according to Embodiment 17.
Figure 67B:
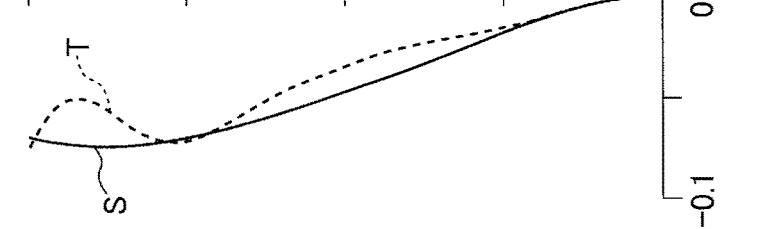
Figure 67A:
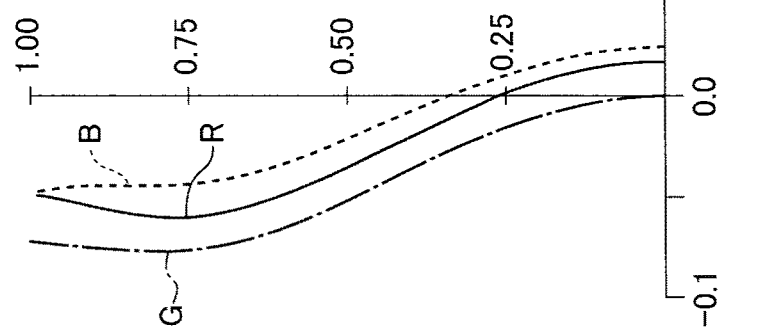
Figure 68A:
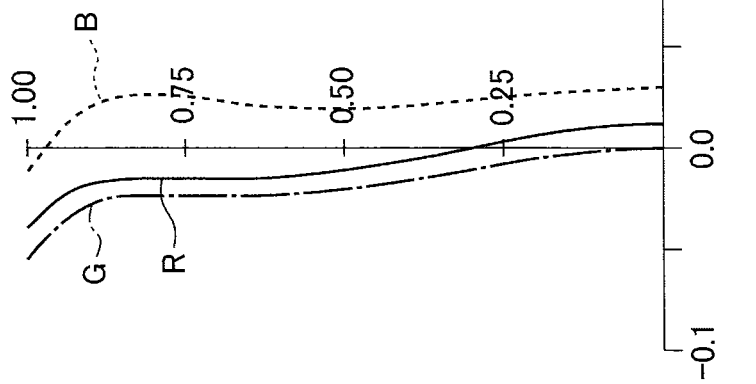
FIGS. 68A, 68B, 68C are aberration views of the projection zoom lens at the intermediate according to Embodiment 17.
Figure 68B:
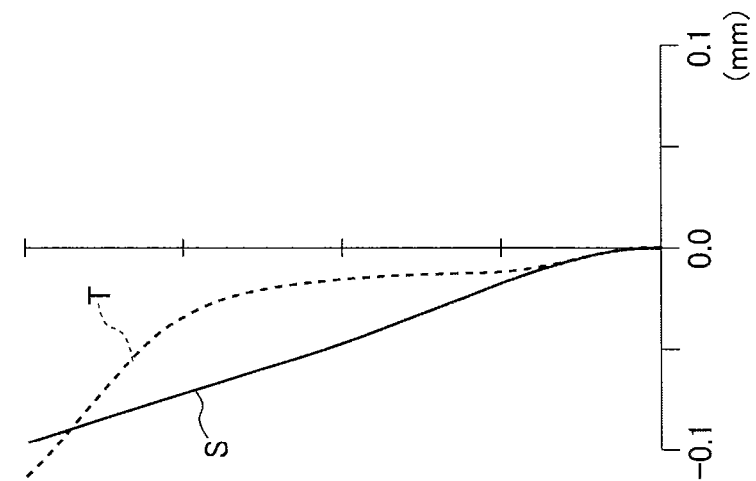
Figure 68C:
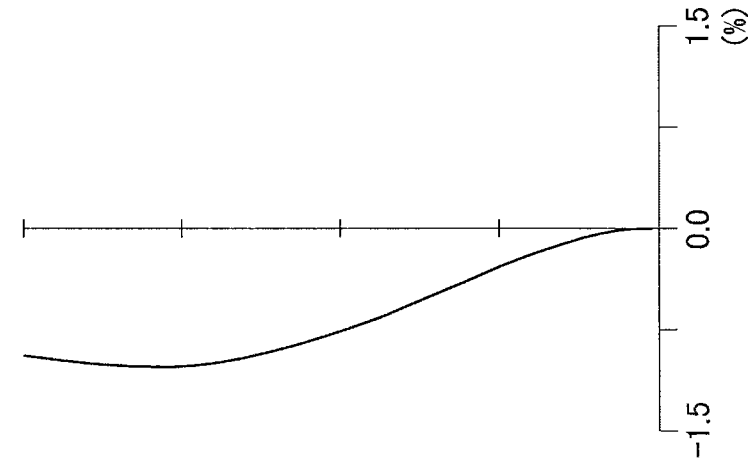
Figure 69C:
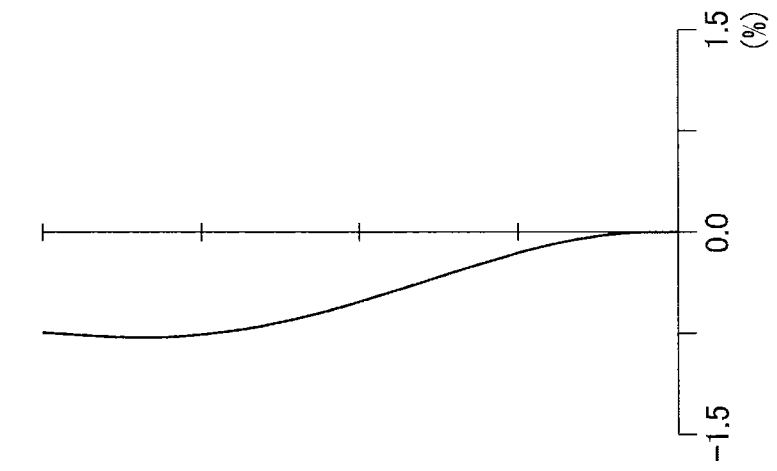
FIGS. 69A, 69B, 69C are aberration views of the projection zoom lens at the telephoto end according to Embodiment 17.
Figure 69B:
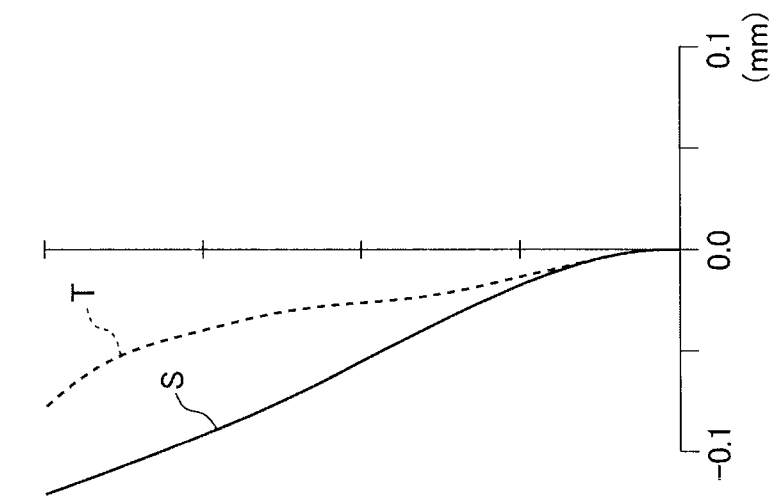
Figure 69A:
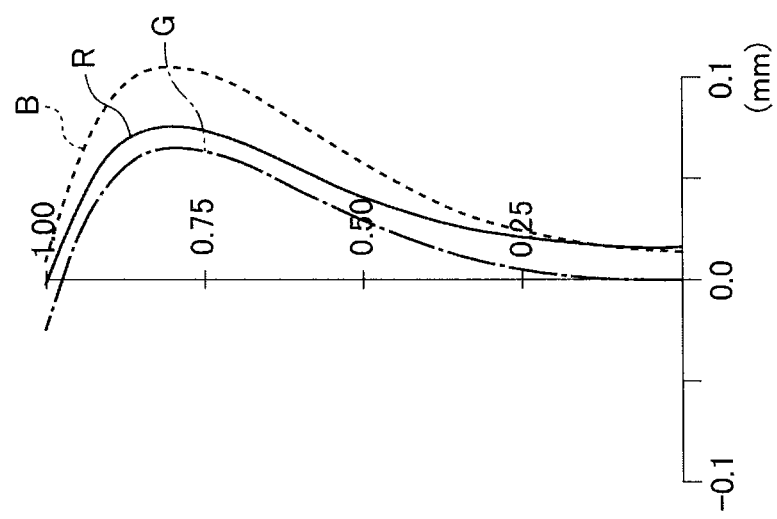
Figure 72C:
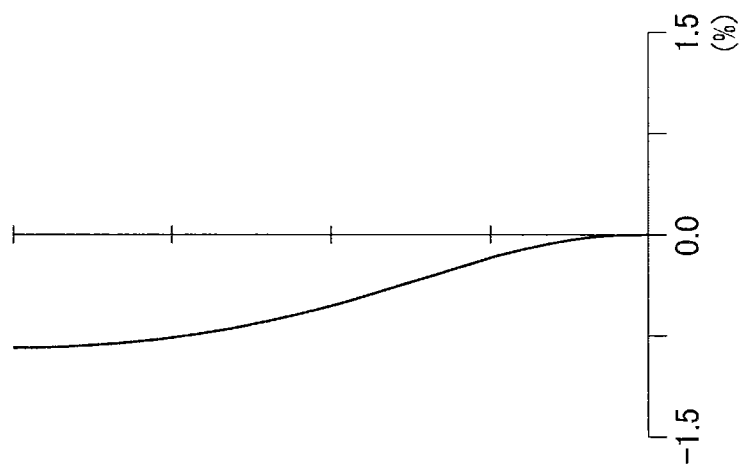
FIGS. 72A, 72B, 72C are aberration views of the projection zoom lens at the intermediate according to Embodiment 18.
Figure 72B:
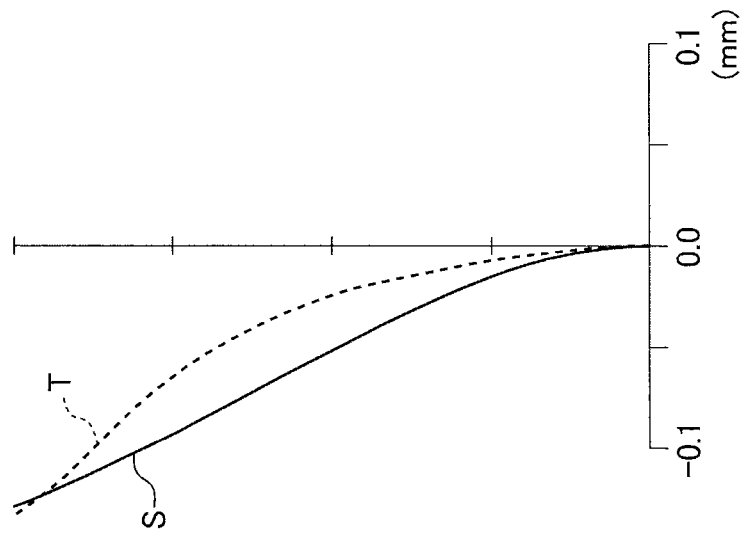
Figure 72A:
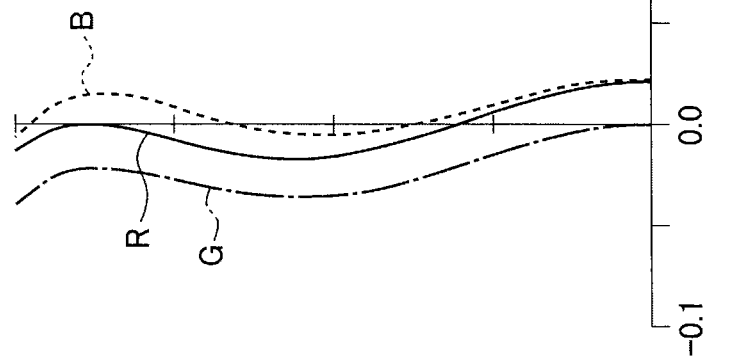

FIGS. 67A-69C illustrate aberration views of the projection zoom lens according to Embodiment 17. FIGS. 67A-67C are views at the wide-angle end, FIGS. 68A-68C are views at the intermediate and FIGS. 69A-69C are views at the telephoto end. FIGS. 67A, 68A, 69A illustrate spherical aberration, FIGS. 67B, 68B, 69B illustrate astigmatism and FIGS. 67C, 68C, 69C illustrate distortion. In each of FIGS. 67A, 68A, 69A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 67B, 68B, 69B, symbol S denotes a sagittal image surface, and symbol T denotes astigmatism of a tangential image surface. As illustrated in FIGS. 67A-69C, the aberration is effectively corrected in each zoom position.

Respective numerical values of Embodiment 17 are illustrated in Table 65.

TABLE 65

F = 14.2~21.1 mm, Fno = 2.55-3.34, WIDE-ANGLE END ω = 39.6°

| S | R | D | Nd | Vd | L | G |
|---|---|---|---|---|---|---|
| 1 | 44.240 | 2.00 | 1.83400 | 37.3 | L11 | G1 |
| 2 | 27.089 | 6.82 | — | — | | |
| 3* | −28.909 | 4.11 | 1.53159 | 55.7 | L12 | |
| 4* | −41.619 | 5.15 | — | — | | |
| 5 | 232.358 | 2.00 | 1.84666 | 23.8 | L13 | |
| 6 | 31.359 | S6 | — | — | | |
| 7 | 100.871 | 6.31 | 1.74077 | 27.8 | L21 | G2 |
| 8 | −41.788 | 0.30 | — | — | | |
| 9 | −67.854 | 1.50 | 1.49700 | 81.5 | L22 | |
| 10 | 24.445 | 6.08 | — | — | | |
| 11 | −306.482 | 6.20 | 1.64769 | 33.8 | L23 | |
| 12 | −19.724 | 1.50 | 1.77250 | 49.6 | L24 | |
| 13 | 900.463 | S13 | — | — | | |
| 14 | 54.428 | 5.10 | 1.72000 | 46.0 | L31 | G3 |
| 15 | 194.638 | S15 | — | — | | |
| 16 | 27.383 | 4.15 | 1.69350 | 53.2 | L41 | G4 |
| 17 | 143.103 | 6.34 | — | — | | |
| 18 | 17.843 | 4.45 | 1.49700 | 81.5 | L42 | |
| 19 | −2202.465 | 0.30 | — | — | | |
| 20 | INF | S20 | — | — | — | |
| 21 | 562.520 | 1.30 | 1.83400 | 37.3 | L51 | G5 |
| 22 | 10.645 | 4.83 | 1.48749 | 70.4 | L52 | |
| 23 | −206.486 | 2.56 | — | — | | |
| 24 | −15.873 | 1.60 | 1.81600 | 46.6 | L53 | |
| 25 | −31.921 | 0.30 | — | — | | |
| 26* | 80.506 | 4.34 | 1.49700 | 81.6 | L54 | |
| 27* | −17.900 | BF | — | — | | |
| 28 | INF | — | 1.51680 | 64.2 | CG | — |
| 29 | INF | — | — | — | | |

In addition, INF in Table 65 denotes infinity, and asterisk * in Table 65 denotes an aspheric surface. The numerical values of the aspheric surface coefficient are as shown in Table 66. S6, S13, S15, S20 in Table 65 are changed as shown in the following Table 67 in zooming. A projection distance is a lens interval in 1600 mm. The numerical value regarding each of the above-described conditions is as shown in the following Table 68.

TABLE 66

| — | 3 | 4 | 26 | 27 |
|---|---|---|---|---|
| K | 0 | 0 | 0 | −0.0233 |
| C4 | 1.0890E−04 | 9.7630E−05 | −1.3573E−05 | 1.4683E−05 |
| C6 | −2.1545E−07 | −8.6404E−08 | 9.3515E−08 | 7.3409E−08 |
| C8 | 3.4221E−10 | −1.6528E−10 | 0.0000E+00 | −2.9796E−10 |
| C10 | −5.1419E−14 | 7.2022E−13 | 0.0000E+00 | 1.0532E−12 |
| C12 | −6.0438E−16 | 1.4422E−15 | 0 | 0 |
| C14 | 1.0157E−18 | −5.5255E−18 | 0 | 0 |
| C16 | −4.7724E−22 | 4.2900E−21 | 0 | 0 |

TABLE 67

| — | S6 | S13 | S15 | S20 |
|---|---|---|---|---|
| WIDE-ANGLE END | 7.78 | 11.26 | 14.58 | 1.15 |
| INTERMEDIATE | 10.25 | 4.03 | 12.74 | 1.60 |
| TELEPHOTO END | 10.79 | 1.24 | 8.15 | 1.97 |

TABLE 68

| CONDITION 7 | F5n/F5p | −1.4 |
|---|---|---|
| CONDITION 8 | 1/F5 | −0.010 |
| CONDITION 9 | F3/F4 | 4.48 |
| CONDITION 10 | Fw/F2 | −0.14 |
| CONDITION 11 | | EPw/DMDHT | | 4.14 |
| CONDITION 12 | Fw/BFw | 0.41 |

[Embodiment 18]

FIG. 70 illustrates an optical arrangement view of a projection zoom lens according to Embodiment 18 at the wide-angle end and the telephoto end. The projection zoom lens according to Embodiment 18 includes, in order from the magnified side, a first lens group G1 having lenses L11-L13, a second lens group G2 having lenses L21-L24, a third lens group G3 having lenses L31, L32, a fourth lens group G4 having a lens L41, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 18, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31 and a positive lens L32 having a convex surface on the magnified side.

The fourth lens group G4 is a positive group including the positive lens L41 having a convex surface on the magnified side.

The fifth lens group G5 is a negative group including a negative lens L51 having a concave surface on the diminished side, a biconvex positive lens L52, a negative lens L53 having a concave surface on the magnified side, and a biconvex positive lens L54. The lenses L51, L52 are cemented.

FIGS. 71A-73C illustrate aberration views of the projection zoom lens according to Embodiment 18. FIGS. 71A-71C are views at the wide-angle end, FIGS. 72A-72C are views at the intermediate and FIGS. 73A-73C are views at the telephoto end. FIGS. 71A, 72A, 73A illustrate spherical aberration, FIGS. 71B, 72B, 73B illustrate astigmatism and FIGS. 71C, 72C, 73C illustrate distortion. In each of FIGS. 71A, 72A, 73A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 71B, 72B, 73B, symbol S denotes a sagittal image surface, and symbol T denotes astigmatism of a tangential image surface. As illustrated in FIGS. 71A-73C, the aberration is effectively corrected in each zoom position.

Each of the numerical values of Embodiment 18 is shown in Table 69.

TABLE 69

F = 13.0~19.6 mm, Fno = 2.55~3.34, WIDE-ANGLE END ω = 42.1°

| — | R | D | Nd | Vd | L | G |
|---|---|---|---|---|---|---|
| 1 | 47.619 | 2.30 | 1.83400 | 37.3 | L11 | G1 |
| 2 | 26.561 | 6.97 | — | — | | |
| 3* | −56.434 | 4.00 | 1.53159 | 55.7 | L12 | |
| 4* | −122.828 | 3.75 | — | — | | |
| 5 | 96.207 | 2.00 | 1.84666 | 23.8 | L13 | |
| 6 | 27.030 | S6 | — | — | | |
| 7 | 47.758 | 7.41 | 1.74077 | 27.8 | L21 | G2 |
| 8 | −48.276 | 0.37 | — | — | | |
| 9 | −80.029 | 1.50 | 1.49700 | 81.5 | L22 | |
| 10 | 19.290 | 6.73 | — | — | | |
| 11 | −43.652 | 6.00 | 1.64769 | 33.8 | L23 | |
| 12 | −16.964 | 1.80 | 1.77250 | 49.6 | L24 | |
| 13 | −74.271 | S13 | — | — | | |
| 14 | 89.328 | 6.00 | 1.69350 | 53.2 | L31 | G3 |
| 15 | −173.557 | 0.30 | — | — | | |
| 16 | 37.478 | 5.70 | 1.69350 | 53.2 | L32 | |
| 17 | 95.951 | S17 | — | — | | |
| 18 | 19.081 | 5.75 | 1.49700 | 81.5 | L41 | G4 |
| 19 | −122.064 | 0.30 | — | — | | |
| 20 | INF | S20 | — | — | — | |
| 21 | 226.979 | 1.50 | 1.83400 | 37.3 | L51 | G5 |
| 22 | 11.328 | 4.52 | 1.48749 | 70.4 | L52 | |
| 23 | −146.917 | 2.69 | — | — | | |
| 24 | −14.356 | 1.60 | 1.80610 | 40.9 | L53 | |
| 25 | −24.687 | 0.30 | — | — | | |
| 26* | 80.889 | 4.60 | 1.48749 | 70.4 | L54 | |
| 27* | −16.897 | Bf | — | — | | |
| 28 | INF | 1 | 1.51680 | 64.1 | CG | — |
| 29 | INF | — | — | — | | |

In addition, INF in Table 69 denotes infinity, and asterisk * in Table 69 denotes an aspheric surface. The numerical values of the aspheric surface coefficients are as shown in Table 70. S6, S13, S15, S20 in Table 69 are changed as shown in the following Table 71 in zooming. A projection distance is a lens interval in 1600 mm. The numerical value regarding each of the above-described conditions is as shown in the following Table 72.

TABLE 70

| — | 3 | 4 | 26 | 27 |
|---|---|---|---|---|
| K | 0 | 0 | 0 | 0 |
| C4 | 7.4160E−05 | 6.9420E−05 | 3.2161E−07 | 2.2340E−05 |
| C6 | −1.5267E−07 | −8.6568E−08 | −2.9004E−08 | 6.3343E−08 |
| C8 | 2.4149E−10 | −1.1318E−10 | 1.3655E−09 | 8.9989E−11 |
| C10 | −4.1560E−14 | 7.3276E−13 | −5.0207E−12 | 3.0536E−12 |
| C12 | −4.4089E−16 | 6.6358E−16 | 0 | 0 |
| C14 | 7.4596E−19 | −6.2146E−18 | 0 | 0 |
| C16 | −5.3286E−22 | 6.4916E−21 | 0 | 0 |

TABLE 71

| — | S6 | S13 | S17 | S20 |
|---|---|---|---|---|
| WIDE-ANGLE END | 7.07 | 14.03 | 11.32 | 1.08 |
| INTERMEDIATE | 9.41 | 5.91 | 10.30 | 1.91 |
| TELEPHOTO END | 9.41 | 0.80 | 8.06 | 2.87 |

TABLE 72

| CONDITION 7 | F5n/F5p | −1.6 |
|---|---|---|
| CONDITION 8 | 1/F5 | −0.001 |
| CONDITION 9 | F3/F4 | 1.27 |
| CONDITION 10 | Fw/F2 | −0.12 |
| CONDITION 11 | \| EPw/DMDHT \| | 4.33 |
| CONDITION 12 | Fw/BFw | 0.41 |

[Embodiment 19]

FIG. 74 illustrates an optical arrangement view of a projection zoom lens according to Embodiment 19 at the wide-angle end and the telephoto end. The projection zoom lens according to Embodiment 19 includes, in order from the magnified side, a first lens group G1 having lenses L11-L13, a second lens group G2 having lenses L21-L24, a third lens group G3 having a lens L31, a fourth lens group G4 having lenses L41, L42, and a fifth lens group G5 having lenses L51-L54. A DMD (digital micro mirror device) as a light modulation device is disposed on the diminished side. In addition, a not-shown cover glass (CG) is disposed on the surface of the DMD facing a lens.

In the projection zoom lens according to Embodiment 19, the first lens group G1 is fixed, the second lens group G2 is moved on the diminished side, the third lens group G3 is moved on the magnified side, the fourth lens group G4 is moved on the magnified side, and the fifth lens group G5 is moved on the magnified side in zooming from the wide-angle end to the telephoto end. Zooming (changing magnification) can be thereby performed from the wide-angle end to the telephoto end. In addition, the third, fourth, and fifth lens groups G3, G4, G5 are moved at different timings.

The first lens group G1 is a negative group including a negative lens L11 having a concave surface on the diminished side, a negative lens L12 having a concave surface on the magnified side, and a negative lens L13 having a concave surface on the diminished side.

The second lens group G2 is a negative group including a biconvex positive lens L21, a biconcave negative lens L22, a lens L23 having a convex surface on the diminished side, and a negative lens L24 having a concave surface on the magnified side. The lenses L23, L24 are cemented.

The third lens group G3 is a positive group including a biconvex positive lens L31.

The fourth lens group G4 is a positive group including a positive lens L41 having a convex surface on the magnified side, and a positive lens L42 having a convex surface on the magnified side.

The fifth lens group G5 is a negative group including a negative lens L51 having a convex surface on the magnified side, a biconvex positive lens L52, a negative lens L53 having a concave surface on the magnified side, and a biconvex positive lens L54. The lenses L51, L52 are cemented.

Figure 75C:
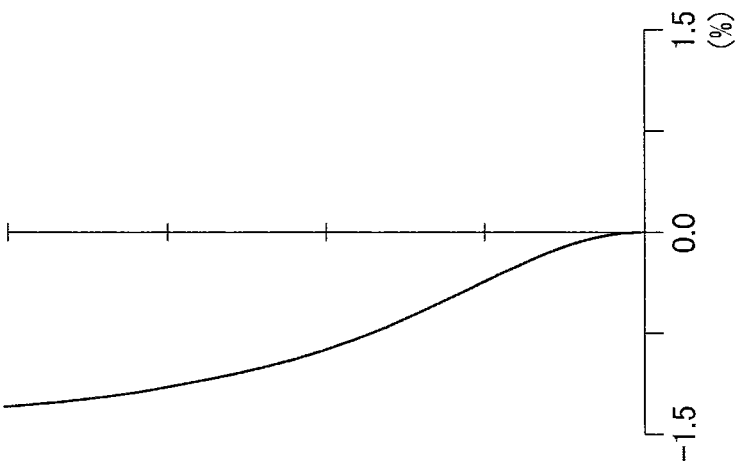
FIGS. 75A, 75B, 75C are aberration views of the projection zoom lens at the wide-angle end according to Embodiment 19.
Figure 75B:
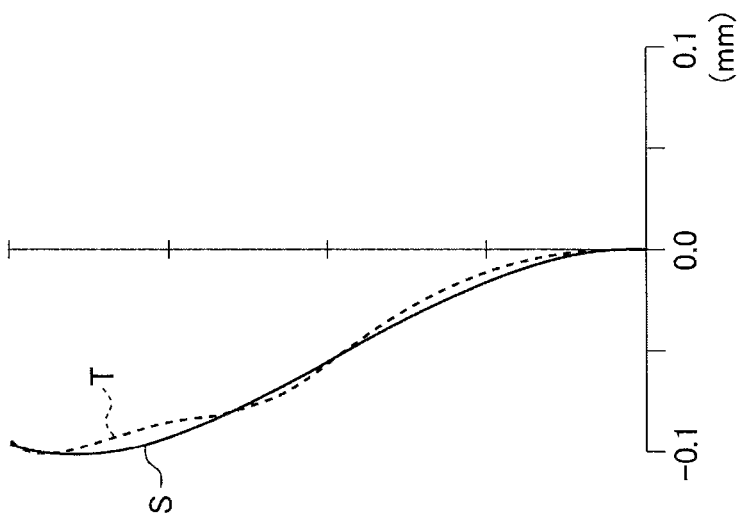
Figure 75A:
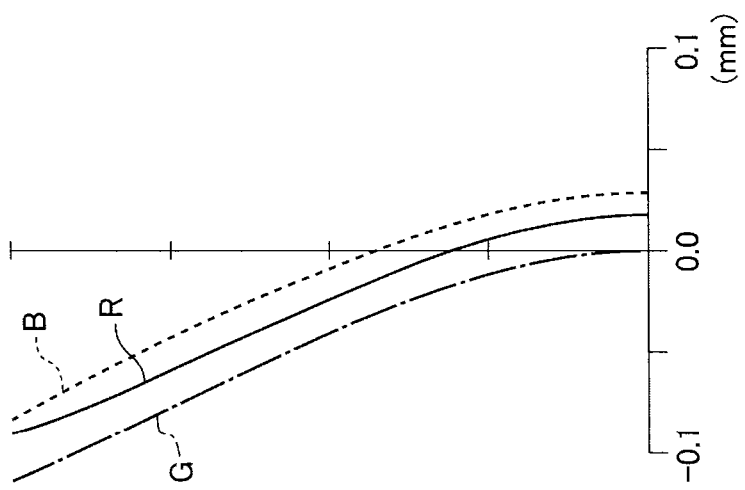
Figures 77A, 77B, 77C:
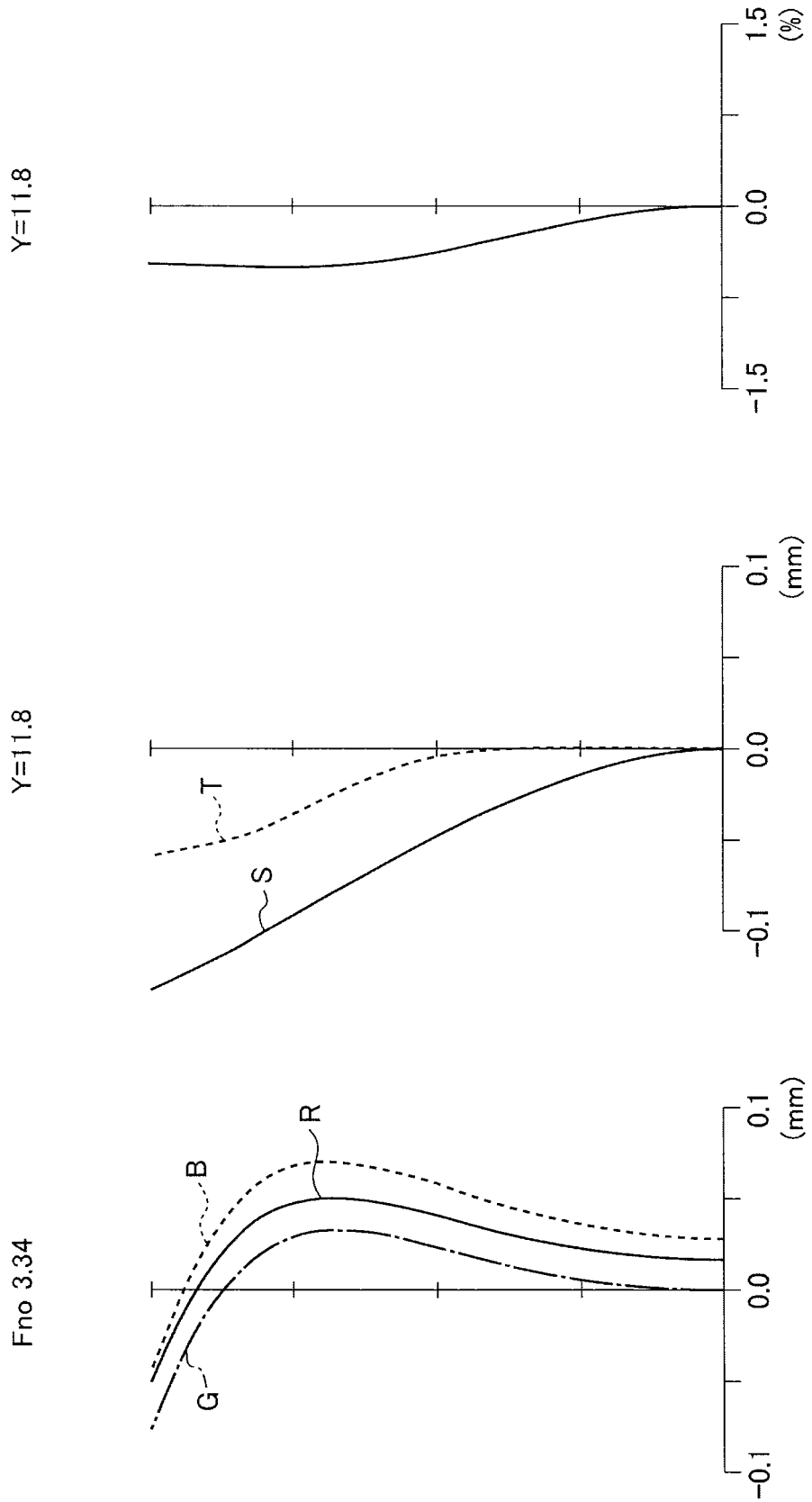
FIGS. 77A, 77B, 77C are aberration views of the projection zoom lens at the telephoto end according to Embodiment 19.

FIGS. 75A-77C illustrate aberration views of the projection zoom lens according to Embodiment 19. FIGS. 75A-75C are views at the wide-angle end, FIGS. 76A-76C are views at the intermediate and FIGS. 77A-77C are views at the telephoto end. FIGS. 75A, 76A, 77A illustrate spherical aberration, FIGS. 75B, 76B, 77B illustrate astigmatism and FIGS. 75C, 76C, 77C illustrate distortion. In each of FIGS. 75A, 76A, 77A, symbol R denotes red (625 nm in wavelength) spherical aberration, symbol G denotes green (550 nm in wavelength) spherical aberration, and symbol B denotes blue (460 nm in wavelength) spherical aberration. In each of FIGS. 75B, 76B, 77B, symbol S denotes a sagittal image surface, and symbol T denotes astigmatism of a tangential image surface. As illustrated in FIGS. 75A-77C, the aberration is effectively corrected in each zoom position.

Each of the numerical values of Embodiment 19 is shown in Table 73.

TABLE 73

F = 13.0~19.6 mm, Fno = 2.55~3.34, WIDE-ANGLE END ω = 42.1°

| | R | D | Nd | Vd | L | G |
|---|---|---|---|---|---|---|
| 1 | 42.925 | 2.30 | 1.83400 | 37.35 | L11 | G1 |
| 2 | 27.025 | 6.68 | — | — | | |
| 3* | −50.899 | 4.00 | 1.53159 | 55.70 | L12 | |
| 4* | −100.040 | 4.62 | — | — | | |
| 5 | 122.391 | 2.00 | 1.84666 | 23.78 | L13 | |
| 6 | 30.005 | S6 | — | — | | |
| 7 | 77.762 | 5.81 | 1.78470 | 26.29 | L21 | G2 |
| 8 | −54.705 | 0.30 | — | — | | |
| 9 | −155.918 | 1.60 | 1.49700 | 81.55 | L22 | |
| 10 | 18.674 | 6.59 | — | — | | |
| 11 | −48.419 | 5.93 | 1.64769 | 33.79 | L23 | |
| 12 | −17.960 | 3.73 | 1.77250 | 49.60 | L24 | |
| 13 | −102.424 | S13 | — | — | | |
| 14 | 81.589 | 3.49 | 1.69700 | 48.52 | L31 | G3 |
| 15 | −486.914 | S15 | — | — | | |
| 16 | 32.258 | 3.78 | 1.69350 | 50.81 | L41 | G4 |
| 17 | 200.172 | 11.56 | — | — | | |
| 18 | 20.135 | 4.13 | 1.49700 | 81.55 | L42 | |
| 19 | −110.425 | 0.30 | — | — | | |
| 20 | INF | S20 | — | — | — | |
| 21 | −117.692 | 1.60 | 1.83400 | 37.35 | L51 | G5 |
| 22 | 12.966 | 4.53 | 1.48749 | 70.44 | L52 | |
| 23 | −65.449 | 2.42 | — | — | | |
| 24 | −16.005 | 1.55 | 1.80610 | 40.93 | L53 | |
| 25 | −29.327 | 0.25 | — | — | | |
| 26* | 62.689 | 4.94 | 1.48749 | 70.24 | L54 | |
| 27* | −17.740 | Bf | — | — | | |
| 28 | INF | 1 | 1.51680 | 64.17 | CG | — |
| 29 | INF | — | — | — | | |

In addition, INF in Table 73 denotes infinity, and asterisk * in Table 73 denotes an aspheric surface. The numerical values of the aspheric surface coefficients are as shown in Table 74. S6, S13, S15, S20 in Table 73 are changed as shown in the following Table 75 in zooming. A projection distance is a lens interval in 1600 mm. The numerical value regarding each of the above-described conditions is as shown in the following Table 76.

TABLE 74

| | 3 | 4 | 26 | 27 |
|---|---|---|---|---|
| K | 0 | 0 | 0 | 0 |
| C4 | 7.5167E−05 | 7.2360E−05 | −1.1005E−05 | 1.9459E−05 |
| C6 | −1.3938E−07 | −7.1757E−08 | 8.1058E−08 | 8.9295E−08 |
| C8 | 1.9731E−10 | −1.0107E−10 | −2.5836E−10 | −7.0144E−10 |
| C10 | −2.1512E−14 | 5.0654E−13 | 5.8440E−12 | 9.6074E−12 |
| C12 | −3.1062E−16 | 6.3442E−16 | 0 | 0 |
| C14 | 5.5741E−19 | −3.0366E−18 | 0 | 0 |
| C16 | −3.7441E−22 | 1.9049E−21 | 0 | 0 |

TABLE 75

| | S6 | S13 | S15 | S20 |
|---|---|---|---|---|
| WIDE-ANGLE END | 6.15 | 9.79 | 8.90 | 1.43 |
| INTERMEDIATE | 9.34 | 3.34 | 5.38 | 2.22 |
| TELEPHOTO END | 9.63 | 0.80 | 0.80 | 3.02 |

TABLE 76

| CONDITION 7 | F5n/F5p | −1.6 |
| CONDITION 8 | 1/F5 | −0.003 |
| CONDITION 9 | F3/F4 | 3.95 |
| CONDITION 10 | Fw/F2 | −0.21 |
| CONDITION 11 | | EPw/DMDHT | | 4.37 |
| CONDITION 12 | Fw/BFw | 0.41 |

As described above, in the projection zoom lens described in each of Embodiments 13-19, aberration is corrected at a high level, and spherical aberration, astigmatism, field curvature, chromatic aberration of magnification, and distortion are significantly corrected. A preferable optical performance is apparent from each of the embodiments.

The projection zoom lens of each of Embodiments 13-19 includes a five-group configuration. However, the configuration of the projection zoom lens according to the present invention is not limited to the embodiments. A six-group configuration can be used. When a sixth lens group G6 is provided in the projection zoom lens of each of Embodiments 13-19, the sixth lens group G6 is made of a lens which corrects aberration. In this case, the refractive power of the sixth lens is weaker than that of the fifth lens group, and the sixth lens group is moved on the magnified side at a different timing from the third, fourth, and fifth lens groups G3, G4, G5.

Projector

Figure 49:
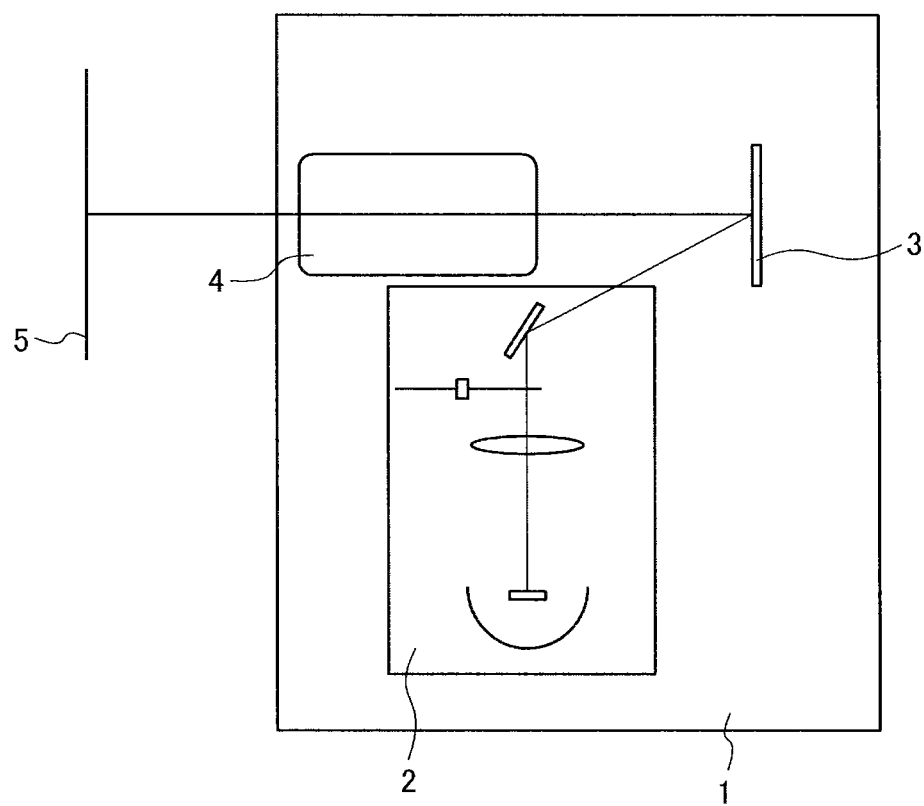
FIG. 49 is a schematic configuration view illustrating an embodiment of a projector according to the present invention.

Next, an embodiment of a projector will be described. FIG. 49 is a schematic view illustrating a configuration of a projector.

As illustrated in FIG. 49, the projector 1 includes a DMD 3 as a light modulation device. The light of the three colors R, G B is irradiated from an illumination optical system 2 to the DMD 3. The reflection light from a micromirror is magnified by a projection lens 4 by controlling the tilt of the micromirror of the DMD 3 corresponding to each pixel in the irradiation timing of each light color, and the magnified light is projected to a screen as a projected surface, so as to be displayed.

The projector 1 includes a not-shown condenser lens, RGB color wheel, and mirror, and requires a relatively large arrangement space. The back focus of the projection lens 4 is required to be ensured on some level, and the lens diameter on the DMD 3 side is required to be reduced because of the relationship between the projection lens 4 and the illumination optical system 2 of the projector 1.

Therefore, by using the projection zoom lens described above as the projection lens 4, a projector having a wide angle of view (ω=39-45)° which is wider than a conventional one, and a high-power zoom ratio of ×1.5 can be obtained.

According to the embodiments of the present invention, a wide-angle and high-power projection zoom lens and projector can be obtained.

What is claimed is:

1. A projection zoom lens constituting a projection optical system of a projector, which projects an image displayed on a surface of an image display element on a projected surface, so as to magnify and display the image,
the projection zoom lens comprising in order from a projected surface side to an image display element side:
a first lens group having a negative refractive power;
a second lens group having a negative refractive power;
a third lens group having a positive refractive power;
a fourth lens group having a positive refractive power; and
a fifth lens group,
wherein a refractive power of the fifth lens group is weaker than the refractive power of the first lens group, the refractive power of the second lens group, the refractive power of the third lens group, and the refractive power of the fourth lens group,
wherein the following condition is satisfied where F5 is a focal length of the fifth lens group in millimeters:

$-0.01 < 1/F5 < 0.01$.

2. The projection zoom lens according in claim 1, wherein the image display element is a reflective image display element.

3. The projection zoom lens according to claim 1, wherein the following condition is satisfied, where F1 is a focal length of the first lens group and F2 is a focal length of the second lens group:

$0.15 < F1/F2 < 0.50$.

4. A projection zoom lens constituting a projection optical system of a projector, which projects an image displayed on a surface of an image display element on a projected surface, so as to magnify and display the image,
the projection zoom lens comprising order from a projected surface side to an image display element side:
a first lens group having a negative refractive power;
a second lens group having a negative refractive power;
a third lens group having a positive refractive power;
a fourth lens group having a positive refractive power; and
a fifth lens group,
wherein a refractive power of the fifth lens group is weaker than the refractive power of the first lens group, the refractive power of the second lens group, the refractive power of the third lens group, and the refractive power of the fourth lens group, and
wherein the following condition is satisfied, where HS is an optical effective diameter of a lens closest to the projected surface, and HE is an optical effective diameter of a lens closest to the image display element:

$2.5 < HS/HE < 3.5$.

5. The projection zoom lens according to claim 1, wherein the following condition is satisfied, where OALw is a distance from a lens surface on the projected surface side in a lens closest to the projected surface to a surface of the image display element when the image projected on the projected surface is focused, and Fw is a focal length of an entire projection optical system at the wide-angle end:

$10.0 < OALw/Fw < 12.0$.

6. The projection zoom lens according to claim 5, wherein HE is an optical effective diameter of a lens closest to the image display element and the following condition is satisfied:

$15.2 < OALw/HE < 17.4$.

7. The projection zoom lens according to claim 1, wherein the following condition is satisfied, where F5n is a focal length of a negative lens closest to the image display element in the fifth lens group, and F5p is a focal length of a positive lens closest to the image display element in the fifth lens group:

$-1.9 < F5n/F5p < 1.1$.

8. The projection zoom lens according to claim 1, wherein the following condition is satisfied; where F3 is a focal length of the third lens group and F4 is a focal length of the fourth lens group:

$1.3 < F3/F4 < 4.6$.

9. The projection zoom lens according to claim 1, wherein the following condition is satisfied, where Fw is a focal length of an entire projection optical system at the wide-angle end and F2 is a focal length of the second lens group:

$-0.27 < Fw/F2 < -0.11$.

10. The projection zoom lens according to claim 2, wherein the following condition is satisfied, where EPw is a distance from a display surface of the reflective image display element to an entrance pupil, and DMDHT is a distance from a rotation central axis of a spherical lens closest to the reflective image display element to a most periphery of the reflective image display element:

$4.0 < |EPw/DMDHT| < 4.5$.

11. The projection zoom lens according to claim 2, wherein the following condition is satisfied, where BFw is a distance from a surface on the reflective image display element side in a lens closest to the reflective image display element of the projection optical system at the wide-angle end to a display surface of the reflective image display element, and Fw is a focal length of an entire projection optical system at the wide-angle end:

$0.35 < Fw/BFw < 0.45$.

12. The projection zoom lens according to claim 1, wherein the following condition is satisfied, where ω is a half-field angle of a projection image:

$39° < ω < 45°$.

13. A projection zoom lens constituting a projection optical system of a projector, which projects an image displayed on a surface of an image display element on a projected surface, so as to magnify and display the image,
the projection zoom lens comprising in order from a projected surface side to an image display element side:
a first lens group having a negative refractive power;
a second lens group having, a negative refractive power;
a third lens group having a positive refractive power;
a fourth lens group having a positive refractive power; and
wherein the fifth lens group includes, in order from the projected surface side, a negative lens, a positive lens, a negative lens and is positive lens.

14. A projector comprising:
a light source;
an illumination light system configured to illuminate an image display element with light emitted from the light source;
an image display element configured to display an image by controlling emission of incident light through the illumination light system; and
a projection optical system configured to project the image displayed on a display surface of the image display element on a projected surface, so as to magnify and display the image,
wherein the projection optical system includes the projection zoom lens according to claim 1.

15. A projector comprising:
a light source;
an illumination light system configured to illuminate an image display element with light emitted from the light source;
an image display element configured to display an image by controlling emission of incident light through the illumination light system; and
a projection optical system configured to project the image displayed on a display surface of the image display element on a projected surface, so as to magnify and display the image,
wherein, the projection optical system includes the projection zoom lens according to claim 13.

16. The projection zoom lens according to claim 1, wherein a lens group closest to the image display element is moved from a wide-angle side to a telephoto side in zooming.

* * * * *